## (12) United States Patent
Kadota et al.

(10) Patent No.: US 6,857,586 B2
(45) Date of Patent: Feb. 22, 2005

(54) ROLLED ARTICLE, AND METHOD OF AND APPARATUS FOR PROCESSING ROLLED ARTICLE

(75) Inventors: Norihiro Kadota, Minamiashigara (JP); Kouji Tsujimura, Minamiashigara (JP); Kazuo Okutsu, Minamiashigara (JP); Katsumi Tashiro, Minamiashigara (JP); Hisashi Takahashi, Minamiashigara (JP); Bungo Shigeta, Minamiashigara (JP); Koichi Nakatogawa, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 173 days.

(21) Appl. No.: 10/119,276

(22) Filed: Apr. 10, 2002

(65) Prior Publication Data

US 2002/0148922 A1 Oct. 17, 2002

(30) Foreign Application Priority Data

| Apr. 12, 2001 | (JP) | ................................. 2001-114506 |
| Apr. 16, 2001 | (JP) | ................................. 2001-116982 |
| May 22, 2001 | (JP) | ................................. 2001-152799 |
| May 16, 2001 | (JP) | ................................. 2001-146823 |
| May 16, 2001 | (JP) | ................................. 2001-146831 |
| Jun. 29, 2001 | (JP) | ................................. 2001-199894 |
| Jul. 12, 2001 | (JP) | ................................. 2001-212756 |

(51) Int. Cl.⁷ ................................. B65H 75/14; B65H 18/28

(52) U.S. Cl. ................................. 242/160.3; 242/160.4; 242/609.1; 242/613.4; 242/614.1; 206/410; 206/416

(58) Field of Search ................................. 242/160.3, 160.4, 242/609, 609.1, 613.4, 613.5, 614.1, 118.61; 206/398, 400, 410, 413, 414, 415, 416

(56) References Cited

U.S. PATENT DOCUMENTS 5,267,704 A * 12/1993 Kitamura et al. ......... 242/613.5
6,481,904 B2 * 11/2002 Fukugawa et al. .......... 206/413

FOREIGN PATENT DOCUMENTS

| JP | 10-129613 | 5/1998 |
| JP | 2000-310834 | 11/2000 |
| JP | 2001-249431 | 9/2001 |

* cited by examiner

Primary Examiner—John M. Jillions
(74) Attorney, Agent, or Firm—Sughrue Mion, PLLC

(57) ABSTRACT

An apparatus for processing a rolled article has a rotary supporting mechanism for rotatably supporting opposite ends of a photosensitive roll, an end drawing mechanism for drawing a sheet end of the photosensitive roll to a prescribed length, a pressing mechanism for supporting opposite surfaces of the sheet end, and an applying mechanism for applying a joint tape to the sheet end supported by the pressing mechanism in a transverse direction of the photosensitive roll.

1 Claim, 107 Drawing Sheets

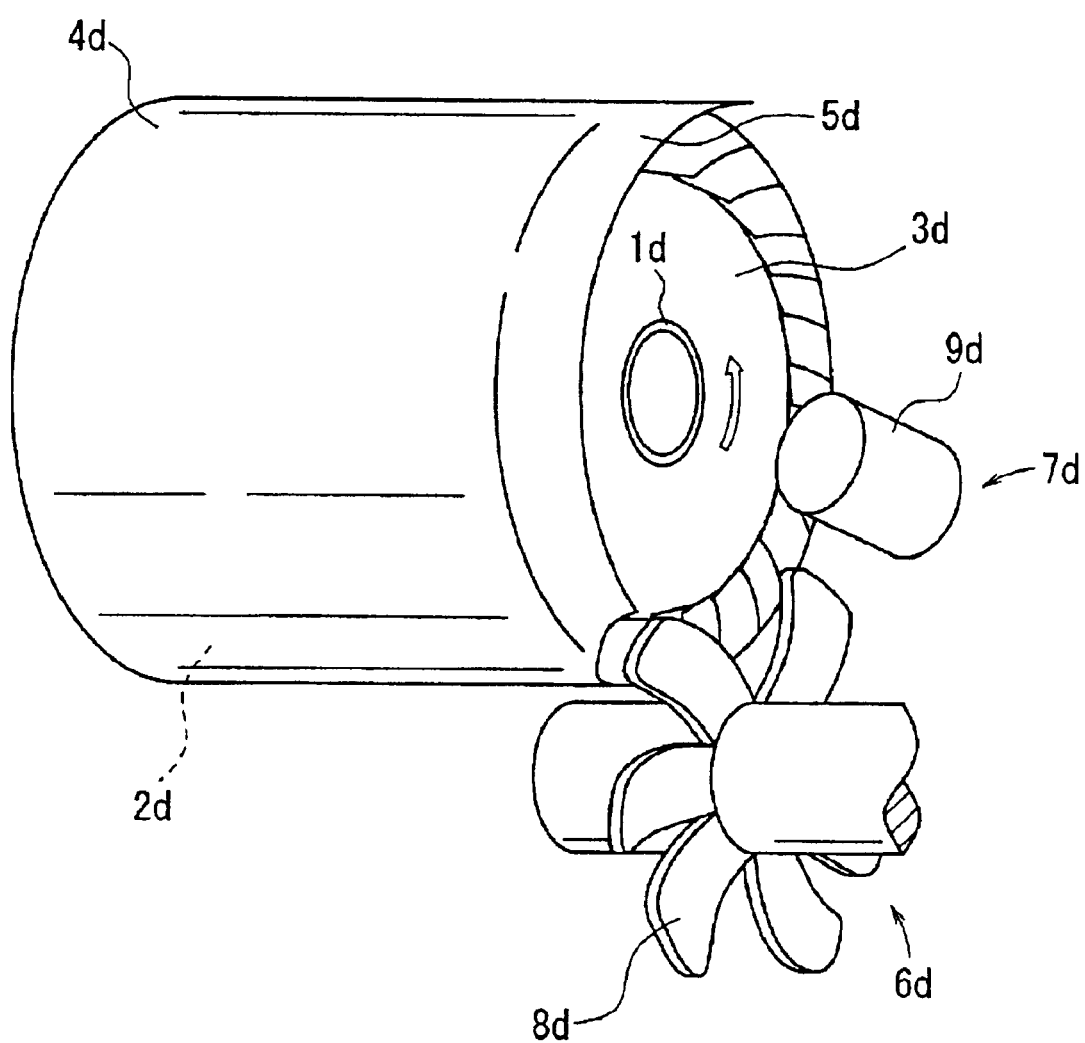

ROLLED ARTICLE, AND METHOD OF AND APPARATUS FOR PROCESSING ROLLED ARTICLE

BACKGROUND OF THE INVENTION

1. Field of the Invention

The present invention relates to a rolled article comprising a roll of elongate sheet, and a method of and an apparatus for processing such a rolled article.

2. Description of the Related Art

Films for use in the field of platemaking are in the form of a light-shielded photosensitive roll comprising an elongate photosensitive sheet wound around a core, a pair of light-shielding members mounted respectively on the opposite ends of the wound photosensitive sheet, and a light-shielding sheet (leader) wound around the photosensitive sheet.

Various light-shielded photosensitive rolls have heretofore been proposed in the art. The applicant of the present application has filed a patent application on a process for easily manufacturing such a light-shielded photosensitive roll (see Japanese Laid-Open Patent Publication No. 2000-310834).

According to the process disclosed in the above patent application, as shown in FIG. 105 of the accompanying drawings, two disk-shaped light-shielding members 2 are attached respectively to opposite ends of a photosensitive roll (rolled article) 1, and an elongate heat-shrinkable light-shielding leader 3 which is longitudinally shrinkable with heat is wound around the photosensitive roll 1, the light-shielding leader 3 having an end fixed to the photosensitive roll 1 by tapes 4. Then, the photosensitive roll 1 is placed in a shrink tunnel and heated to shrink the light-shielding leader 3. The light-shielding leader 3 is shrunk with heat to have its opposite edges brought into close contact with the outer edges of the disk-shaped light-shielding members 2, whereupon a light-shielded photosensitive roll 5 is completed.

The light-shielding leader 3 is joined to the end of the photosensitive roll 1 by a joint tape 6. Since the end of the photosensitive roll 1 is a free end, it tends to have a different length. In addition, the end of the photosensitive roll 1 is liable to curl up or down or sag depending on the width of the photosensitive roll 1, the thickness of the sheet of the photosensitive roll 1, or the type of the photosensitive roll 1.

Because of these irregularities of the end of the photosensitive roll 1, the joint tape 6 may be applied to the end of the photosensitive roll 1 in a displaced position, or may be applied obliquely to the end of the photosensitive roll 1, or wrinkles may be developed in the end of the photosensitive roll 1. As a result, the light-shielding leader 3 may not be attached securely to the end of the photosensitive roll 1.

Usually, suction belts and suction pads are used to supply the light-shielding leader 3 to a position where the light-shielding leader 3 will be applied to the photosensitive roll 1. However, the suction belts and suction pads tend to fail to position the end of the light-shielding leader 3 accurately in the applying position, resulting in a reduction in the accuracy with which the light-shielding leader 3 is applied to the photosensitive roll 1.

After the light-shielding leader 3 is applied to the end of the photosensitive roll 1, the light-shielding leader 3 may possibly be warped when the photosensitive roll 1 is rotated. If the light-shielding leader 3 is warped, then the light-shielding leader 3 wound around the photosensitive roll 1 is shifted out of position in its turn.

End tapes 4 are usually supported in an array on a separable strip 7 before they are supplied to the light-shielding leader 3. End tapes 4 are then successively removed from the separable strip 7 and supplied to the light-shielding leader 3. According to the conventional process, the end tapes 4 applied to the separable strip 7 may not reliably be removed one by one from the separable strip 7, and hence may not efficiently be supplied to the light-shielding leader 3.

The light-shielding leader 3 is relatively expensive to manufacture. Therefore, rectangular heat-shrinkable members (hereinafter referred to as "skirt members") are used to cover the opposite ends of the photosensitive roll 1, and applied to the respective edges of the light-shielding leader 3.

Skirt members are usually blanked from a blank sheet. The yield of skirt members per blank sheet is low because a large amount of scrap is produced. For better efficiency, blanked skirt members need to be collected and handled together. However, it is difficult to separate, one by one, the skirt members which have been collected and handled together, and two or more skirt members may simultaneously be removed from the stock of skirt members, with the result that the skirts cannot efficiently be applied to the edges of the light-shielding leader 3.

As shown in FIG. 106 of the accompanying drawings, flanged members 7 may be mounted respectively in the disk-shaped light-shielding members 2 of the photosensitive roll 1 as required by a device which is loaded with the light-shielded photosensitive roll 5. The disk-shaped light-shielding members 2 have grooves 2a in their inner circumferential surfaces, and the flanged members 7 have ridges 7c extending from tapered tips 7a to straight barrels 7b. The flanged members 7 are turned to bring the ridges 7c thereof into alignment with the grooves 2a of the disk-shaped light-shielding members 2, and then inserted into the disk-shaped light-shielding members 2, respectively.

Usually, the inside diameter of the disk-shaped light-shielding members 2, the outside diameter of the flanged members 7, or the shapes (circularity, etc.) of the disk-shaped light-shielding members 2 and the flanged members 7, are liable to change. When the tapered tips 7a of the flanged members 7 are inserted into the disk-shaped light-shielding members 2 and the flanged members 7 are turned, the ridges 7c of the tapered tips 7a move out of the grooves 2a, so that the tapered tips 7a of the flanged members 7 may be inserted into the disk-shaped light-shielding members 2 while the ridges 7c are out of alignment with the grooves 2a.

With the ridges 7c not aligned with the grooves 2a, the flanged members 7 cannot easily be removed from the disk-shaped light-shielding members 2 when the components of the light-shielded photosensitive roll 5 are to be reused after the light-shielded photosensitive roll 5 has been used.

Since the disk-shaped light-shielding members 2 and the flanged members 7 are engaged with each other under widely different conditions, a large torque is required to turn the flanged members 7. Therefore, a large torque generating device for generating a torque required to turn the flanged members 7 is needed, and hence a large device for installing the flanged members 7 is required.

An apparatus for packaging the above light-shielded photosensitive roll is known from Japanese Laid-Open Patent Publication No. 10-129613, for example. In the known apparatus, as shown in FIG. 107 of the accompanying drawings, inner seals (light-shielding members) $3d$ are applied to the respective opposite ends of a photographic film roll $2d$ on a core, and a light-shielding sheet $4d$ is wound around the photographic film roll $2d$. The light-shielding sheet $4d$ has side edge portions $5d$ (one shown) projecting outwardly beyond the edges of the inner seals $3d$ and folded down against the inner seals $3d$ by folding units $6d$ and heated by heating units $7d$. Each of the folding units $6d$ has folding vanes $8d$ which are rotated by a motor, and each of the heating units $7d$ has a heating roller $9d$.

When the photographic film roll $2d$ is rotated about its own axis in the direction indicated by the arrow by a rotating mechanism (not shown), the folding vanes $8d$ of the folding units $6d$ fold down the side edge portions $5d$ of the light-shielding sheet $4d$ against the inner seals $3d$, and the heating rollers $9d$ of the heating units $7d$ heat the side edge portions $5d$, thermally bonding the side edge portions $5d$ to the inner seals $3d$.

The conventional packaging apparatus is complex in structure and large in size because of a rotating mechanism for rotating the photographic film roll $2d$. The heating rollers $9d$ of the heating units $7d$ need to be adjusted in position for processing photographic film rolls $2d$ having different outside diameters. The heating units $7d$ with such a positional adjustment capability are also complex in structure.

Apparatus for manufacturing photosensitive rolls usually have a number of working stations which are supplied with specification data on shapes and materials of photosensitive rolls for processing workpieces depending on the specifications of photosensitive rolls.

When a photosensitive roll is fed from one working station to a next working station, the specification data are also transferred to a controller associated with the next working station. The controller operates on the premise that the transferred specification data are the specification data for the fed photosensitive roll.

If a photosensitive roll manufacturing apparatus performs a complex manufacturing process and has many working stations, then since there is no guarantee that the specification data will always be transferred normally, the reliability of the specification data may become lower as they go to more downstream working stations. When the photosensitive roll manufacturing apparatus continuously operates under such conditions, inappropriate photosensitive rolls may possibly be manufactured, or control devices of the photosensitive roll manufacturing apparatus may possibly be damaged or otherwise malfunction.

If trouble arises while a photosensitive roll is being fed and the photosensitive roll is removed from its pallet, then a photosensitive roll and specification data supplied to a working station may not correspond to each other.

One solution would be for each of the pallets for feeding photosensitive rolls between working stations to be equipped with a memory means for storing the specification data of a photosensitive roll, so that when a pallet arrives at a working station, the working station reads the specification data stored in the memory means on the pallet. The memory means on the pallets allow each working station to operate on the pallet appropriately without the danger of data transfer troubles.

However, the memory means on each pallet needs to rewrite the stored specification data each time a different photosensitive roll is carried on the pallet. Since the memory means is limited to a certain number of rewriting cycles, if the pallet is repeatedly used in a mass-production application, then the service life of the memory means is relatively short because the stored specification data are rewritten many times.

SUMMARY OF THE INVENTION

It is a general object of the present invention to provide a method of and an apparatus for processing a rolled article so as to be able to easily and reliably apply tape members to an end of the rolled article at given positions thereon, and to well handle changes in the width of the rolled article.

A primary object of the present invention is to provide a method of and an apparatus for processing a rolled article so as to be able to wind a packaging sheet well and efficiently around a rolled article in a simple process and with a simple arrangement.

Another primary object of the present invention is to provide a method of and an apparatus for processing a rolled article so as to be able to remove end tapes reliably one by one from a separable sheet for thereby efficiently supplying the end tapes in a simple process and with a simple arrangement.

Still another primary object of the present invention is to provide a method of and an apparatus for processing a rolled article so as to be able to apply skirt members reliably to sheet members for thereby efficiently and automatically processing packaging sheets in a simple process and with a simple arrangement.

Yet another primary object of the present invention is to provide a method of and an apparatus for processing a rolled article so as to be able to bond a packaging member reliably, with heat, to opposite outer circumferential edges of various rolled articles having different diameters, with a simple arrangement.

Still yet another primary object of the present invention is to provide a rolled article of a simple arrangement which allows grooves in a first flanged member and ridges on a second flanged member to be aligned with each other reliably and easily.

A further primary object of the present invention is to provide a method of and an apparatus for processing a rolled article so as to be able to allow grooves in a first flanged member and ridges on a second flanged member to be aligned with each other reliably and easily, for thereby efficiently mounting a flanged structure in a simple process and with a simple arrangement.

A still further primary object of the present invention is to provide a method of and an apparatus for processing a rolled article highly reliably so as to be able to transfer specification data of the rolled article reliably to working stations while the specification data are being used in a number of times in a mass-production application, when the rolled article is placed on a pallet and fed between a plurality of working stations for being processed therein.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 107 is a perspective view of a conventional packaging apparatus.

DESCRIPTION OF THE PREFERRED EMBODIMENTS

Figure 1:
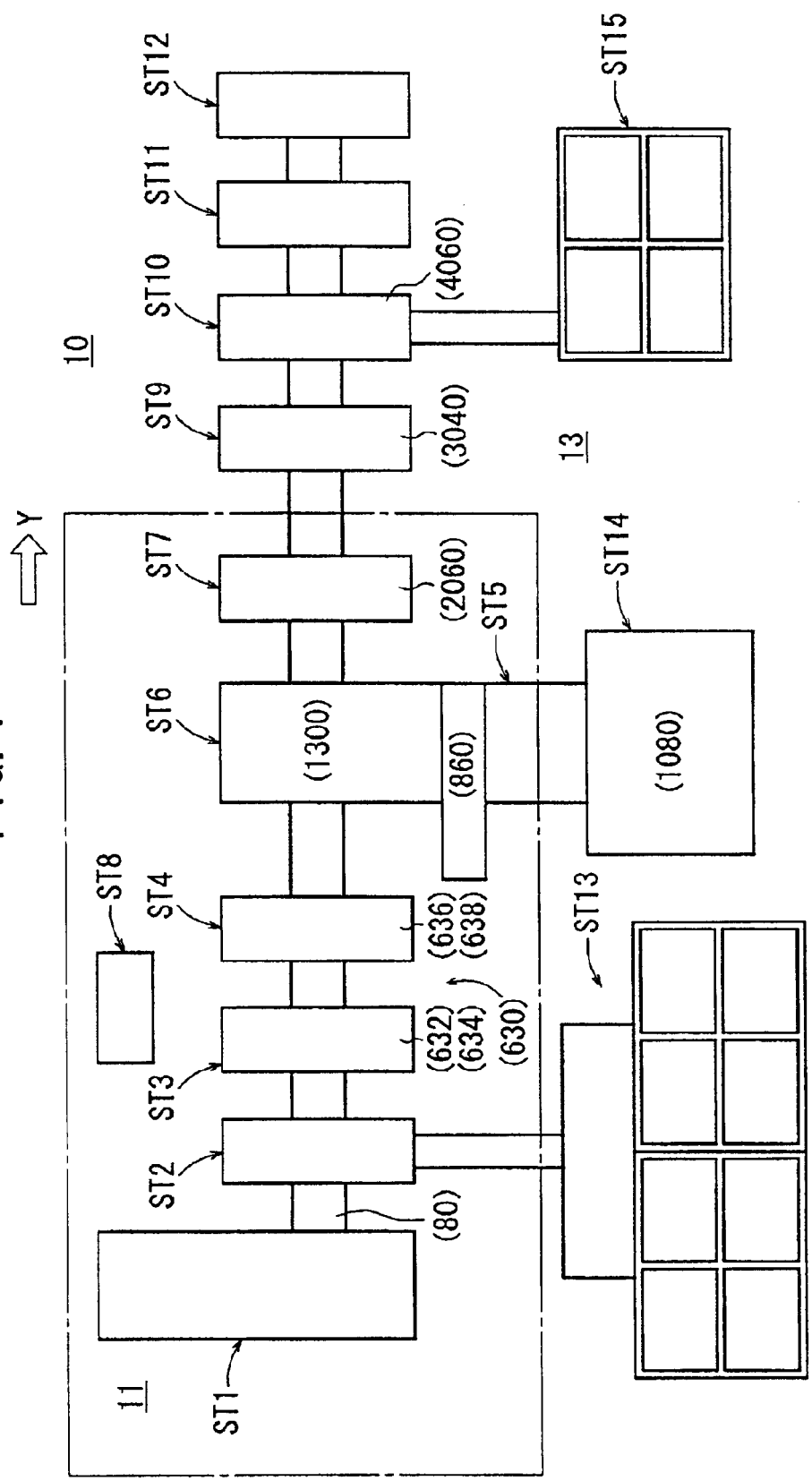
FIG. 1 is a block diagram of an automatic packaging system for carrying out a method of automatically packaging a rolled article according to an embodiment of the present invention.
Figure 2:
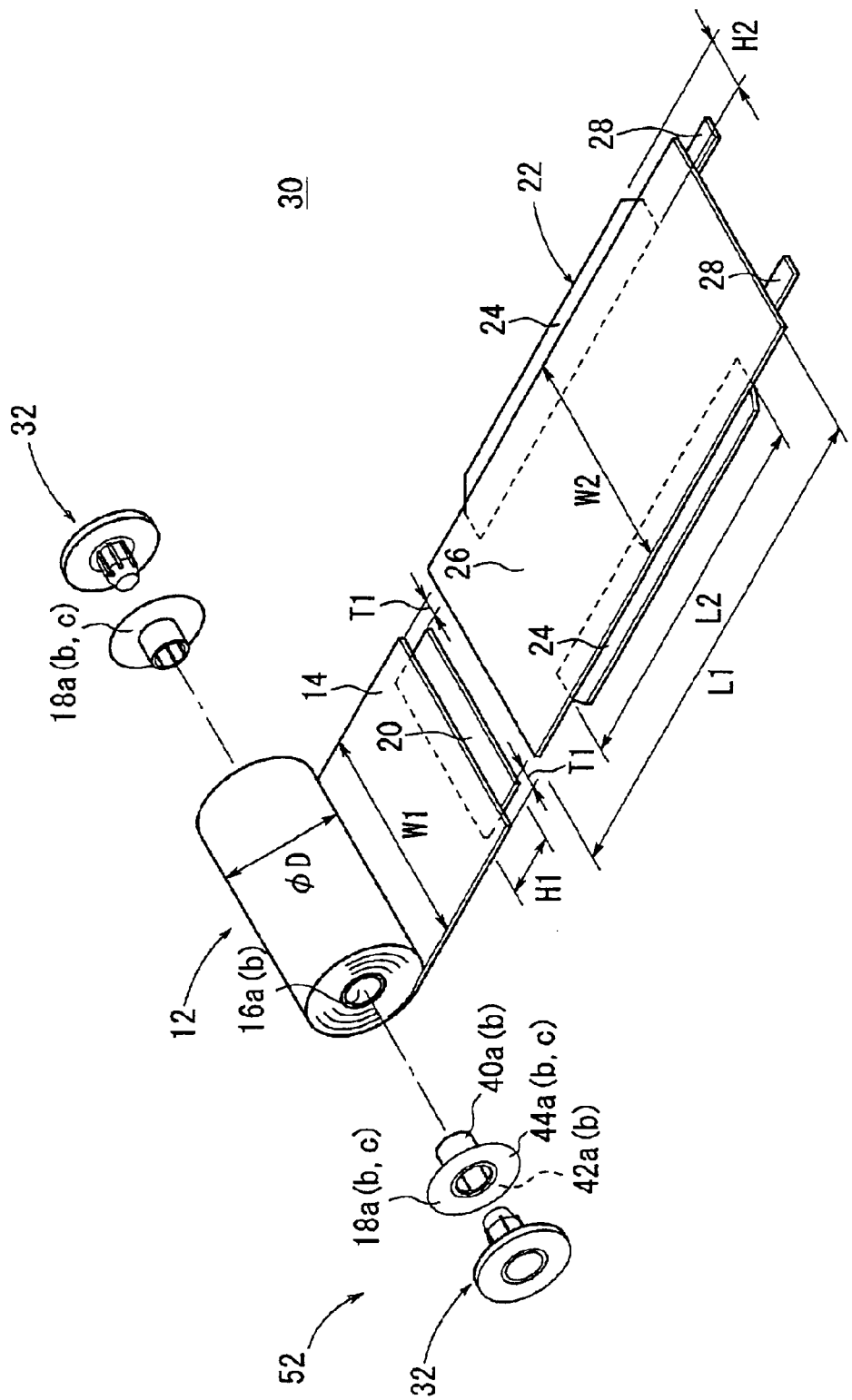
FIG. 2 is a partially exploded perspective view of a photosensitive roll as the rolled article.

FIG. 1 shows in block form an automatic packaging system 10 for carrying out a method of automatically packaging a rolled article according to an embodiment of the present invention, and FIG. 2 shows in exploded perspective view a photosensitive roll 30 to be automatically packaged by the automatic packaging system 10.

The automatic packaging system 10 has various working stations disposed in a dark chamber 11 which include a transfer station ST1 for transferring a photosensitive roll (rolled article) 12 comprising an elongate photosensitive sheet 14 wound around a core 16a or 16b (hereinafter referred to as "core 16a"), a first flanged member inserting station ST2 for assembling first flanged members (light-shielding members) 18a, 18b, or 18c (hereinafter referred to as "first flanged members 18a") on respective opposite ends of the photosensitive roll 12, an end drawing station ST3 for drawing an end 14a of the photosensitive sheet 14 to a prescribed length, an applying station ST4 for applying a joint tape (tape member) 20 to the end 14a as drawn to the prescribed length, a light-shielding leader assembling station ST5 for applying light-shielding shrink films (skirt members) 24 as packaging members to transversely opposite edges of a light-shielding sheet (sheet member) 26 and applying a pair of end fastening tapes 28 to the leading end of the light-shielding sheet 26, thus assembling a light-shielding leader (packaging sheet) 22, a light-shielding leader winding station ST6 for winding the light-shielding leader 22 around the photosensitive roll 12 after the light-shielding leader 22 is applied to the end 14*a*, a thermally fusing station ST7 for thermally fusing (bonding) the light-shielding shrink films 24 to respective opposite outer circumferential edges of the photosensitive roll 12, and a reentrant article storage station ST8 for temporarily storing a photosensitive roll 12 for reentry after the photosensitive roll 12 is removed from a working station for the reason of some fault or checking purpose.

The automatic packaging system 10 also has an inspecting station ST9 for inspecting a light-shielded photosensitive roll 30 manufactured in the dark chamber 11 for its light-shielded state, a second flanged member inserting station ST10 for inserting hard second flanged members 32 into respective opposite ends of the light-shielded photosensitive roll 30, a label applying station ST11 for applying a product label (not shown) printed with product information of the light-shielded photosensitive roll 30, and a discharging station ST12 for discharging the light-shielded photosensitive roll 30 to a next working station. These stations ST9, ST10, ST11, ST12 are successively arrayed in the direction indicated by the arrow Y along a path extending from the dark chamber 11 into a bright chamber 13.

The first flanged member inserting station ST2 is associated with a first flanged member assembling station ST13 for selecting caps and rings from two types of caps 40*a*, 40*b* and three types of rings 44*a*, 44*b*, 44*c* depending on the diameter of the core of the photosensitive roll 12 and assembling first flanged members 18*a* through 18*c*. The light-shielding leader assembling station ST5 is associated with a leader feeding station ST14 for feeding out a rolled strip-like light-shielding sheet (described later on). The second flanged member inserting station ST10 is associated with a hard flanged member supplying station ST15 for supplying the second flanged members 32.

As shown in FIG. 2, the first flanged members 18*a*, 18*b*, or 18*c* comprise caps 40*a* or 40*b* to be fitted into the respective ends of a core 16*a* or 16*b*, and rings 44*a*, 44*c*, or 44*b* heat-sealed to respective flanges 42*a* or 42*b* of the caps 40*a* or 40*b*. The core 16*a*, 16*b* have a diameter of 2 inches or 3 inches, for example.

The light-shielding leader 22 comprises a light-shielding sheet 26 and two light-shielding shrink films 24 applied to transversely opposite edges of the light-shielding sheet 26. The light-shielding sheet 26 and the photosensitive sheet 14 are joined to each other by a joint tape 20. A pair of laterally spaced end fastening tapes 28 is attached to the leading end of the light-shielding sheet 26. The light-shielding leader 22 is wound around the photosensitive roll 12 and fastened thereto by the end fastening tapes 28, thus making up the light-shielded photosensitive roll 30. The light-shielding leader 22 and the light-shielding shrink films 24 may be integrally formed of the material of the light-shielding shrink films 24.

In the present embodiment, the joint tape 20 has a width H1 of 25 mm, for example, and includes a substantially half portion projecting from the end of the photosensitive sheet 14, the substantially half portion having a width which is substantially half the width H1, i.e., a width of 12.5 mm±1 mm. The remaining half portion of the joint tape 20 is to be bonded to the end of the photosensitive sheet 14 and has a width of 12.5 mm. The joint tape 20 has opposite ends spaced inwardly from the transversely opposite edges of the photosensitive sheet 14 by a distance T1 in the range from 0 to 10 mm.

The photosensitive roll 12 has a diameter D, the photosensitive sheet 14 has a width W1, the light-shielding sheet 26 has a width W2 and a length L1, and the light-shielding shrink films 24 each have a width H2 and a length L2. The width W2 is substantially equal to the width W1 (W2≈W1) or slightly greater than the width W1 (W2>W1). The length L2 is related to the diameter D by L2>3.14×D, and the lengths L1, L2 are related to each other by L1>L2+200 mm.

The light-shielding sheet 26 has an end superposed on and bonded to the end 14*a* of the photosensitive sheet 14 by the joint tape 20, the bonded end of the light-shielding sheet 26 having a width of about 20 mm. The width H2 of each of the light-shielding shrink films 24 is set to 25 mm, for example, and the light-shielding shrink films 24 have respective outer edges projecting outwardly from the outer edges of the light-shielding sheet 26 by a distance of 9 mm. The length L1 of the light-shielding sheet 26 is set to 900 mm, for example, and the length L2 of each of the light-shielding shrink films 24 is set to 500 mm or 600 mm, for example.

Figure 3:
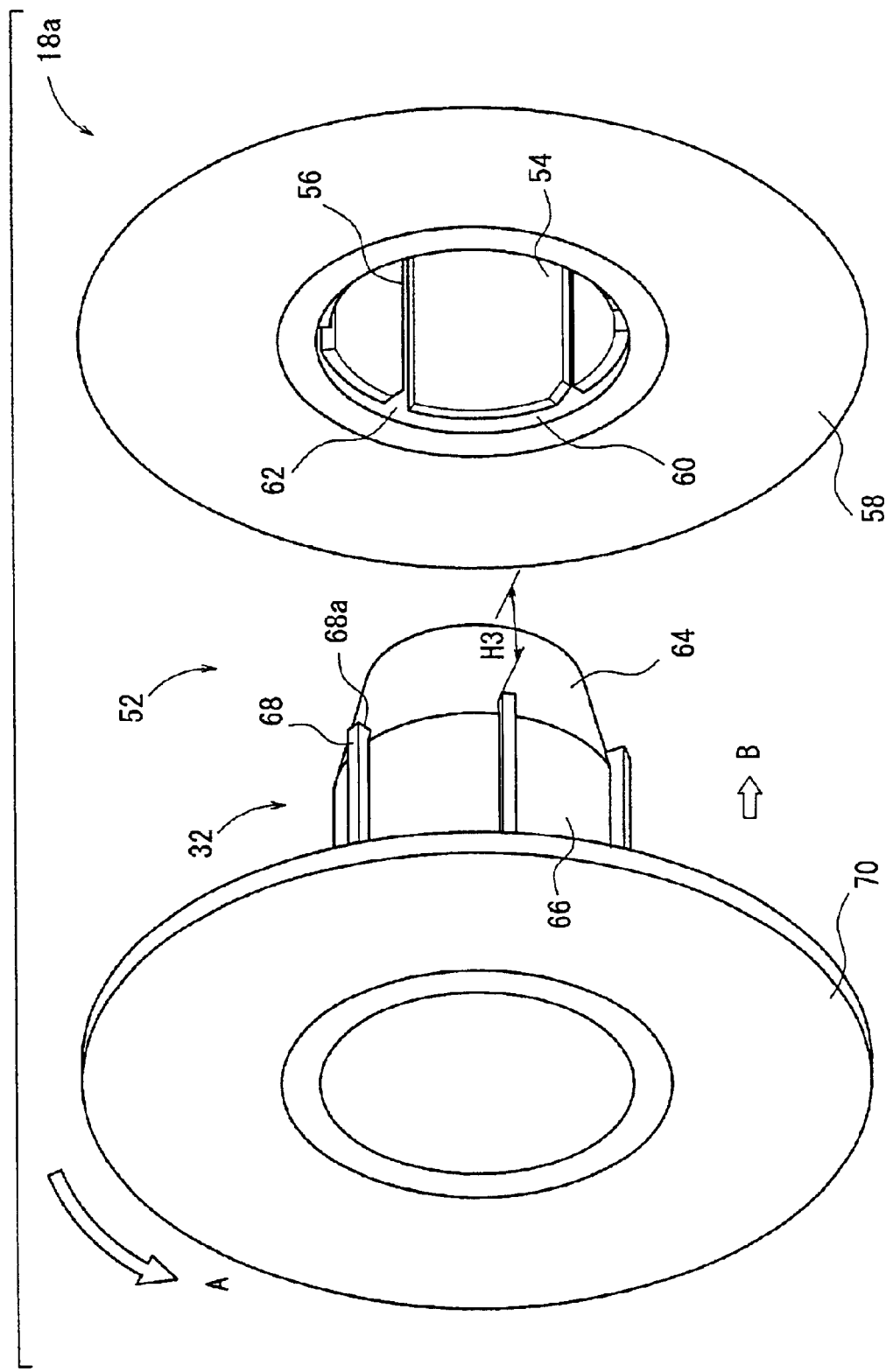
FIG. 3 is a partially exploded perspective view of a flanged structure.
Figure 4:
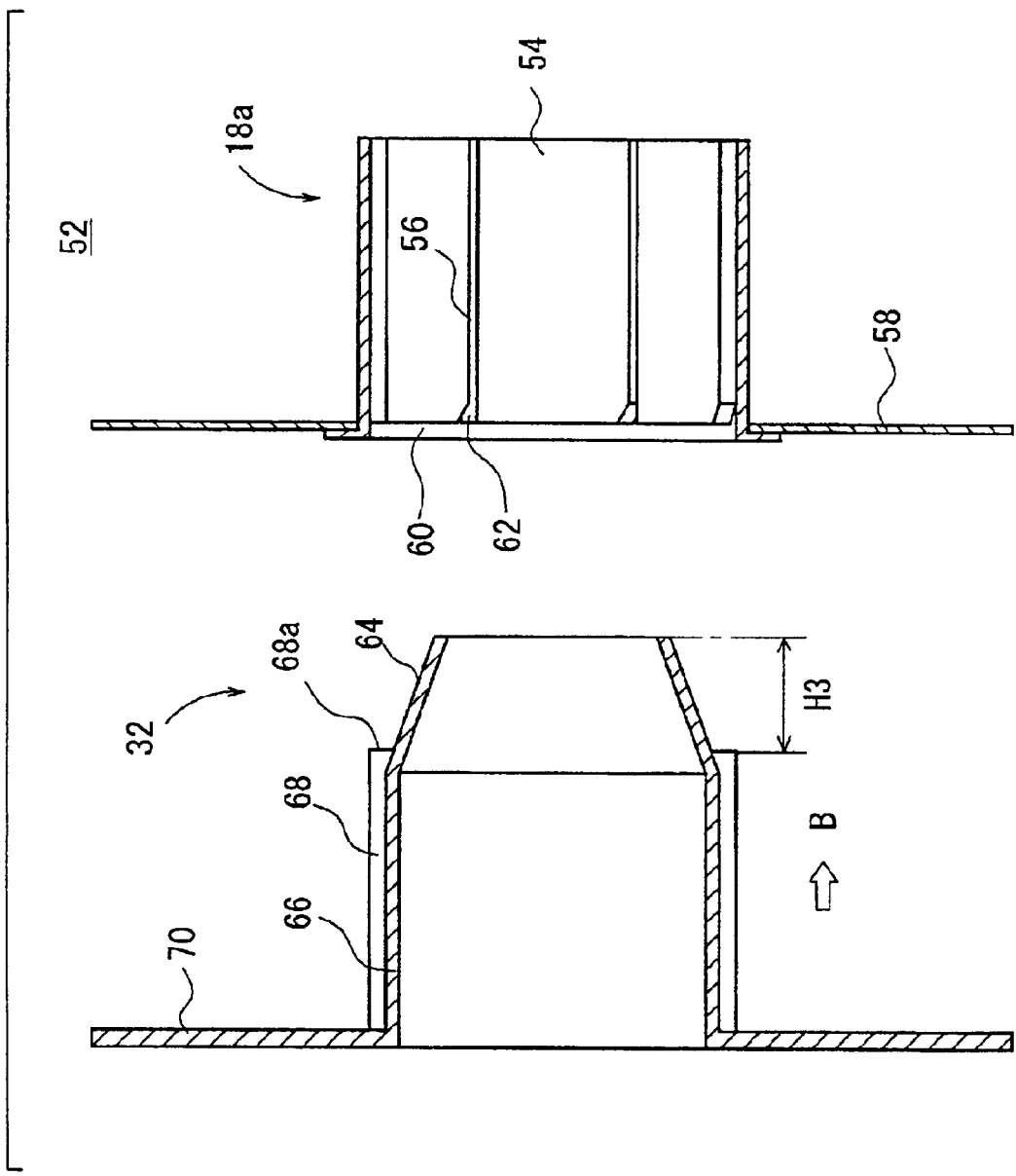
FIG. 4 is a cross-sectional view of the flanged structure.

The second flanged member 32 which is harder than the first flanged member 18*a* is inserted into the first flanged member 18*a*, making up a flanged structure 52. As shown in FIGS. 3 and 4, the first flanged member 18*a* has a plurality of (e.g., six) angularly spaced, axially extending grooves 56 defined in an inner circumferential surface 54 thereof, and a step 60 of increased diameter disposed on the inner circumferential surface 54 closer to a flange 58 at an end into which the second flanged member 32 is to be inserted. The inner circumferential surface 54 has guide recesses 62 defined therein which extend obliquely from the step 60 toward the respective ends of the grooves 56 in the direction indicated by the arrow A in which the second flanged member 32 is rotated upon insertion into the first flanged member 18*a*.

The second flanged member 32 has, on an outer circumferential surface thereof, a tapered tip 64 which is progressively smaller in diameter toward the tip end thereof in a direction in which the second flanged member 32 is inserted into the first flanged member 18*a*, and a straight barrel 66 contiguous from a larger-diameter end of the tapered tip 64. The second flanged member 32 also has, disposed on the straight barrel 66, a plurality of (e.g., six) angularly spaced, axially extending ridges 68 extending axially along the straight barrel 66 toward a flange 70 in alignment with the grooves 56. The ridges 68 have respective straight end faces 68*a* spaced axially from the smaller-diameter tip end of the tapered tip 64 toward the straight barrel 66 by a given distance H3 smaller than the full length of the tapered tip 64, i.e., positioned substantially at the larger-diameter end of the tapered tip 64, and extending radially outwardly to respective radial positions corresponding to the diameter of the step 60 of the first flanged member 18*a*.

Figure 5:
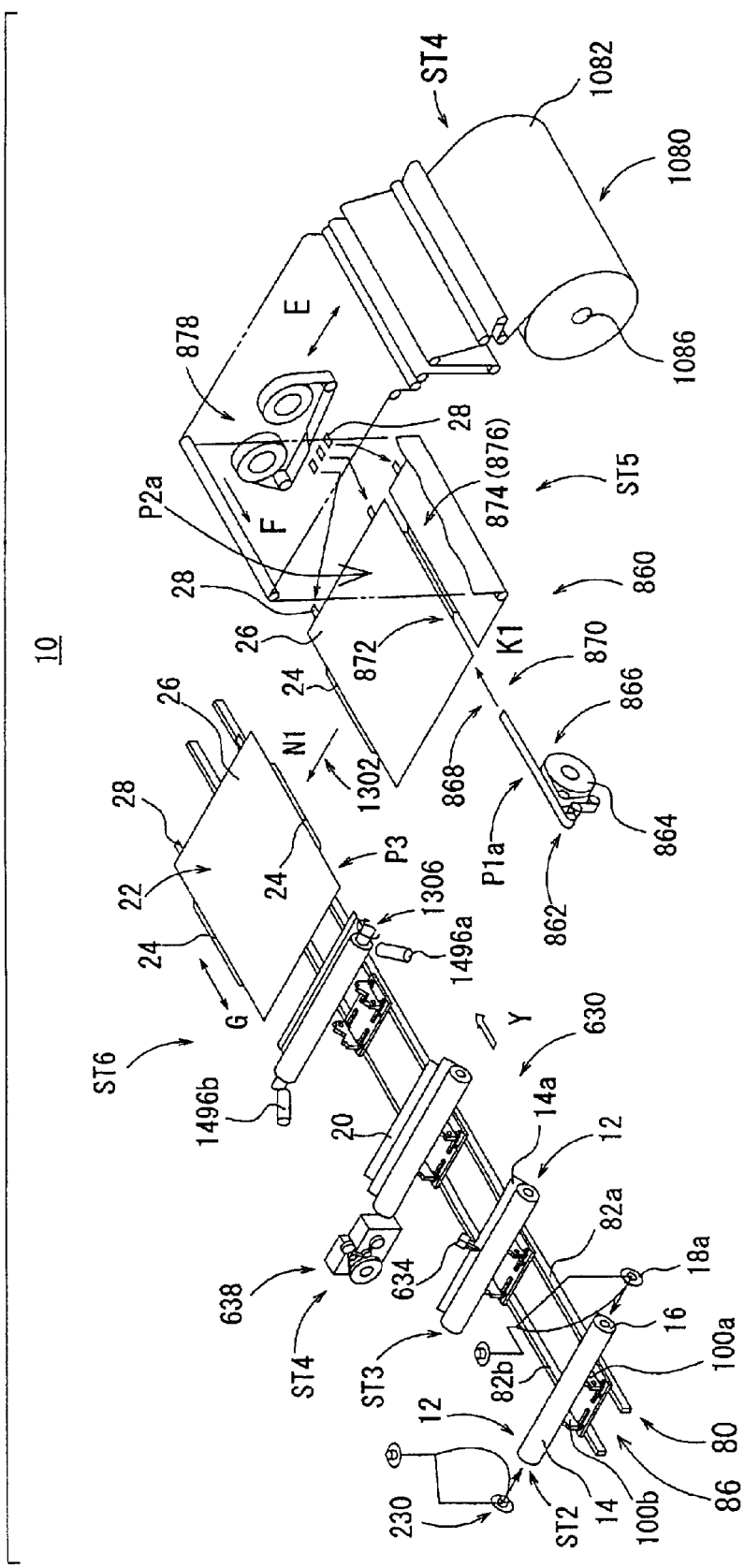
FIG. 5 is a perspective view of an upstream portion of the automatic packaging system.
Figure 6:
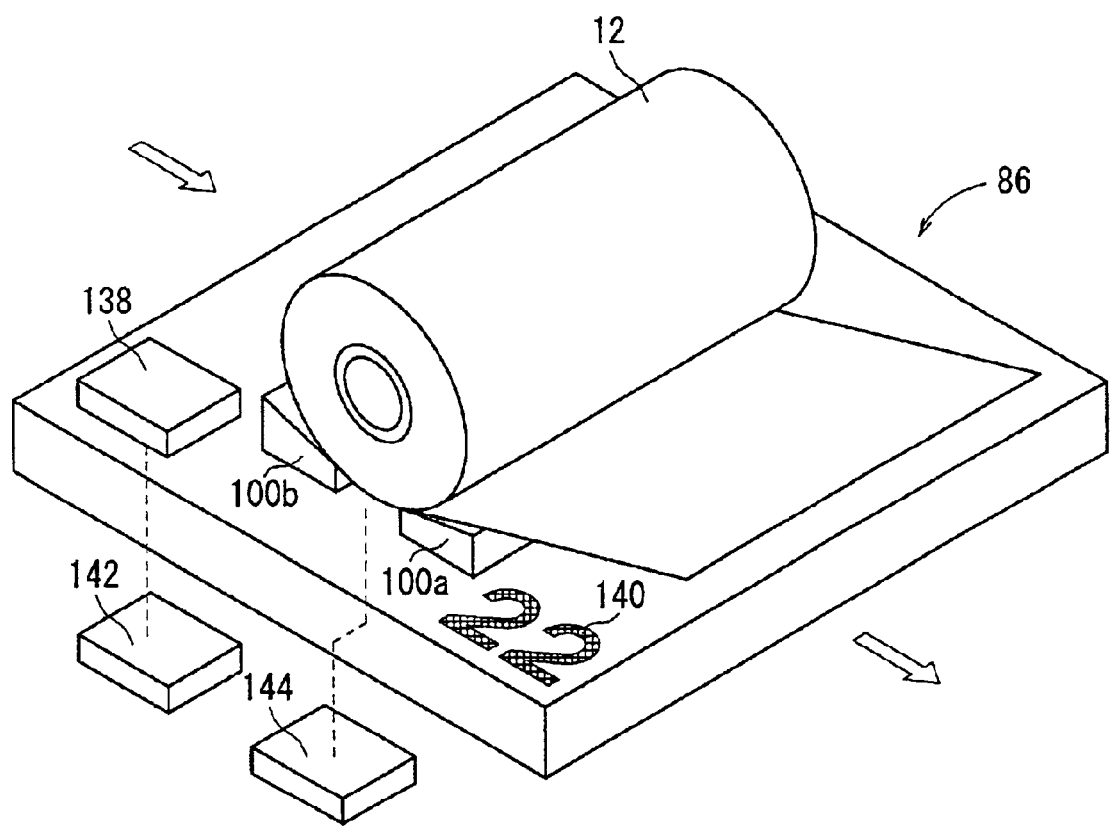
FIG. 6 is a perspective view of a pallet.

As shown in FIG. 5, a succession of photosensitive rolls 12 are fed in the direction indicated by the arrow Y by a feed device 80. The feed device 80 has pallets 86 supported on feed conveyors 82*a*, 82*b* for placing photosensitive rolls 12 thereon. As shown in FIGS. 5 and 6, each of the pallets 86 has a pair of support bases 100*a*, 100*b* disposed on an upper surface thereof, with the photosensitive roll 12 placed on the support bases 100*a*, 100*b*.

As shown in FIG. 6, a memory medium (identification data memory means, read-only memory element) 138 for storing identification data inherent in the pallet 86 is disposed on the pallet 86. The memory medium 138 may comprise a data carrier or an IC memory which is capable of electrically recording identification data and can be accessed from an external circuit to read recorded identification data.

The pallet 86 is printed with an identification number 140 thereof which corresponds to the identification data and which can visually be recognized by the operator.

Each of the working stations at which the pallet 86 arrives has a data reader (identification data reading means) 142 for reading the identification data stored in the recording medium 138, and a workpiece detector (workpiece detecting means) 144 for detecting whether there is a photosensitive roll 12 or a light-shielded photosensitive roll 30 on the pallet 86 or not.

Figure 7:
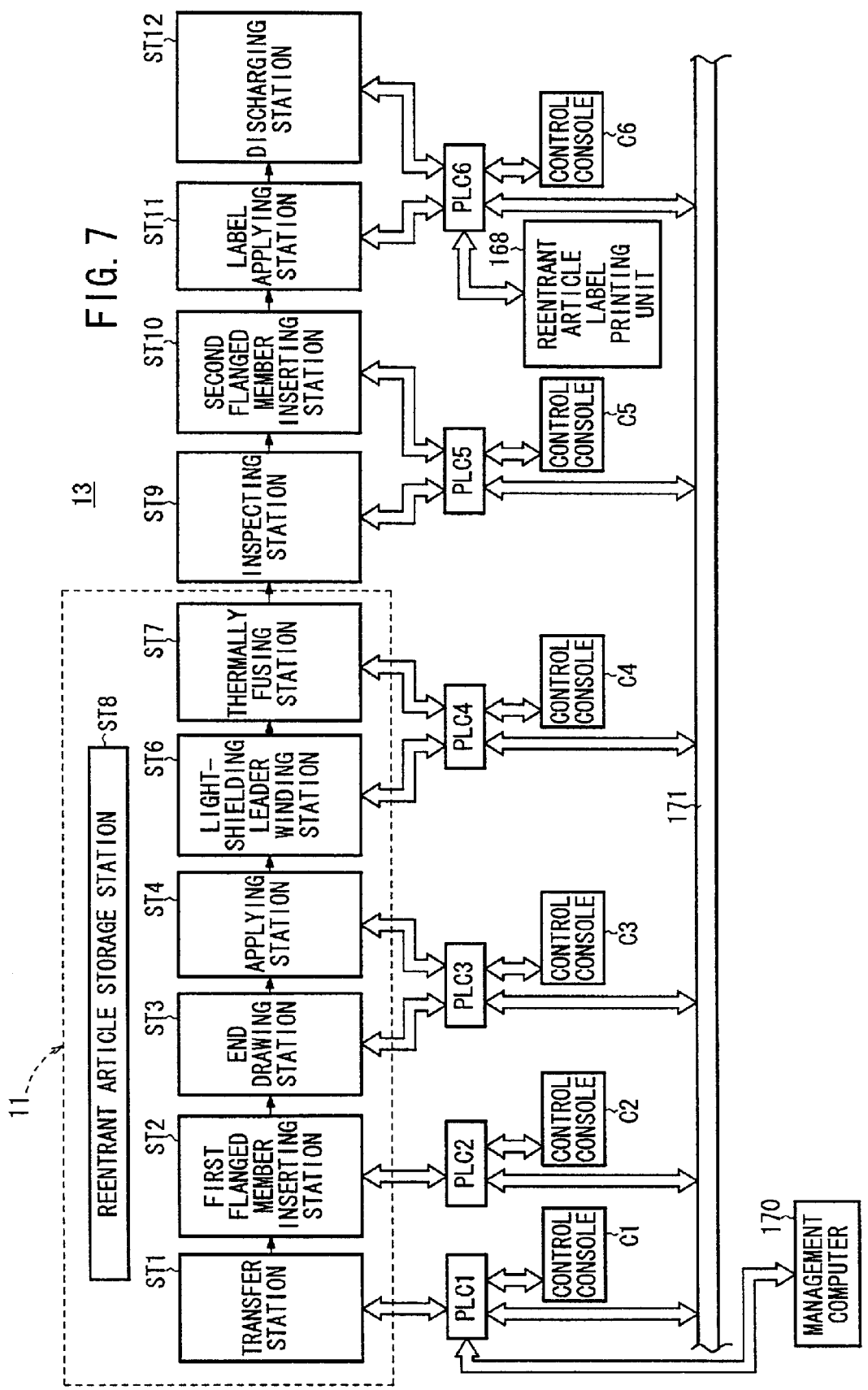
FIG. 7 is a block diagram showing the relationship between working stations and a control system thereof.
Figure 8:
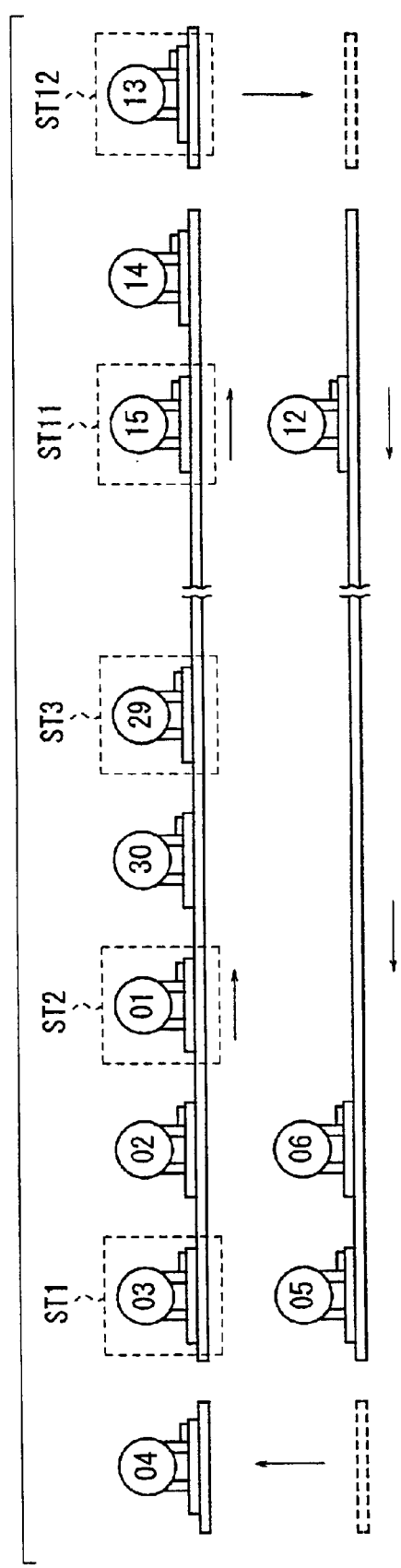
FIG. 8 is a view showing how pallets are fed in circulation.

FIG. 7 shows in block form the relationship between the working stations for manufacturing light-shielded photosensitive rolls 30 from photosensitive rolls 12 supplied from the dark chamber 11, and a control system thereof. FIG. 8 shows how pallets are fed in circulation.

Control devices in the working stations are controlled by programmable controllers PLC1 through PLC6 having respective control consoles C1 through C6. The control consoles C1 through C4 and the programmable controllers PLC1 through PLC4 may be installed in the dark chamber 11 insofar as light emitted from display means of the control consoles C1 through C4 and the programmable controllers PLC1 through PLC4 does not adversely affect the photosensitive material.

The programmable controller PLC1 controls the transfer station ST1, the programmable controller PLC2 controls the first flanged member inserting station ST2, the programmable controller PLC3 controls the end drawing station ST3 and the applying station ST4, the programmable controller PLC4 controls the light-shielding leader winding station ST6 and the thermally fusing station ST7, the programmable controller PLC5 controls the inspecting station ST9 and the second flanged member inserting station ST10, and the programmable controller PLC6 controls the label applying station ST11, the discharging station ST12, and a reentrant article label printing unit 168. The reentrant article label printing unit 168 issues a reentrant article label to be applied to a reentrant photosensitive roll 12 which is removed from any of the working stations or a photosensitive roll 12 which is judged as being defective. Of these programmable controllers PLC1 through PLC6, the programmable controller PLC1 is connected to a management computer 170. The programmable controllers PLC1 through PLC6 are connected to each other through a bus line 171.

Figure 9:
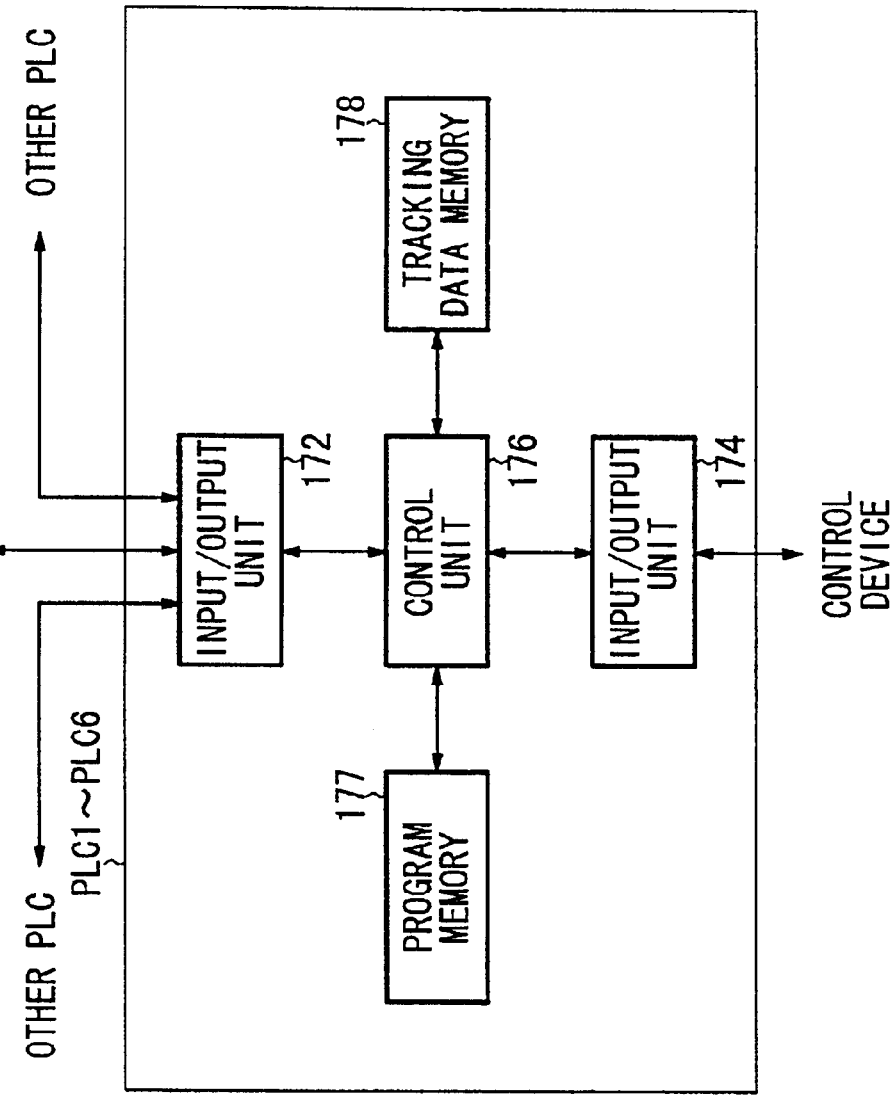
FIG. 9 is a block diagram of a programmable controller.

FIG. 9 shows in block form each of the programmable controllers PLC1 through PLC6. As shown in FIG. 9, each of the programmable controllers PLC1 through PLC6 comprises an input/output unit 172 for sending data to and receiving data from the management computer 170 and the other programmable controllers, an input/output unit 174 for sending data to and receiving data from the control devices in the working stations, a control unit 176 for controlling the data and performing a control process according to a given control program, a program memory 177 for storing operating programs for the control devices in the working stations which are connected to the programmable controllers PLC1 through PLC6, and a tracking data memory (identification data/specification data association memory means) 178 for storing tracking data which are specification data relative to photosensitive rolls 12 or light-shielded photosensitive rolls 30 which are fed to the working stations that are controlled by the programmable controllers PLC1 through PLC6.

Figure 10:
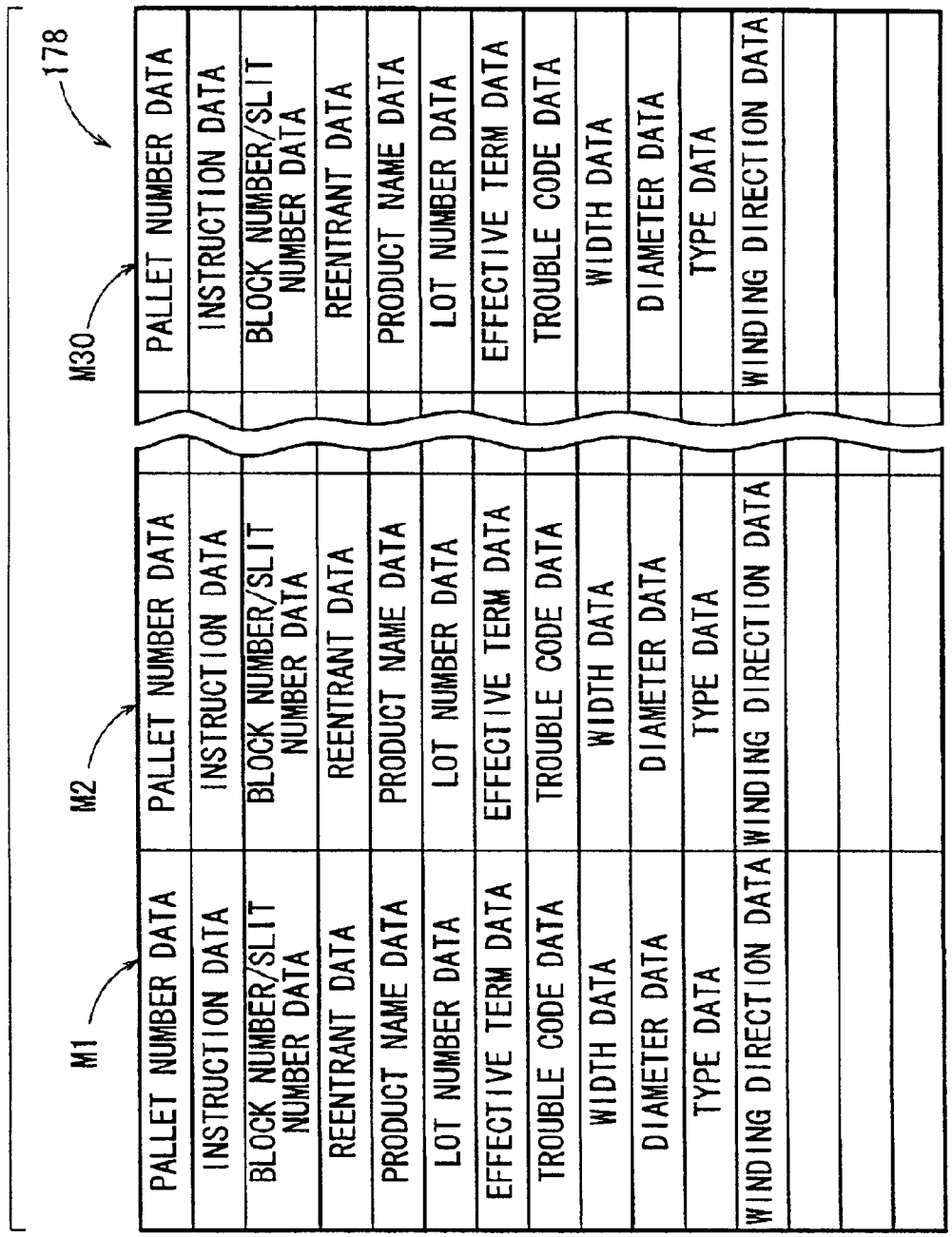
FIG. 10 is a diagram showing data stored in a tracking data memory of the programmable controller shown in FIG. 9.

FIG. 10 illustrates data stored in the tracking data memory 178 of the programmable controller PLC1 which controls the transfer station ST1. The tracking data memory 178 of the programmable controller PLC1 has data areas M1 through M30 corresponding to respective pallets 86 that are used between the transfer station ST1 through the discharging station ST12. In the present embodiment, it is assumed that 30 pallets 86 are in service at all times. Each of the tracking data memories 178 of the other programmable controllers PLC2 through PLC6 has data areas M1 through M30 relative to pallets 86 that are fed to the working stations controlled by the programmable controllers PLC2 through PLC6.

The data areas M1 through M30 store pallet number data (identification data), in the order of 1 through 30, for example, of pallets 86 corresponding to an identification number 140. The data areas M1 through M30 also store, in connection with the pallet number data, specification data relative to photosensitive rolls 12 or light-shielded photosensitive rolls 30 carried on the pallets 86. The specification data include instruction data for the control devices, block number/slit number data, reentrant data, product name data, lot number data, effective term data, trouble code data, width data, diameter data, type data, winding direction data, and work attribute data managing attributes of photosensitive rolls 12 or light-shielded photosensitive rolls 30.

The block number data are data specifying regions where photosensitive rolls 12 are cut from a wide film roll (not shown) in its longitudinal direction. The slit number data are data specifying regions where photosensitive rolls 12 are cut from a wide film roll (not shown) in its transverse direction. The reentrant data are data which are set when a photosensitive roll 12 or a light-shielded photosensitive roll 30 which has been removed from the production line is repaired if necessary and reentered into the production line. The trouble code data are data representing defect details when a photosensitive roll 12 or a light-shielded photosensitive roll 30 which has been inspected is judged as a defective product. The width data are data representing widths of photosensitive rolls 12, and the diameter data are data representing diameters of photosensitive rolls 12. The type data are data representing the type of an emulsion or the like used in the photosensitive material. The winding direction data are data representing the direction in which the emulsion surfaces of photosensitive rolls 12 face.

The workpiece attribute data are data managing working states of photosensitive rolls 12 or light-shielded photosensitive rolls 30. For example, the workpiece attribute data include data representing whether photosensitive rolls 12 or light-shielded photosensitive rolls 30 have been worked upon in the working stations, whether photosensitive rolls 12 or light-shielded photosensitive rolls 30 are defective or not in the working stations, and whether there are photosensitive rolls 12 or light-shielded photosensitive rolls 30 in the working stations.

Figure 11:
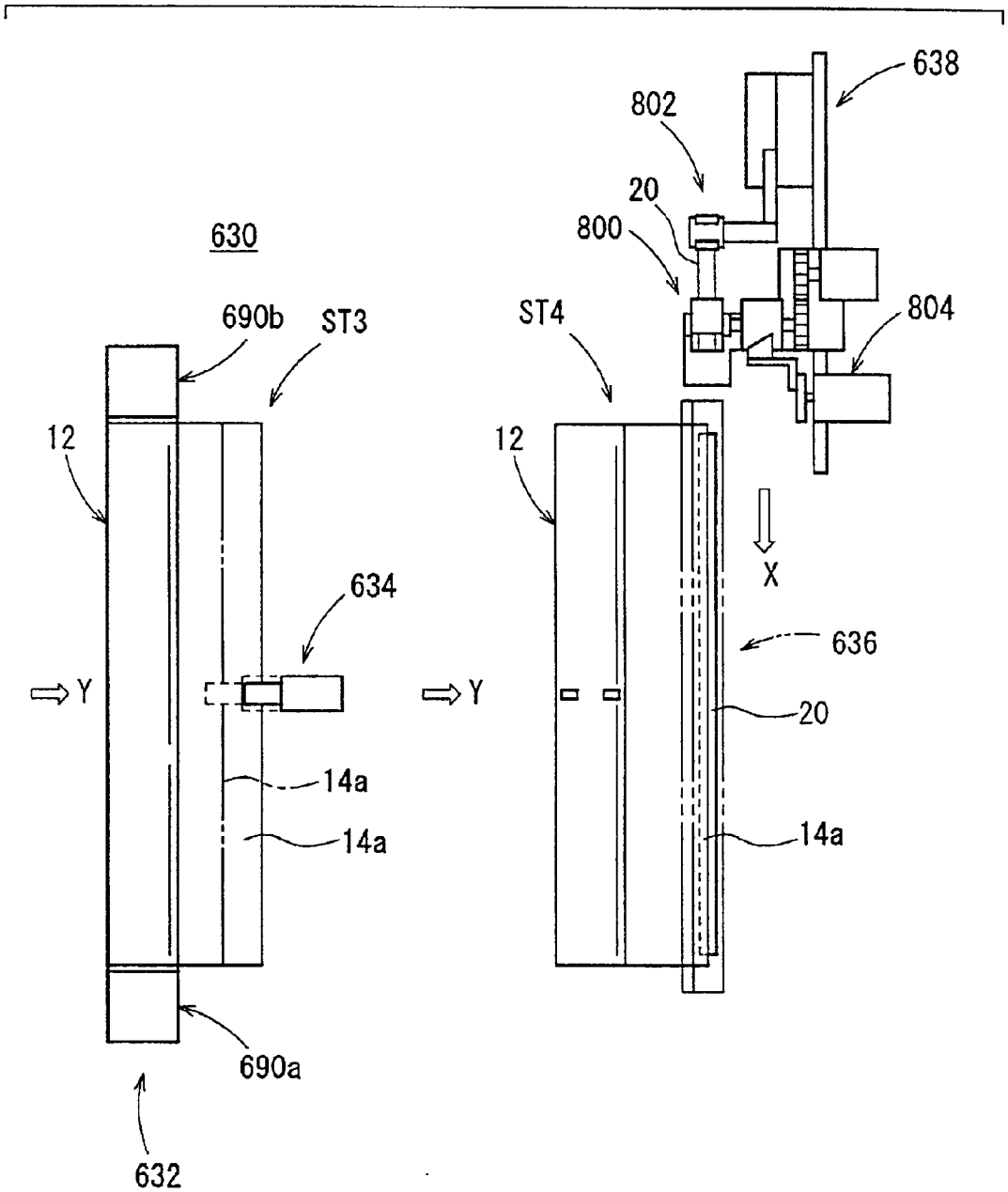
FIG. 11 is a plan view of an end drawing station and an applying station.

As shown in FIGS. 5 and 11, the automatic packaging system 10 has a tape member applying device 630 for automatically applying the joint tape 20 to the end 14a of the photosensitive sheet 14. The tape member applying device 630 comprises a rotary support mechanism 632 disposed in the end drawing station ST3 for rotatably supporting the opposite ends of the photosensitive roll 12 and applying a predetermined tension to the photosensitive roll 12 when the end 14a of the photosensitive sheet 14 is drawn, an end drawing mechanism 634 disposed in the end drawing station ST3 for gripping and drawing the end 14a to a prescribed length, a pressing mechanism 636 disposed in the applying station ST4 for supporting the end 14a drawn to the prescribed length from its opposite surfaces, and an applying mechanism 638 disposed in the applying station ST4 for applying the joint tape 20 to the end 14a supported by the pressing mechanism 636 in the transverse direction indicated by the arrow X of the photosensitive roll 12.

Figure 12:
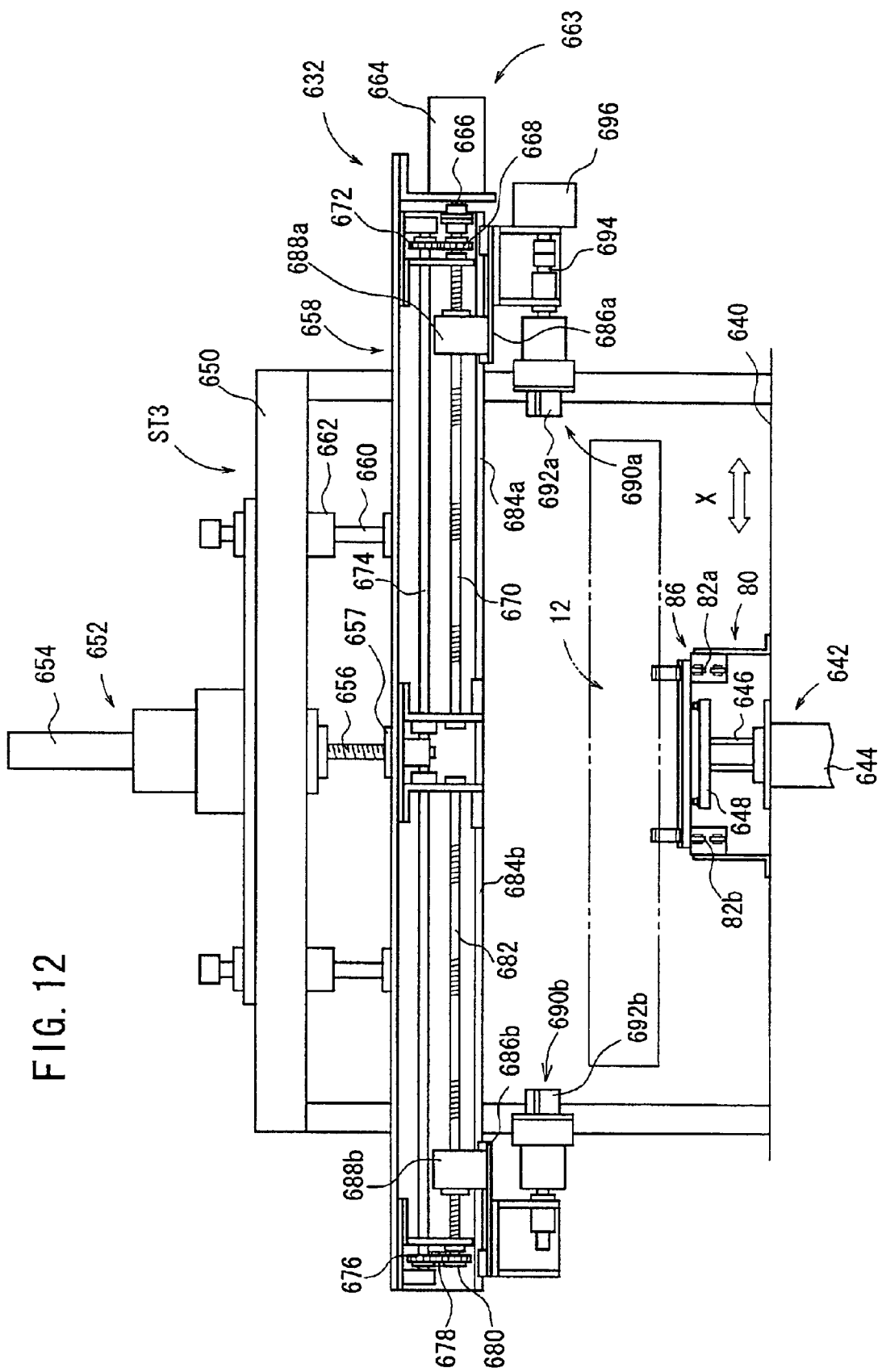
FIG. 12 is a front elevational view of a rotary support mechanism of an end processing device.
Figure 13:
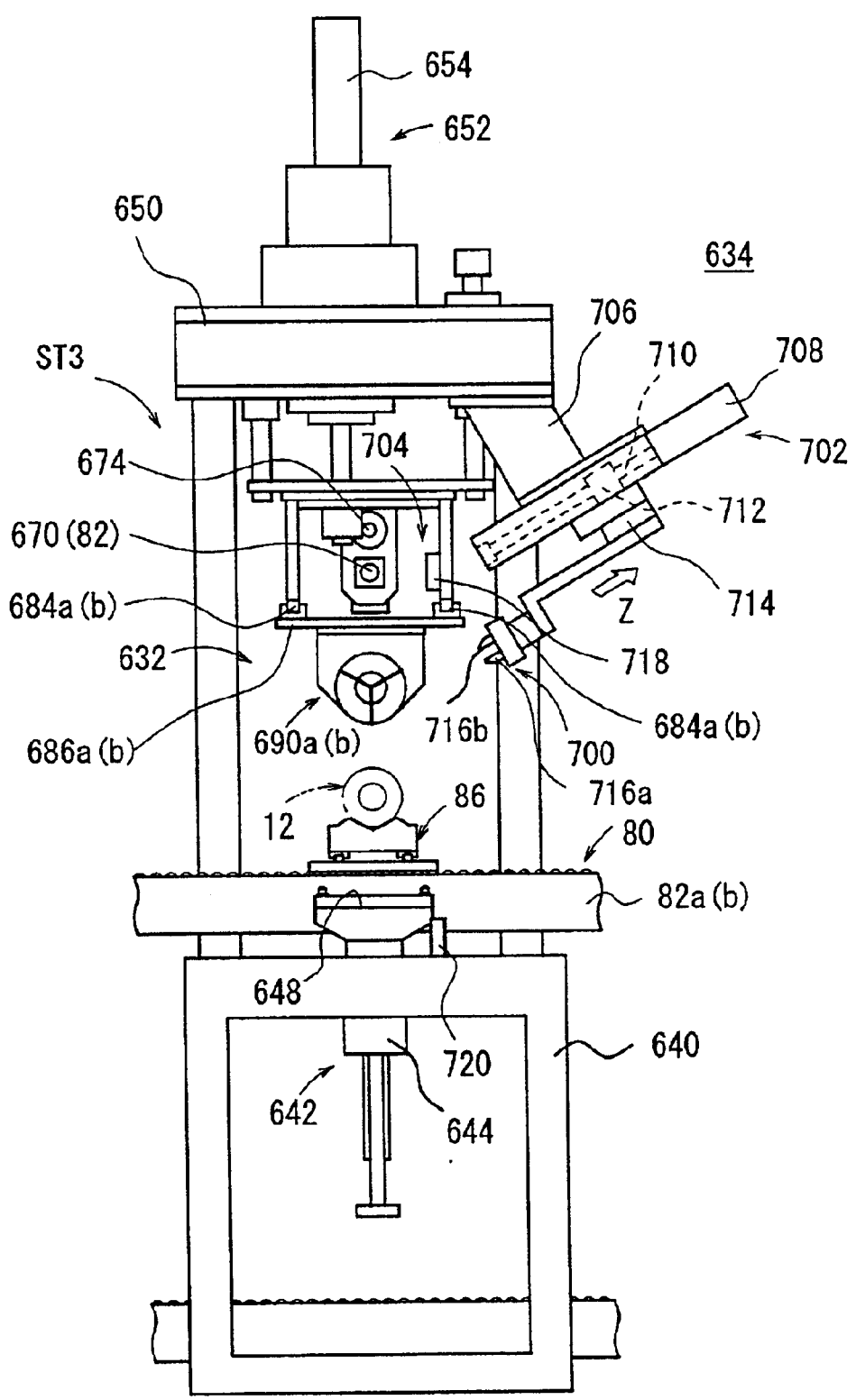
FIG. 13 is a side elevational view of the rotary support mechanism and an end drawing mechanism.

As shown in FIGS. 12 and 13, the end drawing station ST3 has a base 640 with a pallet lifting and lowering unit 642 mounted thereon. The pallet lifting and lowering unit 642 has a cylinder 644 fixed to the base 640 and having an upwardly extending rod 646 to which a vertically movable base 648 is secured. The vertically movable base 648 can engage a pallet 86 which has been fed by upper feed conveyors 82a, 82b and feed the pallet 86 above the upper feed conveyors 82a, 82b.

Figure 14:
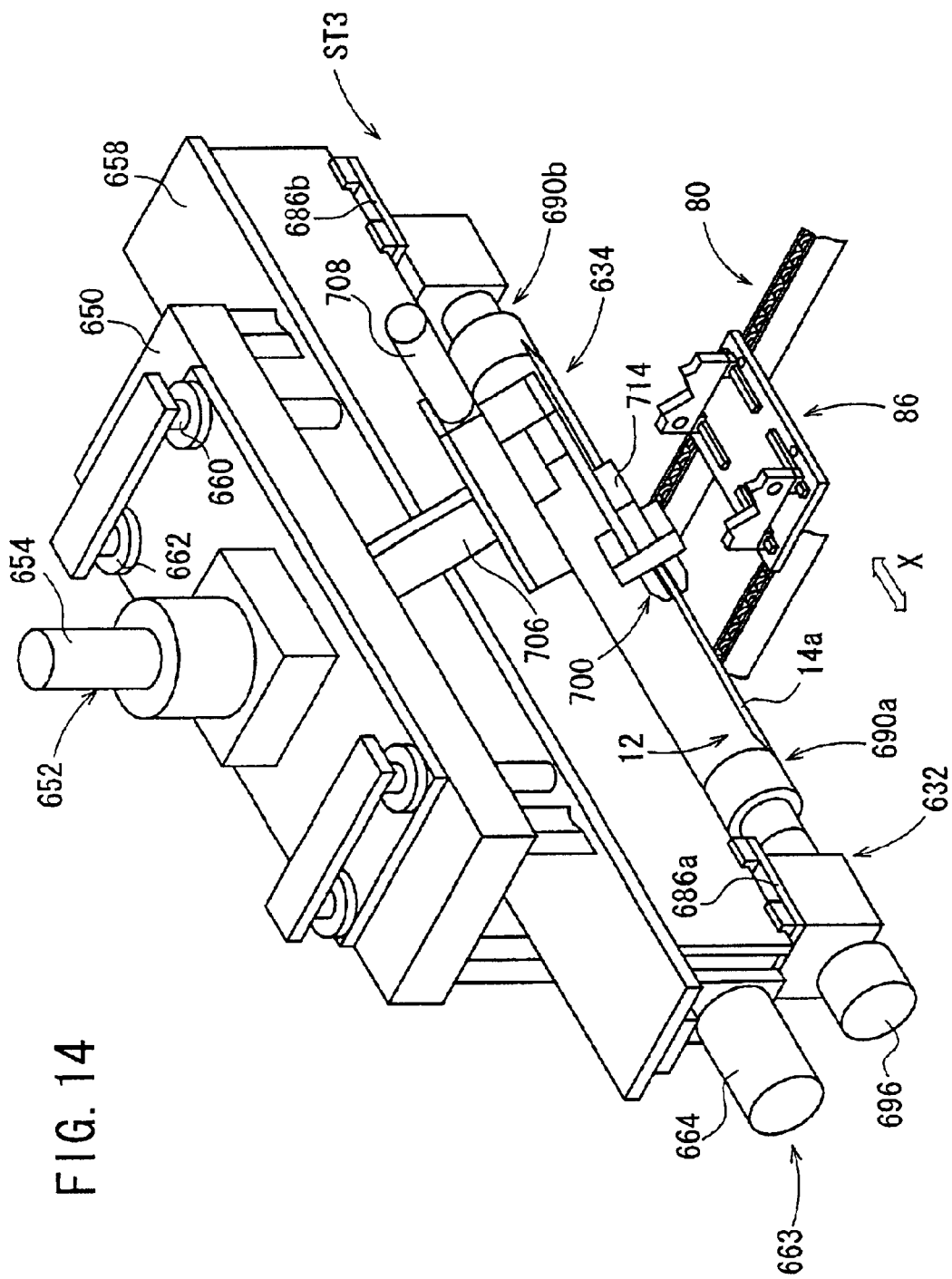
FIG. 14 is a perspective view of the rotary support mechanism and the end drawing mechanism.

A frame 650 is mounted on the base 640 and supports thereon a moving unit 652 of a rotary support mechanism 632. As shown in FIGS. 12 through 14, the moving unit 652 has a motor 654 fixedly mounted on the frame 650 and directed downwardly, and having a downwardly extending rotatable drive shaft (not shown) to which a ball screw 656 is coaxially connected. The ball screw 656 is threaded through a nut 657 fixed to a vertically movable frame 658 which extends transversely across the photosensitive roll 12 in the direction indicated by the arrow X. Four guide rods 660 have lower ends screwed to the vertically movable frame 658 and upper ends inserted slidably in respective guide rods 662 attached to the frame 650.

A drive unit 663 has a motor 664 mounted on a longitudinal end of the vertically movable frame 658 and having a rotatable drive shaft 666 to which there are coaxially fixed a drive gear 668 and a first ball screw 670. The drive gear 668 is held in mesh with a driven gear 672 fixedly mounted on an end of a rotatable shaft 674 whose opposite ends and central portion are rotatably supported on the vertically movable frame 658.

The rotatable shaft 674 has a first gear 676 mounted on an end thereof remote from the driven gear 672 and held in mesh with a second gear 678 meshing with a third gear 680. The third gear 680 is mounted on an end of a second ball screw 682 which is coaxial with the first ball screw 670 and is rotatably supported on the vertically movable frame 658.

The vertically movable frame 658 has a set of guide rails 684a, 684b extending parallel to the first and second ball screws 670, 682, and first and second slide bases 686a, 686b are slidably supported on the guide rails 684a, 684b. The first and second slide bases 686a, 686b support first and second nuts 688a, 688b fixed thereto which are threaded respectively over the first and second ball screws 670, 682. First and second chucks 690a, 690b are rotatably supported on lower surfaces of the first and second slide bases 686a, 686b, respectively.

The first and second chucks 690a, 690b have a plurality of openable and closable claws 692a, 692b which are insertable in the opposite ends of the photosensitive roll 12 and movable radially inwardly and outwardly in the photosensitive roll 12. A powder clutch (tension applying unit) 696 is connected to a shaft 694 of the first chuck 690a.

As shown in FIGS. 13 and 14, the end drawing mechanism 634 comprises a gripper 700 for gripping a substantially central area of the end 14a of the photosensitive sheet 14, an actuator 702 for moving the gripper 700 in the direction indicated by the arrow Z to draw the end 14a, and a detecting assembly for detecting a drawn length of the end 14a.

The actuator 700 has a motor 708 fixed to the frame 650 by an attachment plate 706 and having a ball screw 710 connected to the drive shaft of the motor 708 and threaded through a nut 712. The nut 712 is mounted on a movable base 714 with the gripper 700 being mounted on a distal end of the movable base 714. The gripper 700 has a pair of gripping fingers 716a, 716b movable toward and away from each other for gripping and releasing the end 14a of the photosensitive sheet 14.

The detecting assembly 704 has an infrared emitter 718 and an infrared detector 720 for detecting the end 14a of the photosensitive sheet 14. The infrared emitter 718 is mounted on the vertically movable frame 658, and the infrared detector 720 is mounted on the base 640.

Figure 15:
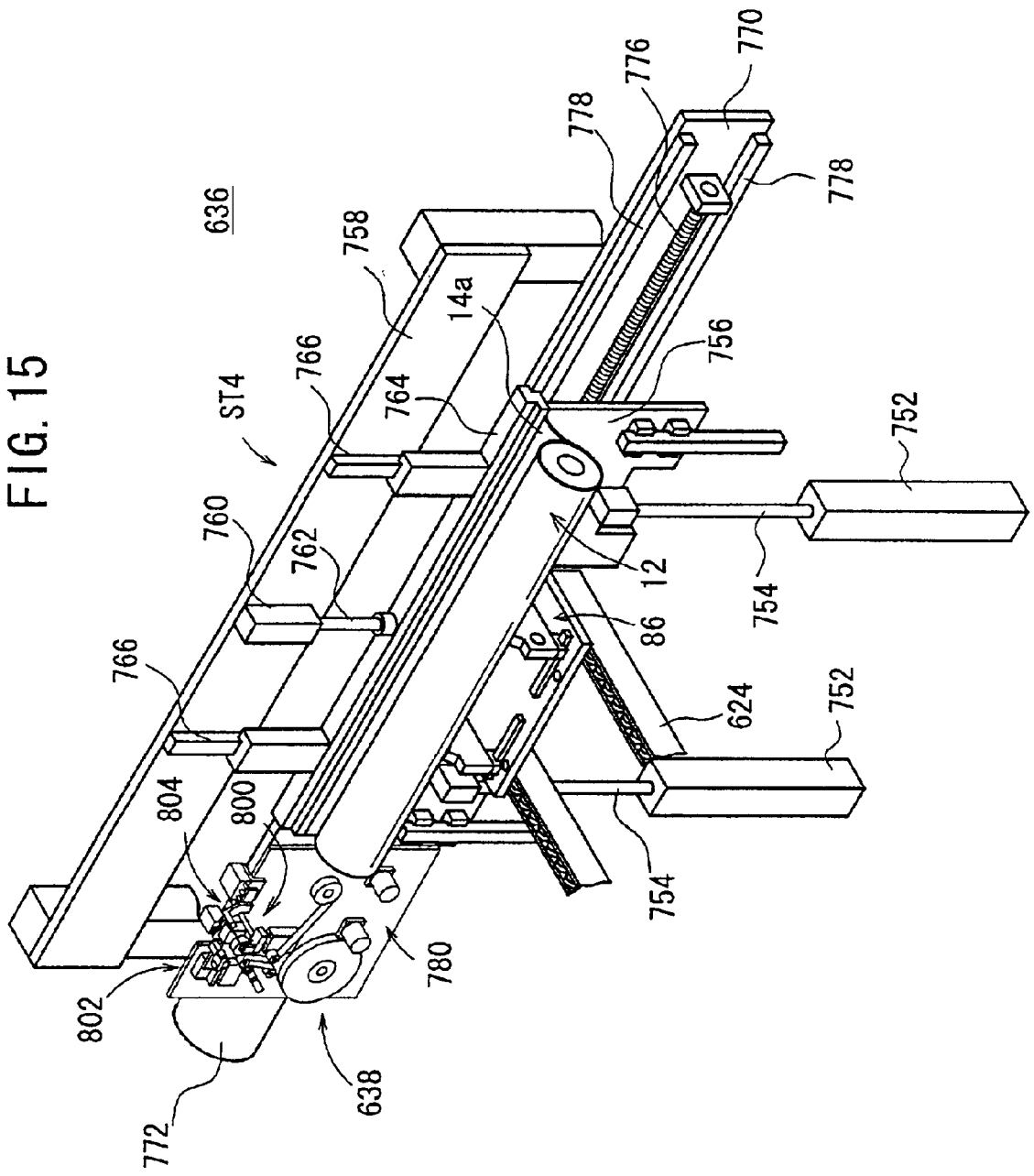
FIG. 15 is a perspective view of a pressing mechanism and an applying mechanism of the end processing device.
Figure 16:
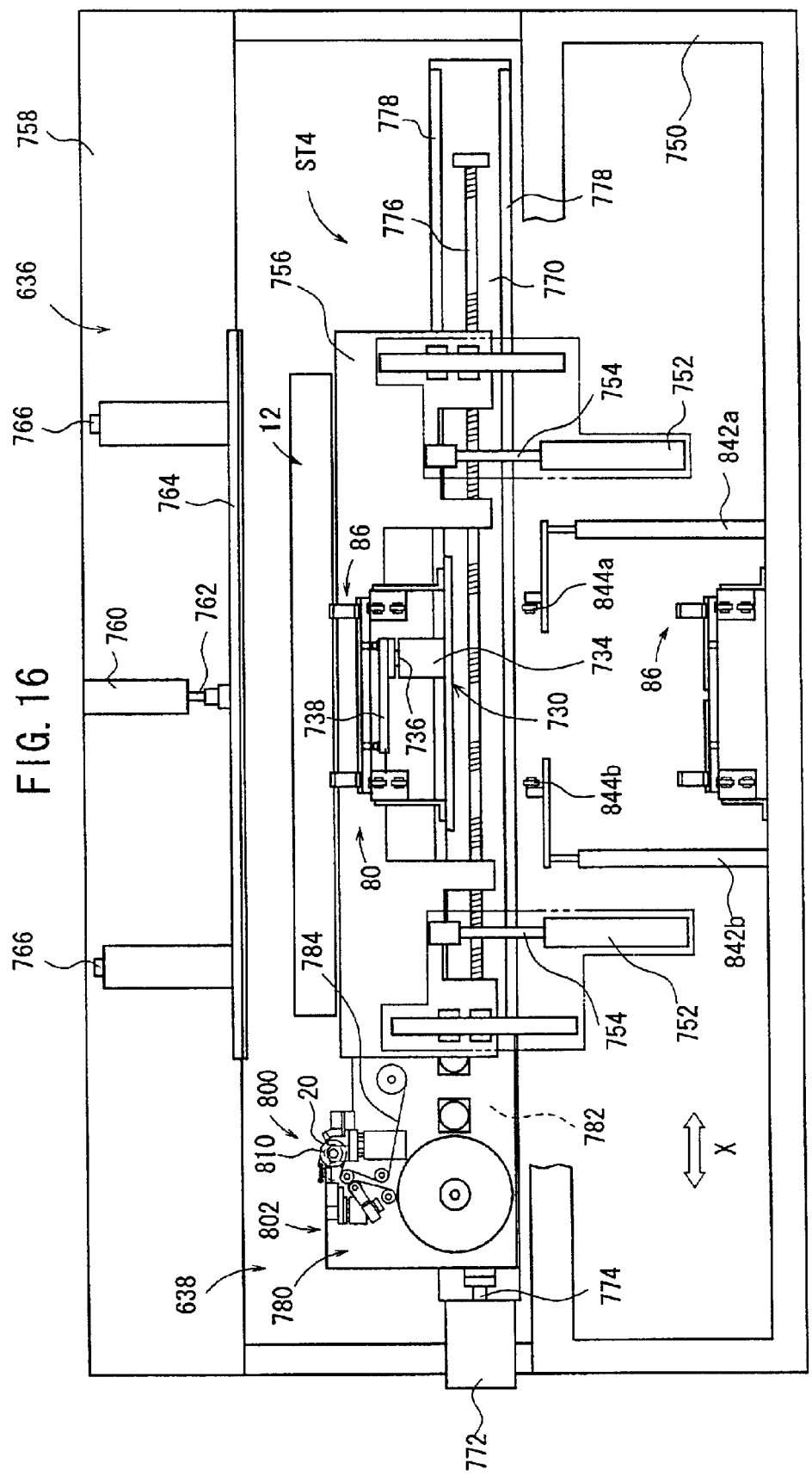
FIG. 16 is a front elevational view of the pressing mechanism and the applying mechanism.
Figure 17:
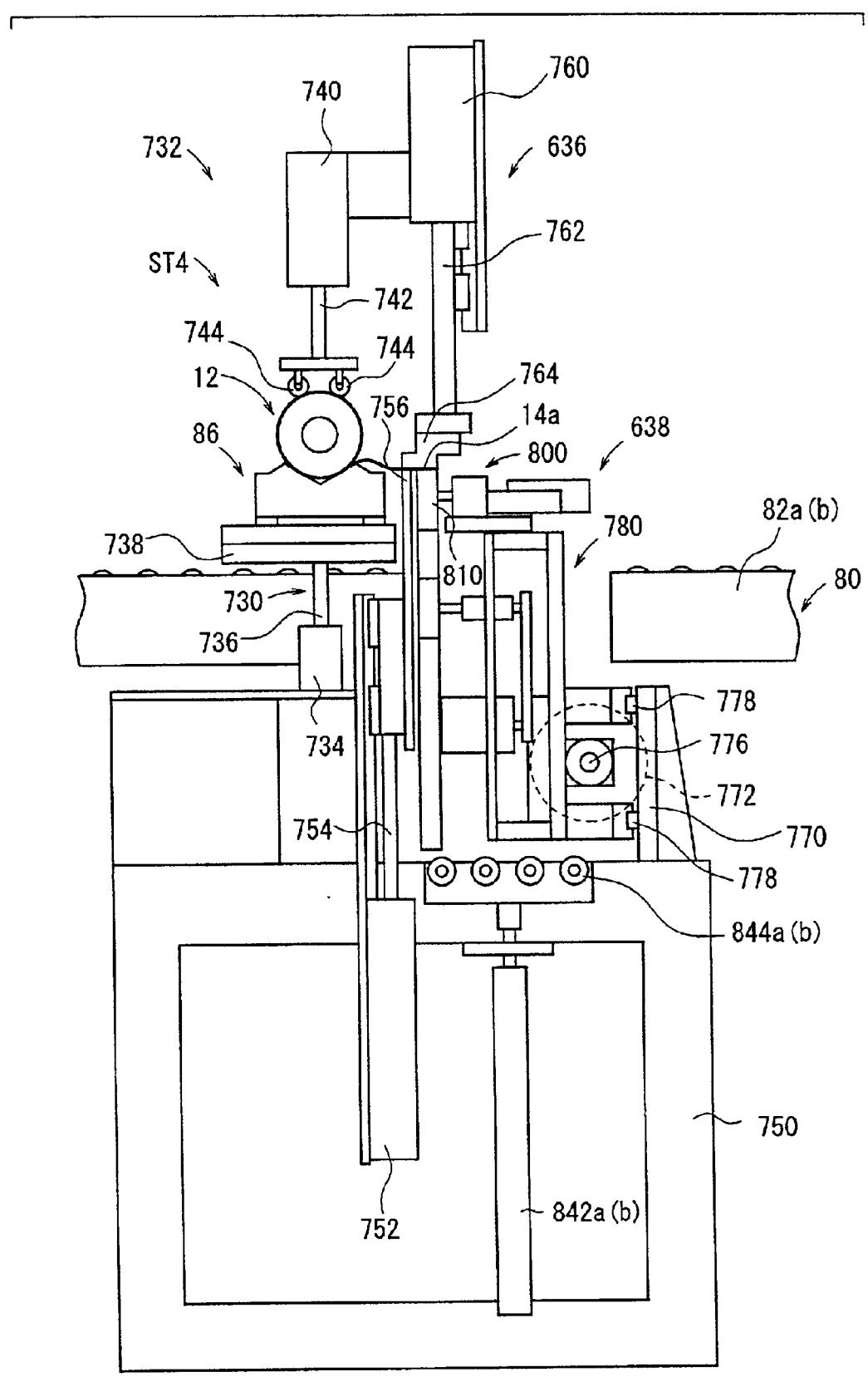
FIG. 17 is a side elevational view of the pressing mechanism and the applying mechanism.

As shown in FIGS. 15 through 17, the applying station ST4 has a pallet lifting and lowering unit 730 for lifting and lowering the pallet 86, and a roller presser 732 for holding an upper surface of the photosensitive roll 12 which is lifted by the pallet lifting and lowering unit 730.

The pallet lifting and lowering unit 730 has a cylinder 734 having an upwardly extending rod 736 on which a vertically movable base 738 is supported. The roll presser 732 has a cylinder 740 having a downwardly extending rod 742 on which there are supported a plurality of rollers 744 (see FIG. 17) for holding an upper outer circumferential surface of the photosensitive roll 12.

As shown in FIGS. 15 through 17, the pressing mechanism 636 has a pair of laterally spaced cylinders (actuators) 752 fixed to a base 750 and having respective upwardly extending rods 754 to which there is fixed a first pressing member 756 disposed below one surface (lower surface) of the end 14a of the photosensitive sheet 14 and extending transversely across the end 14a. A cylinder (actuator) 760 is mounted on the base 750 by a frame 758 and has a downwardly extending rod 762 to which there is fixed a second pressing member 764 disposed above the other surface (upper surface) of the end 14a and extending transversely across the end 14a. The second pressing member 764 is guided for its vertical movement by a pair of laterally spaced linear guides 766.

The applying mechanism 638 has a support member 770 fixedly mounted on the base 750 and having a length greater than the width of the photosensitive roll 12. A motor 772 is mounted on an end of the support member 770. The motor 772 has a rotatable drive shaft 774 to which there is coaxially connected a ball screw 776 that is rotatably supported on the support member 770. A pair of vertically spaced guide rails 778 with the ball screw 776 disposed therebetween is mounted on a vertical surface of the support member 770. A slide unit 780 is supported on the guide rails 778 for movement in the direction indicated by the arrow X. The slide unit 780 has a nut 782 threaded over the ball screw 776.

Figure 18:
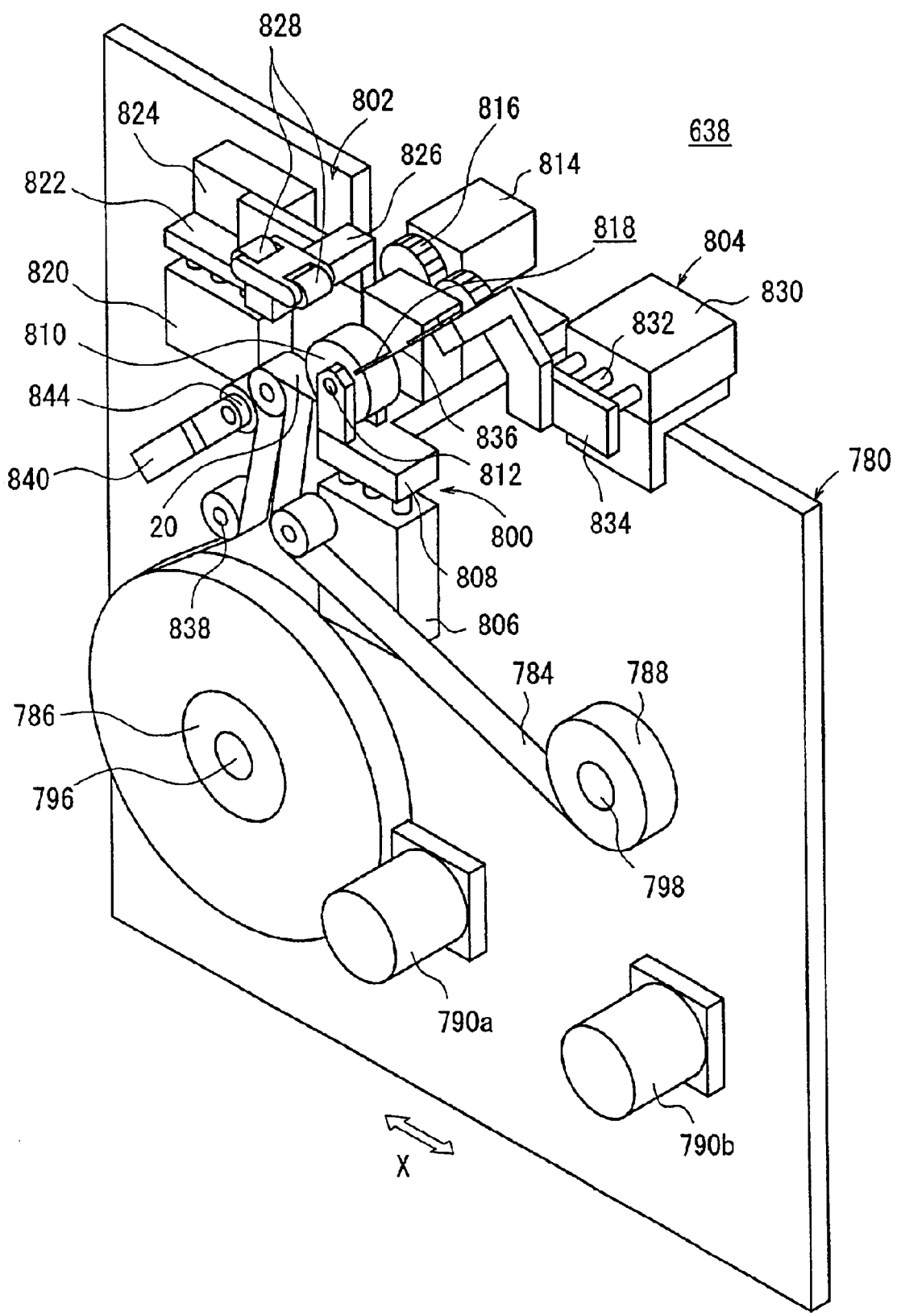
FIG. 18 is a perspective view of a slide unit of the applying mechanism.
Figure 19:
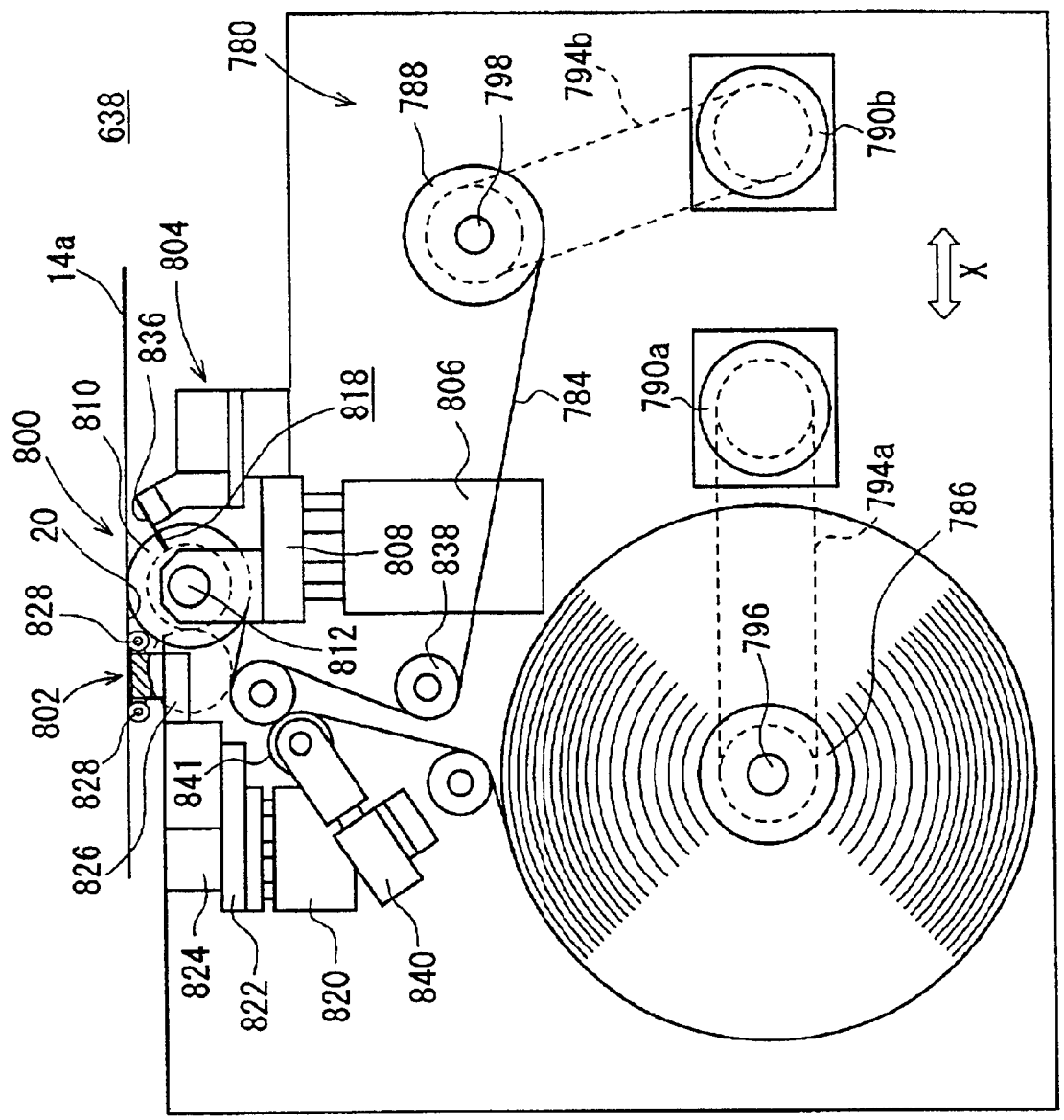
FIG. 19 is a front elevational view of the slide unit.

As shown in FIGS. 18 and 19, the slide unit 780 supports thereon a tape payout reel 786 for supporting and paying out a separable sheet 784 with joint tapes 20 thereon, and a separable sheet takeup reel 788 for winding the separable sheet 784 free of joint tapes 20. The slide unit 780 also supports thereon torque motors 790a, 790b positioned near the tape payout reel 786 and the separable sheet takeup reel 788. Rotatable shafts 796, 798 rotatably supported on the slide unit 780 have ends connected to the torque motors 790a, 790b by respective belt and pulley means 794a, 794b and opposite ends fixed to the tape payout reel 786 and the separable sheet takeup reel 788, respectively.

The slide unit 780 supports thereon an applying means 800 for applying the joint tape 20 to the end 14a, the applying means 800 being movable toward and away from the end 14a, a squeezing means 802 disposed behind the applying means 800 in the direction in which the joint tape 20 is applied to the end 14a, for pressing the joint tape 20 to the end 14a, the squeezing means 802 being movable toward and away from the end 14a, and a cutter 804 for cutting off the joint tape 20.

The applying means 800 has a cylinder 806 fixed to the slide unit 780, a movable base 808 movable back and forth by the cylinder 806, and a suction roller 810 rotatably supported on the movable base 808. The suction roller 810 has a rotatable shaft 812 which receives rotational drive power from a rotary actuator 814 through a gear train 816. The suction roller 810 has a cutter guide slot 818 defined in an outer circumferential surface thereof and extending axially of the suction roller 810.

The squeezing means 802 has a cylinder 820 fixed to the slide unit 780, a vertically movable base 822 vertically movable by the cylinder 820, and a cylinder 824 extending horizontally and fixedly mounted on the vertically movable base 822. A pair of squeezing rollers 828 is rotatably mounted on an arm 826 which is horizontally movable by the cylinder 824.

The cutter 804 has a cylinder 830 fixed to the slide unit 780, rods 832 extending from the cylinder 830 parallel to the axis of the suction roller 810, and a movable plate 834 fixed to the rods 832. A disk-shaped cutting blade 836 is fixedly mounted on the movable plate 834.

The slide unit 780 also supports thereon a plurality of fixed guide rollers 838, and a guide roller 841 movable toward and away from one of the fixed guide rollers 838 by a cylinder 840.

As shown in FIG. 17, a plurality of feed rollers 844a, 844b vertically movable by a pair of laterally spaced cylinders 842a, 842b are disposed below the slide unit 780 for transferring the pallet 86 to the upper feed conveyors 82a, 82b.

Figure 20:
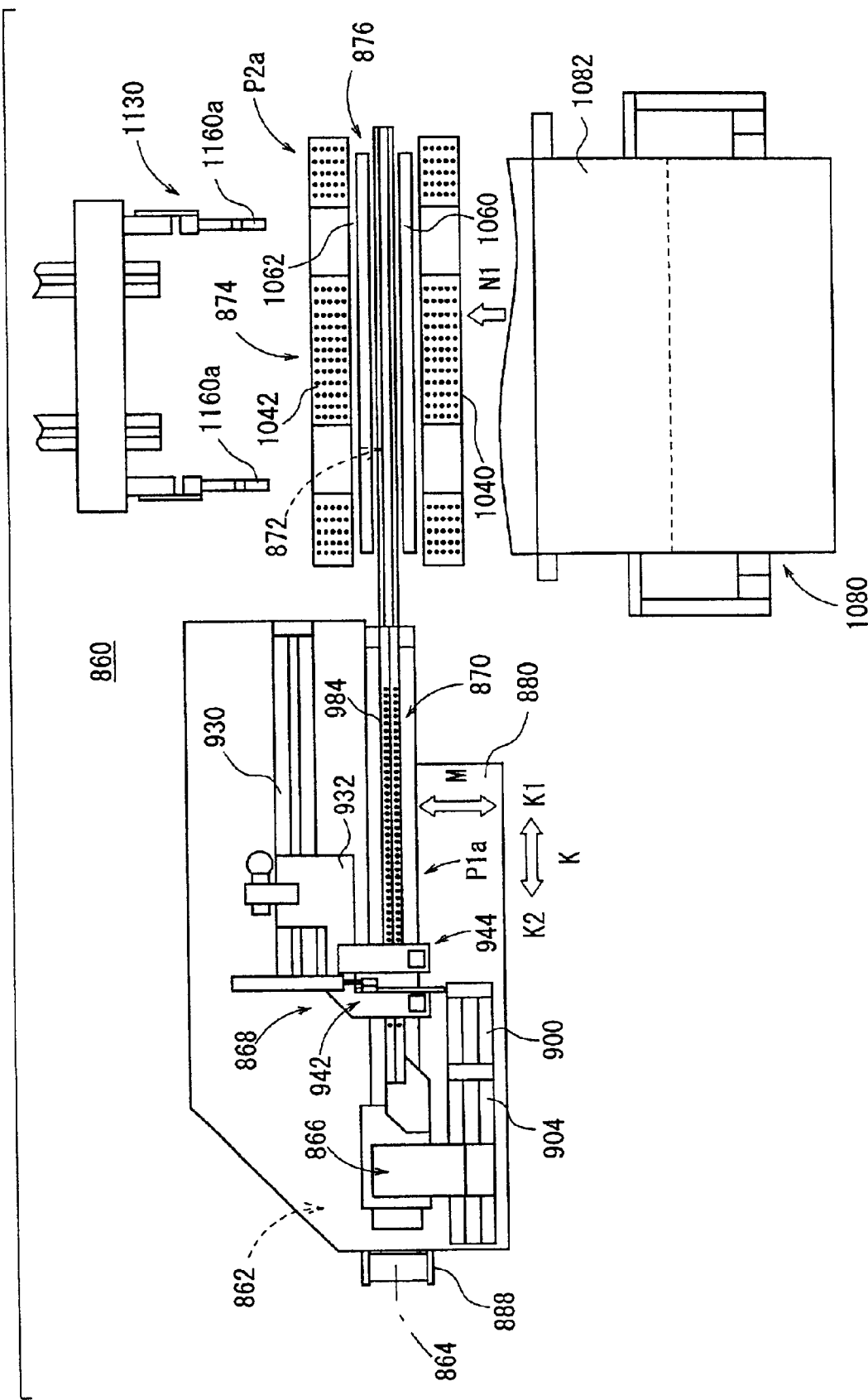
FIG. 20 is a plan view of a working device.

The light-shielding leader assembling station ST5 has a packaging sheet working device 860. As shown in FIGS. 5 and 20, the packaging sheet working device 860 has a working mechanism 866 for at least blanking a strip-like skirt member 864 delivered from a skirt member supply unit 862, a skirt member cutting mechanism 868 for transversely cutting the strip-like skirt member 864 in the blanked region into light-shielding shrink films 24, a skirt member feeding mechanism 870 for feeding the light-shielding shrink films 24 to a cutting region and a joining region for joining them to a light-shielding sheet 26, a cutting mechanism 872 for cutting the light-shielding sheet 26 in a longitudinal direction of the light-shielding shrink films 24, a sheet member spacing mechanism 874 for spacing cut ends of the light-shielding sheet 26 apart from each other by a given distance, a joining mechanism 876 for joining the light-shielding shrink films 24 to the confronting cut ends of the light-shielding sheet 26 with the light-shielding shrink films 24 having exposed transverse portions, and an end tape supplying and applying mechanism 878 for supplying end fastening tapes 28 to the leading end of the light-shielding sheet 26.

Figure 21:
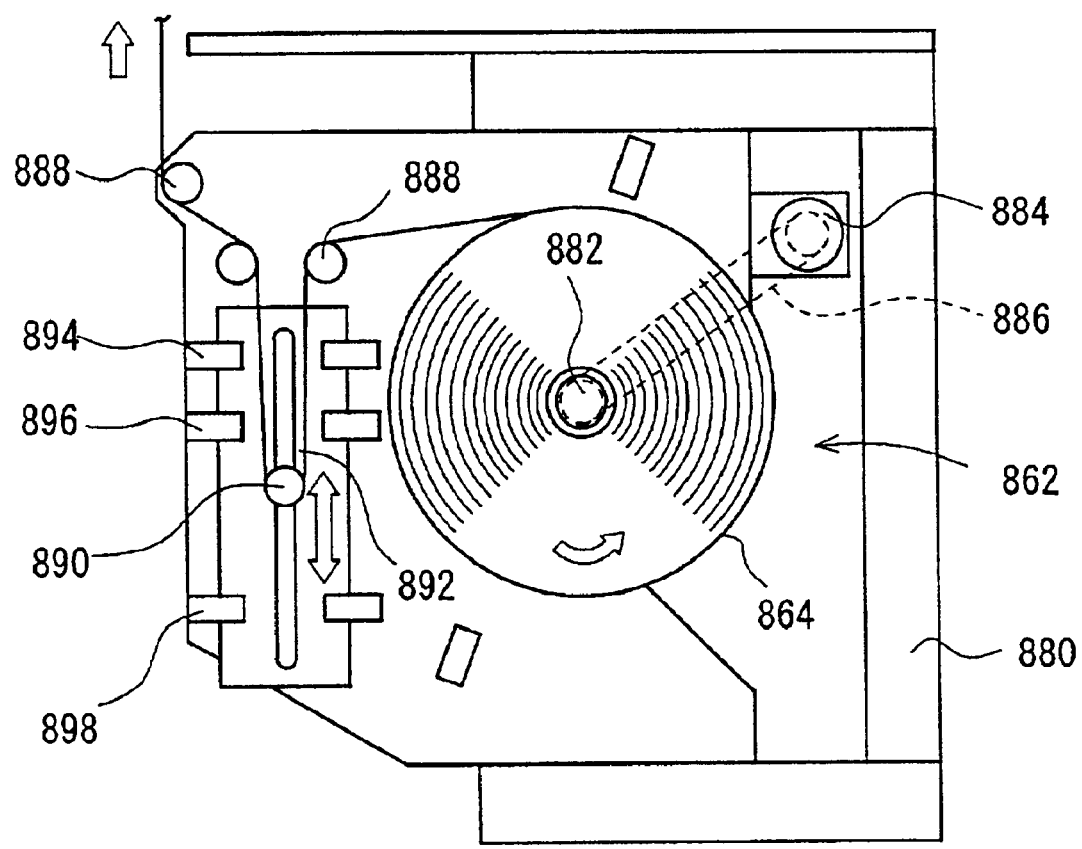
FIG. 21 is a front elevational view of a skirt member supply unit of the working device.

As shown in FIG. 21, the skirt member supply unit 862 has a payout shaft 882 rotatably supported on a base 880. The payout shaft 882 is rotatable about a horizontal axis by a motor 884 through a belt and pulley means 886 which is connected to the motor 884. The skirt member supply unit 862 also has a plurality of guide rollers 888 rotatably supported on the base 880 and arranged in a direction in which the strip-like skirt member 864 is paid out from the payout shaft 882. A dancer roller 890 is vertically movably disposed in two of the guide rollers 888 which are disposed parallel to each other.

The strip-like skirt member 864 includes a loop 892 formed around the dancer roller 890 between the two guide rollers 888. Positions of the loop 892 are detected by a first upper position detecting sensor 894, a second upper position detecting sensor 896, and a second lower position detecting sensor 898 which are disposed in vertically spaced positions.

Figure 22:
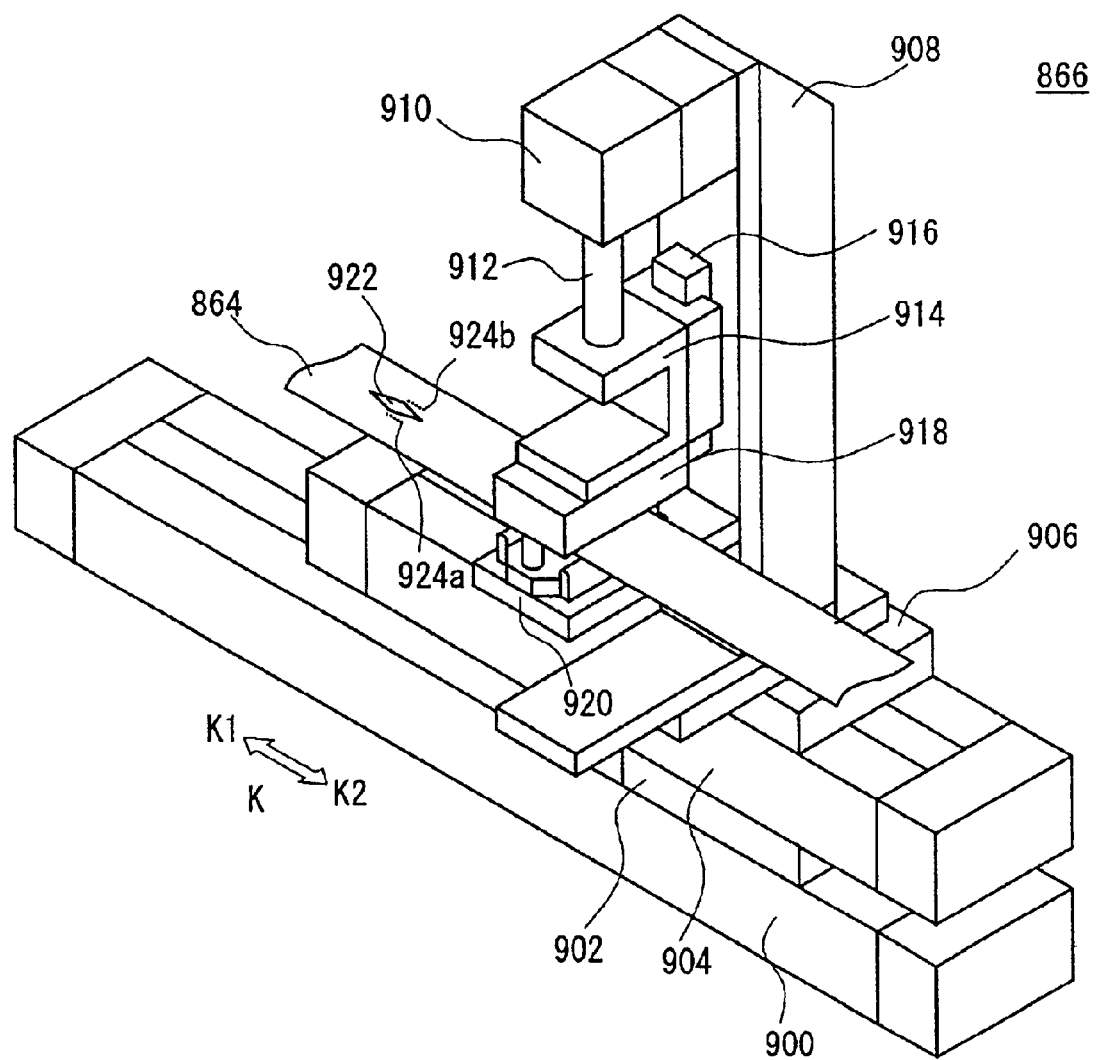
FIG. 22 is a perspective view of a working mechanism of the working device.

As shown in FIGS. 20 and 22, the working mechanism 866 has a lower rodless cylinder 900 mounted on the base 880 and extending parallel to a strip-like skirt member feed path defined by the guide rollers 888. The lower rodless cylinder 900 has a first movable base 902 movable back and forth in the longitudinal direction indicated by the arrow K of the lower rodless cylinder 900. An upper rodless cylinder 904, which is shorter than the lower rodless cylinder 900, is fixedly mounted on the first movable base 902. The upper rodless cylinder 904 has a second movable base 906 movable back and forth in the longitudinal direction of the upper rodless cylinder 904.

Figure 23:
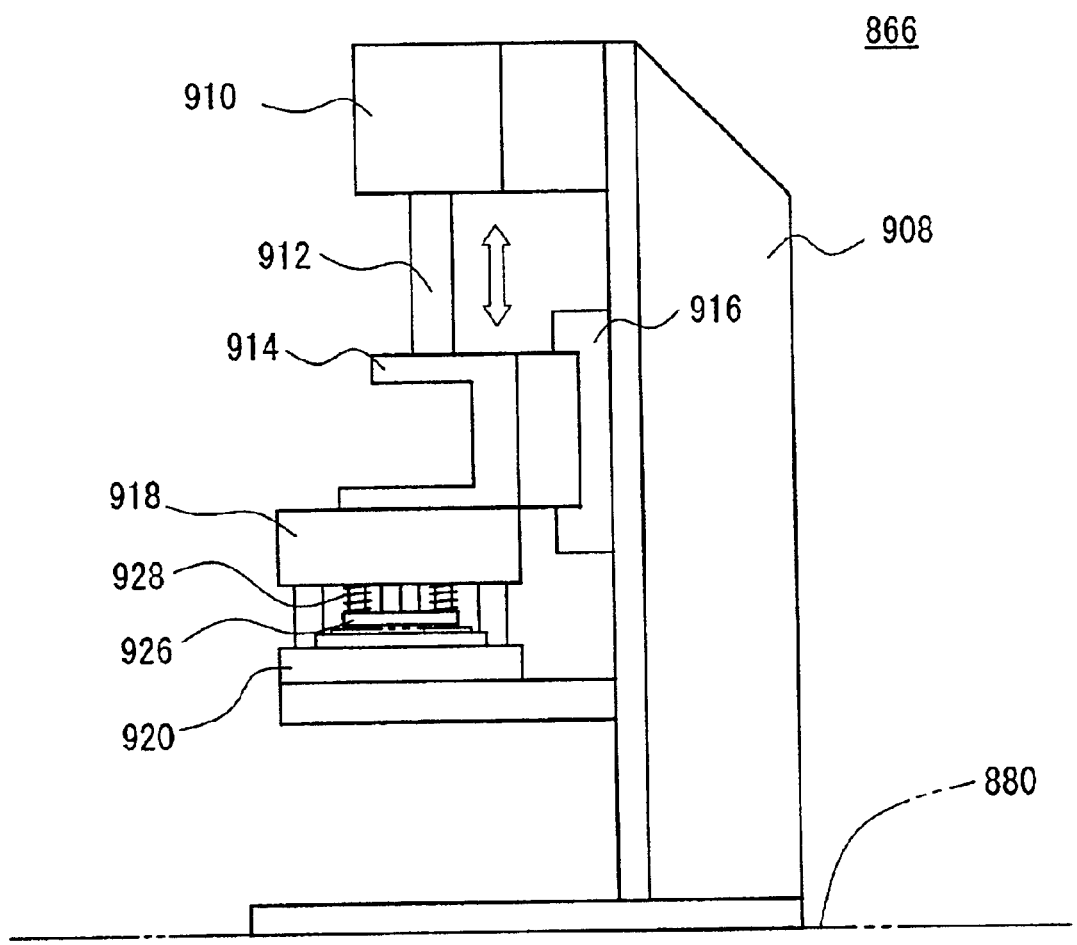
FIG. 23 is a side elevational view of the working mechanism.

A support frame 908 extending vertically upwardly is screwed to the second movable base 906, and a pressurizing cylinder 910 is fixed to an upper end of the support frame 908. As shown in FIGS. 22 and 23, the pressurizing cylinder 910 has a downwardly extending rod 912 positioned above and aligned with the strip-like skirt member feed path defined by the guide rollers 888. A vertically movable base 914 is coupled to a lower end of the rod 912. The vertically movable base 914 is guided along a vertical surface of the support frame 908 by a linear guide 916, and supports a punch 918 on its lower end. A die plate 920 disposed below the punch 918 is fixedly mounted on the support frame 908.

As shown in FIG. 22, the punch 918 and the die plate 920 jointly operate to form a lozenge-shaped opening 922 and tear-off perforations 924a, 924b in the strip-like skirt member 864. The punch 918 and the die plate 920 have their punch and die structures shaped complementarily to the lozenge-shaped opening 922 and the tear-off perforations 924a, 924b. As shown in FIG. 23, the punch 918 has a stripper 926 vertically movably supported on a plurality of stripper bolts 928.

Figure 24:
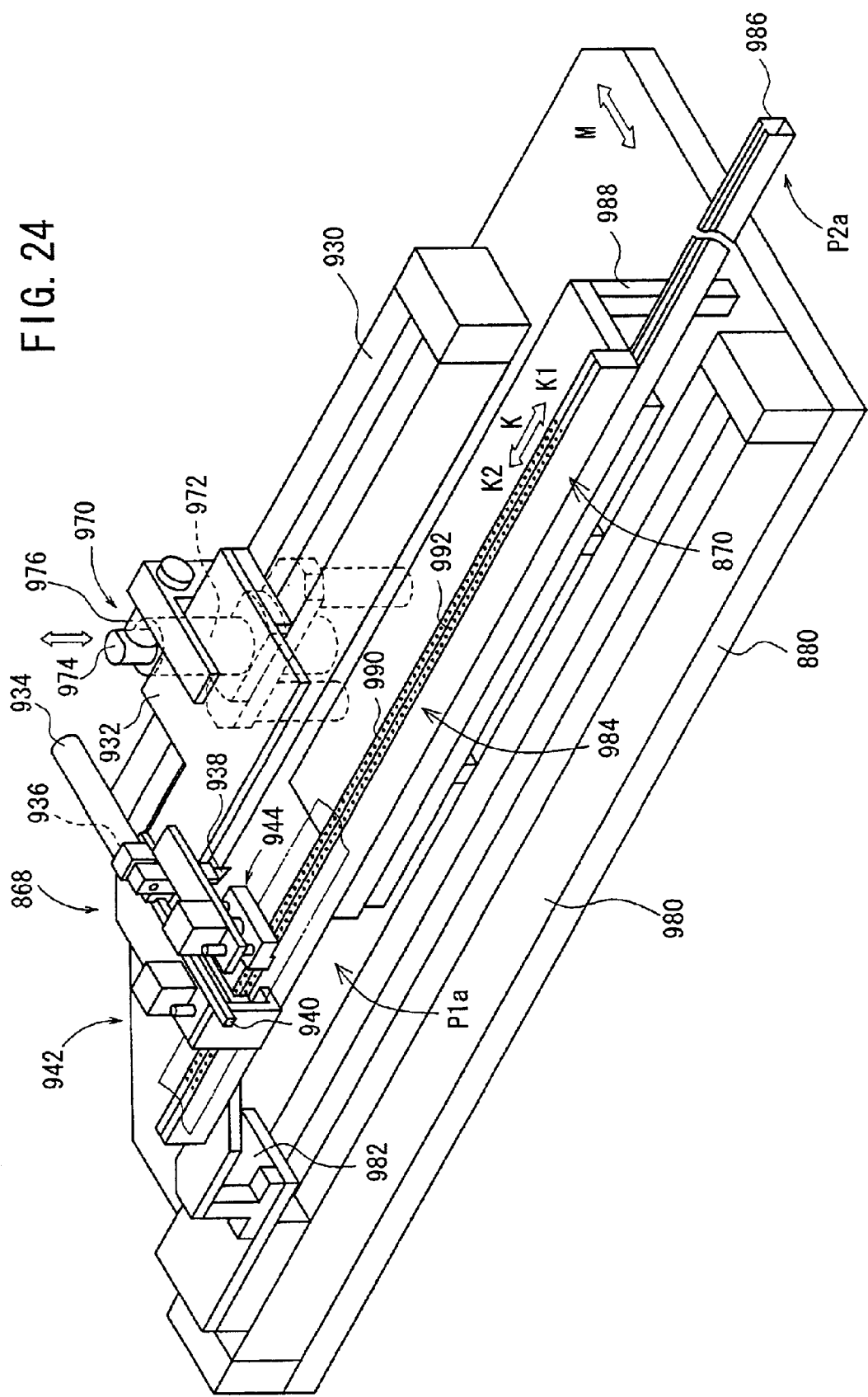
FIG. 24 is a perspective view of a skirt member cutting mechanism and a skirt member feeding mechanism of the working device.

As shown in FIGS. 20 and 24, a rodless cylinder 930 is mounted on the base 880 parallel to the lower rodless cylinder 900 of the working mechanism 866, the rodless cylinder 930 being positioned on one side of the strip-like skirt member feed path remotely from the lower rodless cylinder 900. The rodless cylinder 930 has a length in the direction indicated by the arrow K so as to correspond to the drawn length of the strip-like skirt member 864. The rodless cylinder 930 has a movable base 932 on which the skirt member cutting mechanism 868 is mounted. The skirt member cutting mechanism 868 has a horizontal cylinder 934 having a rod 936 with a cutter blade 938 fixed thereto. The cutter blade 938 is guided by a slide guide 940 for movement in the transverse direction indicated by the arrow M of the strip-like skirt member 864.

The movable base 932 has a function as a skirt member holding mechanism for holding the strip-like skirt member 864 when the strip-like skirt member 864 is transversely cut off by the skirt member cutting mechanism 868. The movable base 932 has a gripping means 942 disposed upstream of the cutter blade 938 with respect to the direction in which the strip-like skirt member 864 is fed, and a holding means 944 disposed downstream of the cutter blade 938 with respect to the same direction.

Figure 25:
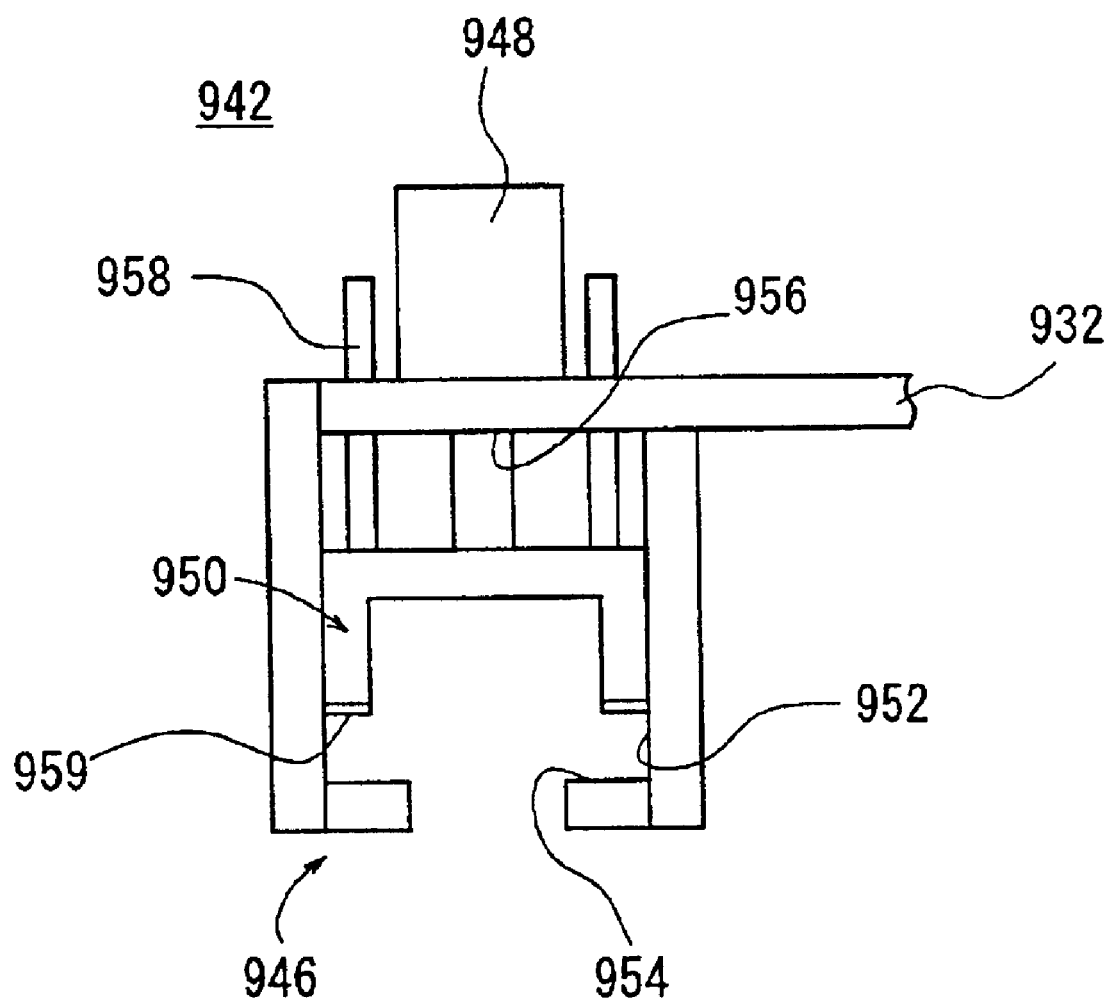
FIG. 25 is a front elevational view of a gripping means of the working device.

As shown in FIG. 25, the gripping means 942 has a fixed guide 946 fixed to the movable base 932 and a movable base 950 movable toward and away from the fixed guide 946 by a cylinder 948. The fixed guide 946 has a pair of vertical guide surfaces 952 spaced from each other by a distance corresponding to the width of the strip-like skirt member 864, and a pair of horizontal guide surfaces 954 spaced from each other by a given distance for supporting the lower surface of the strip-like skirt member 864.

The movable guide 950 is coupled to a distal end of a rod 956 extending downwardly from the cylinder 948 and is movably guided on the movable base 932 by a plurality of guide bars 958. The movable guide 950 has a pair of pressing surfaces 959 for pressing and holding transversely spaced opposite edges of the strip-like skirt member 864 against the respective horizontal guide surfaces 954.

Figure 26:
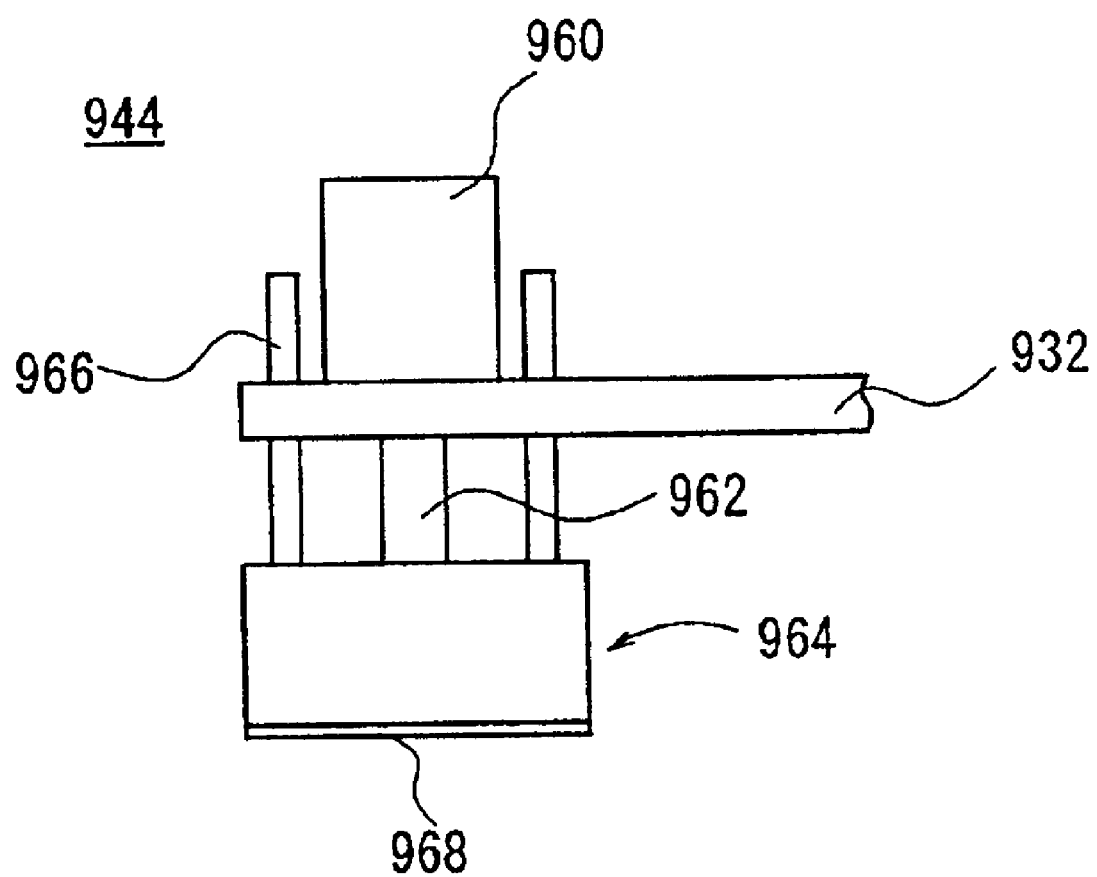
FIG. 26 is a front elevational view of a holding means of the working device.

As shown in FIG. 26, the holding means 944 has a cylinder 960 fixed to the movable base 932 and a pressing guide 964 coupled to a rod 962 which extends downwardly from the cylinder 960. The pressing guide 964 is vertically movably supported on the movable base 932 by a plurality of guide bars 966 and has a lower pressing surface 968 for pressing and holding the strip-like skirt member 864 against the skirt member feeding mechanism 870. The lower pressing surface 968 extends the full transverse width of the strip-like skirt member 864.

As shown in FIG. 24, a stopper means 970 for positioning and holding the movable base 932 is disposed in a retracted position of the movable base 932, i.e., a position for cutting the strip-like skirt member 864. The stopper means 970 has a cylinder 972 disposed on the base 880 and having an engaging rod 974 which extends upwardly. When the engaging rod 974 is brought into an upper end position by the cylinder 972, the engaging rod 974 abuts against an engaging member 976 on the movable base 932. When the engaging rod 974 is retracted into the cylinder 972, the engaging rod 974 is spaced from the movable base 932, allowing the movable base 932 to move to a retracted limit position of the rodless cylinder 930.

As shown in FIGS. 20 and 24, the skirt member feeding mechanism 870 has an elongate rodless cylinder (actuator) 980 extending in the direction indicated by the arrow K over the strip-like skirt member feed path. The rodless cylinder 980 has a movable base 982 to which an end of a skirt member suction box 984 is coupled. The skirt member suction box 984 is supported on an elongate guide member 986 extending from a cutting region P1a to a joining region P2a. The guide member 986 is disposed on the base 880 by a plurality of support columns 988.

The skirt member suction box 984 has its dimension in the direction indicated by the arrow K so as to correspond to the cut length of the strip-like skirt member 864. The skirt member suction box 984 has a plurality of suction holes 990 defined in its upper surface. The skirt member suction box 984 also has a cutting guide slit 992 defined in its upper surface at a transversely central region thereof and extending longitudinally.

Figure 27:
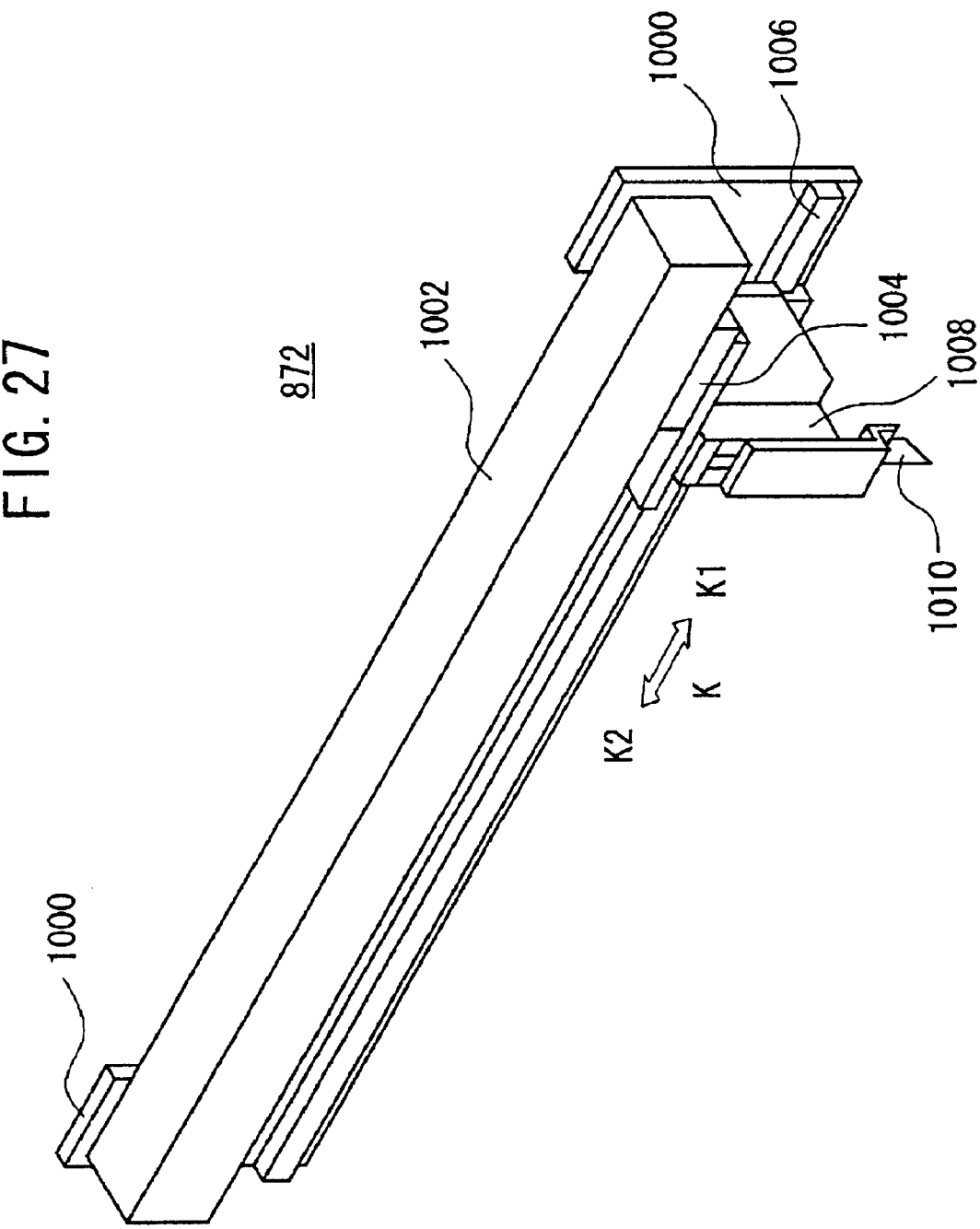
FIG. 27 is a perspective view of a cutting mechanism of the working device.

As shown in FIGS. 20 and 27, the cutting mechanism 872 has a support frame 1000 disposed above the joining region P2a, and a horizontally extending rodless cylinder 1002 is mounted on a vertical surface of the support frame 1000. The rodless cylinder 1002 has a movable base 1004 which is movable back and forth in the direction indicated by the arrow K along a linear guide 1006 fixed to the support frame 1000. A cylinder 1008 is fixedly mounted on the movable base 1004, and a cutter blade 1010 is vertically movably supported on the cylinder 1008.

Figure 28:
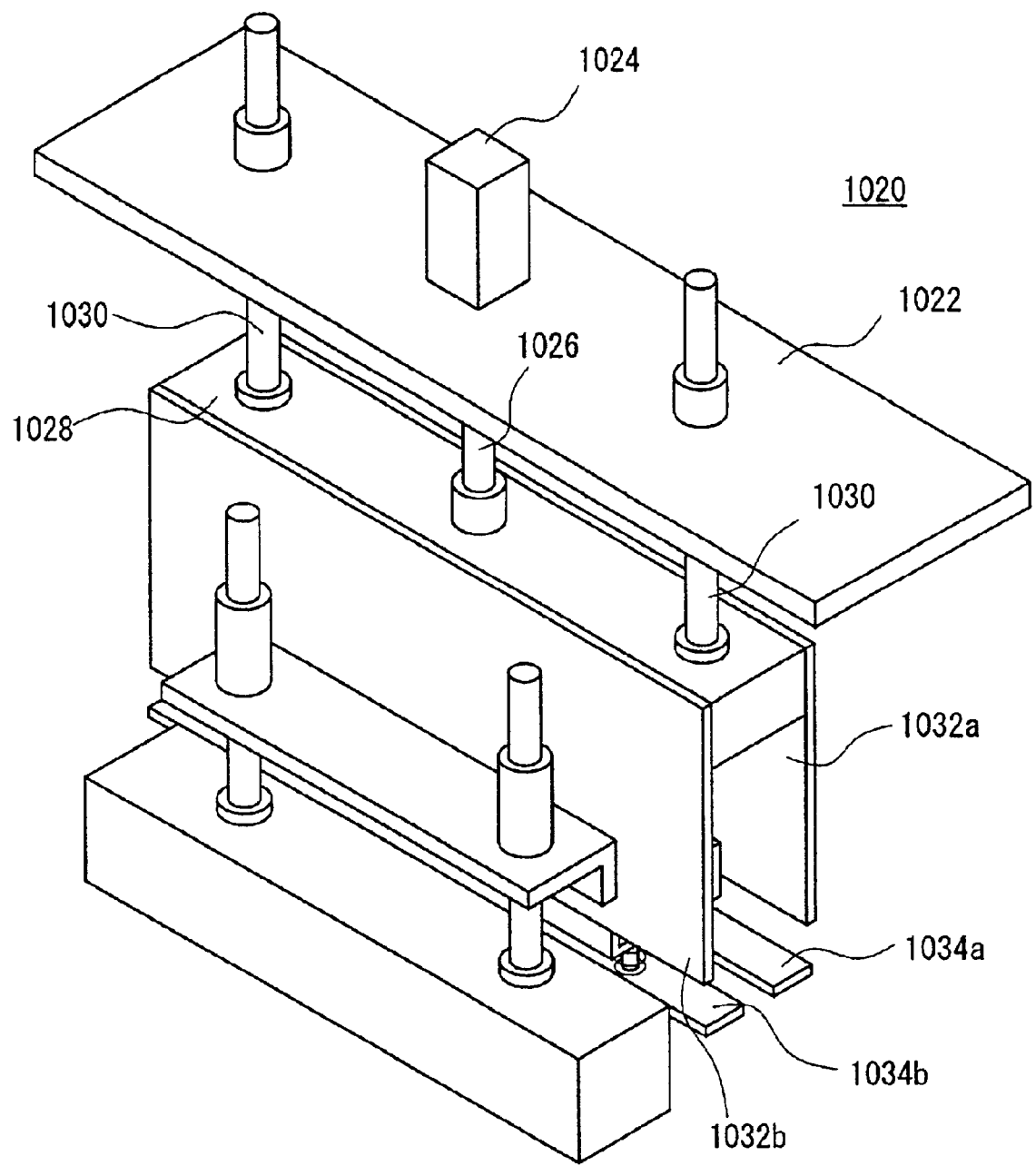
FIG. 28 is a perspective view of a sheet member holding mechanism of the working device.

As shown in FIG. 28, a sheet member holding mechanism 1020 is disposed near the cutting mechanism 872. The sheet member holding mechanism 1020 has a lifting and lowering cylinder 1024 fixedly mounted on a horizontal upper frame 1022 and having a downwardly extending rod 1026 to which a vertically movable base 1028 is fixed. The vertically movable base 1028 is movably supported on the upper frame 1022 by guide bars 1030. Presser plates 1034a, 1034b are mounted on the vertically movable base 1028 by attachment plates 1032a, 1032b. The presser plates 1034a, 1034b extend in the direction in which the light-shielding sheet 26 is cut, and are disposed one on each side of the cutter blade 1010.

Figure 29:
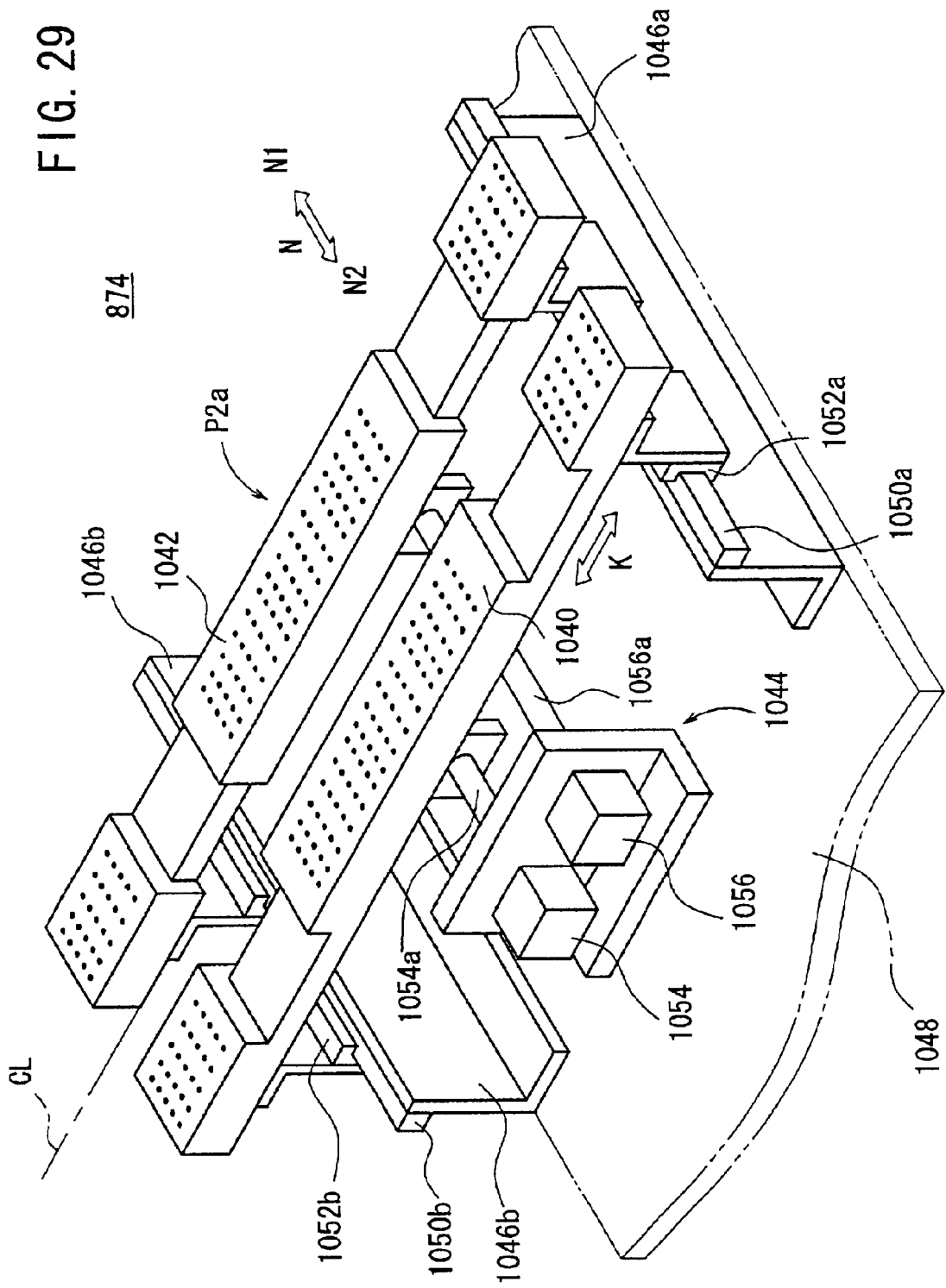
FIG. 29 is a perspective view of a sheet member spacing mechanism of the working device.

As shown in FIG. 29, the sheet member spacing mechanism 874 has first and second sheet member suction boxes 1040, 1042 disposed one on each side of a cutting line CL for the light-shielding sheet 26, for attracting the light-shielding sheet 26 under suction, and a moving unit 1044 for moving the first and second sheet member suction boxes 1040, 1042 toward and away from each other in the direction indicated by the arrow N.

In the joining region P2a, a pair of support members 1046a, 1046b is fixedly mounted on a base 1048. The support members 1046a, 1046b are spaced a distance from each other in the direction indicated by the arrow K and extend parallel to each other in the direction indicated by the arrow N. Guide rails 1050a, 1050b extending in the direction indicated by the arrow N are mounted on the respective support members 1046a, 1046b. The guide rails 1050a, 1050b are slidably engaged by respective linear guides 1052a, 1052b that are fixed to opposite ends of the first and second sheet member suction boxes 1040, 1042.

The moving unit 1044 has first and second cylinders 1054, 1056 fixedly mounted on a base 1048. The first and second cylinders 1054, 1056 have respective shorter and longer rods 1054a, 1056a extending parallel to each other in the direction indicated by the arrow N1. The shorter rod 1054a is coupled to a lower surface of the first sheet member suction box 1040, and the longer rod 1056a extends below the first sheet member suction box 1040 and is coupled to the second sheet member suction box 1042.

Figure 30:
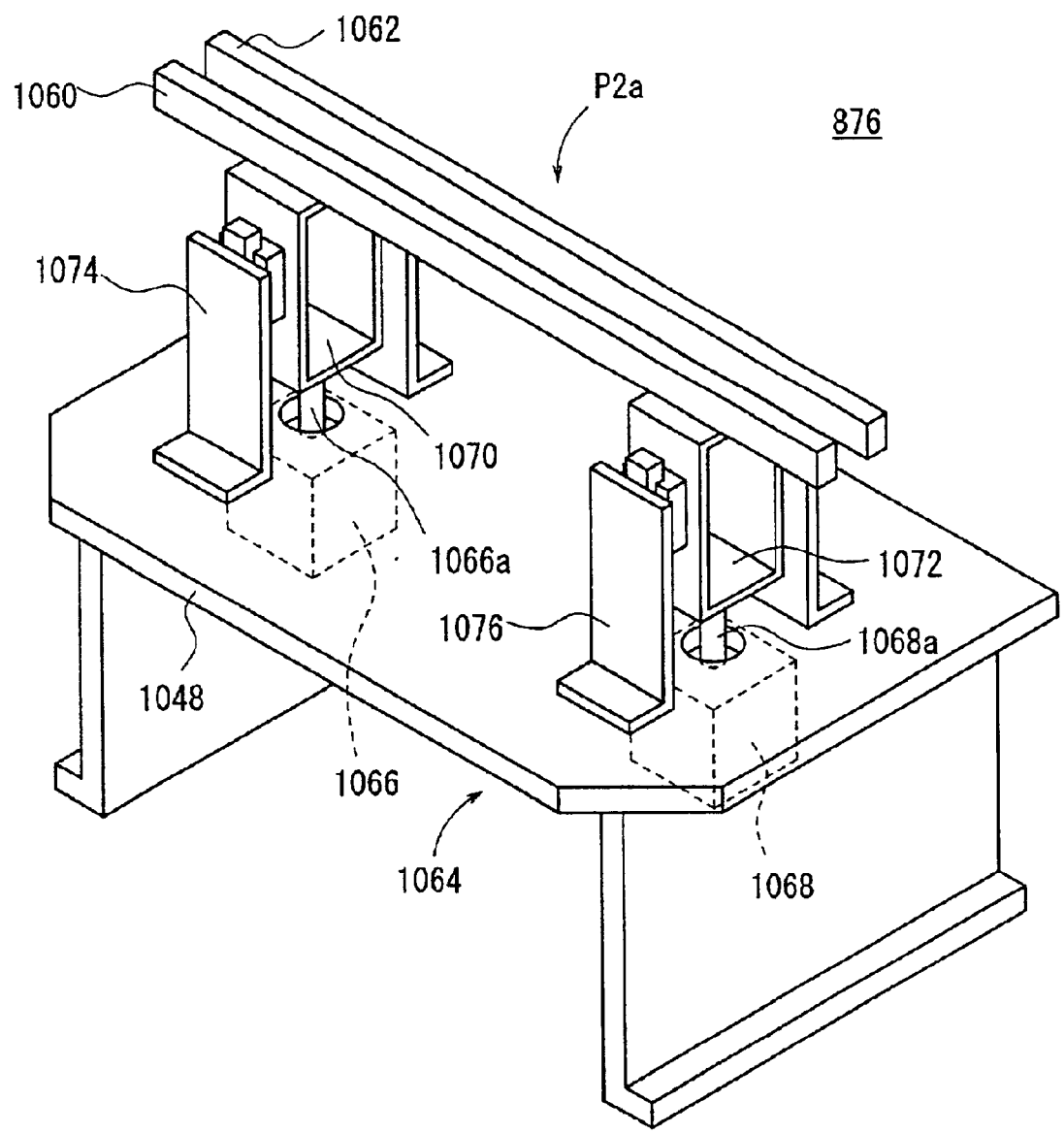
FIG. 30 is a perspective view of a joining mechanism of the working device.

As shown in FIG. 30, the joining mechanism 876 has first and second heater blocks 1060, 1062 disposed between the first and second sheet member suction boxes 1040, 1042 in the joining region P2a, and a lifting and lowering unit 1064 for lifting and lowering the first and second heater blocks 1060, 1062.

The lifting and lowering unit 1064 has a pair of laterally spaced lifting and lowering cylinders 1066, 1068 mounted on the base 1048 outside of the moving unit 1044 and having upwardly extending rods 1066a, 1068a, respectively, to which vertically movable bases 1070, 1072 are coupled. The vertically movable bases 1070, 1072 are vertically supported by respective pairs of guide plates 1074, 1076. The first and second heater blocks 1060, 1062 are integrally fixed to the vertically movable bases 1070, 1072.

Figure 31:
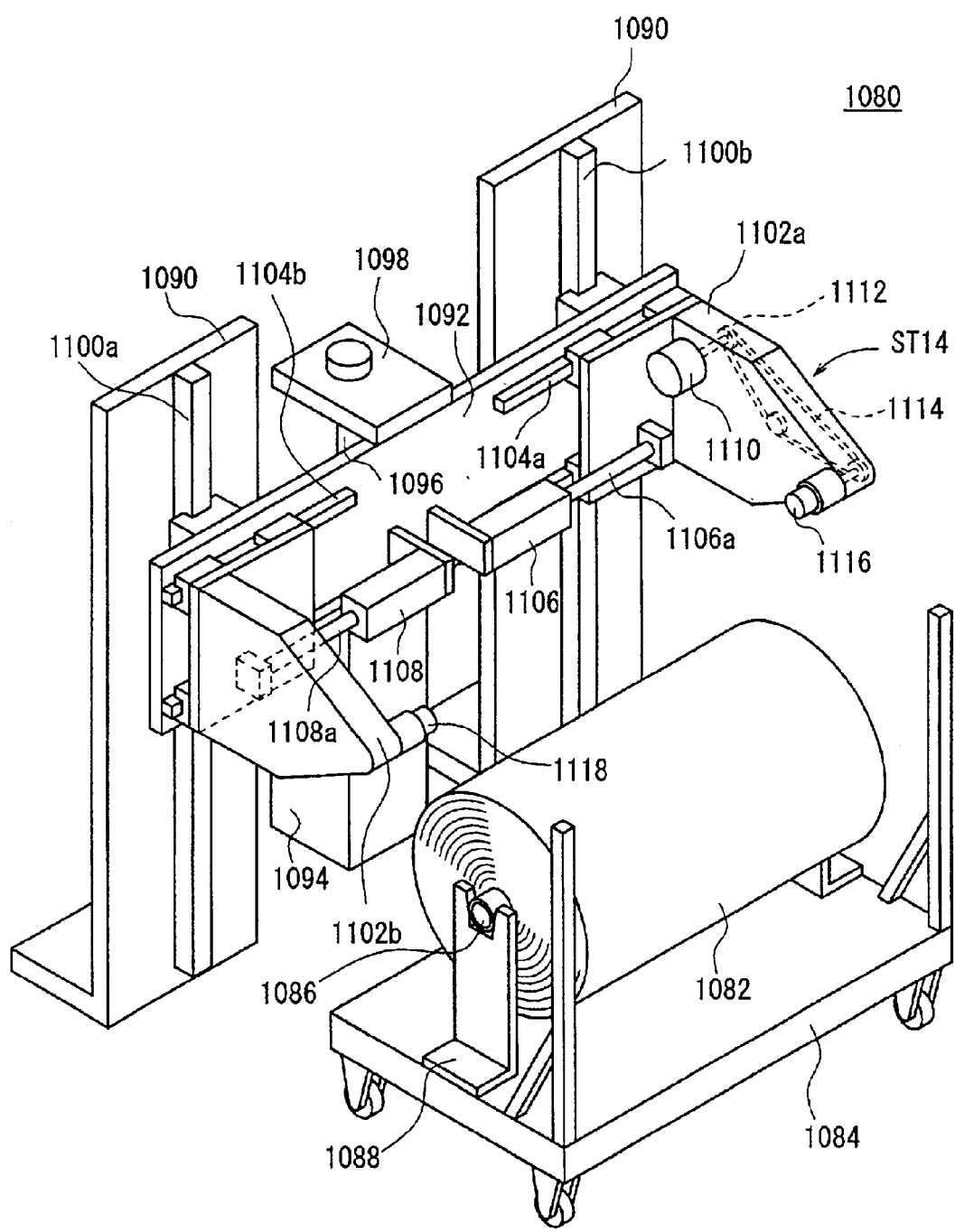
FIG. 31 is a perspective view of a light-shielding sheet supply.
Figure 32:
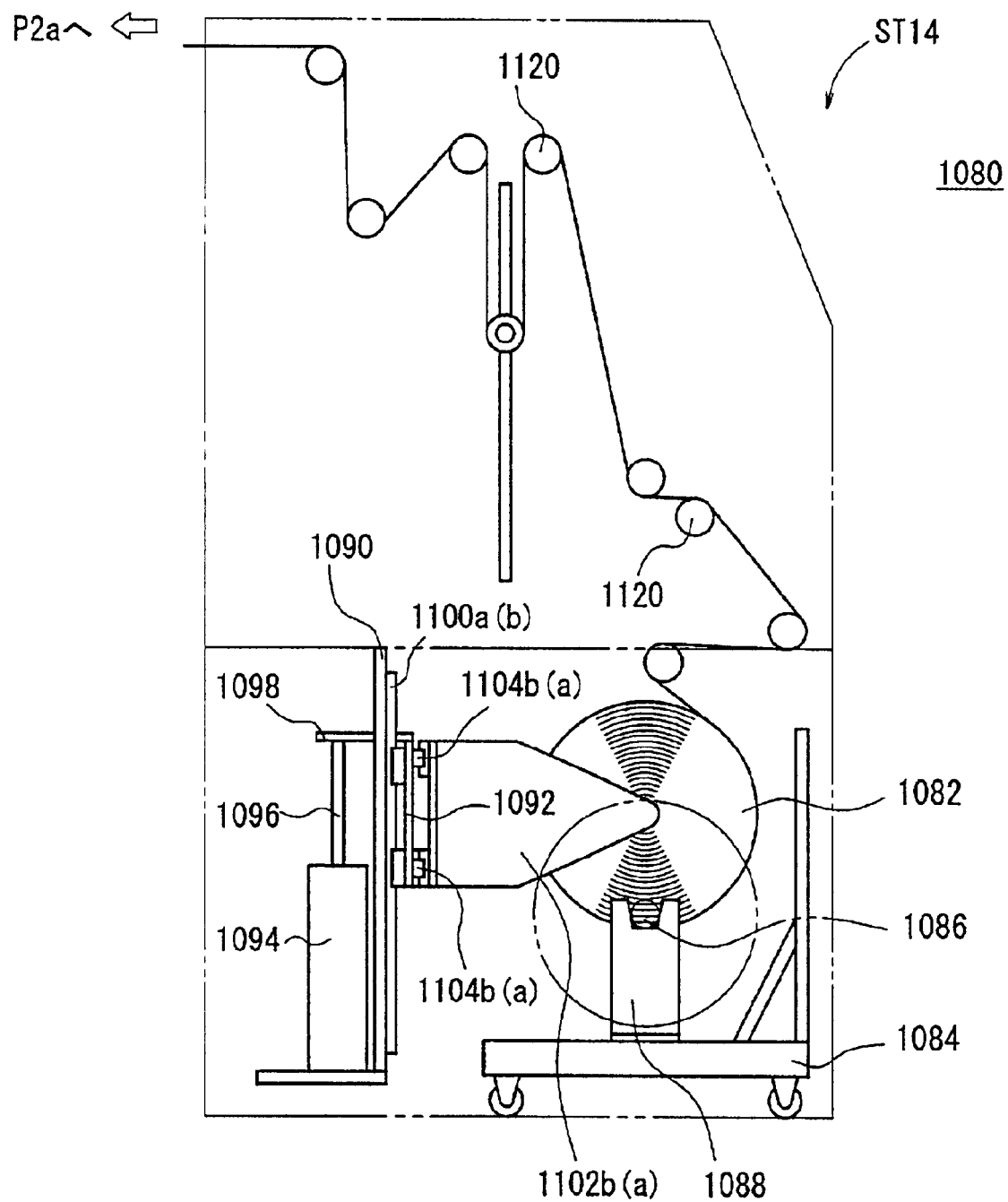
FIG. 32 is a side elevational view of the light-shielding sheet supply.

As shown in FIG. 5, a light-shielding sheet 26 is produced by cutting off a strip-like light-shielding sheet 1082 unwound from its roll in a light-shielding sheet supply 1080, to a predetermined width in the joining region P2a. In the light-shielding sheet supply 1080, as shown in FIGS. 31 and 32, the strip-like light-shielding sheet 1082 is placed as a roll on a carriage 1084 and supplied therefrom. A pair of support blocks 1088 supporting a core 1086 of the rolled strip-like light-shielding sheet 1082 is mounted on the carriage 1084.

The light-shielding sheet supply 1080 has a pair of vertically extending walls 1090 in a position where the carriage 1084 is placed. A support plate 1092 which is vertically movable by a lifting and lowering cylinder 1094 is supported on the walls 1090. The lifting and lowering cylinder 1094 is directed vertically and has an upwardly extending rod 1096 which is connected to a support plate 1092 by a joint 1098. Laterally spaced rails 1100*a*, 1100*b* are vertically mounted on vertical surfaces of the respective walls 1090, with the support plate 1092 being slidably supported on the rails 1100*a*, 1100*b*.

A pair of laterally spaced movable arms 1102*a*, 1102*b* is horizontally movably supported on the support plate 1092 by respective pairs of upper and lower guide rails 1104*a*, 1104*b*. The support plate 1092 supports cylinders 1106, 1108 fixed thereto which extend horizontally in alignment with each other. The cylinders 1106, 1108 have respective rods 1106*a*, 1108*a* projecting in different directions therefrom and coupled to the movable arms 1102*a*, 1102*b*, respectively.

A motor 1110 is mounted on the movable arm 1102*a* and has a rotatable shaft 1112 operatively coupled to a drive shaft 1116 on the movable arm 1102*a* by a chain and sprocket mechanism 1114. A driven shaft 1118 is rotatably supported on the movable arm 1102*b* in alignment with the drive shaft 1116. The drive shaft 1116 and the driven shaft 1118 can be fitted in the respective opposite ends of the core 1086 of the rolled strip-like light-shielding sheet 1082. The light-shielding sheet supply 1080 has a plurality of guide rollers 1120 for feeding the strip-like light-shielding sheet 1082 to the joining region P2*a* (see FIG. 32).

Figure 33:
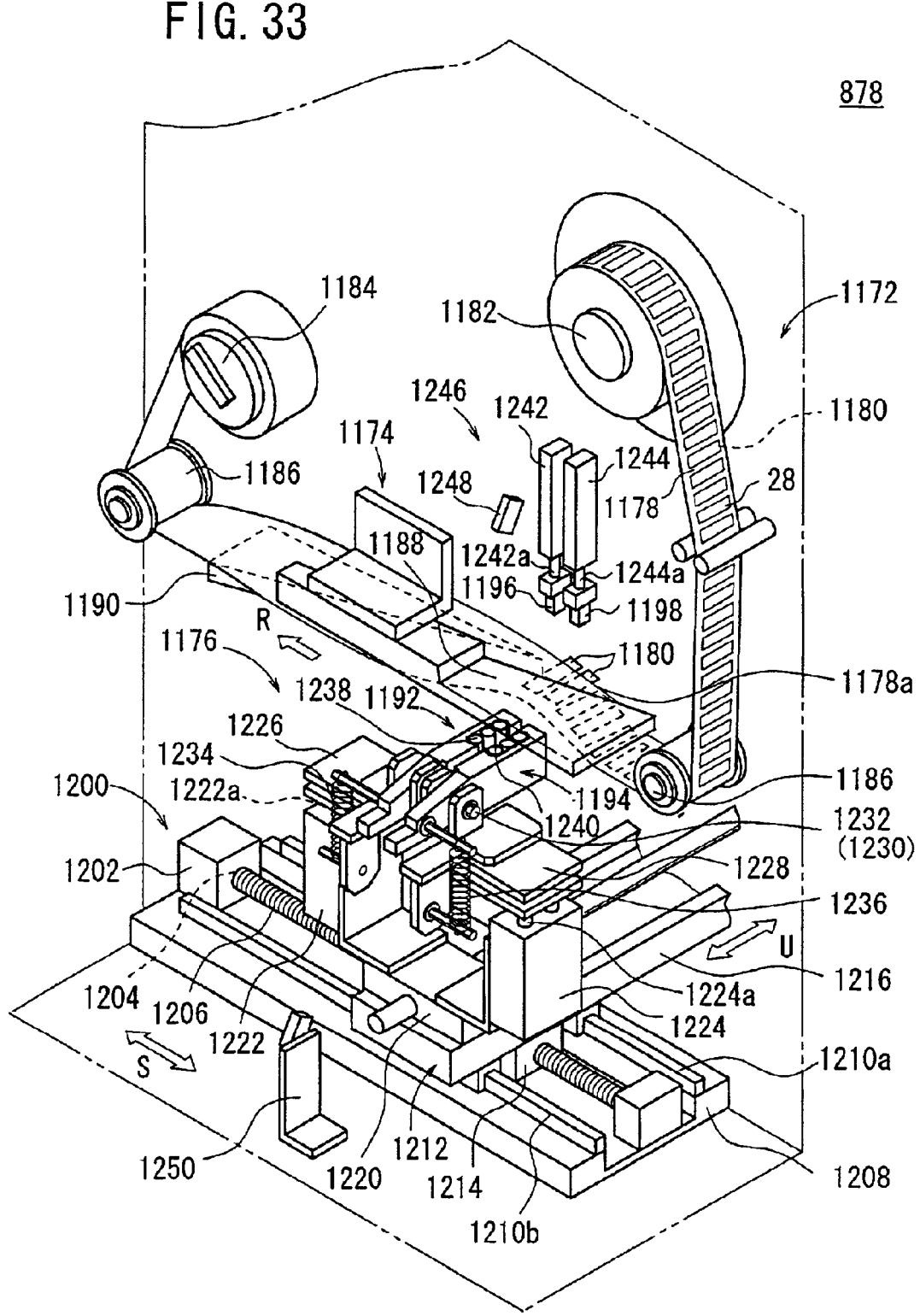
FIG. 33 is a perspective view of an end tape supplying and applying mechanism of the automatic packaging system.
Figure 34:
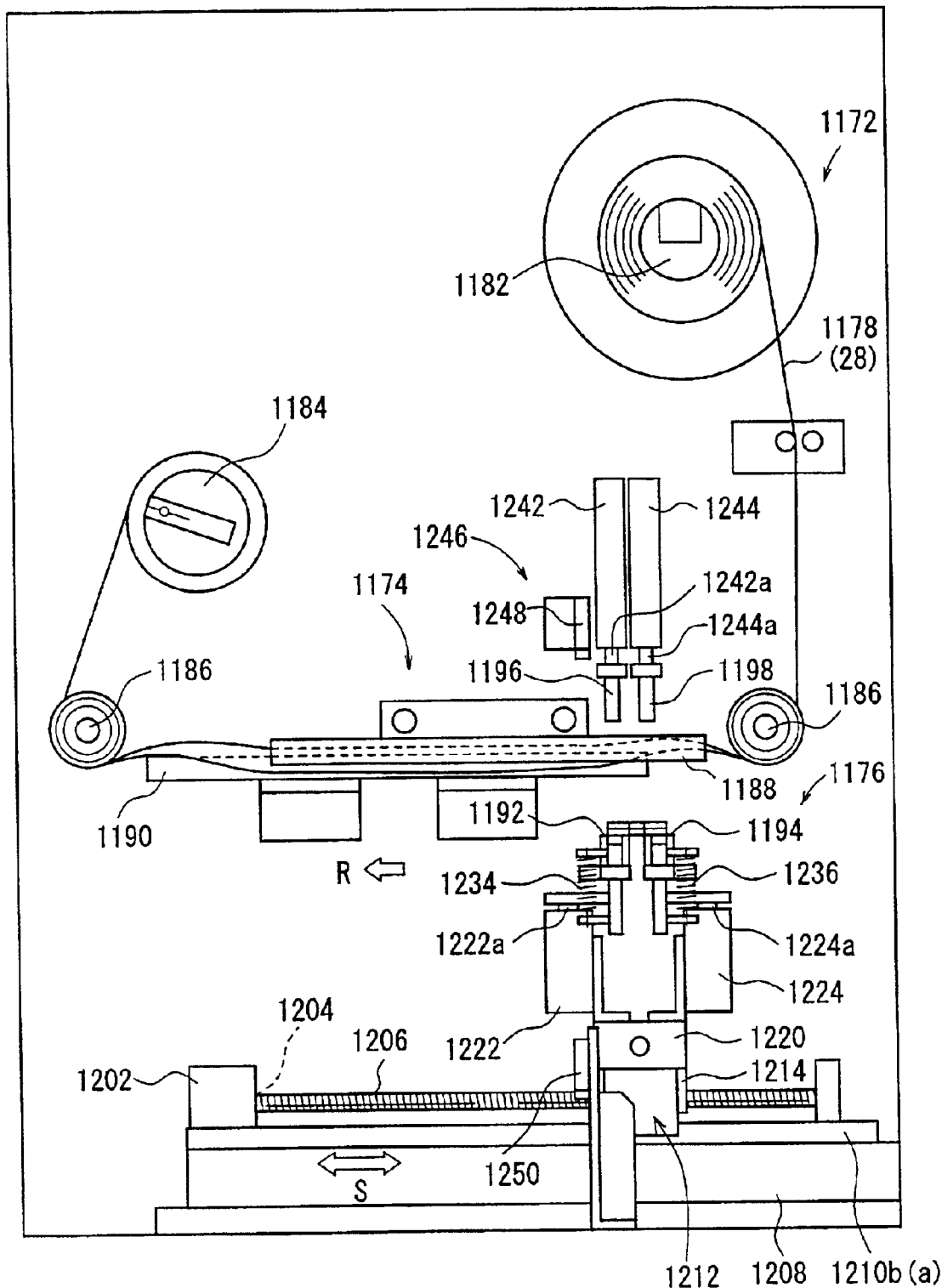
FIG. 34 is a front elevational view of the end tape supplying and applying mechanism.

As shown in FIGS. 33 and 34, the end tape supplying and applying mechanism 878 has a separable sheet payout mechanism 1172, a separable sheet bending mechanism 1174, and an end tape removing mechanism 1176. End fastening tapes 28 are applied in an array to a strip-like separable sheet 1178. Each of the end fastening tapes 28 has its longitudinal direction extending transversely across the strip-like separable sheet 1178, and has an adhesive-free area 1180 positioned at a side edge 1178*a* of the strip-like separable sheet 1178.

The separable sheet payout mechanism 1172 has a tape payout shaft 1182 for paying out the separable sheet 1178 with end fastening tapes 28 applied thereto from a roll thereof on the tape payout shaft 1182, and a separable sheet takeup shaft 1184 for winding the separable sheet 1178 free of the end fastening tapes 28. A pair of guide rollers 1186 whose axes extend substantially horizontally parallel to each other is disposed between the tape payout shaft 1182 and the separable sheet takeup shaft 1184.

Figure 35:
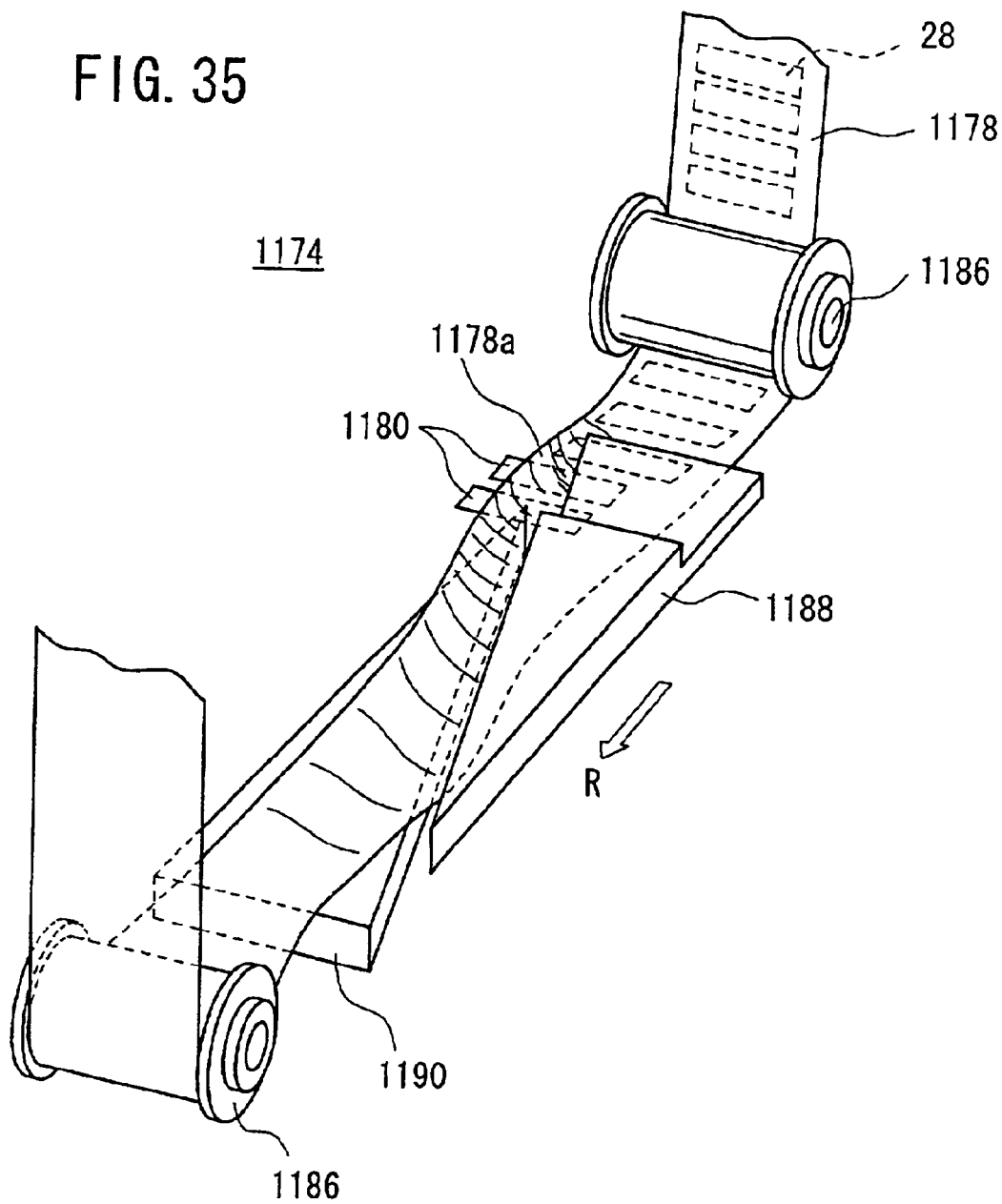
FIG. 35 is a perspective view of a separable sheet bending mechanism of the end tape supplying and applying mechanism.
Figure 36:
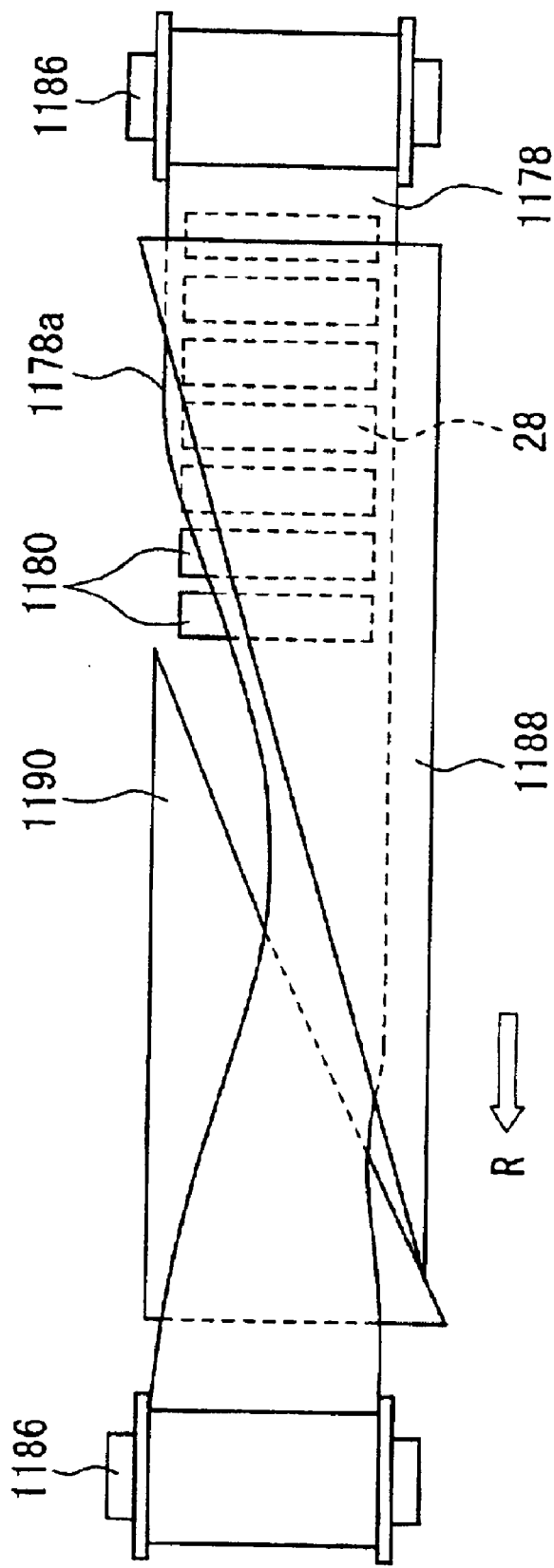
FIG. 36 is a plan view of the separable sheet bending mechanism.

As shown in FIGS. 35 and 36, the separable sheet bending mechanism 1174 has first and second feed guides 1188, 1190 disposed one on each side of the separable sheet 1178, for guiding the side edge 1178*a* of the strip-like separable sheet 1178 so as to forcibly bend the side edge 1178*a* upwardly. The first feed guide 1188 serves to guide a reverse side of the strip-like separable sheet 1178 opposite to the surface thereof on which the end fastening tapes 28 are disposed. The first feed guide 1188 has a substantially triangular shape having an edge inclined progressively away from the side edge 1178*a* of the strip-like separable sheet 1178 in the direction indicated by the arrow R in which the strip-like separable sheet 1178 is fed.

The second feed guide 1190 serves to guide the surface of the strip-like separable sheet 1178 on which the end fastening tapes 28 are disposed. The second feed guide 1190 has a substantially triangular shape having an edge inclined progressively away from the side edge 1178*a* of the strip-like separable sheet 1178 in the direction indicated by the arrow R in which the strip-like separable sheet 1178 is fed.

When the strip-like separable sheet 1178 is guided by the first and second feed guides 1188, 1190, the side edge 1178*a* thereof is bent upwardly, exposing the adhesive-free areas 1180 of the end fastening tapes 28 out of the side edge 1178*a*.

As shown in FIGS. 33 and 34, the end tape removing mechanism 1176 has first and second suction heads 1192, 1194 positioned in facing relation to the surface of the strip-like separable sheet 1178 on which the end fastening tapes 28 are disposed, and first and second pressing members 1196, 1198 positioned in facing relation to the reverse side of the strip-like separable sheet 1178, with the end fastening tapes 28 being interposed between the first and second suction heads 1192, 1194 and the first and second pressing members 1196, 1198.

The end tape removing mechanism 1176 has a moving means 1200 for moving the first and second suction heads 1192, 1194 together in the direction indicated by the arrow S. The moving means 1200 has a servomotor 1202 having a rotatable drive shaft 1204 to which there is coupled an end of a ball screw 1206 that is rotatably supported on a base 1208. Two parallel guide rails 1210*a*, 1210*b* disposed one on each side of the ball screw 1206 and extending parallel to each other are mounted on the base 1208. A movable base 1212 is movably mounted on the guide rails 1210*a*, 1210*b*. The movable base 1212 has a nut 1214 threaded over the ball screw 1206.

The movable base 1212 supports thereon a guide member 1216 which is elongate in the direction indicated by the arrow U which is perpendicular to the direction indicated by the arrow S. A slide member 1220 of a rodless cylinder is mounted on the guide member 1216 for movement in the direction indicated by the arrow U.

First and second lifting and lowering cylinders 1222, 1224 are vertically mounted on the slide member 1220 and have respective upwardly extending rods 1222*a*, 1224*a* to which first and second vertically movable bases 1226, 1228 are fixed.

Figure 37:
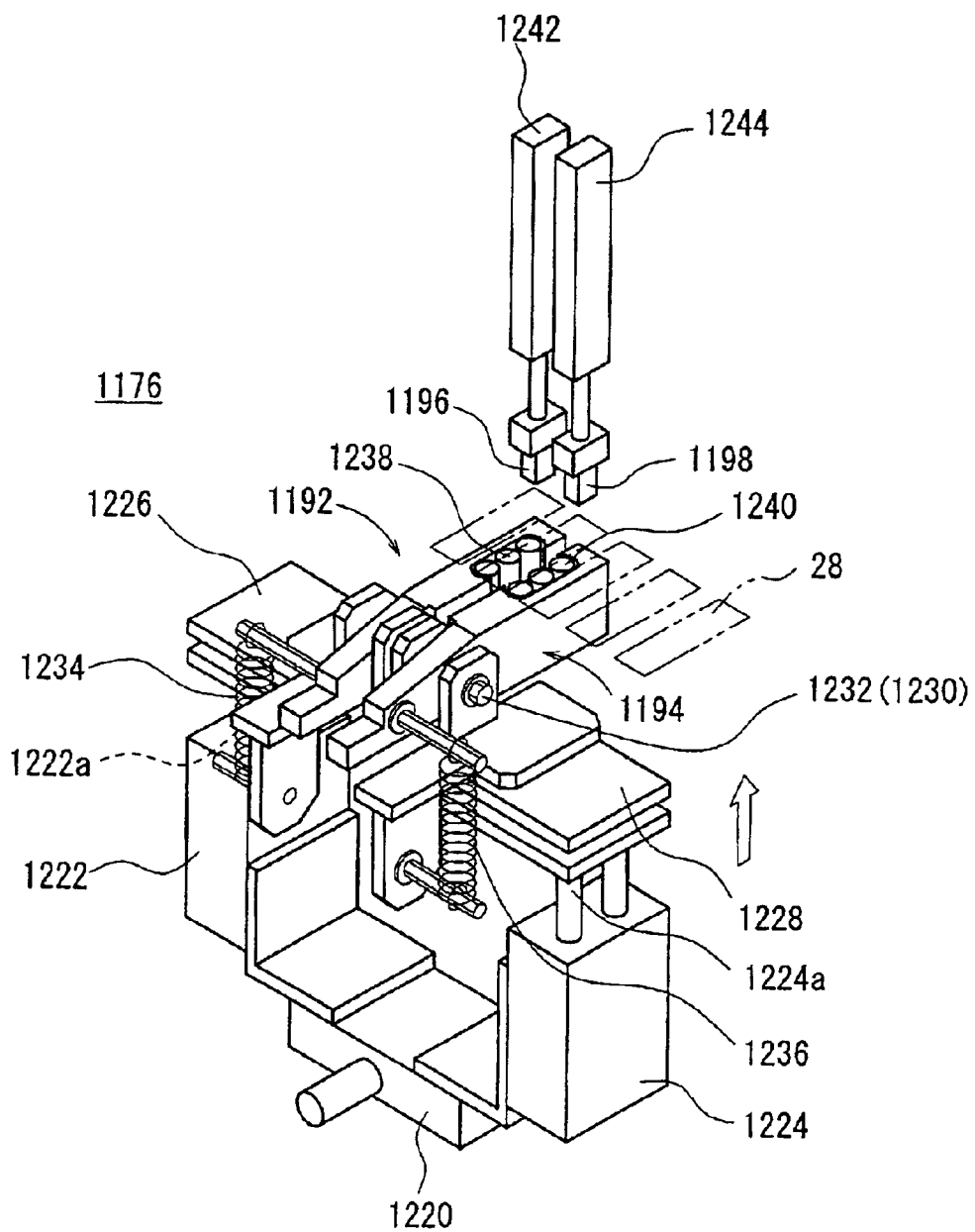
FIG. 37 is a perspective view showing the manner in which first and second suction heads of an end tape removing mechanism are lifted.

As shown in FIGS. 33 and 37, the first and second suction heads 1192, 1194 are mounted on the respective first and second vertically movable bases 1226, 1228 for swinging movement about respective pivot shafts 1230, 1232. The first and second suction heads 1192, 1194 are normally urged by respective springs 1234, 1236 to cause their distal ends to swing upwardly. A plurality of (e.g., three) suction pads 1238, 1240 are arrayed on each of the first and second suction heads 1192, 1194 in the longitudinal direction of the end fastening tapes 28. The suction pads 1238, 1240 are connected to a vacuum source (not shown).

As shown in FIGS. 33 and 34, the first and second pressing members 1196, 1198 are fixed to respective tip ends of rods 1242*a*, 1244*a* which project downwardly from respective first and second cylinders 1242, 1244, and positioned in alignment with the adhesive-free areas 1180 of the end fastening tapes 28 applied to the separable sheet 1178. An end tape detecting means 1246 for automatically detecting the adhesive-free areas 1180 of the end fastening tapes 28 is disposed near the first cylinder 1242. The end tape detecting means 1246 comprises a light emitter 1248 and a light detector 1250 which are vertically spaced a certain distance from each other.

Figure 38:
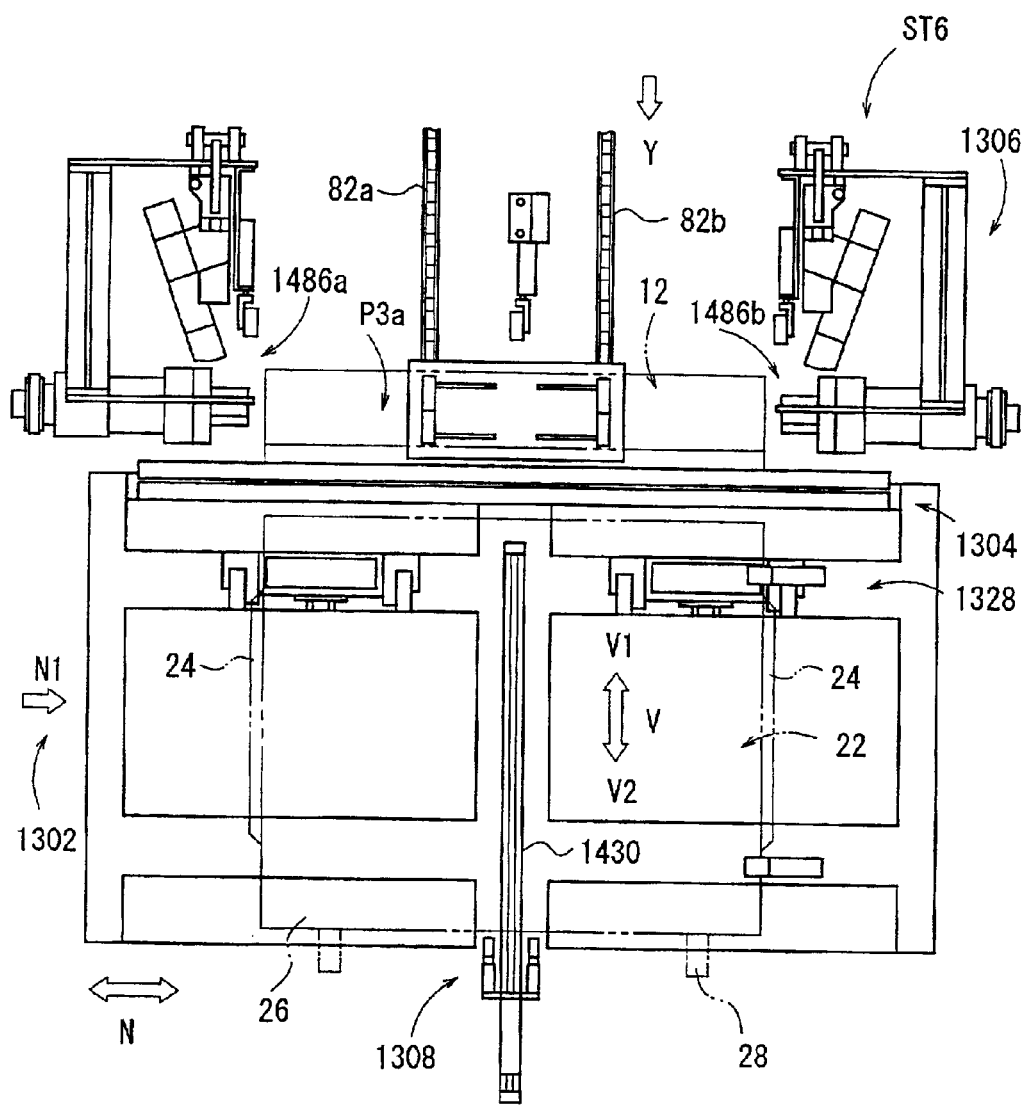
FIG. 38 is a plan view of a light-shielding leader winding station.

The light-shielding leader winding station ST6 has a packaging sheet takeup device 1300. As shown in FIG. 38, the packaging sheet takeup device 1300 comprises a light-shielding leader feed mechanism (packaging sheet feed mechanism) 1302 for gripping the end of the light-shielding leader 22 and feeding and positioning the end of the light-shielding leader 22 in a winding position P3a, an applying mechanism 1304 for applying the light-shielding leader 22 to the end 14a of the photosensitive sheet 14, a rotating mechanism 1306 for rotating the photosensitive roll 12 with the light-shielding leader 22 applied thereto, and a light-shielding leader holding mechanism (packaging sheet holding mechanism) 1308 for gripping and moving the winding terminal end of the light-shielding leader 22 to the photosensitive roll 12 when the photosensitive roll 12 is rotated.

Figure 39:
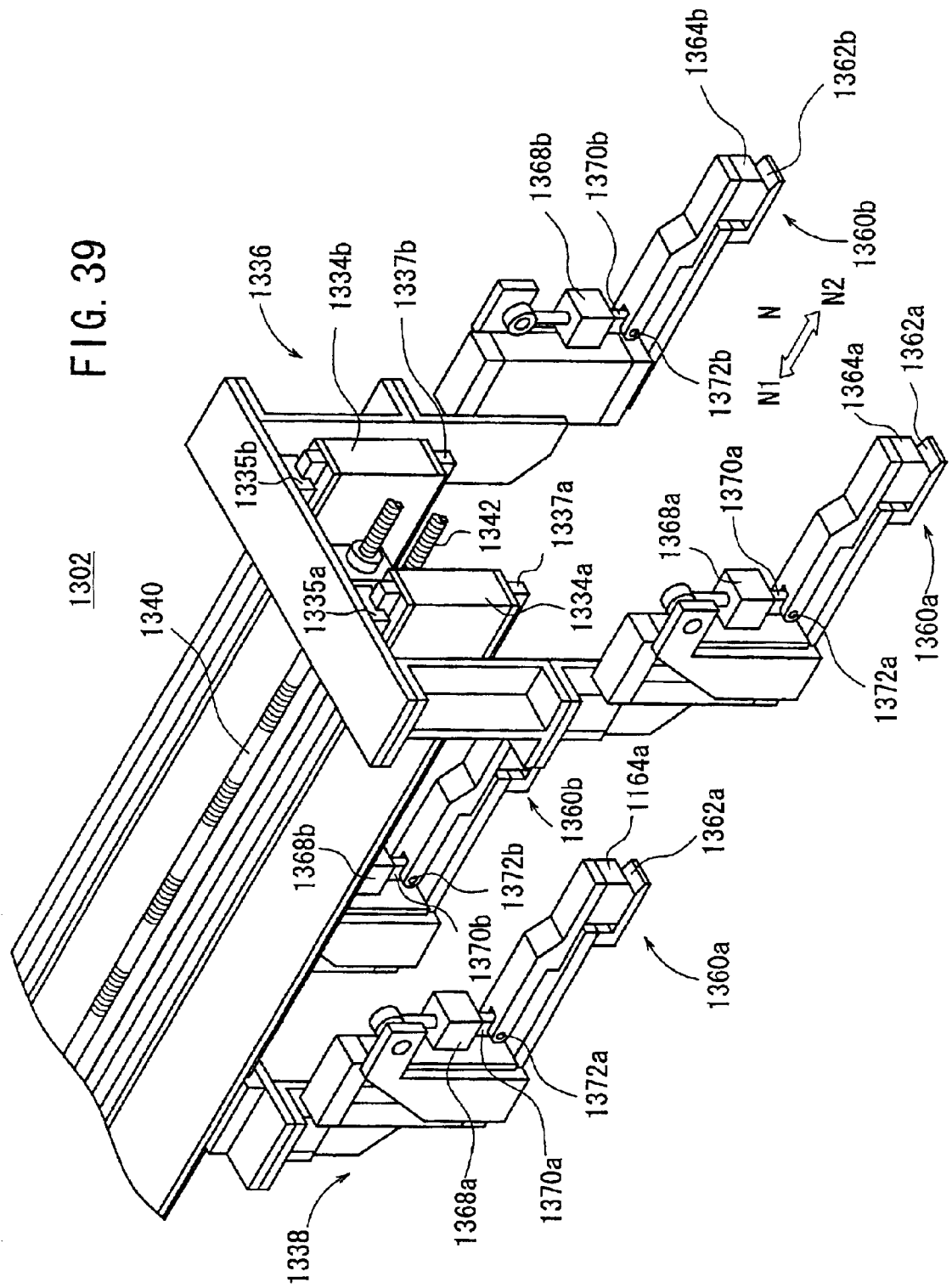
FIG. 39 is a perspective view of a light-shielding leader feeding mechanism of the automatic packaging system.
Figure 40:
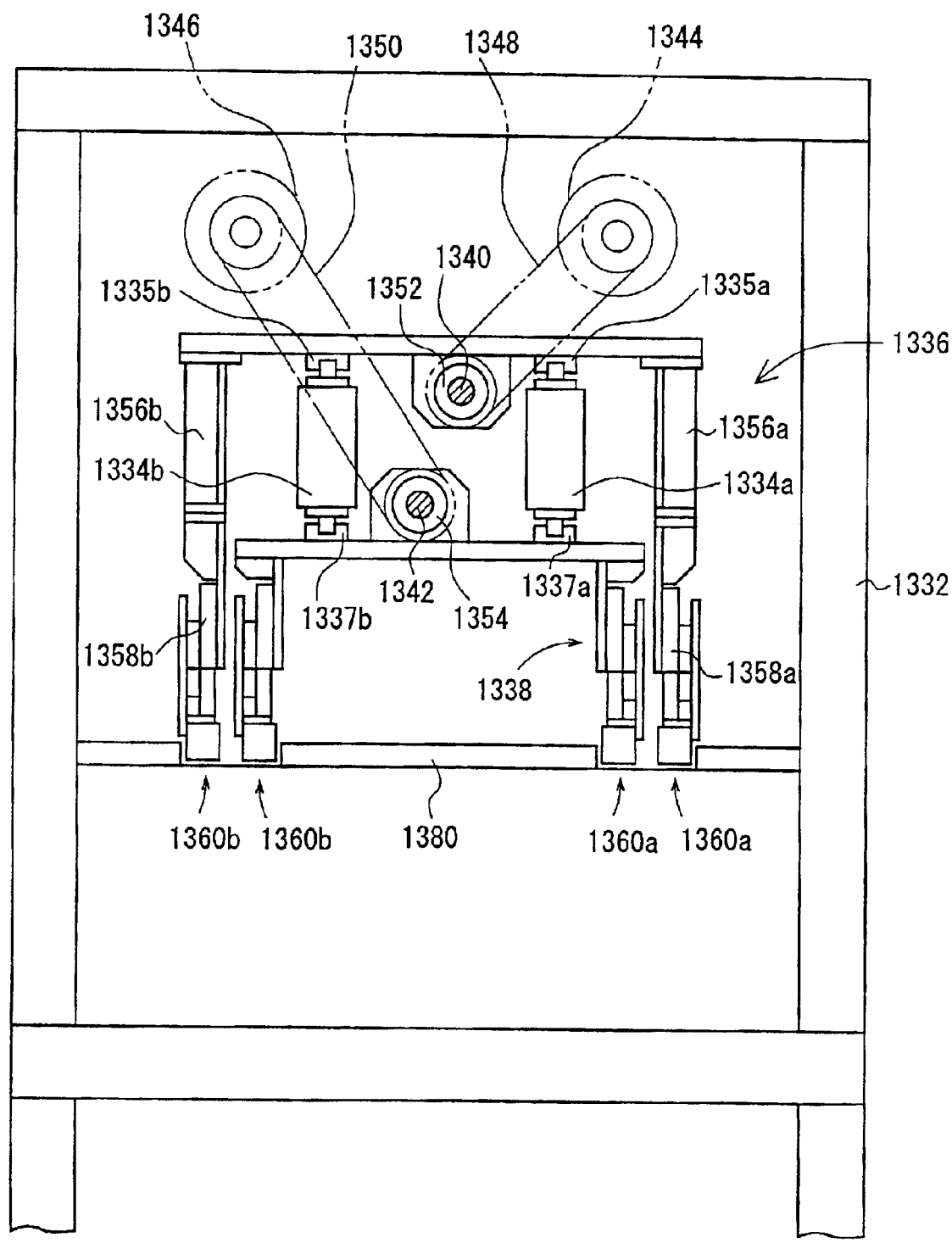
FIG. 40 is a front elevational view of the light-shielding leader feeding mechanism.

As shown in FIGS. 39 and 40, the light-shielding leader feed mechanism 1302 has a pair of horizontally extending rails 1334a, 1334b supported on an upper portion of a frame 1332 which extends from the light-shielding leader assembling station ST5 to the light-shielding leader winding station ST6. On the rails 1334a, 1334b, there are movably mounted first and second feed units 1336, 1338, respectively, for selectively feeding light-shielding leaders 22 having different lengths.

Upper linear guides 1335a, 1335b and lower linear guides 1337a, 1337b are mounted on the rails 1334a, 1334b, between which there are rotatably supported first and second ball screws 1340, 1342. The first and second ball screws 1340, 1342 can individually be rotated by belt and pulley means 1348, 1350 which are coupled to respective motors 1344, 1346 fixed to an end of the frame 1332.

The first feed unit 1336 has a nut 1352 threaded over the first ball screw 1340, and is supported by the upper linear guides 1335a, 1335b for movement in the direction indicated by the arrow N. The second feed unit 1338 has a nut 1354 threaded over the second ball screw 1342, and is supported by the lower linear guides 1337a, 1337b for movement in the direction indicated by the arrow N.

Figure 41:
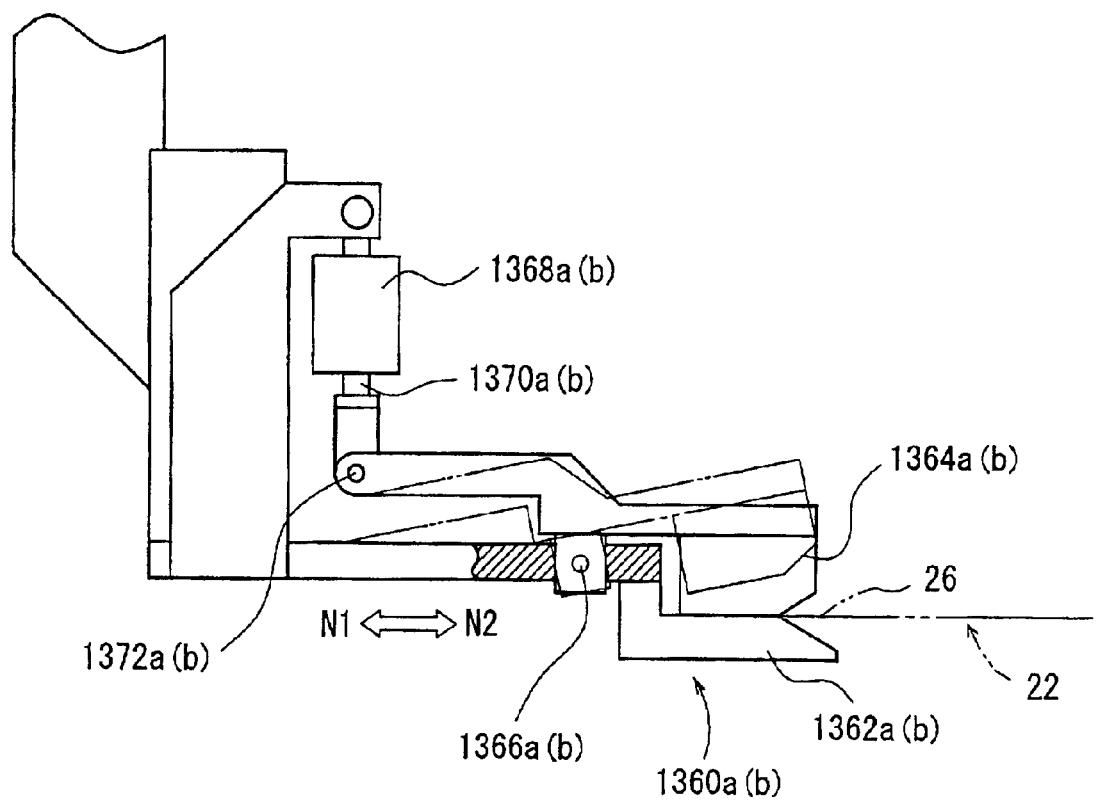
FIG. 41 is a view of a clamp means of the light-shielding leader feeding mechanism.

Arms 1356a, 1356b extend downwardly from the first feed unit 1336, and support on their lower ends clamp means 1360a, 1360b through vertically movable tables 1358a, 1358b which are actuatable under air pressure. As shown in FIGS. 39 and 41, the clamp means 1360a, 1360b have fixed fingers 1362a, 1362b and swing fingers 1364a, 1364b. The swing fingers 1364a, 1364b are swingable about respective pivot shafts 1366a, 1366b and have rear ends connected by respective hinge pins 1372a, 1372b to respective rods 1370a, 1370b extending downwardly from cylinders 1368a, 1368b.

The second feed unit 1338 is identical in structure to the first feed unit 1336. Therefore, the components of the second feed unit 1338 which are identical to those of the first feed unit 1336 are denoted by identical reference characters, and will not be described in detail below.

Figure 42:
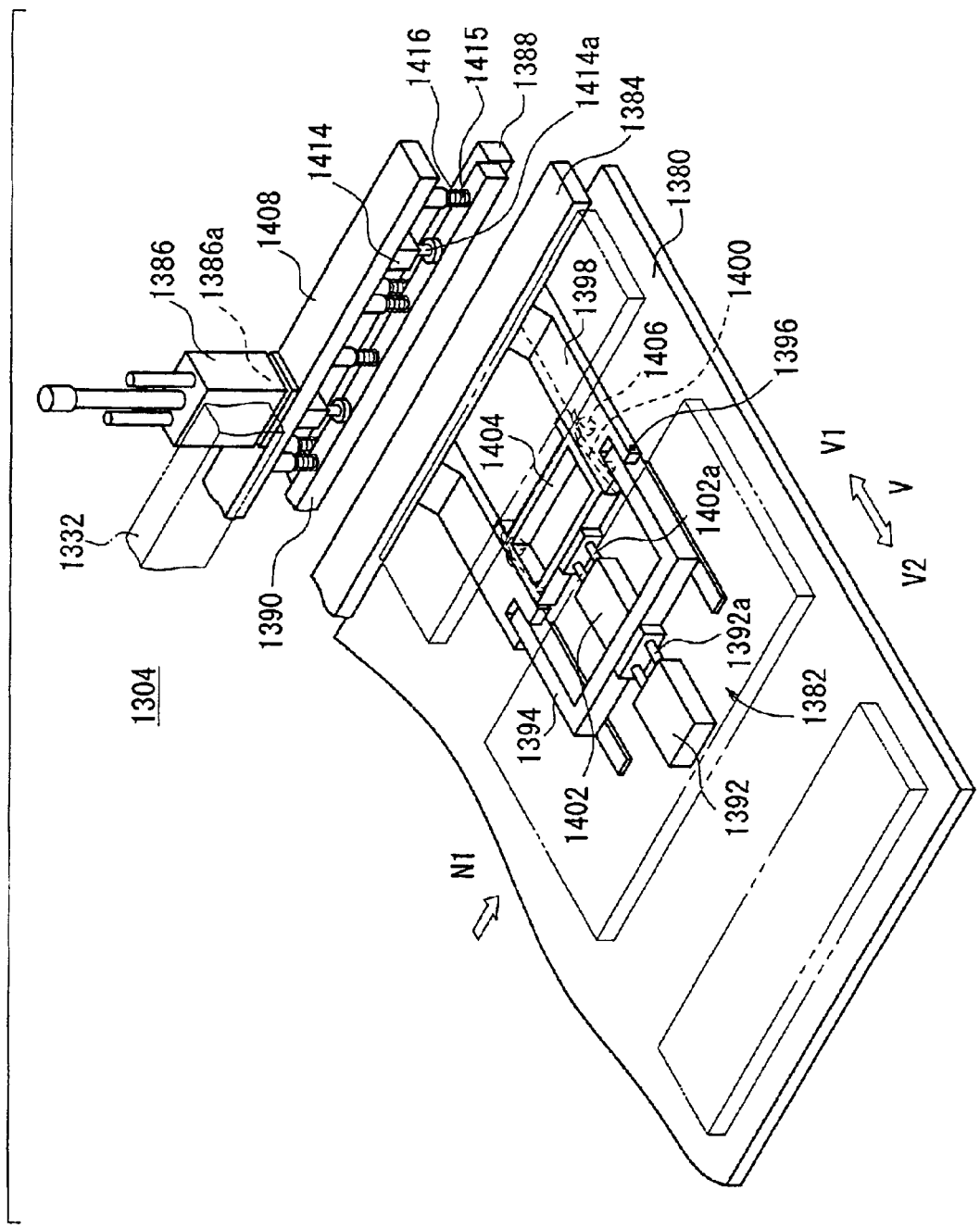
FIG. 42 is a perspective view of an applying mechanism of the automatic packaging system.
Figure 43:
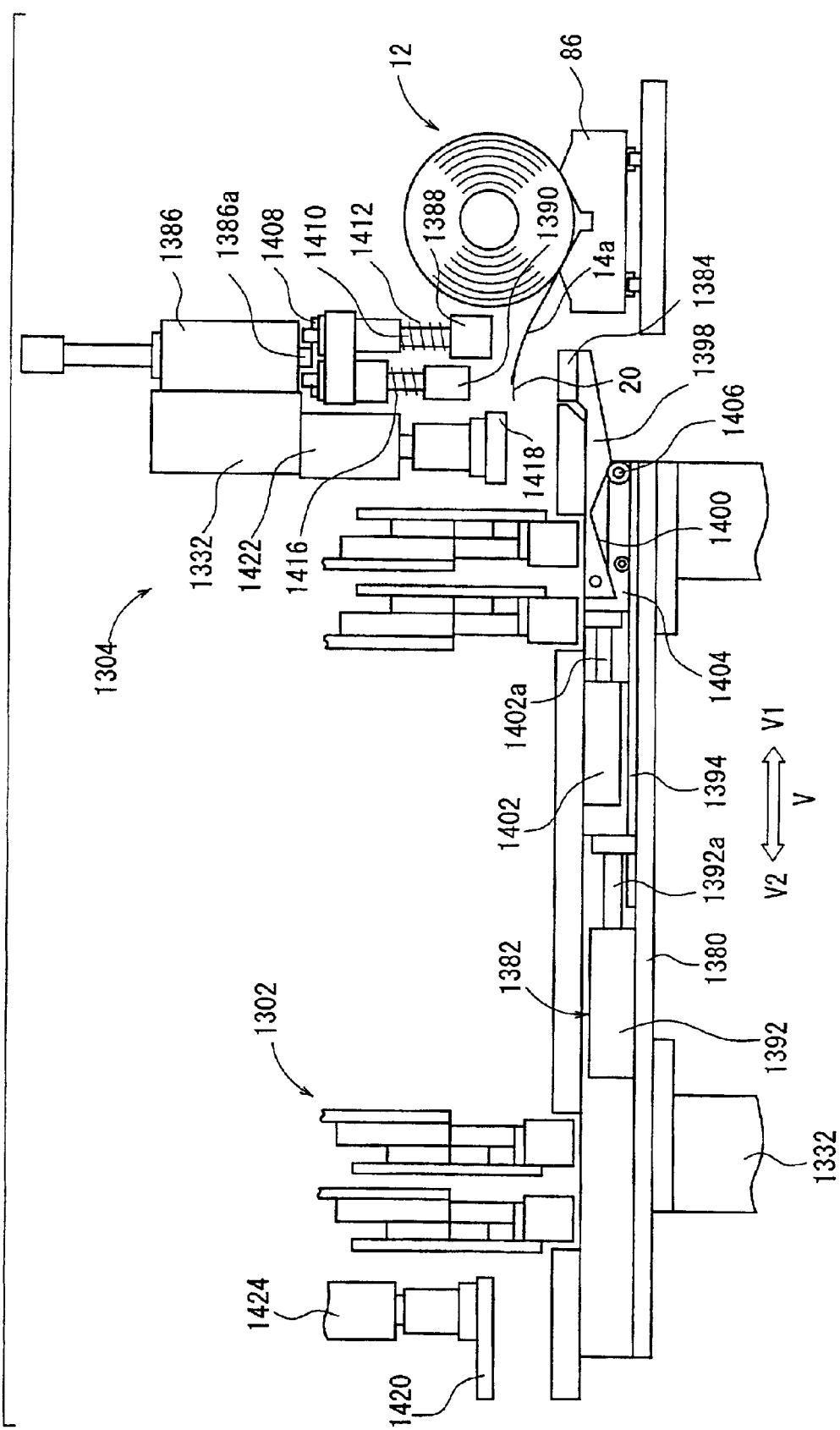
FIG. 43 is a side elevational view of the applying mechanism.

As shown in FIGS. 42 and 43, the applying mechanism 1304 has a movable bearing base 1384 which is movable by an actuator 1382 mounted on a base 1380 of the frame 1332, and first and second presser members 1388, 1390 disposed above the bearing base 1384 and vertically movable by a lifting and lowering cylinder 1386.

The actuator 1382 has a pair of laterally spaced first cylinders 1392 mounted on the base 1380 and having rods 1392a which extend therefrom in the direction indicated by the arrow V1 and are connected to a movable base 1394. Arms 1398 are swingably supported by a pair of pivot shafts 1396 on a distal end of the movable base 1394 in the direction indicated by the arrow V1. The movable bearing base 1384 is integrally fixed to distal ends of the arms 1398. The arms 1398 have respective angularly concave cam surfaces 1400 on their lower surfaces.

A second cylinder 1402 is mounted centrally on the movable base 1394 and has rods 1402a which extend therefrom in the direction indicated by the arrow V1 and are connected to a cam plate 1404. Cam rollers 1406 engaging the cam surfaces 1400 of the arms 1398 are mounted on opposite ends of the cam plate 1404.

The lifting and lowering cylinder 1386 is fixed to the frame 1332 and has a downwardly extending rod 1386a to which an attachment plate 1408 is fixed. The first presser member 1388, which is positioned closely to the photosensitive roll 12, is connected to the attachment plate 1408 by a plurality of guide bars 1410, with springs 1412 disposed around the respective guide bars 1410. The attachment plate 1408 supports thereon a plurality cylinders 1414 spaced from the guide bars 1410 in the direction indicated by the arrow V2 and having respective downwardly extending rods 1414a to which the second presser member 1390 is fixed. The second presser member 1390 is movable toward and away from the attachment plate 1408 by the cylinders 1414 while being guided by rods 1415 and springs 1416 disposed therearound.

As shown in FIG. 43, light-shielding leader pressers 1418, 1420 are disposed on the base 1380 at its opposite ends spaced in the direction indicated by the arrow V. The light-shielding leader pressers 1418, 1420 extend in the direction indicated by the arrow N, and are vertically movable by respective lifting and lowering cylinders 1422, 1424. The light-shielding leader holding mechanism 1308 is disposed on the base 1380 at a substantially central position in the direction indicated by the arrow N (see FIG. 38).

Figure 44:
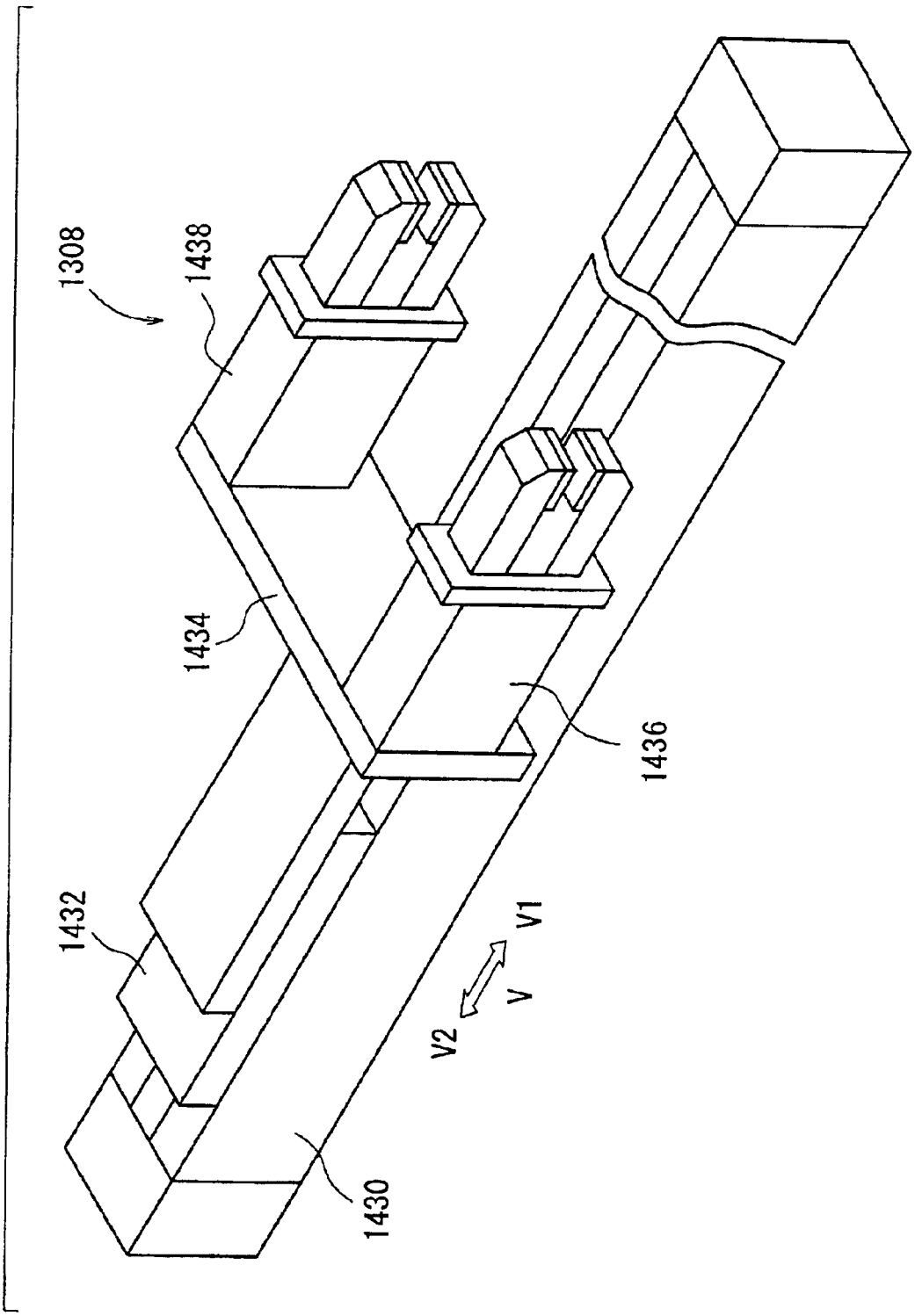
FIG. 44 is a perspective view of a light-shielding leader holding mechanism of the automatic packaging system.

The light-shielding leader holding mechanism 1308 has a rodless cylinder 1430 mounted on the base 1380 and extending in the direction indicated by the arrow V. As shown in FIG. 44, a support plate 1434 is fixed to a movable base 1432 which is movable in the direction indicated by the arrow V by the rodless cylinder 1430. Air chucks 1436, 1438 are mounted on the support plate 1434 in respective positions which are equally spaced laterally from a transversely central line of the light-shielding leader 22.

Figure 45:
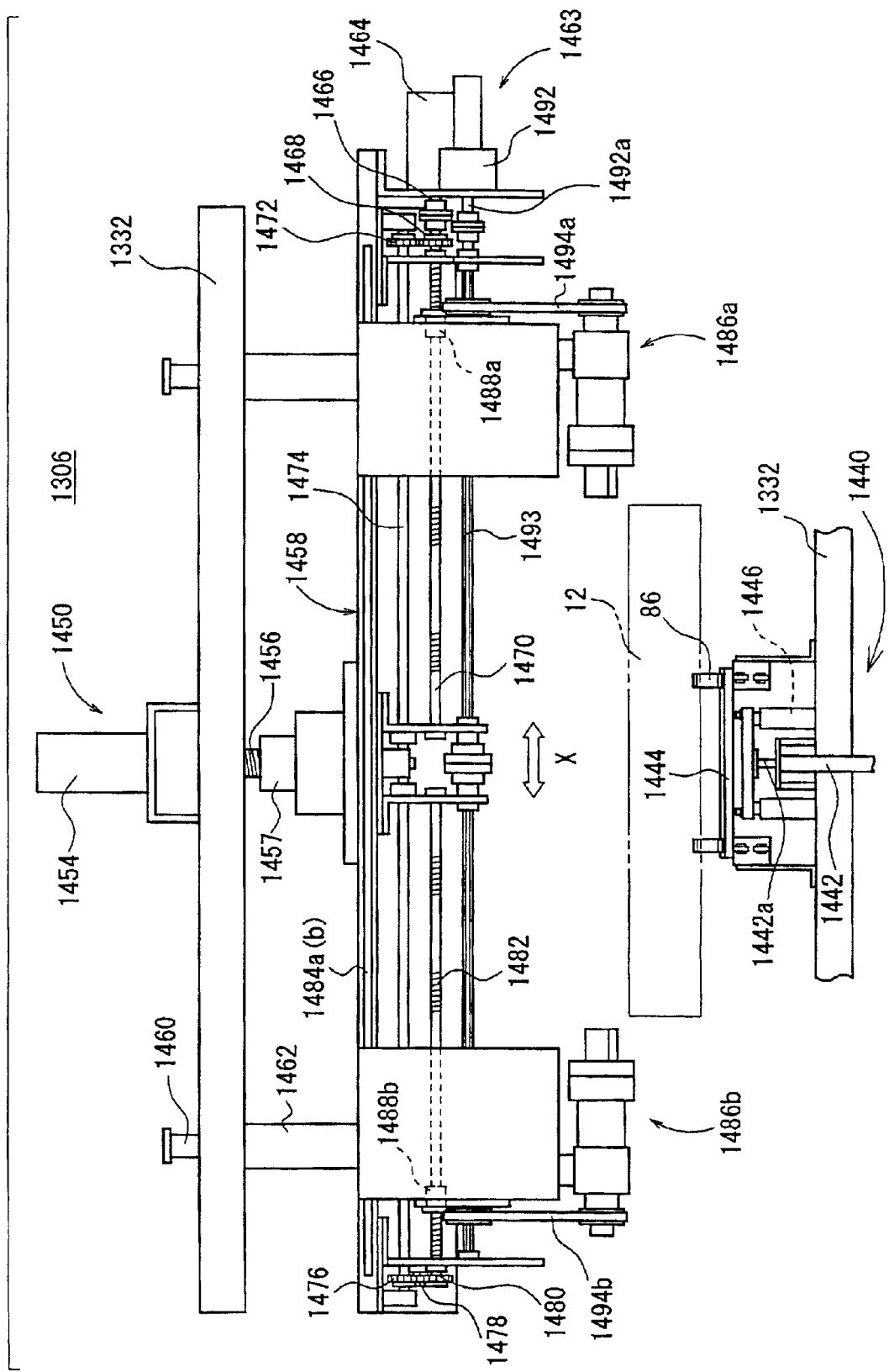
FIG. 45 is a front elevational view of a rotating mechanism and a pallet lifting and lowering device of the automatic packaging system.

As shown in FIG. 45, the photosensitive roll 12 is supported on a pallet lifting and lowering device 1440 in a position below the rotating mechanism 1306. The pallet lifting and lowering device 1440 has a cylinder 1442 fixed to the frame 1332. The cylinder 1442 has an upwardly extending rod 1442a to which a vertically movable base 1444 is secured. Guide bars 1446 mounted on the vertically movable base 1444 are vertically movably supported by the frame 1332. The pallet 86 can be placed on the vertically movable base 1444.

Figure 46:
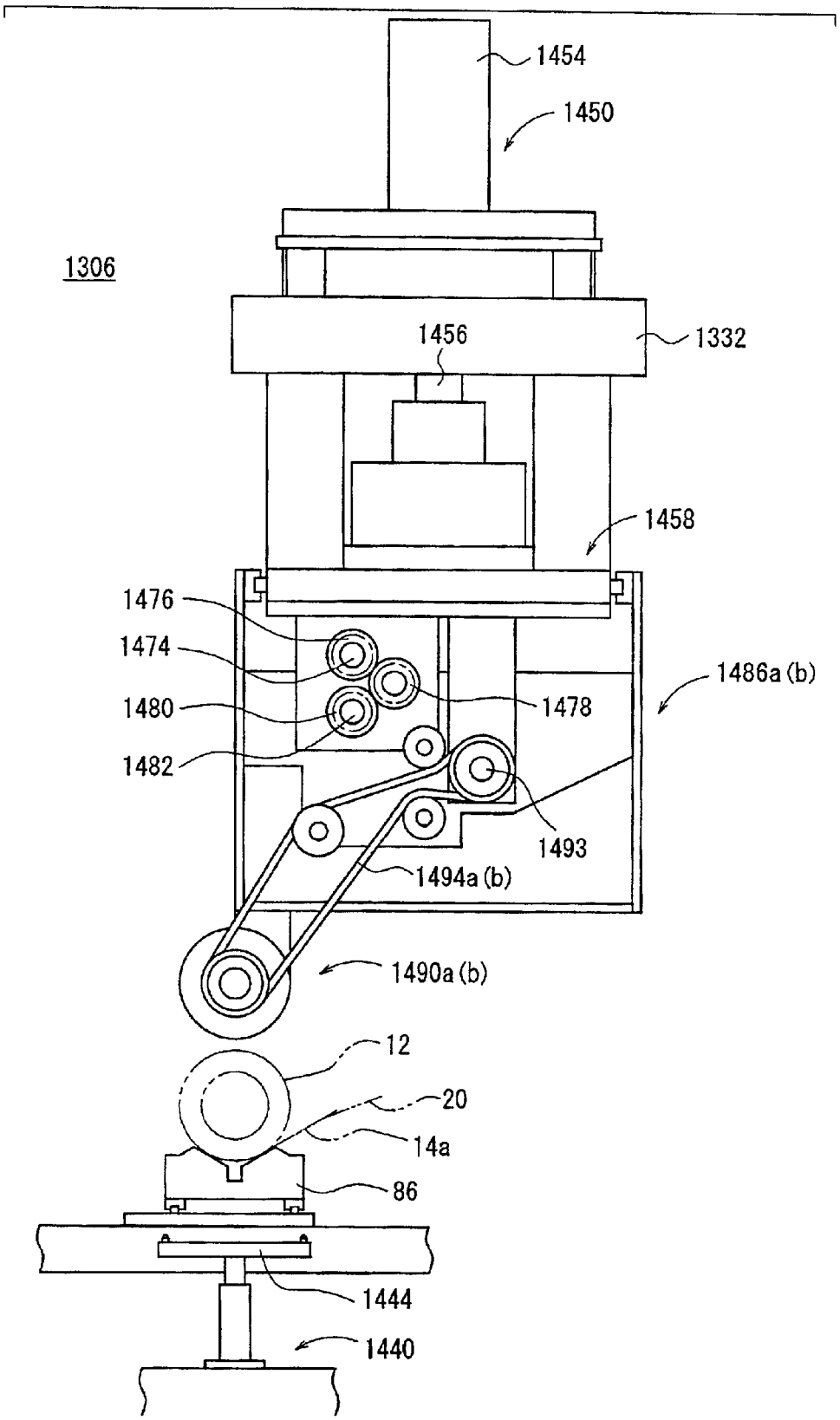
FIG. 46 is a side elevational view of the rotating mechanism and the pallet lifting and lowering device.

The rotating mechanism 1306 has a moving unit 1450 mounted on the frame 1332. As shown in FIGS. 45 and 46, the moving unit 1450 has a motor 1454 fixedly mounted on the frame 1332 and directed downwardly, and having a downwardly extending rotatable drive shaft (not shown) to which a ball screw 1456 is coaxially connected. The ball screw 1456 is threaded through a nut 1457 fixed to a vertically movable frame 1458 which extends transversely across the photosensitive roll 12 in the direction indicated by the arrow X. Four guide rods 1460 have lower ends screwed to the vertically movable frame 1458 and are inserted in respective guide bushings 1462 attached to the frame 1332.

A drive unit 1463 has a motor 1464 mounted on a longitudinal end of the vertically movable frame 1458 and having a rotatable drive shaft 1466 to which there are coaxially fixed a drive gear 1468 and a first ball screw 1470. The drive gear 1468 is held in mesh with a driven gear 1472 fixedly mounted on an end of a rotatable shaft 1474 whose opposite ends and central portion are rotatably supported on the vertically movable frame 1458.

The rotatable shaft 1474 has a first gear 1476 mounted on an end thereof remote from the driven gear 1472 and held in mesh with a second gear 1478 meshing with a third gear 1480. The third gear 1480 is mounted on an end of a second ball screw 1482 which is coaxial with the first ball screw 1470 and is rotatably supported on the vertically movable frame 1458.

The vertically movable frame 1458 has a set of guide rails 1484a, 1484b extending parallel to the first and second ball screws 1470, 1482, and first and second slide units 1486a, 1486b are slidably supported on the guide rails 1484a, 1484b. The first and second slide units 1486a, 1486b support first and second nuts 1488a, 1488b fixed thereto which are threaded respectively over the first and second ball screws 1470, 1482. First and second chucks 1490a, 1490b are rotatably supported on lower surfaces of the first and second slide units 1486a, 1486b, respectively. The first and second chucks 1490a, 1490b are insertable in the opposite ends of the photosensitive roll 12 and movable radially inwardly and outwardly in the photosensitive roll 12.

A motor 1492 is mounted on the longitudinal end of the vertically movable frame 1458 in juxtaposed relation to the motor 1464, and has a rotatable drive shaft 1492a to which a splined shaft 1493 is coaxially connected. The splined shaft 1493 extends in the direction indicated by the arrow X and is rotatably supported on the vertically movable frame 1458. The first and second chucks 1490a, 1490b are operatively coupled to the opposite ends of the splined shaft 1493 respectively by belt and pulley means 1494a, 1494b.

Figure 47:
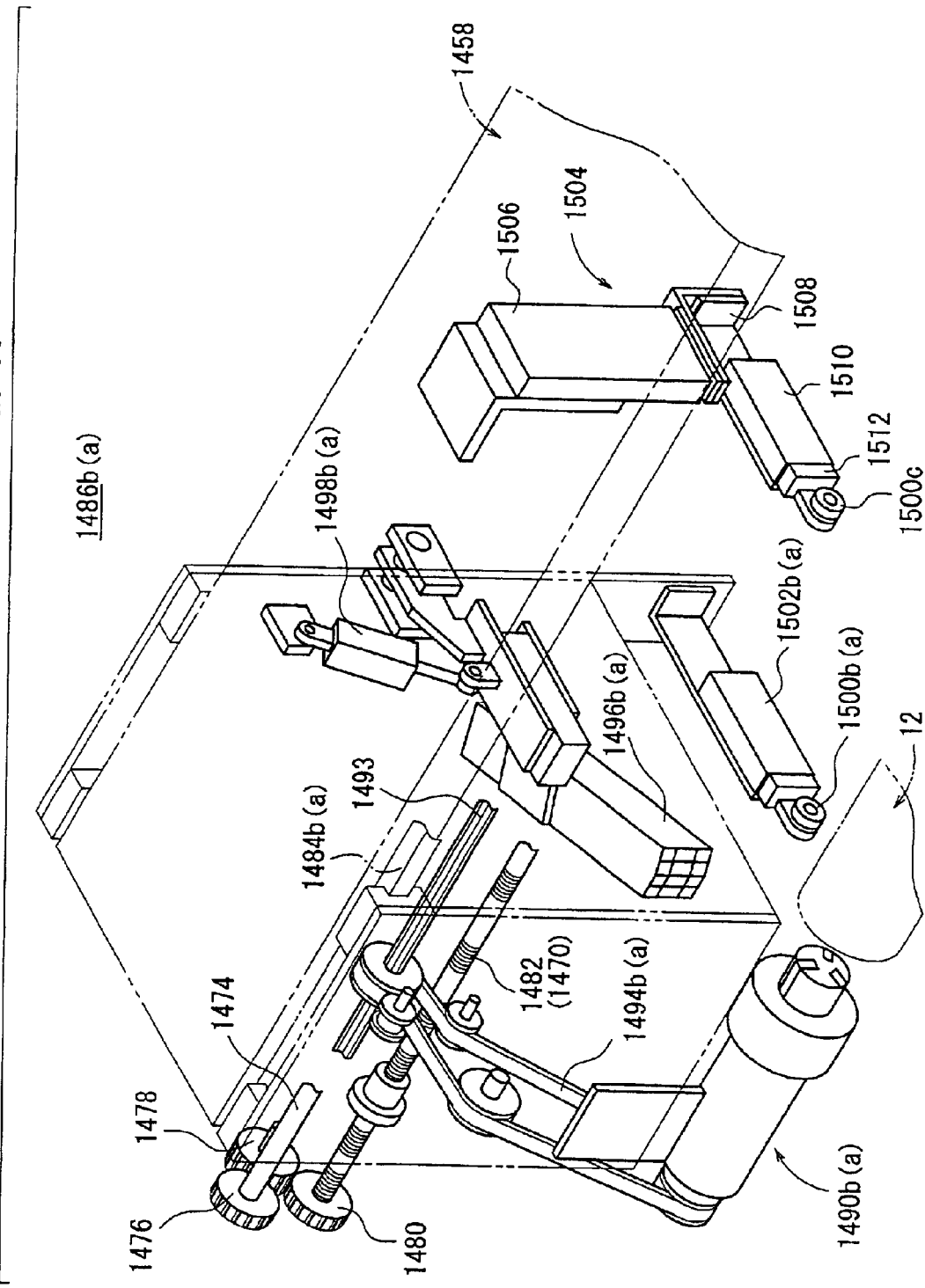
FIG. 47 is a perspective view of a slide unit of the rotating mechanism.
Figure 48:
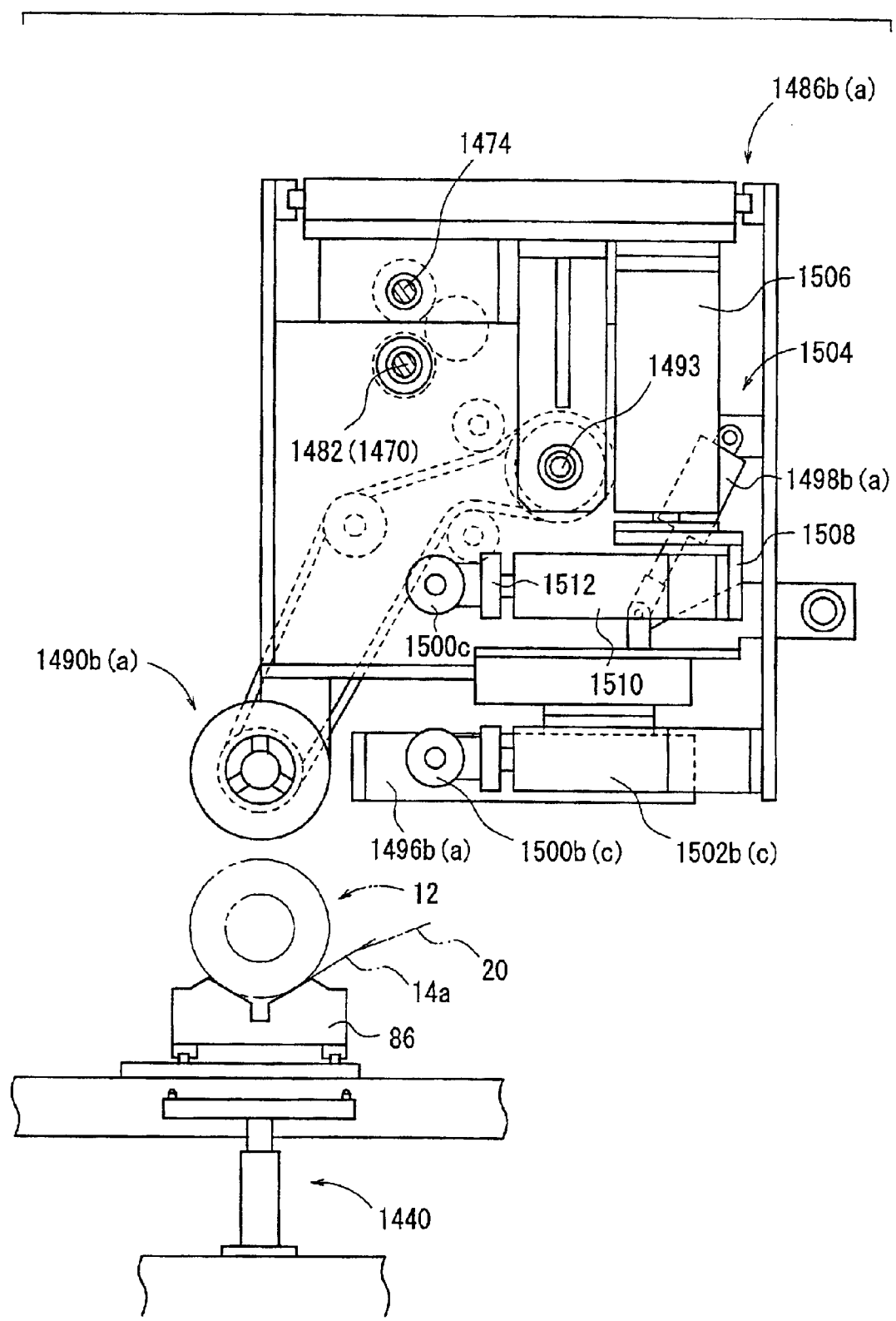
FIG. 48 is a side elevational view of the slide unit.

As shown in FIGS. 47 and 48, hot air blowers 1496a, 1496b for continuously supplying hot air at a constant temperature and a constant rate to the light-shielding shrink films 24 upon rotation of the photosensitive roll 12 are swingably mounted on the respective first and second slide units 1486a, 1486b by cylinders 1498a, 1498b.

Rollers 1500a, 1500b for pressing the light-shielding leader 22 against the photosensitive roll 12 while the winding terminal end of the light-shielding leader 22 is being released from the light-shielding leader holding mechanism 1308 when the light-shielding leader 22 is wound are mounted on the respective first and second slide units 1486a, 1486b. The rollers 1500a, 1500b are horizontally movable by horizontal cylinders 1502a, 1502b, respectively.

A roller 1500c which is movable by an actuator 1504 is mounted on the vertically movable frame 1458. The actuator 1504 has a vertical first cylinder 1506 which lifts and lowers an attachment plate 1508 having a vertical surface on which a horizontal second cylinder 1510 is fixedly mounted. The second cylinder 1510 horizontally moves a plate 1512 with the roller 1500c being rotatably supported thereon.

Figure 49:
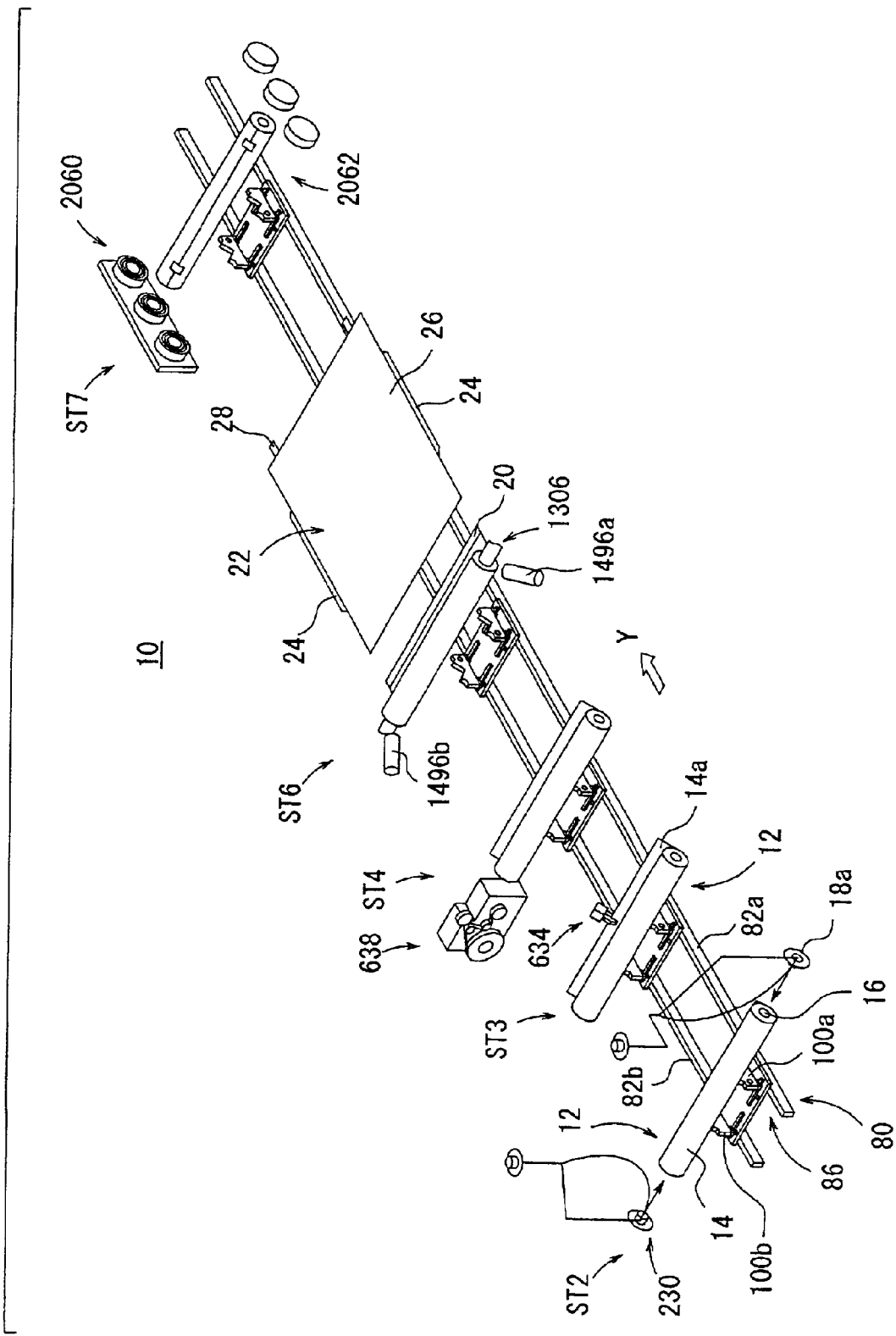
FIG. 49 is a perspective view of a downstream portion of the automatic packaging system.

As shown in FIG. 49, the thermally fusing station ST7 has a packaging sheet bonding device 2060 and a lifting and lowering device 2062 for lifting the photosensitive roll 12 in unison with the pallet 86 to a thermally fusing position.

Figure 50:
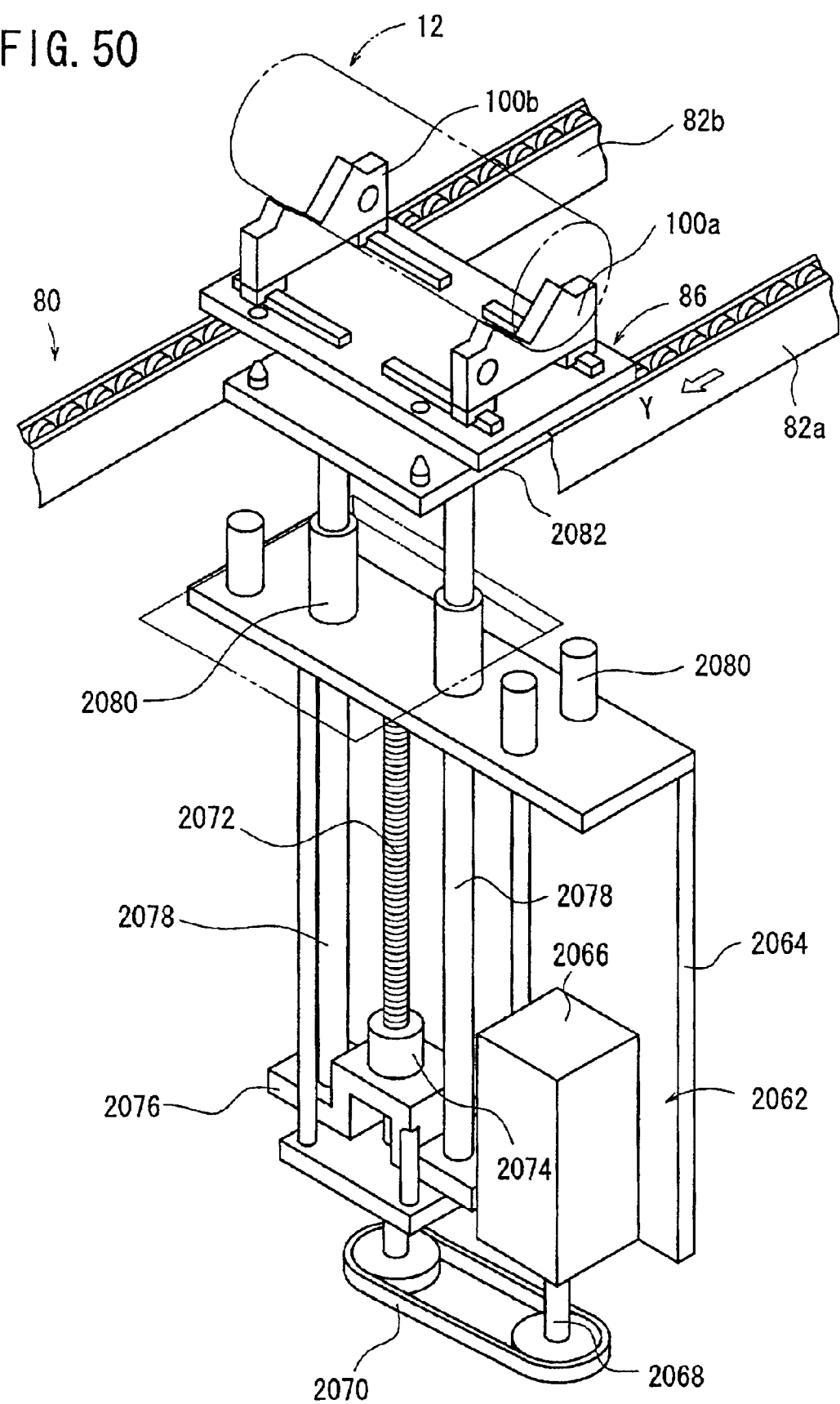
FIG. 50 is a perspective view of a lifting and lowering device of a thermally fusing mechanism.

As shown in FIG. 50, the lifting and lowering device 2062 has a servomotor 2066 with a brake as a rotary actuator fixed to a frame 2064. The servomotor 2066 has a rotatable drive shaft 2068 operatively coupled to a ball screw 2072 by a belt and pulley means 2070. The ball screw 2072 extends vertically and have upper and lower ends rotatably supported on the frame 2064.

The ball screw 2072 is threaded through a nut 2074 mounted on a vertically movable base 2076 to which there are fixed the lower ends of a pair of guide bars 2078 parallel to the ball screw 2072. The guide bars 2078 are supported on the frame 2064 by linear bushings 2080 and have respective upper ends to which a vertically movable plate 2082 is fixed.

Figure 51:
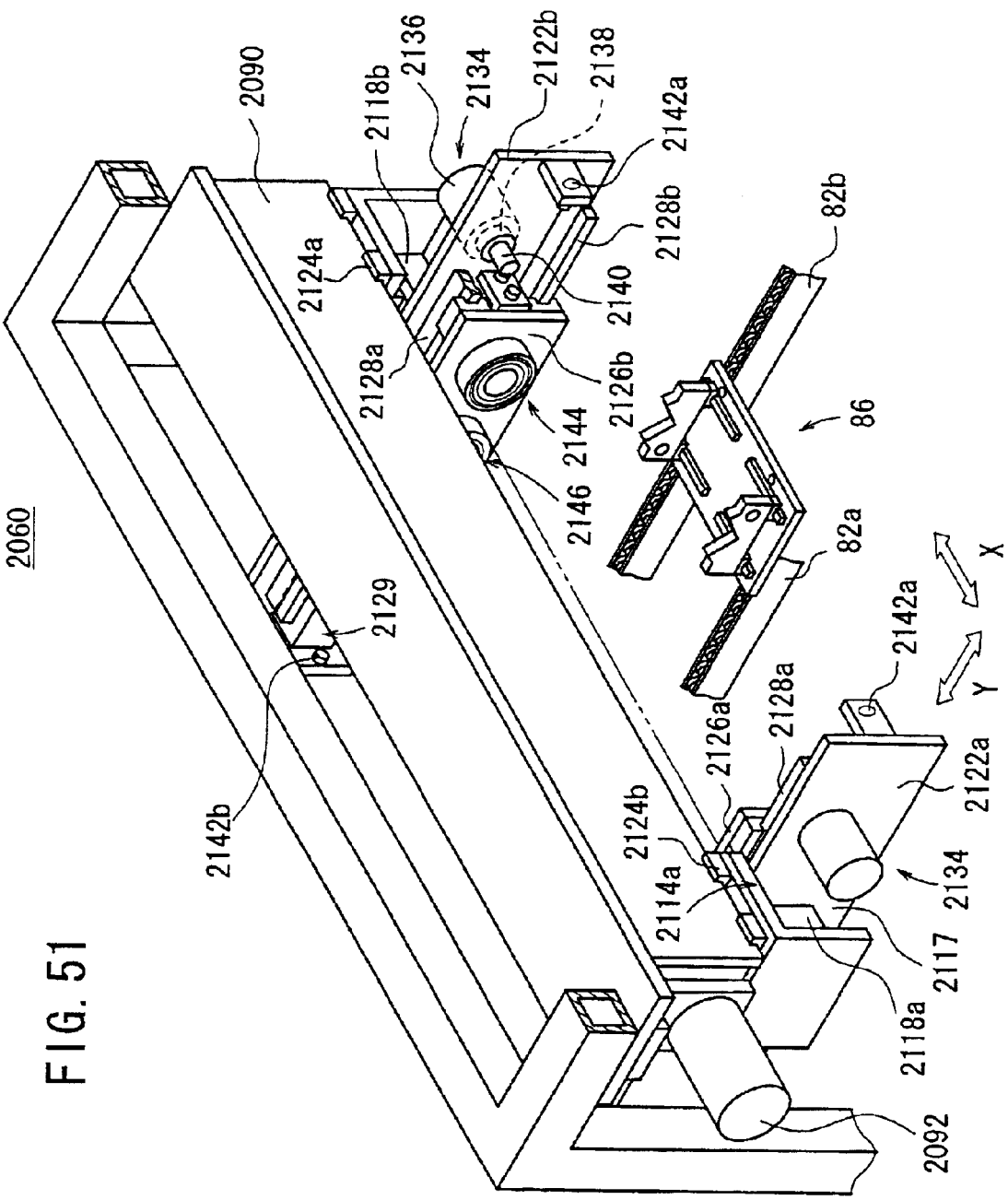
FIG. 51 is a perspective view of the thermally fusing mechanism.
Figure 52:
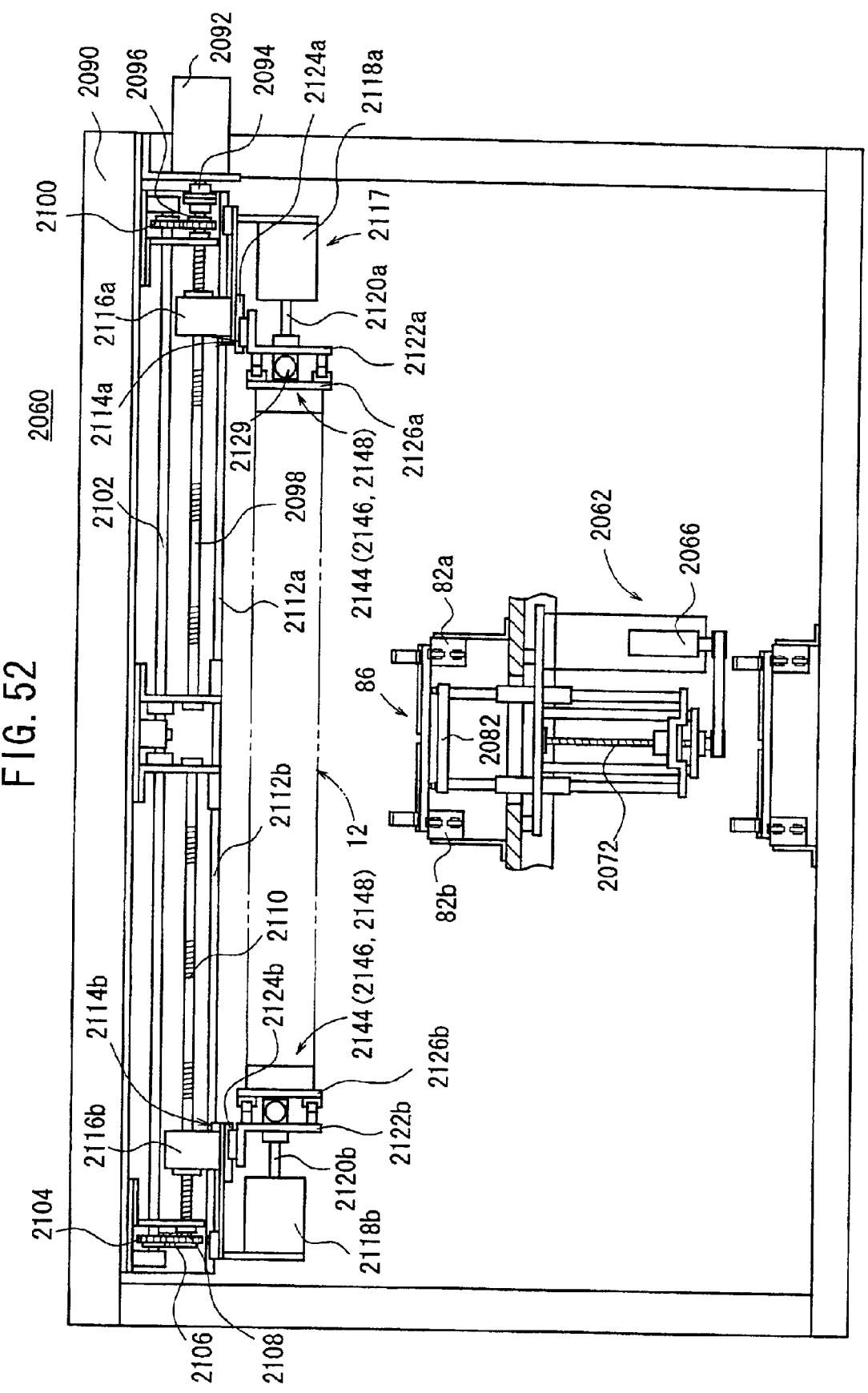
FIG. 52 is a front elevational view of the thermally fusing mechanism.
Figure 53:
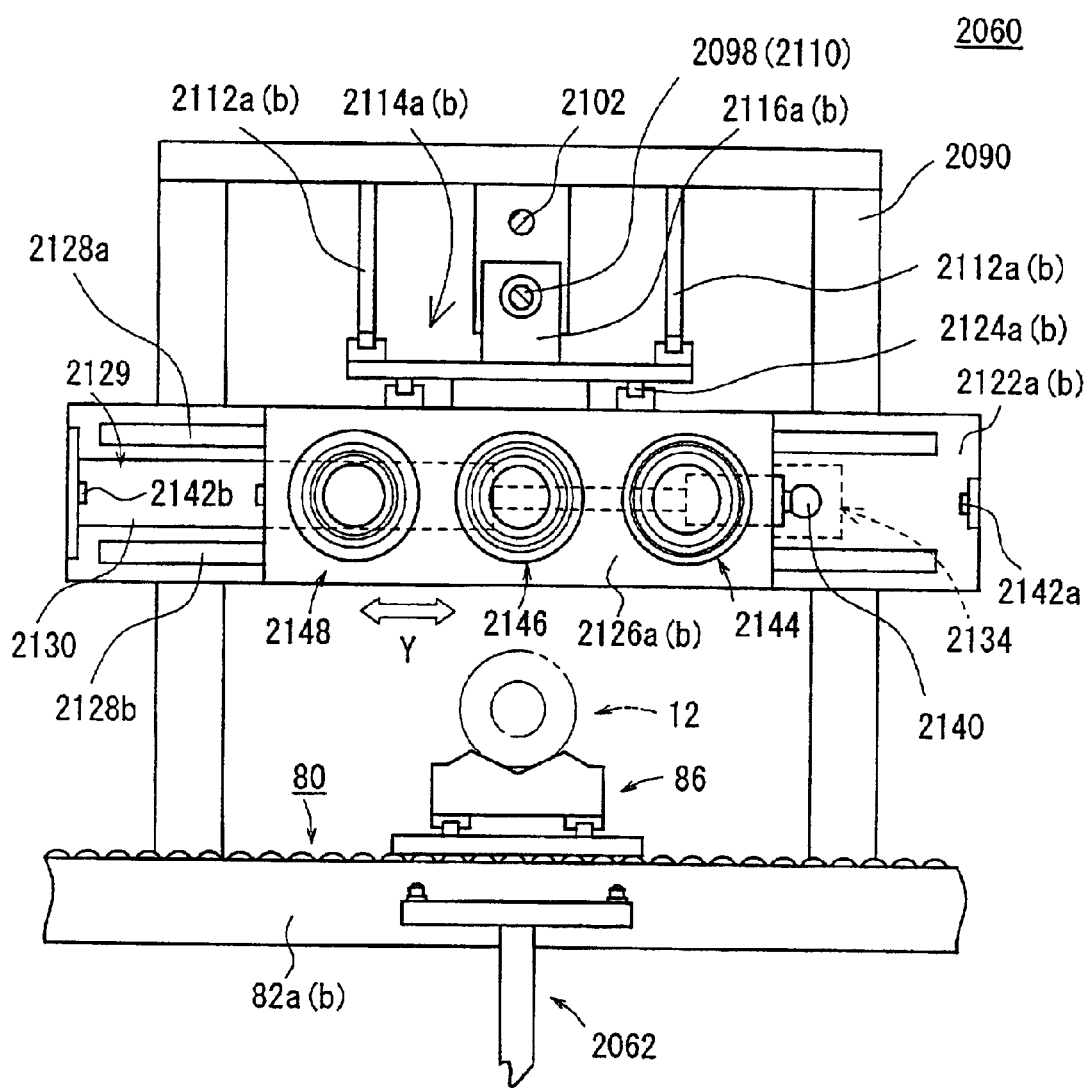
FIG. 53 is a side elevational view of the thermally fusing mechanism.

As shown in FIGS. 51 through 53, the packaging sheet bonding device 2060 has an upper frame 2090 fixedly mounted on the frame 2064. A horizontal servomotor 2092 with a brake is mounted on an end of the upper frame 2090 and has a rotatable drive shaft 2094 to which there are coaxially fixed a drive gear 2096 and a first ball screw 2098. The drive gear 2096 is held in mesh with a driven gear 2100 fixedly mounted on an end of a rotatable shaft 2102 whose opposite ends and central portion are rotatably supported on the upper frame 2090.

The rotatable shaft 2102 has a first gear 2104 mounted on an end thereof remote from the driven gear 2100 and held in mesh with a second gear 2106 meshing with a third gear 2108. The third gear 2108 is mounted on an end of a second ball screw 2110 which is coaxial with the first ball screw 2098 and is rotatably supported on the upper frame 2090. The upper frame 2090 has a set of guide rails 2112a, 2112b extending parallel to the first and second ball screws 2098, 2110, and first and second slide bases 2114a, 2114b are slidably supported on the guide rails 2112a, 2112b.

The first and second bases 2114a, 2114b support first and second nuts 2116a, 2116b fixed thereto which are threaded respectively over the first and second ball screws 2098, 2110. A pressing mechanism 2117 has first and second cylinders 2118a, 2118b fixed to lower surfaces of the first and second bases 2114a, 2114b in confronting relation to each other. The first and second cylinders 2118a, 2118b have respective horizontally projecting rods 2120a, 2120b coupled to respective first and second movable support bases 2122a, 2122b. The first and second movable support bases 2122a, 2122b are movably supported on the respective first and second bases 2114a, 2114b by respective linear guides 2124a, 2124b.

Figure 54:
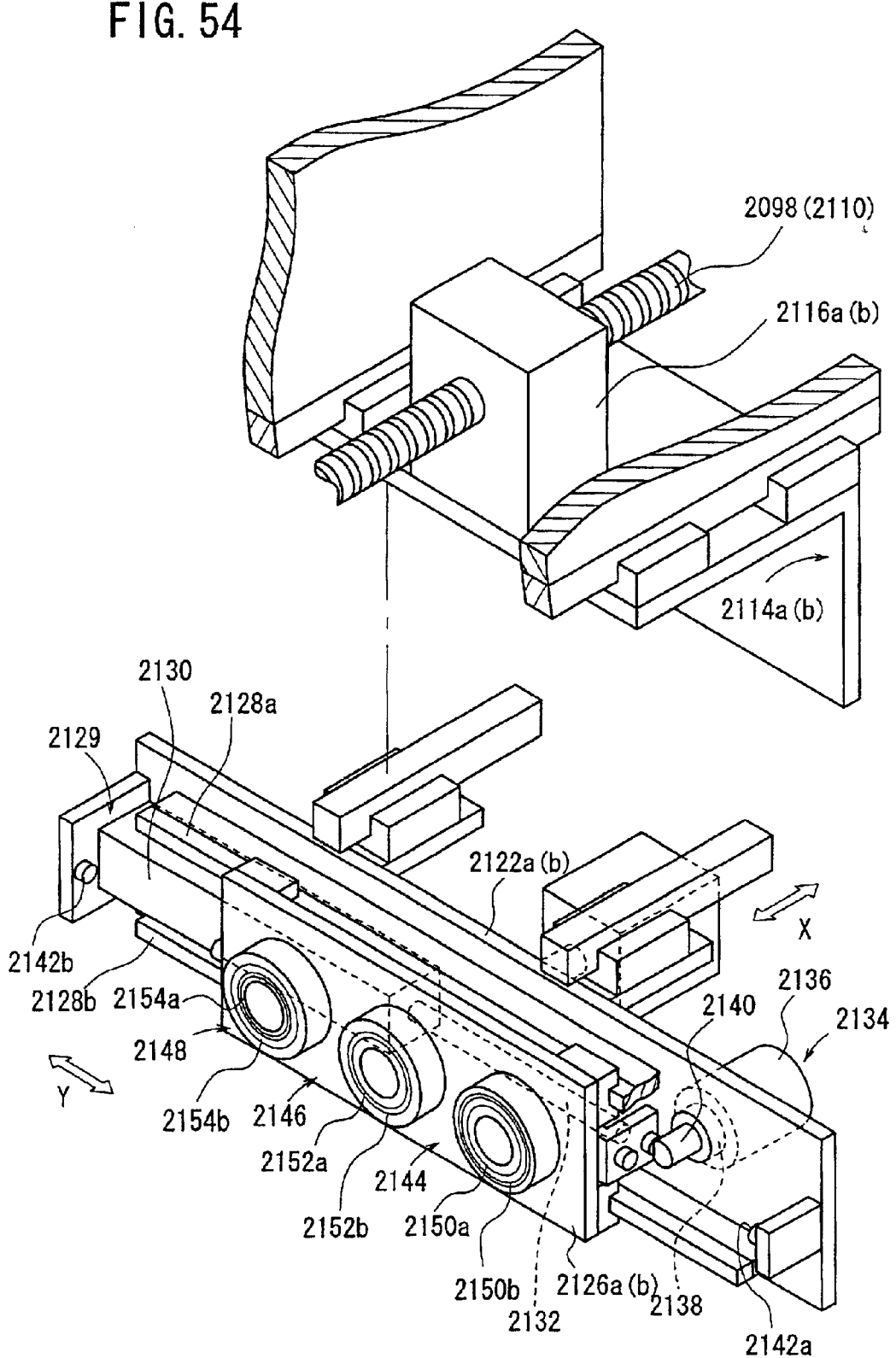
FIG. 54 is a perspective view of heating heads of the thermally fusing mechanism.

As shown in FIG. 54, slide plates 2126a, 2126b are mounted respectively on the first and second movable support bases 2122a, 2122b for movement in the direction indicated by the arrow Y (diametrically across the photosensitive roll 12) which is perpendicular to the direction indicated by the arrow X in which the first and second movable support bases 2122a, 2122b are movable. The first and second movable support bases 2122a, 2122b have respective vertical surfaces to which there are fixed upper and lower guide rails 2128a, 2128b extending parallel to each other in the direction indicated by the arrow Y. A moving mechanism 2129 has a cylinder 2130 disposed between the upper and lower guide rails 2128a, 2128b. The cylinder 2130 has a horizontally extending rod 2132 connected to the slide plate 2126a, 2126b which is supported on the guide rails 2128a, 2128b.

The first and second movable support bases 2122a, 2122b have a stopper means 2134 for forcibly stopping the slide plate 2126a, 2126b in a substantially intermediate position between the opposite ends of its stroke of movement caused by the cylinder 2130. The stopper means 2134 has a cylinder 2136 having a rod 2138 with an engaging member 2140 coupled thereto. Engaging screws 2142a, 2142b for engaging the opposite ends of the slide plate 2126a, 2126b to position the slide plate 2126a, 2126b are positionally adjustably mounted on the respective opposite ends of the first and second movable support bases 2122a, 2122b in the direction indicated by the arrow Y.

A first heating head 2144, a second heating head 2146, and a third heating head 2148 are mounted on a front surface of the slide plate 2126a, 2126b. Each of the first through third heating heads 2144, 2146, 2148 is substantially disk-shaped, and houses a cartridge heater, not shown, therein.

Figure 55:
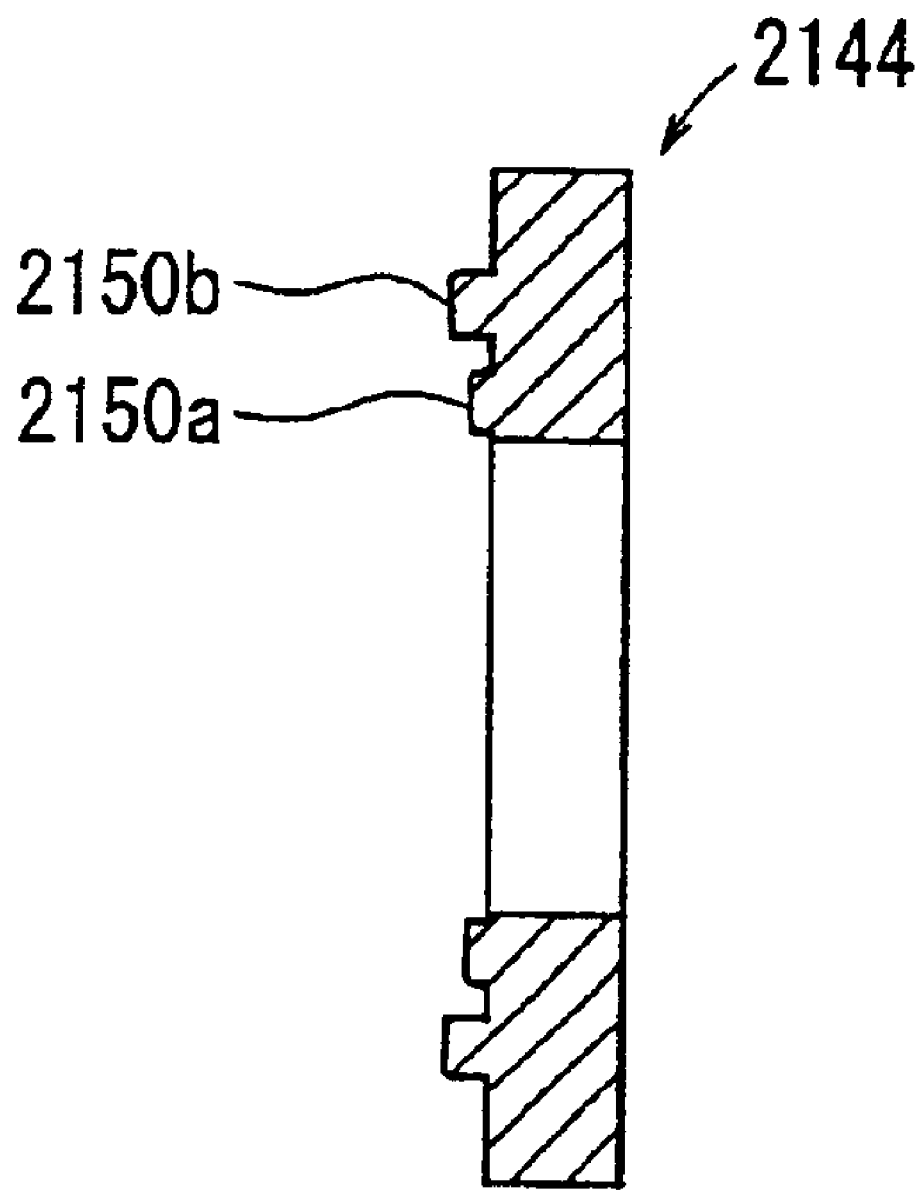
FIG. 55 is a cross-sectional view of a first heating head.
Figure 56:
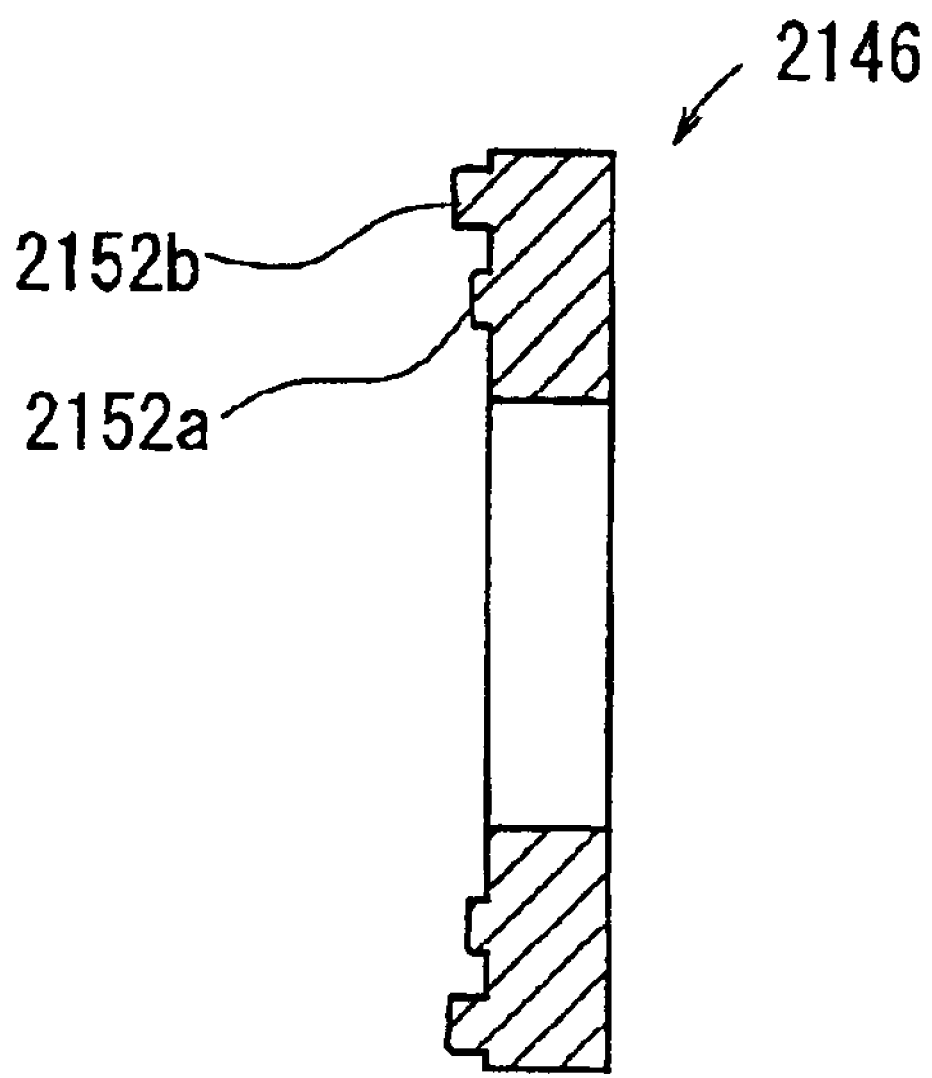
FIG. 56 is a cross-sectional view of a second heating head.
Figure 57:
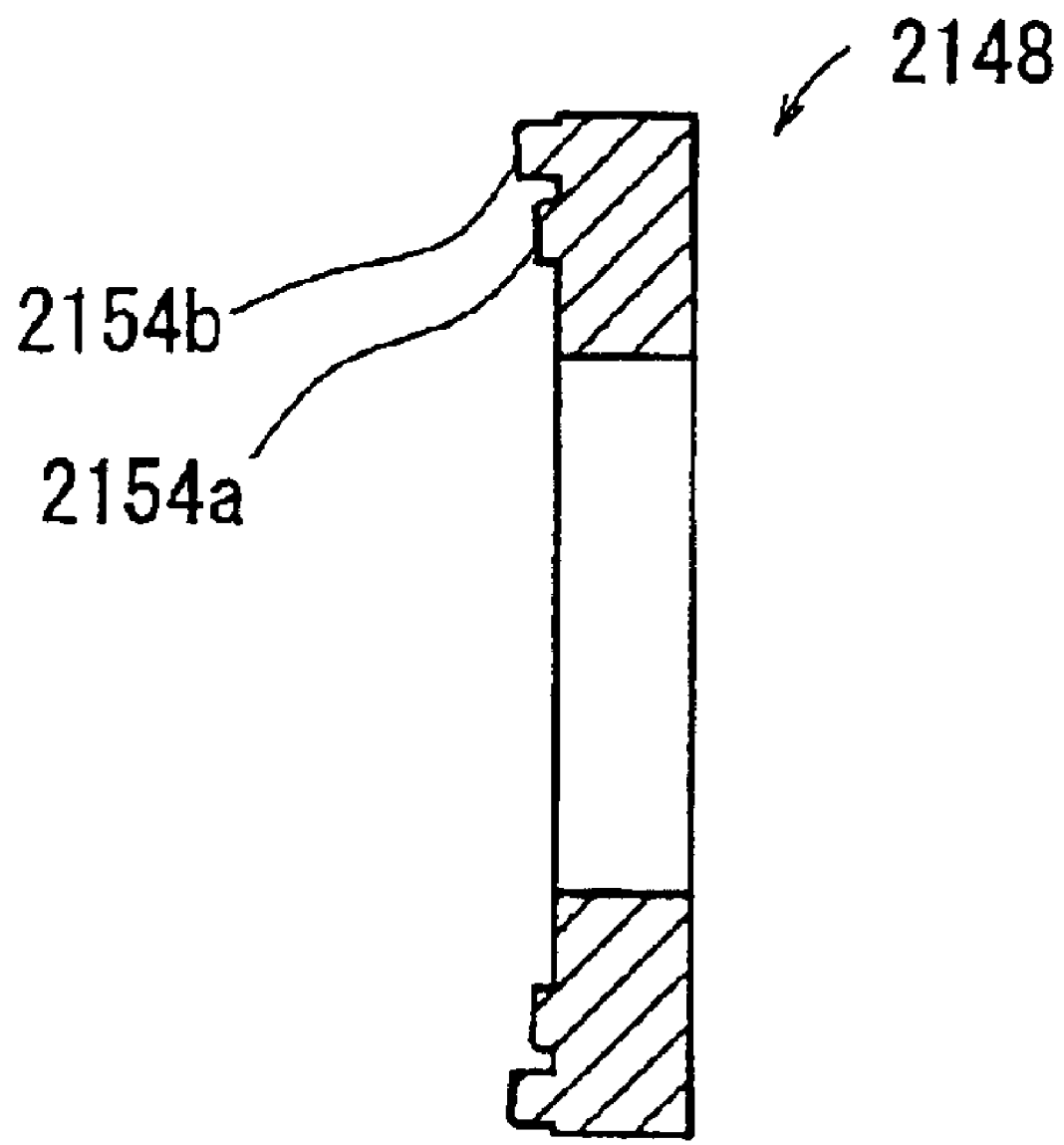
FIG. 57 is a cross-sectional view of a third heating head.

As shown in FIGS. 54 and 55, the first heating head 2144 has a first annular protrusion 2150*a* and a second annular protrusion 2150*b* disposed coaxially around the first annular protrusion 2150*a*. The outer second annular protrusion 2150*b* projects outwardly more than the inner first annular protrusion 2150*a*. The second and third heating heads 2146, 2148 also have inner first annular protrusions 2152*a*, 2154*a*, respectively, and outer second annular protrusions 2152*b*, 2154*b* disposed coaxially around the first annular protrusions 2152*a*, 2154*a*. The outer second annular protrusions 2152*b*, 2154*b* project outwardly more than the inner first annular protrusions 2152*a*, 2154*a* (see FIGS. 56 and 57).

The first annular protrusions 2150*a*, 2152*a*, 2154*a* and the second annular protrusions 2150*b*, 2152*b*, 2154*b* have different diameters, allowing the first, second, and third heating heads 2144, 2146, 2148 to handle six types of photosensitive rolls 12 having different outside diameters.

Figure 58:
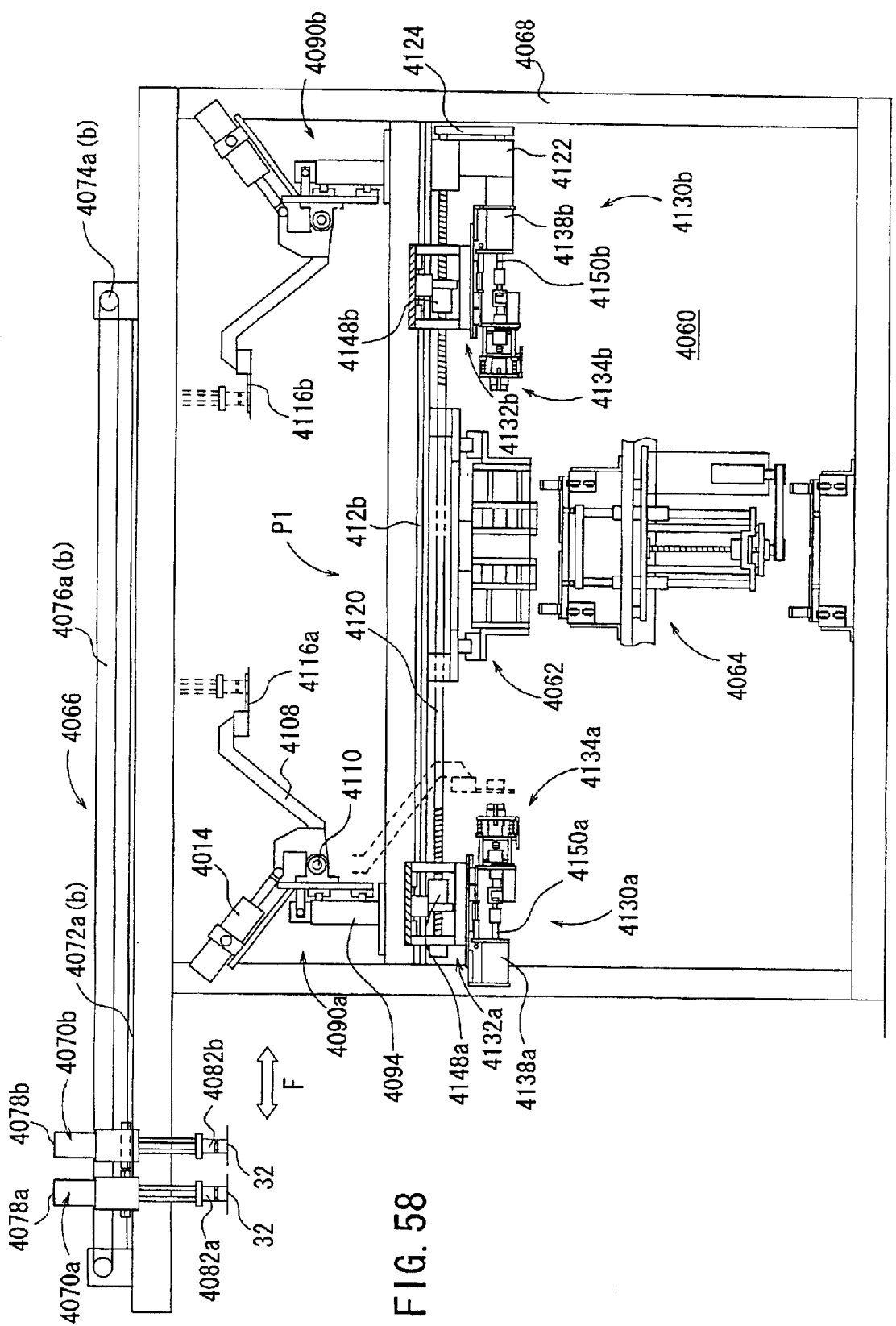
FIG. 58 is a side elevational view of a hard flanged member inserting device, a centering device, a lifting and lowering device, and a flanged member feeding device.

The second flanged member inserting station ST10 has a hard flanged member inserting device 4060. FIG. 58 shows the hard flanged member inserting device 4060, a centering device 4062 for positioning and holding the outer circumference of the light-shielded photosensitive roll 30, a lifting and lowering device 4064 for lifting and lowering the light-shielded photosensitive roll 30, and a flanged member feeding device 4066 for feeding the second flanged members 32 to the hard flanged member inserting device 4060.

Figure 59:
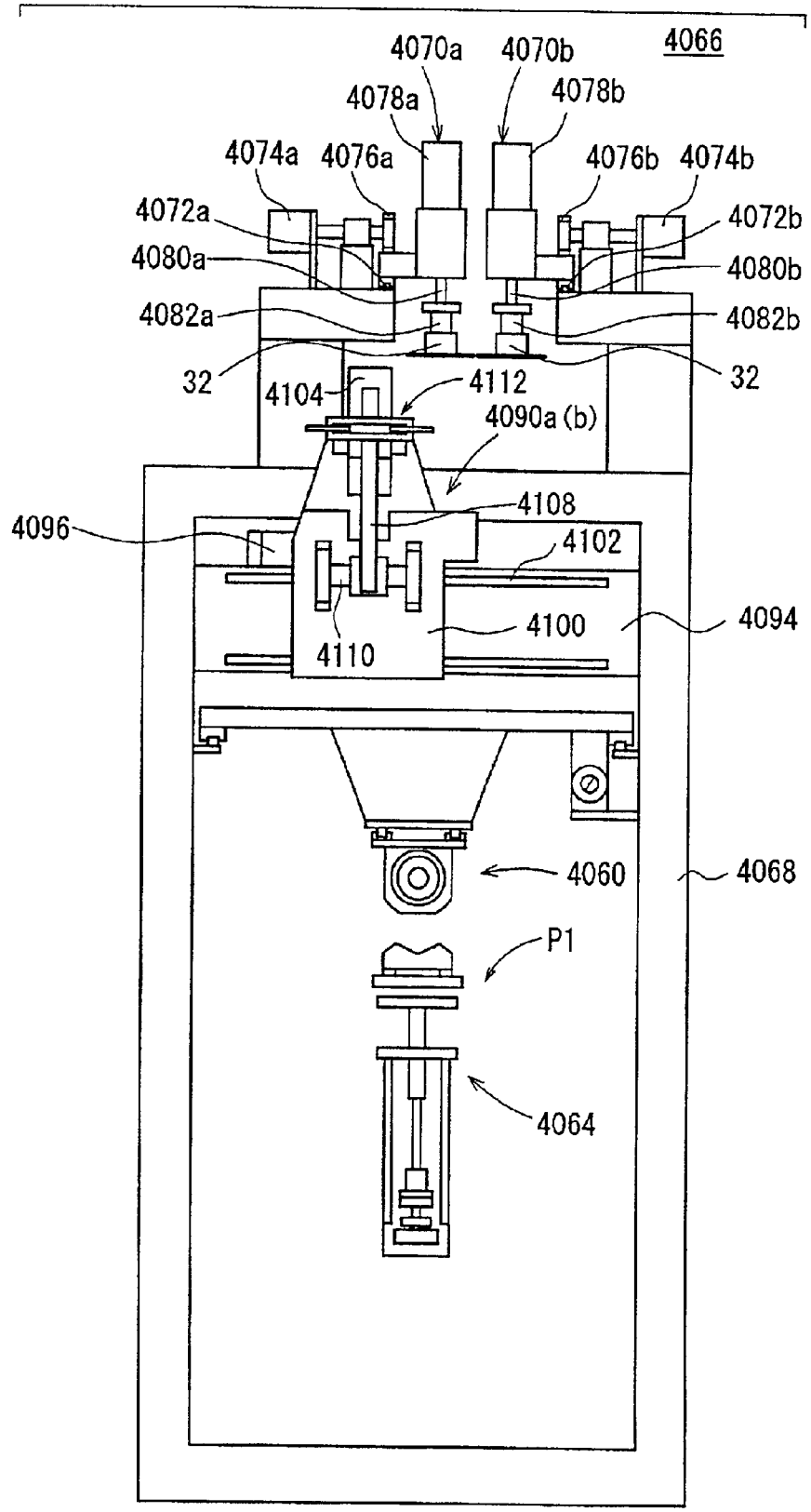
FIG. 59 is a front elevational view of the hard flanged member inserting device, the lifting and lowering device, and the flanged member feeding device.

The flanged member feeding device 4066 has first and second horizontally feeding means 4070*a*, 4070*b* disposed respectively on guide rails 4072*a*, 4072*b* on a frame 4068 for movement along the guide rails 4072*a*, 4072*b* in the direction indicated by the arrow F. As shown in FIG. 59, the first and second horizontally feeding means 4070*a*, 4070*b* are fixed to respective belts 4076*a*, 4076*b* driven in a circulative path by respective motors 4074*a*, 4074*b* for movement along the guide rails 4072*a*, 4072*b* to a position above a mounting position P1.

The first and second horizontally feeding means 4070*a*, 4070*b* have respective vertically extending cylinders 4078*a*, 4078*b* and having respective downwardly projecting rods 4080*a*, 4080*b* on which there are mounted chucks 4082*a*, 4082*b* for gripping second flanged members 32 from their inner circumferential surfaces.

As shown in FIG. 58, first and second transfer means 4090*a*, 4090*b* are disposed in the mounting position P1 for receiving the second flanged members 32 fed by the first and second horizontally feeding means 4070*a*, 4070*b* and transferring the received second flanged members 32 to the hard flanged member inserting device 4060. The first and second transfer means 4090*a*, 4090*b* have a base 4094 fixed to the frame 4068.

Figure 60:
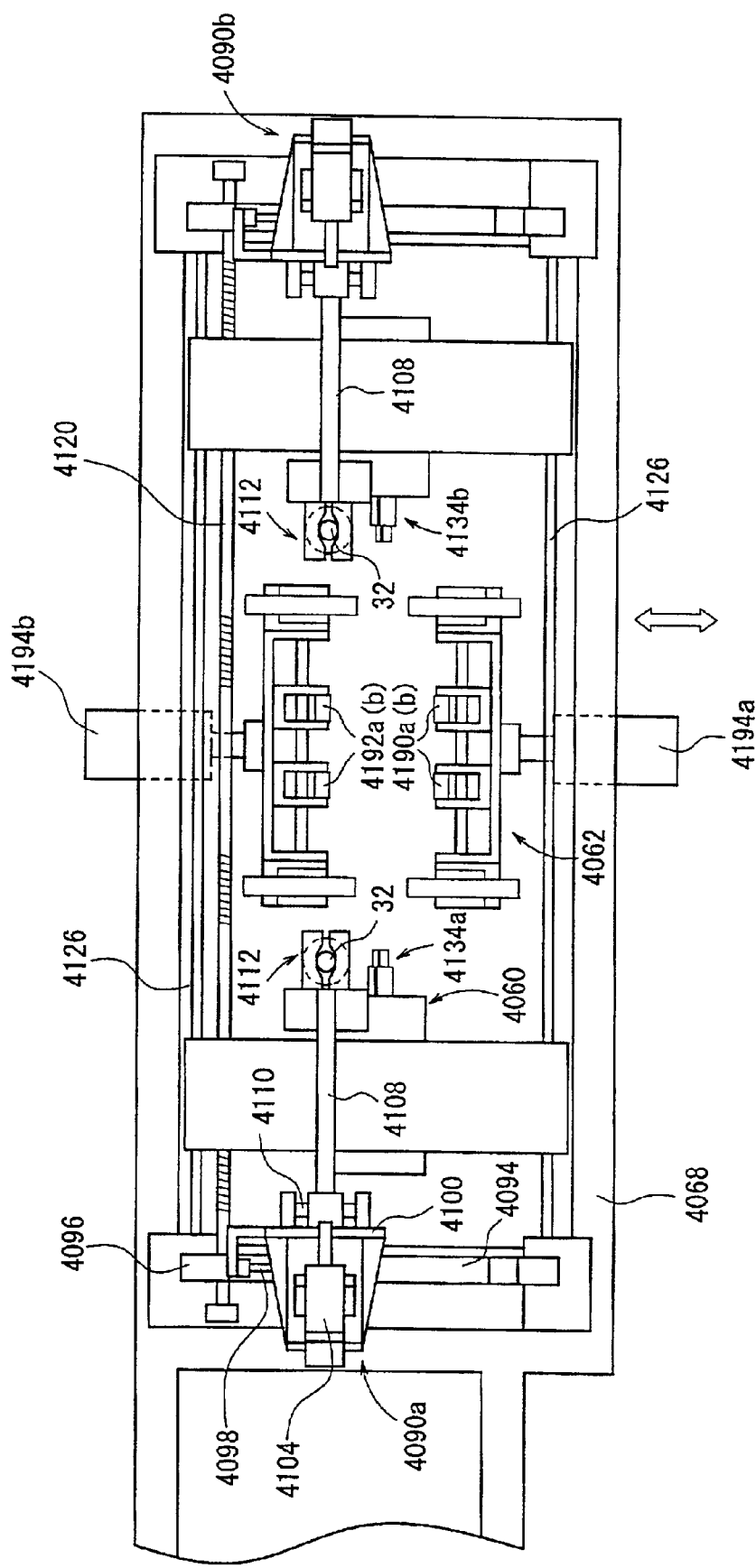
FIG. 60 is a plan view of the hard flanged member inserting device and the centering device.
Figure 61:
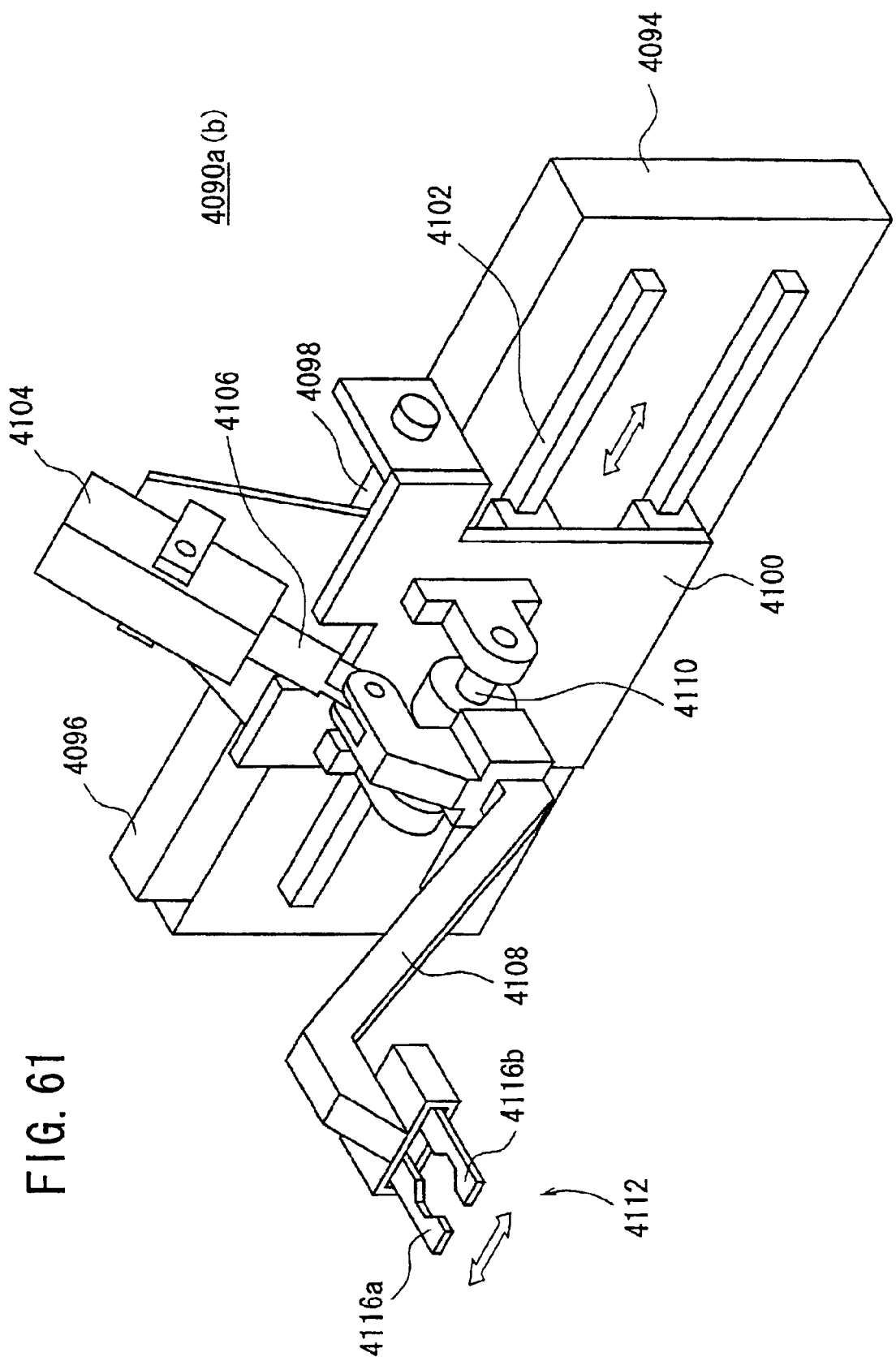
FIG. 61 is a perspective view of a first transferring means.
Figure 62:
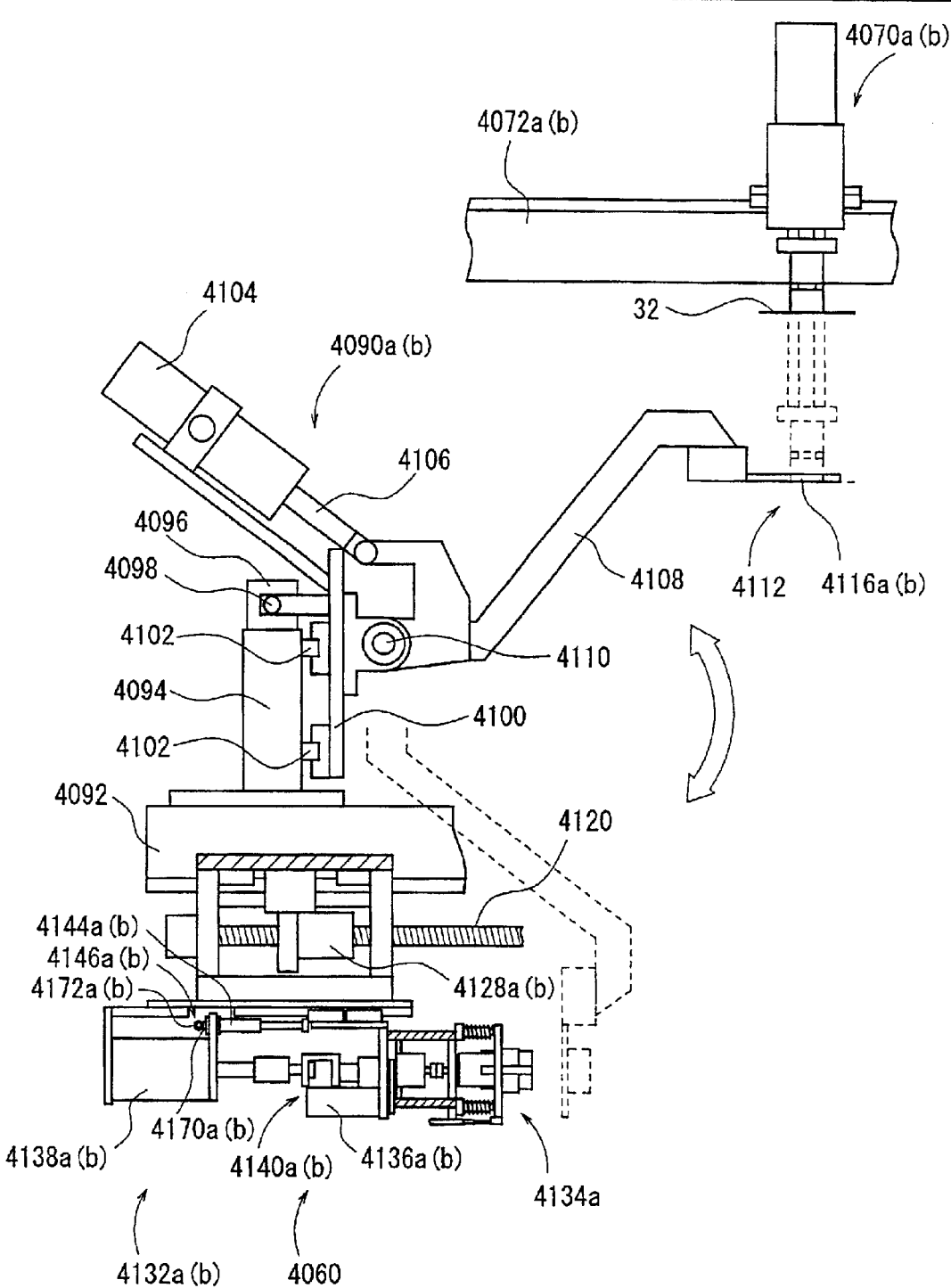
FIG. 62 is a front elevational view of the first transferring means.

As shown in FIGS. 60 through 62, a horizontal cylinder 4096 is mounted on the base 4094 and has a rod 4098 fixed to a base 4100 which is supported on the base 4094 by linear guides 4102 for horizontal movement.

A cylinder 4104 is mounted on the base 4100 and has a rod 4106 coupled to a swing arm 4108. The swing arm 4108 is angularly movable about 90° about a pivot shaft 4110 and supports a chuck 4112 mounted on a distal end thereof. The chuck 4112 has a pair of fingers 4116*a*, 4116*b* movable toward and away from each other.

The hard flanged member inserting device 4060 is disposed in a position which is reached by the swing arm 4108 when it is angularly moved to its lower limit. As shown in FIG. 58, the hard flanged member inserting device 4060 has a ball screw 4120 rotatably supported on the frame 4068 and extending in the axial direction (transverse direction) of the photosensitive roll 12. The ball screw 4120 can be rotated by a motor 4122 through a gear train 4124. The ball screw 4120 is paralleled by a pair of guide rods 4126 (see FIG. 60) which support first and second inserting units 4130*a*, 4130*b* thereon.

Figure 63:
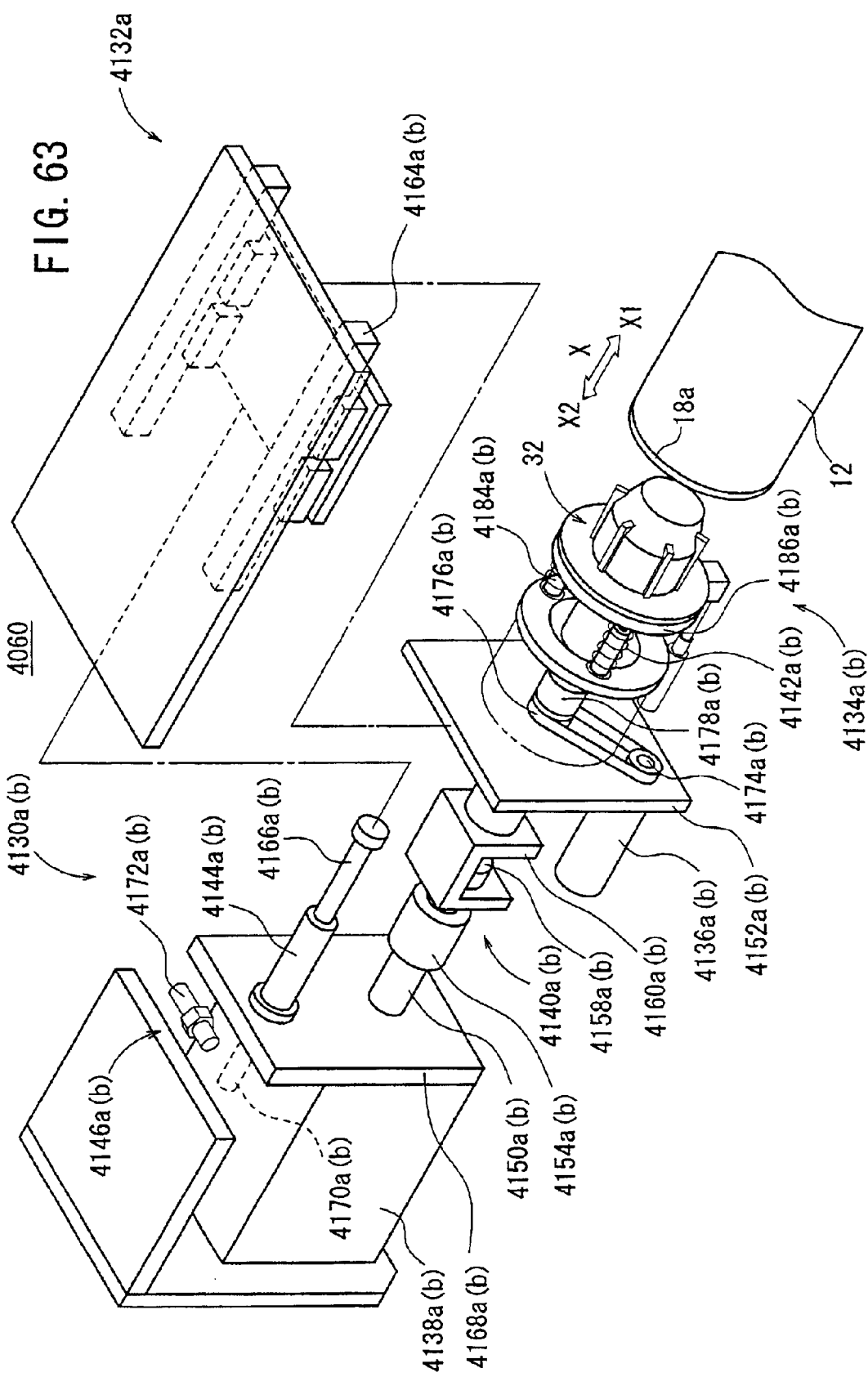
FIG. 63 is a perspective view of first and second inserting units of a mounting device.
Figure 64:
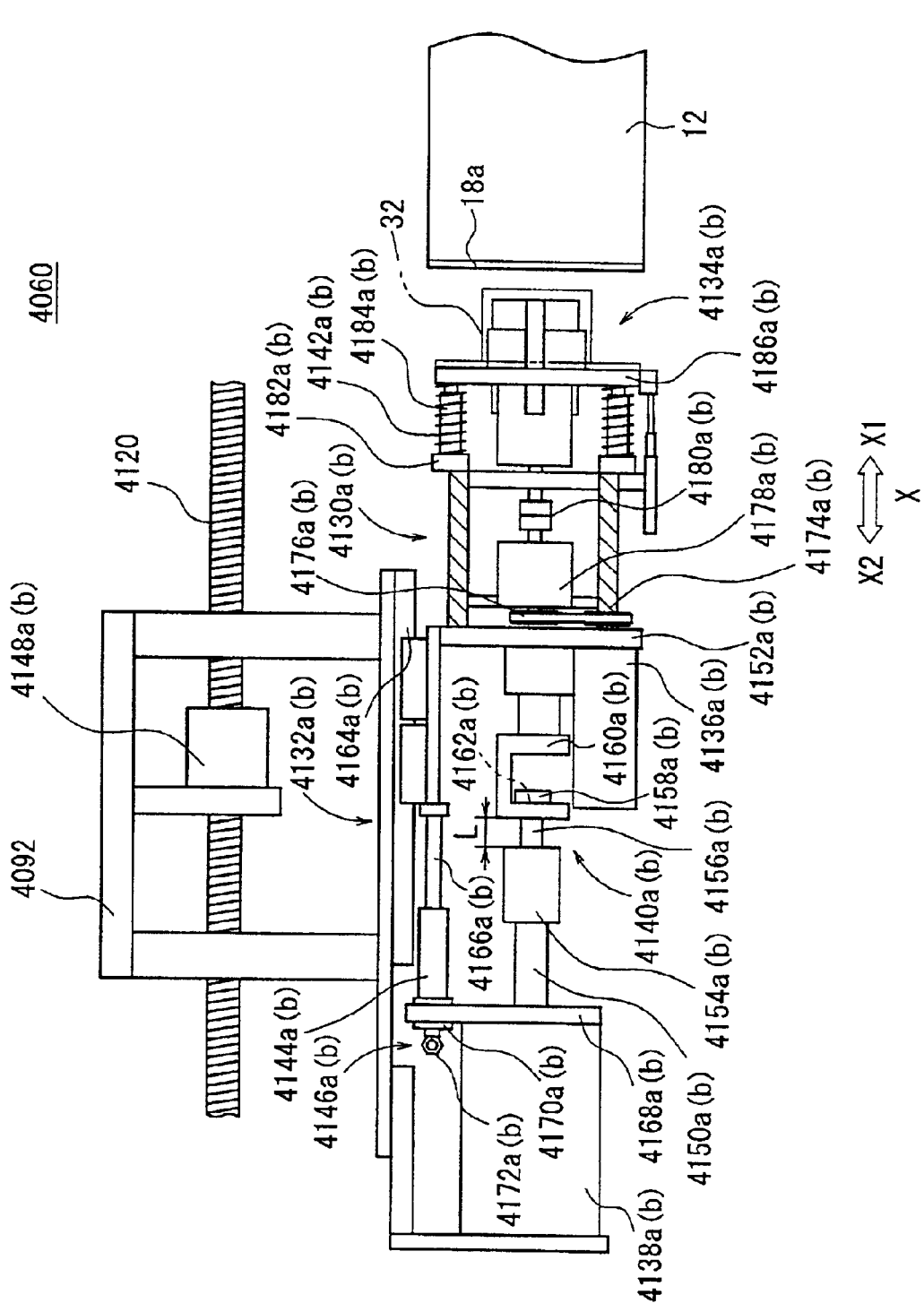
FIG. 64 is a side elevational view, partly in cross section, of the first and second inserting units.

As shown in FIGS. 63 and 64, the first and second inserting units 4130*a*, 4130*b* have respective inserting heads 4134*a*, 4134*b* movable toward and away from unit assemblies 4132*a*, 4132*b* while gripping second flanged members 32, respective motors (rotary actuators) 4136*a*, 4136*b* for rotating the inserting heads 4134*a*, 4134*b*, respective inserting cylinders (inserting actuators) 4138*a*, 4138*b* fixed to the unit assemblies 4132*a*, 4132*b* for moving the inserting heads 4134*a*, 4134*b* in order to insert the second flanged members 32 into first flanged members 18*a*, respective floating couplers 4140*a*, 4140*b* for moving the inserting heads 4134*a*, 4134*b* by a distance L with respect to the inserting cylinders 4138*a*, 4138*b*, respective cylinders (urging means) 4144*a*, 4144*b* for pressing the second flanged members 32 against the first flanged members 18*a* while allowing the second flanged members 32 to move with respect to the inserting heads 4134*a*, 4134*b*, and respective detectors 4146*a*, 4146*b* for detecting when the grooves 56 of the first flanged members 18*a* are aligned with the ridges 68 of the second flanged members 32 by the motors 4136*a*, 4136*b* and the second flanged members 32 are moved into the first flanges 18*a*.

The unit assemblies 4132*a*, 4132*b* have nuts 4148*a*, 4148*b* threaded over the ball screw 4120. The ball screw 4120 has reversely threaded structures one on each side of its center, so that the unit assemblies 4132*a*, 4132*b* can move in unison in directions toward and away from each other. The inserting cylinders 4138*a*, 4138*b* of the unit assemblies 4132*a*, 4132*b* have respective horizontal rods 4150*a*, 4150*b* engaged by respective movable bases 4152*a*, 4152*b* of the inserting heads 4134*a*, 4134*b* through the floating couplers 4140*a*, 4140*b*.

Tubular pressers 4154*a*, 4154*b* are mounted on the respective distal ends of the rods 4150*a*, 4150*b*. Rods 4156*a*, 4156*b* inserted in the respective tubular pressers 4154*a*, 4154*b* have larger-diameter members 4158*a*, 4158*b* integrally formed with distal ends thereof. Angles 4160*a*, 4160*b* are fixed to the respective movable bases 4152*a*, 4152*b* and have respective holes 4162*a*, 4162*b* defined in distal ends thereof.

The rods 4156*a*, 4156*b* are fitted respectively in the holes 4162*a*, 4162*b*. The tubular pressers 4154*a*, 4154*b* can press the outer surfaces of the distal ends of the angles 4160*a*, 4160*b*, whereas the larger-diameter members 4158*a*, 4158*b* can press inner surfaces of the angles 4160*a*, 4160*b*. The movable bases 4152*a*, 4152*b* are independently movable the distance L between the tubular pressers 4154*a*, 4154*b* and the larger-diameter members 4158*a*, 4158*b*.

The movable bases 4152*a*, 4152*b* are supported on respective guide rails 4164*a*, 4164*b* mounted on the unit assemblies 4132*a*, 4132*b* for movement in the direction indicated by the arrow X. The cylinders 4144*a*, 4144*b* have respective presser rods 4166*a*, 4166*b* whose distal ends can abut against ends of the movable bases 4152*a*, 4152*b*. The presser rods 4166*a*, 4166*b* are movably supported on respective attachment plates 4168*a*, 4168*b* fixed to the inserting cylinders 4138*a*, 4138*b* and normally urged toward the movable base 4152*a* in the direction indicated by the arrow X1 by the cylinders 4144*a*, 4144*b*.

The detectors 4146*a*, 4146*b* have respective dogs 4170*a*, 4170*b* fixed to the ends of the presser rods 4166*a*, 4166*b*.

The dogs 4170a, 4170b are engageable with the attachment plates 4168a, 4168b to prevent the presser rods 4166a, 4166b from being detached from the attachment plates 4168a, 4168b. The detectors 4146a, 4146b also have respective sensors 4172a, 4172b which are turned on by the dogs 4170a, 4170b when the grooves 56 of the first flanged members 18a are not aligned with the ridges 68 of the second flanged members 32, and turned off when the grooves 56 are aligned with the ridges 68 and the second flanged members 32 move toward the first flanged members 18a.

The motors 4136a, 4136b are fixed to the movable bases 4152a, 4152b, respectively, and have respective rotatable drive shafts 4174a, 4174b to which rotatable shafts 4178a, 4178b are operatively coupled by belt and pulley means 4176a, 4176b. The inserting heads 4134a, 4134b are connected to the respective rotatable shafts 4178a, 4178b by respective couplings 4180a, 4180b.

Support tubes 4182a, 4182b have ends fixed to the distal ends of the movable bases 4152a, 4152b, and support rods 4184a, 4184b are movably disposed in the respective support tubes 4182a, 4182b, with springs 4142a, 4142b disposed around the support tubes 4182a, 4182b and the support rods 4184a, 4184b. Presser plates 4186a, 4186b are fixed to distal ends of the support rods 4184a, 4184b.

As shown in FIG. 60, the centering device 4062 has first centering rollers 4190a, 4190b and second centering rollers 4192a, 4192b which are disposed one on each side of the photosensitive roll 12 in confronting relation to each other diametrically across the photosensitive roll 12, and cylinders 4194a, 4194b for moving the first centering rollers 4190a, 4190b and the second centering rollers 4192a, 4192b toward and away from each other.

The lifting and lowering device 4064 for lifting the pallet 86 with the light-shielded photosensitive roll 12 placed thereon to a second flanged member assembling position is disposed in the mounting position P1. The lifting and lowering device 4064 is identical in structure to the lifting and lowering device 2062 described above, and will not be described in detail below.

Operation of the automatic packaging system 10 thus constructed will be described below with respect to a method of automatically packaging a rolled article according to the present invention.

A photosensitive roll 12 with first flanged members 18a assembled thereon in the first flanged member inserting station ST2 is fed on a pallet 86 to the end drawing station ST3 by the feed conveyors 82a, 82b. In the end drawing station ST3, as shown in FIGS. 12 and 13, while the pallet 86 is at rest, the cylinder 644 of the pallet lifting and lowering unit 642 is actuated to lift the vertically movable base 648 into engagement with the pallet 86, which is delivered to a position above the feed conveyors 82a, 82b, bringing the photosensitive roll 12 into an end drawing position.

Then, the motor 664 of the drive unit 663 is energized to rotate the drive gear 668 and the ball screw 670 in unison in a given direction. The drive gear 668 rotates the driven gear 672 whose rotation is transmitted through the rotatable shaft 674 to the first gear 676 and then from the second gear 678 meshing with the first gear 676 through the third gear 680 to the second ball screw 682. The first and second balls crews 670, 682 rotate in different directions, causing the first and second nuts 688a, 688b to move the first and second slide bases 686a, 686b toward each other.

The first and second chucks 690a, 690b rotatably supported on the first and second slide bases 686a, 686b have the openable and closable claws 692a, 692b inserted into the opposite ends of the photosensitive roll 12. At this time, the openable and closable claws 692a, 692b are displaced radially outwardly, causing the first and second chucks 690a, 690b to hold the opposite ends of the photosensitive roll 12.

Then, the actuator 702 of the end drawing mechanism 634 is energized. As shown in FIG. 13, when the motor 708 is energized, the ball screw 710 rotates about its own axis, causing the nut 712 threaded over the ball screw 710 to move the movable base 714 toward the photosensitive roll 12. When the movable base 714 reaches a position where the gripper 700 can grip the end 14a of the photosensitive sheet 14, the actuator 702 is de-energized.

Figure 65:
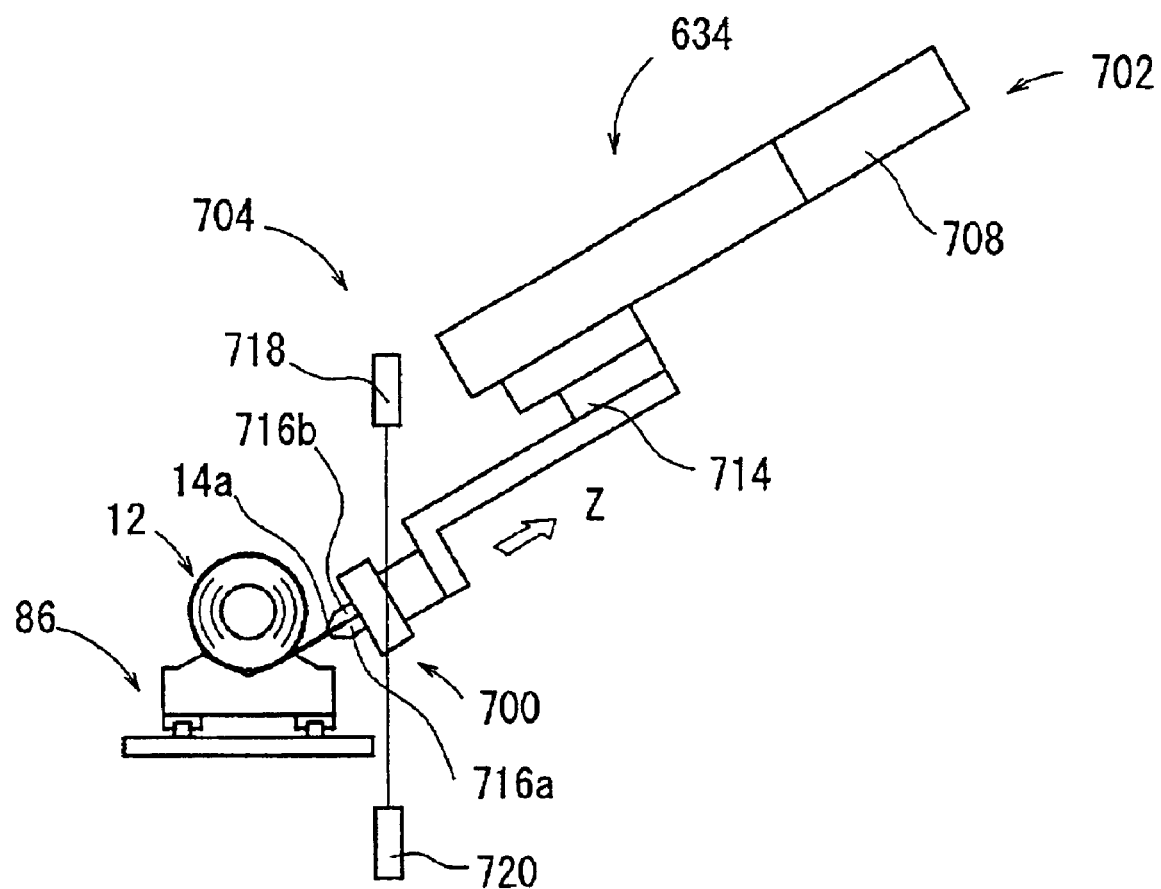
FIG. 65 is a view showing the manner in which an end of a photosensitive sheet is gripped by a gripper.

As shown in FIG. 65, the gripping fingers 716a, 716b of the gripper 700 are closed and grip the end 14a of the photosensitive sheet 14. Then, the pallet 86 is lowered a predetermined distance away from the outer circumferential surface of the photosensitive roll 12, and the motor 708 of the actuator 702 is energized in a reversed direction, moving the movable base 714 in the direction indicated by the arrow Z away from the photosensitive roll 12.

Figure 66:
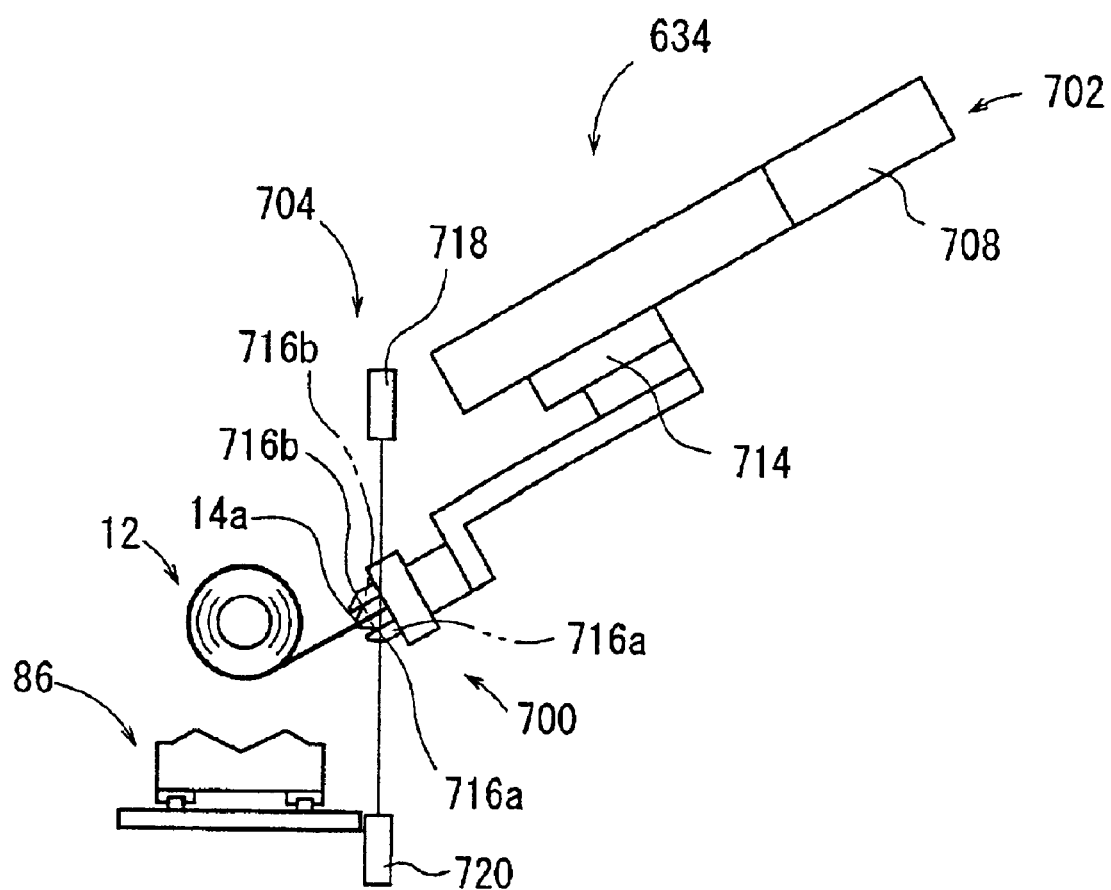
FIG. 66 is a view showing the manner in which the end of the photosensitive sheet is drawn by the gripper.

In the detecting assembly 704, an infrared radiation is being emitted from the infrared emitter 718 to the infrared detector 720. When the gripper 700 moves in the direction indicated by the arrow Z and the end 14a reaches the path of the infrared radiation, the detecting assembly 704 detects the end 14a. In this position, the pallet 86 is lifted a given distance, and the actuator 702 is de-energized, and the gripper 700 is actuated to open the gripping fingers 716a, 716b to release the end 14a (see the two-dot-and-dash lines in FIG. 66).

As described above, the end 14a of the photosensitive sheet 14 is drawn to a predetermined length by the end drawing mechanism 634 in the end drawing station ST3. Therefore, even if the length of the end 14a varies when it is fed in a free state, the length of the end 14a can reliably be adjusted to a desired length before a joint tape 20 is applied thereto.

The powder clutch 696 as a tension applying unit is connected to the first chuck 690a which supports one end of the photosensitive roll 12 when the end 14a of the photosensitive sheet 14 is drawn by the end drawing mechanism 634. Therefore, when the end 14a is drawn out, the photosensitive roll 12 is placed under a certain tension, reliably preventing the photosensitive sheet 14 from becoming loose on the outer circumferential surface of the photosensitive roll 12.

After the end 14a is drawn out to a given length, the opposite ends of the photosensitive roll 12 are released from the first and second chucks 690a, 690b of the rotary support mechanism 632, and the motor 664 is reversed. The first and second balls crews 670, 682 rotate in different directions, displacing the first and second slide bases 686a, 686b away from each other to remove the first and second chucks 690a, 690b from the opposite ends of the photosensitive roll 12.

The pallet lifting and lowering unit 642 is actuated to lower the pallet 86 with the photosensitive roll 12 placed thereon onto the upper feed conveyors 82a, 82b. The upper feed conveyors 82a, 82b are actuated to deliver the pallet 86 from the end drawing station ST3 to the applying station ST4. In the applying station ST4, the pallet 86 is temporarily stopped, and, as shown in FIG. 17, the cylinder 734 of the pallet lifting and lowering unit 730 is actuated. The vertically movable base 738 is lifted to deliver the pallet 86 to a position above the upper feed conveyors 82a, 82b.

The cylinder 740 of the roller presser 732 is actuated to lower the rollers 744 to press the upper outer circumferential surface of the photosensitive roll 12.

In synchronism with the operation of the pallet lifting and lowering unit 730, the cylinders 752, 760 of the pressing mechanism 636 are actuated. Since the first pressing member 756 is coupled to the cylinder 752 and the second pressing member 764 is coupled to the cylinder 760, the first and second pressers 756, 764 are displaced toward each other, gripping the end 14a of the photosensitive sheet 14 on its upper and lower surfaces.

Figure 67:
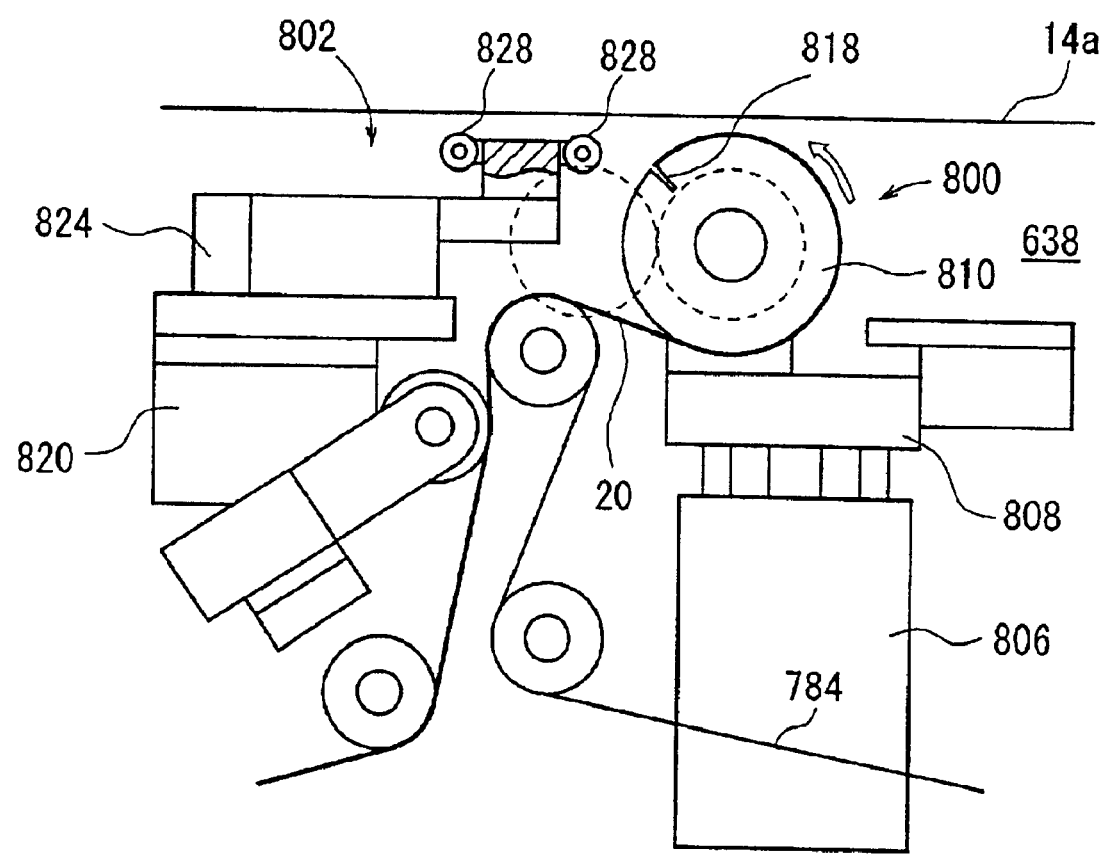
FIG. 67 is a view showing the manner in which a joint tape is wound around a suction roller.

As described above, with the end 14a being gripped by the pressing mechanism 636, the applying mechanism 638 is actuated. As shown in FIG. 18, the rotary actuator 814 of the applying means 800 is energized to cause the gear train 816 to rotate the suction roller 810 through a certain angle. The suction roller 810, which is connected to a vacuum source, not shown, draws under vacuum a joint tape 20 against the outer circumferential surface of the suction roller 810. The joint tape 20 is attracted to the outer circumferential surface of the suction roller 810 through a certain angle (see FIG. 67).

The torque motors 790a, 790b are energized to pay out the separable sheet 784 with joint tapes 20 thereon from the tape payout reel 786, and wind the separable sheet 784 from which joint tapes 20 are removed on the separable sheet takeup reel 788.

Figure 68:
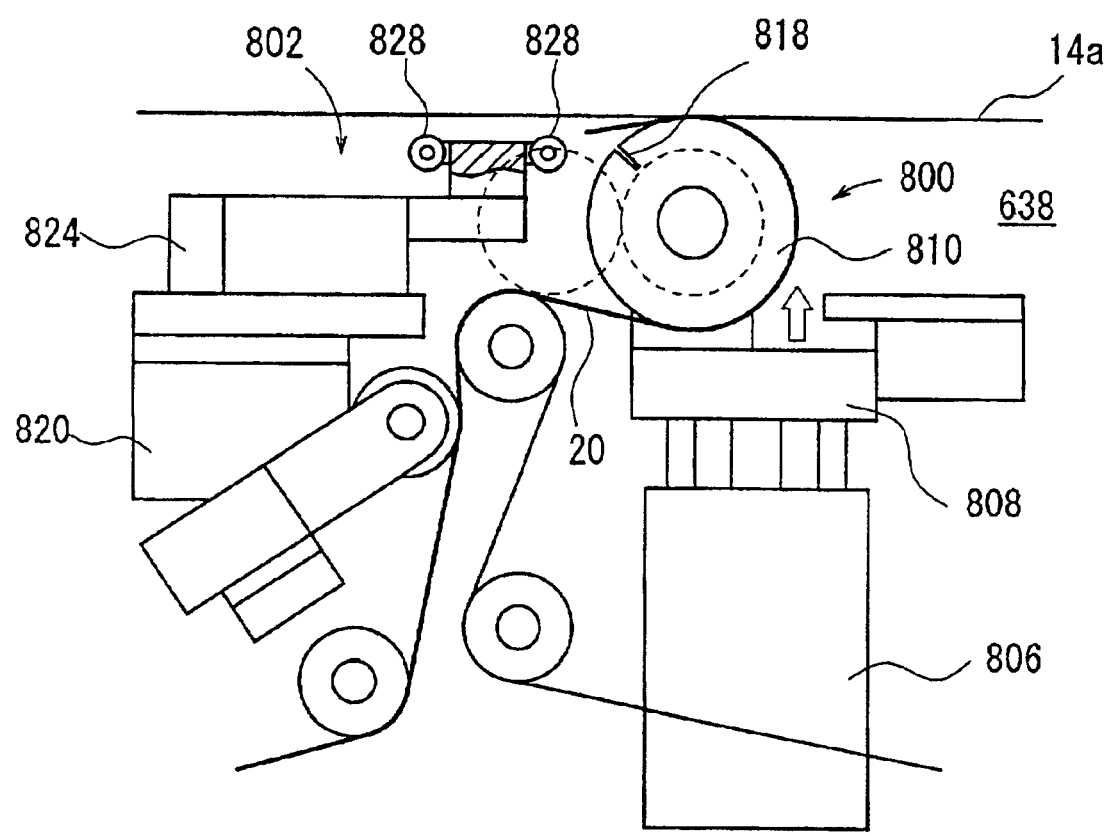
FIG. 68 is a view showing the manner in which the joint tape is partly applied to the end of the photosensitive sheet.
Figure 69:
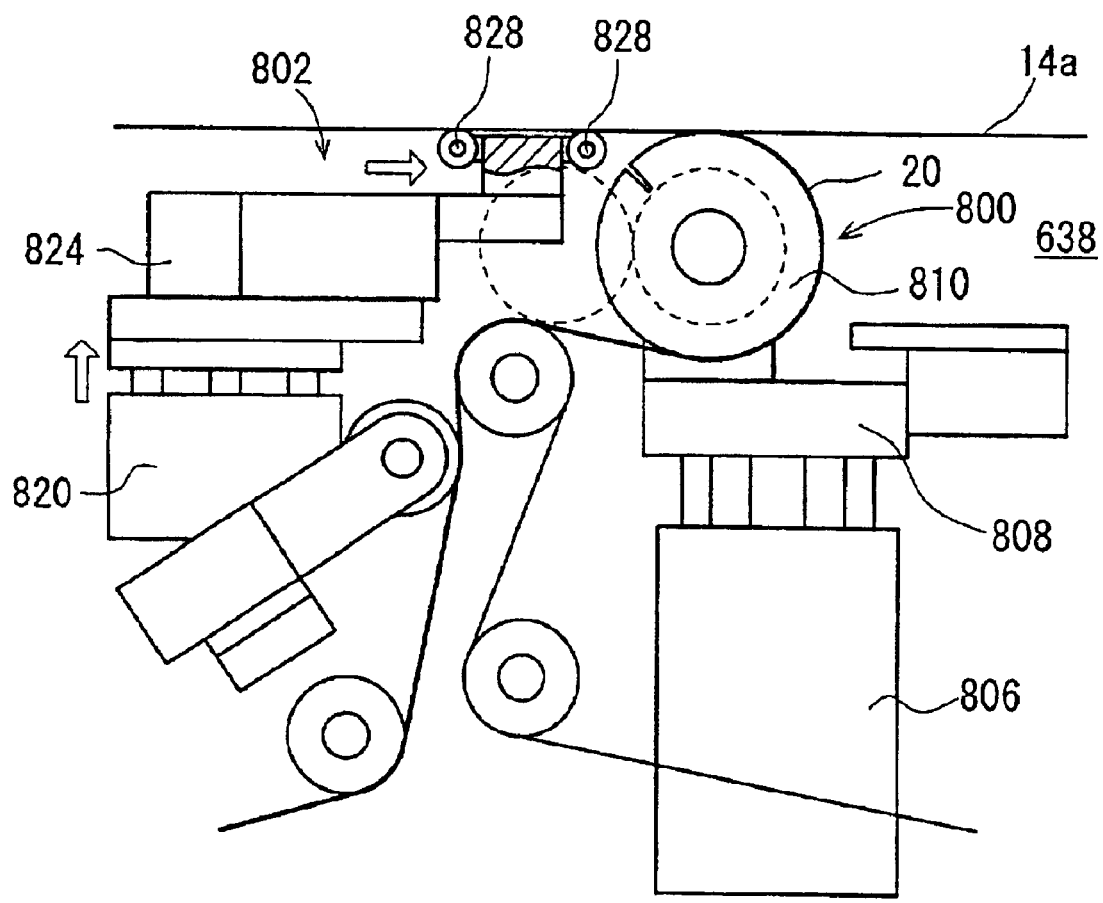
FIG. 69 is a view showing the manner in which the joint tape is applied to the end of the photosensitive sheet transversely thereacross.

Then, as shown in FIG. 68, the cylinder 806 is actuated to lift the suction roller 810 to press the joint tape 20 attracted to the outer circumferential surface of the suction roller 810 against the end 14a of the photosensitive sheet 14, and then the suction roller 810 releases the joint tape 20. The cylinder 824 of the squeezing means 802 is actuated to move the squeezing rollers 828 in unison with the arm 826 toward the suction roller 810, after which the cylinder 820 is actuated to lift the squeezing rollers 828 to press the joint tape 20 against the end 14a (see FIG. 69).

Figure 70:
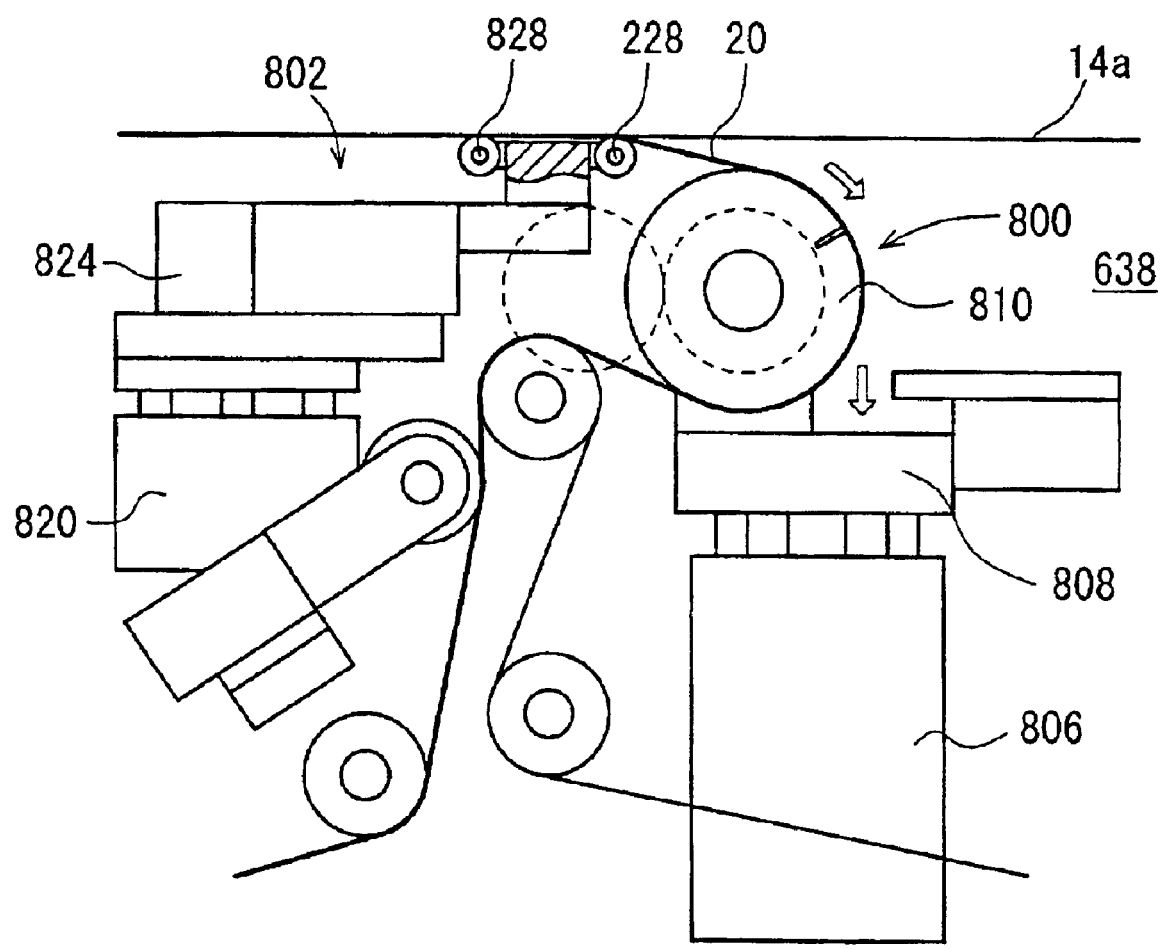
FIG. 70 is a view showing the manner in which the suction roller is driven after the joint tape is applied to the end of the photosensitive sheet.

Then, as shown in FIGS. 15 and 16, the motor 772 is energized to rotate the ball screw 776 to move the slide unit 780 along the support member 770 transversely across the photosensitive roll 12 in the direction indicated by the arrow X. When the suction roller 810 runs from one edge to the other of the end 14a, the motor 772 is de-energized, and the suction roller 810 is lowered by the cylinder 806 and then rotated by the rotary actuator 814 in the direction indicated by the arrow in FIG. 70.

Figure 71:
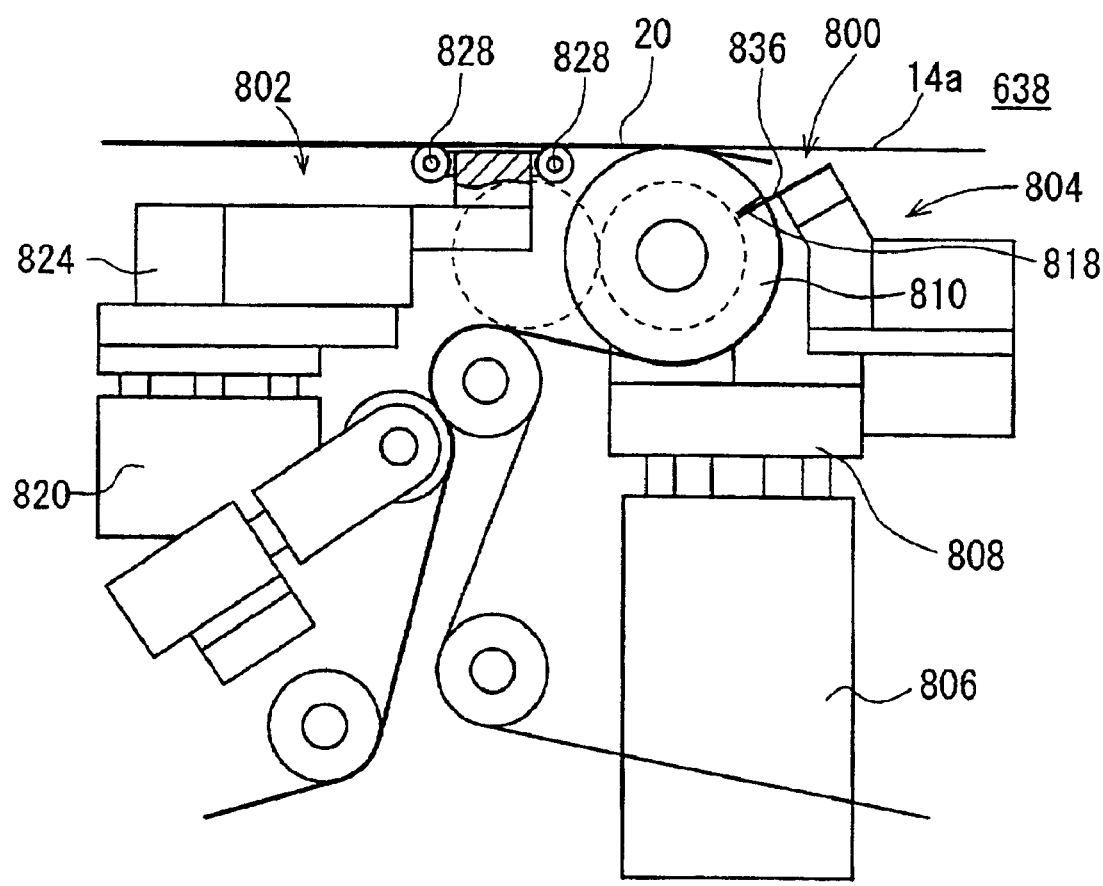
FIG. 71 is a view showing the manner in which the joint tape is cut off.

Thereafter, the suction roller 810 starts to draw the joint tape 20, and is lifted by the cylinder 806, after which the cutter 804 is actuated. The cylinder 830 of the cutter 804 is actuated to move the movable plate 834 transversely across the joint tape 20, causing the cutting blade 836 on the movable plate 834 along the cutter guide slot 818 in the suction roller 810 thereby to cut off the joint tape 20 (see FIG. 71). After the cutting blade 836 is returned by the cylinder 830, the suction roller 810 is lowered, and the slide unit 780 is further displaced by the motor 772.

Figure 72:
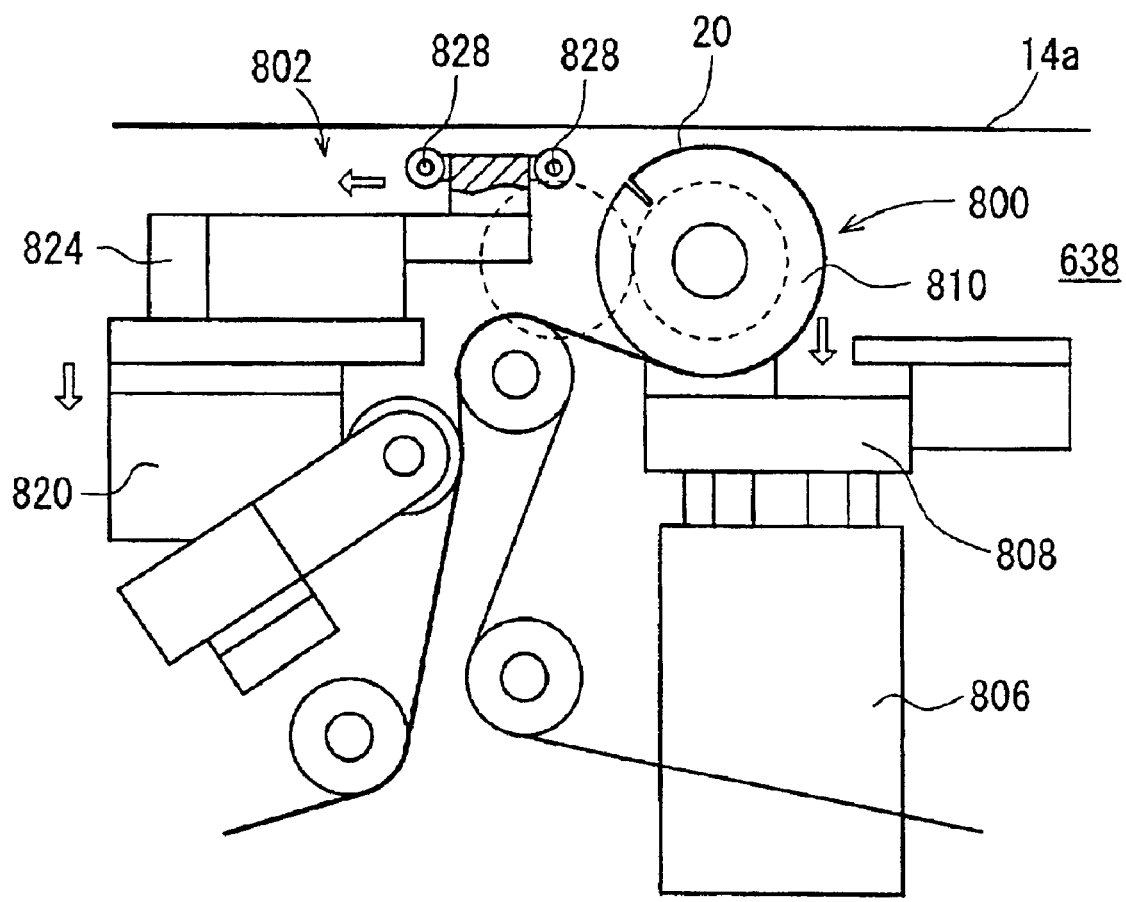
FIG. 72 is a view showing the position of the parts after the joint tape is cut off.

Then, as shown in FIG. 72, the squeezing rollers 828 are lowered by the cylinder 820 and spaced from the suction roller 810 by the cylinder 824. Thereafter, the slide unit 780 is returned to a position to start applying the joint tape 20, by reversing the motor 772. The joint tape 20 is now applied to the reverse side of the end 14a over a length which is substantially half the width of the end 14a. The cylinders 752, 760 are actuated to displace the first and second pressing members 756, 764 away from each other, releasing the end 14a therefrom. The pallet lifting and lowering unit 730 and the roller presser 732 are actuated to transfer the pallet 86 onto the upper feed conveyors 82a, 82b.

As shown in FIG. 17, the cylinders 842a, 842b are actuated to lift the feed rollers 844a, 844b to the same height as the upper feed conveyors 82a, 82b, so that the pallet 86 can smoothly be transferred over the feed rollers 844a, 844b onto the upper feed conveyors 82a, 82b.

In the applying station ST4, before the joint tape 20 is applied to the end 14a of the photosensitive sheet 14, the opposite surfaces of the end 14a are supported by the first and second pressing members 756, 764 of the pressing mechanism 636. Therefore, the end 14a can be held reliably in a constant position at all times even if the end 14a may be curled or sagging in a different fashion depending on the width of the photosensitive roll 12 and the thickness or type of the photosensitive sheet 14.

Thus, the joint tape 20 can accurately and efficiently be applied to the end 14a at a desired position by the applying mechanism 638. In the end drawing station ST3, since the end 14a has been drawn in advance to a prescribed length, the joint tape 20 can accurately and efficiently be applied to the end 14a. Accordingly, the process of applying the joint tape 20 to the end 14a can readily be automatized.

In the rotary support mechanism 632, the first and second chucks 690a, 690b can be lifted and lowered by the moving unit 652. Therefore, even if the photosensitive roll 12 placed on the pallet 18 has a different diameter, the photosensitive roll 12 can easily be handled by the rotary support mechanism 632. The rotary support mechanism 632 is thus applicable to many types of photosensitive rolls 12 having different widths and diameters, and hence is highly versatile.

After the joint tape 20 is applied to the end 14a of the photosensitive sheet 14, the photosensitive roll 12 is fed from the applying station ST4 to the light-shielding leader winding station ST6. In the light-shielding leader assembling station ST5, as shown in FIG. 21, the motor 884 of the skirt member supply unit 862 is energized to cause the belt and pulley means 886 to rotate the payout shaft 882 in the direction indicated by the arrow. Therefore, the strip-like skirt member 864 wound around the payout shaft 882 is paid out through the guide rollers 888 and the dancer roller 890 to the working mechanism 866.

Figure 73:
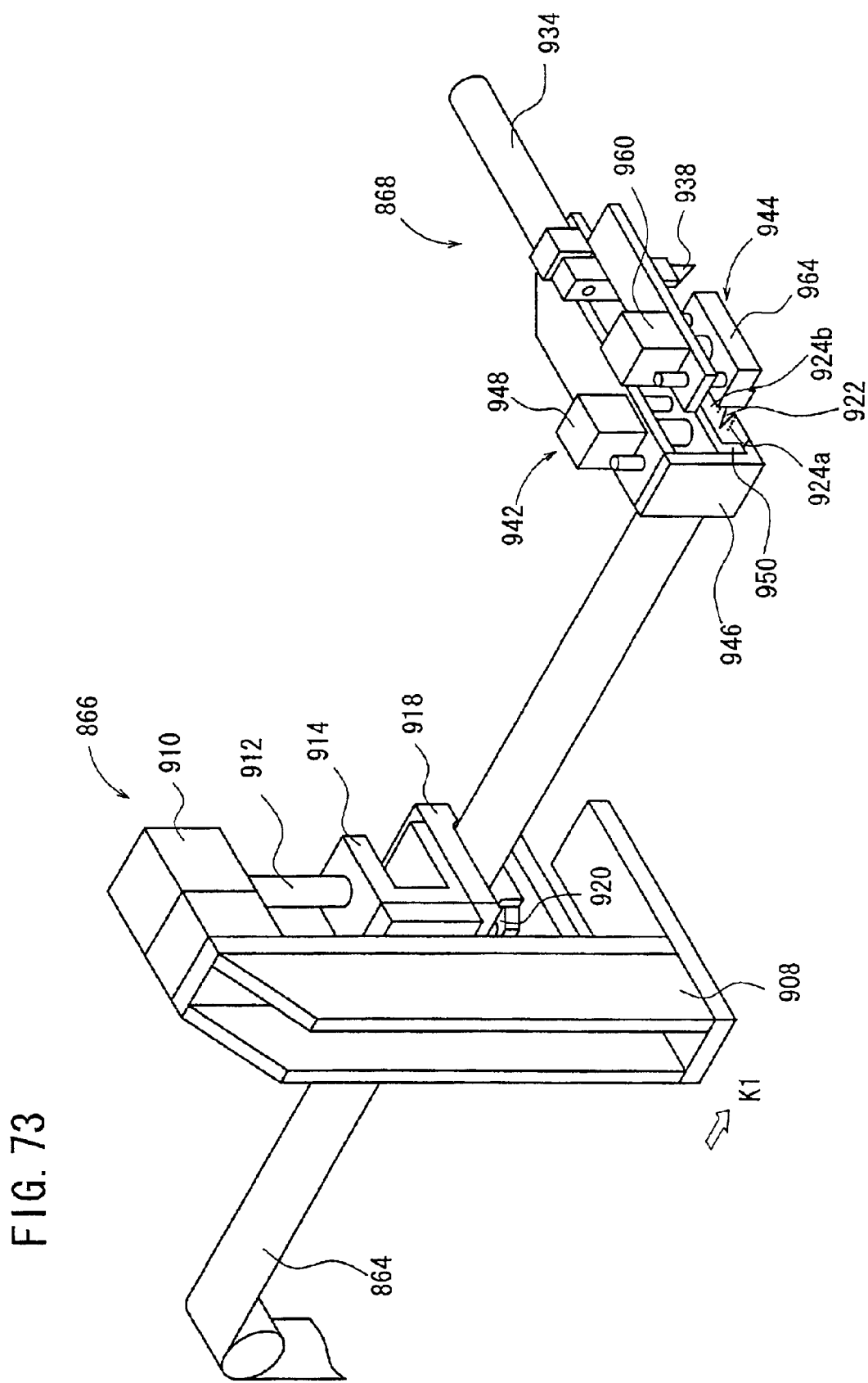
FIG. 73 is perspective view showing the manner in which a strip-like skirt member is blanked.

Then, the leading end of the strip-like skirt member 864 is gripped by the gripping means 942. As shown in FIG. 20, the rodless cylinder 930 is actuated to move the movable base 932 toward the joining region P2a in the direction indicated by the arrow K1. Then, the lower rodless cylinder 900 of the working mechanism 866 is actuated to move the first movable base 902 in the direction indicated by the arrow K1. Therefore, the punch 918 and the die plate 920 which are supported on the support frame 908 are positioned in a region where the strip-like skirt member 864 is to be blanked (see FIG. 73).

The pressurizing cylinder 910 of the working mechanism 866 is actuated to lower the vertically movable base 914 in unison with the rod 912. The die plate 920 and the punch 918 then produces a lozenge-shaped opening 922 and tear-off perforations 924a, 924b in the strip-like skirt member 864 (see FIG. 22).

Thereafter, the pressurizing cylinder 910 is actuated to lift the punch 918, and the lower rodless cylinder 900 is actuated to move the first movable base 902 in the direction indicated by the arrow K2. The working mechanism 866 is now placed in a given retracted position. The rodless cylinder 980 of the skirt member feeding mechanism 870 is actuated to move the skirt member suction box 984 from the joining region P2a to the cutting region P1a in the direction indicated by the arrow K2.

When the skirt member suction box 984 is placed below the strip-like skirt member 864 whose leading end is gripped by the gripping means 942 in the cutting region P1a, the strip-like skirt member 864 is drawn by the skirt member suction box 984 and attracted against the suction surface (upper surface) of the skirt member suction box 984 under vacuum through suction holes 990. The cylinder 948 of the gripping means 942 is then actuated to move the movable guide 950 upwardly in unison with the rod 956 out of engagement with the strip-like skirt member 864.

After the strip-like skirt member 864 is released from the movable guide 950 and the fixed guide 946, the rodless cylinder 930 is actuated to move the movable base 932 in the direction indicated by the arrow K2 to place the skirt member cutting mechanism 868 in a position to cut off the strip-like skirt member 864. The cylinder 972 of the stopper means 970 is actuated to move the engaging rod 974 upwardly. The engaging rod 974 abuts against the movable base 932 for reliably preventing the movable base 932 from moving.

Figure 74:
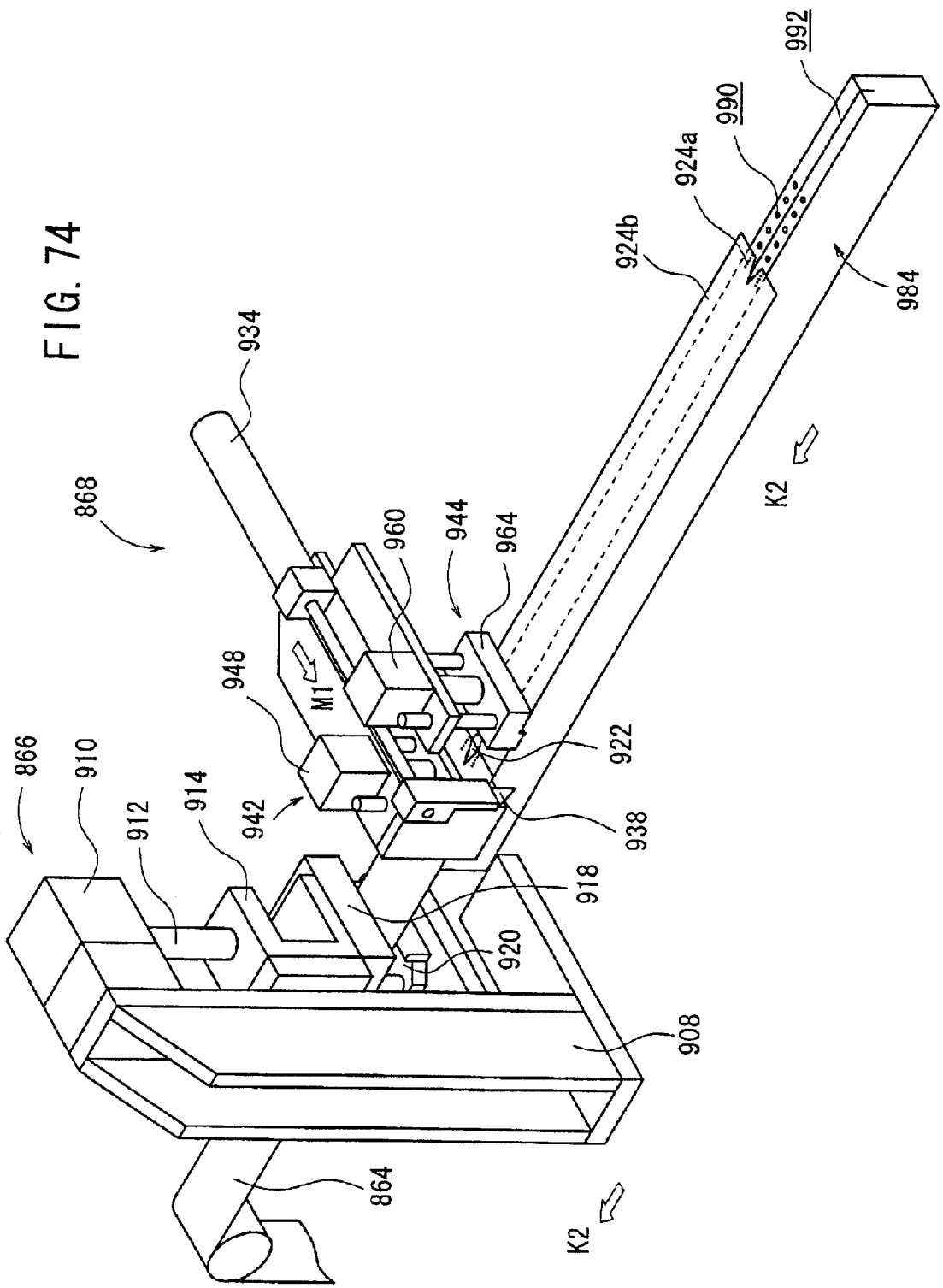
FIG. 74 is perspective view showing the manner in which the strip-like skirt member is cut off transversely thereacross while it is being held under suction.

Then, the cylinder 948 of the gripping means 942 is actuated to cause the fixed guide 946 and the movable guide 950 to grip the cut rear end of the strip-like skirt member 864. The cylinder 960 of the gripping means 944 is actuated to lower the pressing guide 964 to cause the lower pressing surface 968 to press the strip-like skirt member 864 against the skirt member suction box 984. The cylinder 934 of the skirt member cutting mechanism 868 is actuated to move the cutter blade 938 in unison with the rod 936 in the direction indicated by the arrow M1, thus cutting off the strip-like skirt member 864 substantially centrally across the opening 922 along a diagonal line thereof (see FIG. 74). After the strip-like skirt member 864 is cut off transversely, the cylinder 960 of the holding means 944 is actuated to lift the pressing guide 964 to release the strip-like skirt member 864. The cut-off strip-like skirt member 864 remains attracted to the skirt member suction box 984, and the rodless cylinder 980 is actuated to move the movable base 982 in the direction indicated by the arrow K1.

Figure 75:
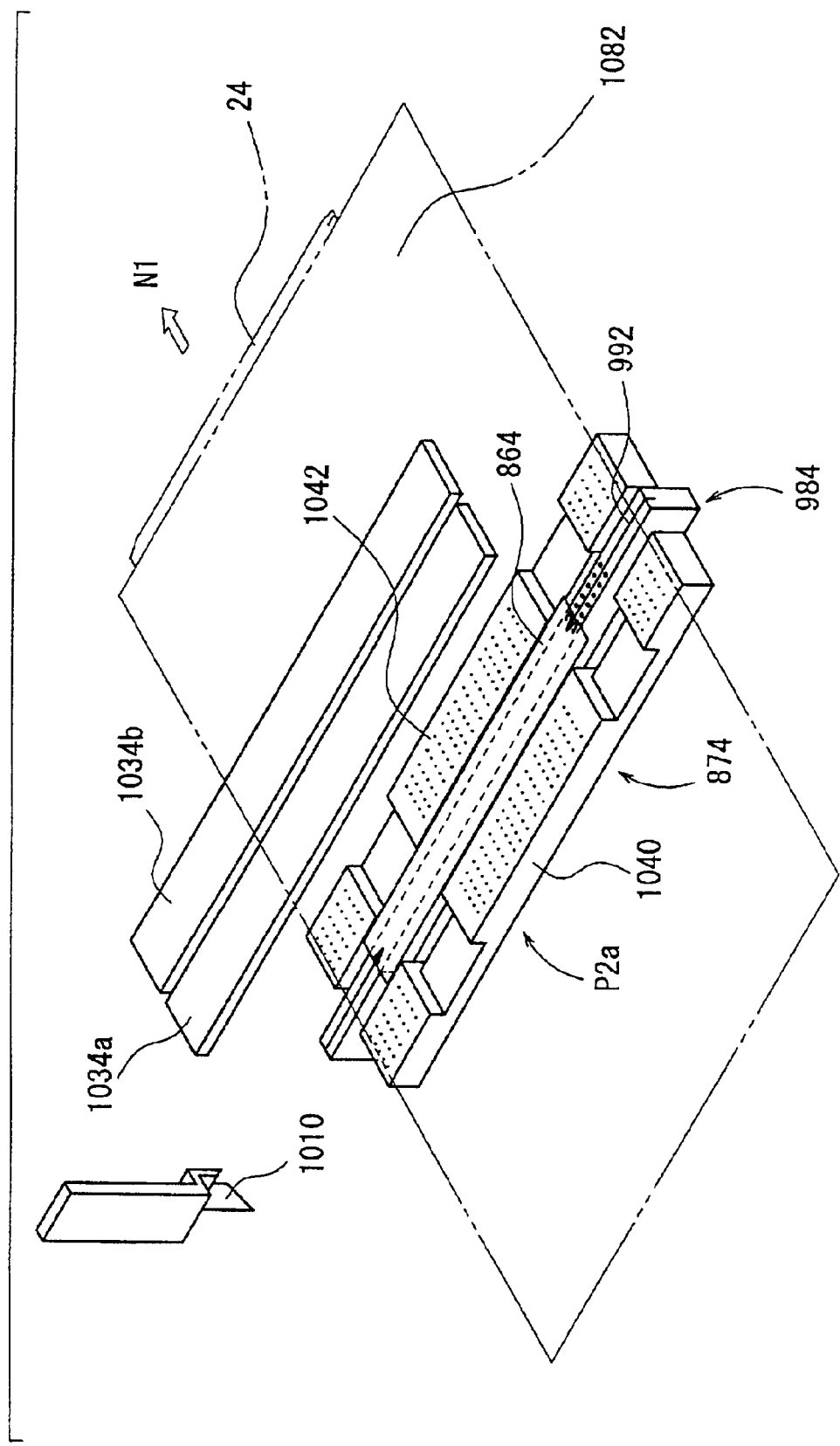
FIG. 75 is a perspective view showing a joined region.

The skirt member suction box 984 which engages the movable base 982 is thus moved from the cutting region P1a to the joining region P2a while being guided by the guide member 986 (see FIG. 75).

In the light-shielding sheet supply 1080 in the leader feeding station ST14, as shown in FIGS. 31 and 32, the rolled strip-like light-shielding sheet 1082 is loaded as it is supported on the support block 1088 of the carriage 1084. The movable arms 1102a, 1102b which are spaced from each other are displaced toward each other by the cylinders 1106, 1108. Therefore, the drive shaft 1116 and the driven shaft 1118 on the movable arms 1102a, 1102b are fitted into the opposite ends of the core 1086 of the rolled strip-like light-shielding sheet 1082.

When the lifting and lowering cylinder 1094 is actuated to move the rod 1096 upwardly, the support plate 1092 is elevated along the vertical surfaces of the walls 1090 by the joint 1098. The rolled strip-like light-shielding sheet 1082 is now lifted off the carriage 1084 by the movable arms 1102a, 1102b mounted on the support plate 1092, with the opposite ends of the core 1086 being supported by the drive shaft 1116 and the driven shaft 1118. The motor 1110 is energized to cause the chain and sprocket mechanism 1114 connected to the rotatable shaft 1112 to rotate the drive shaft 1116, unwinding the rolled strip-like light-shielding sheet 1082. The unwound strip-like light-shielding sheet 1082 is fed to the joining region P2a by the guide rollers 1120.

In the joining region P2a, as shown in FIG. 75, the strip-like light-shielding sheet 1082 is attracted to the first and second sheet member suction boxes 1040, 1042 of the sheet member spacing mechanism 874, and the skirt member suction box 984 with the strip-like skirt member 864 attracted thereto is disposed between the first and second sheet member suction boxes 1040, 1042.

Figure 76:
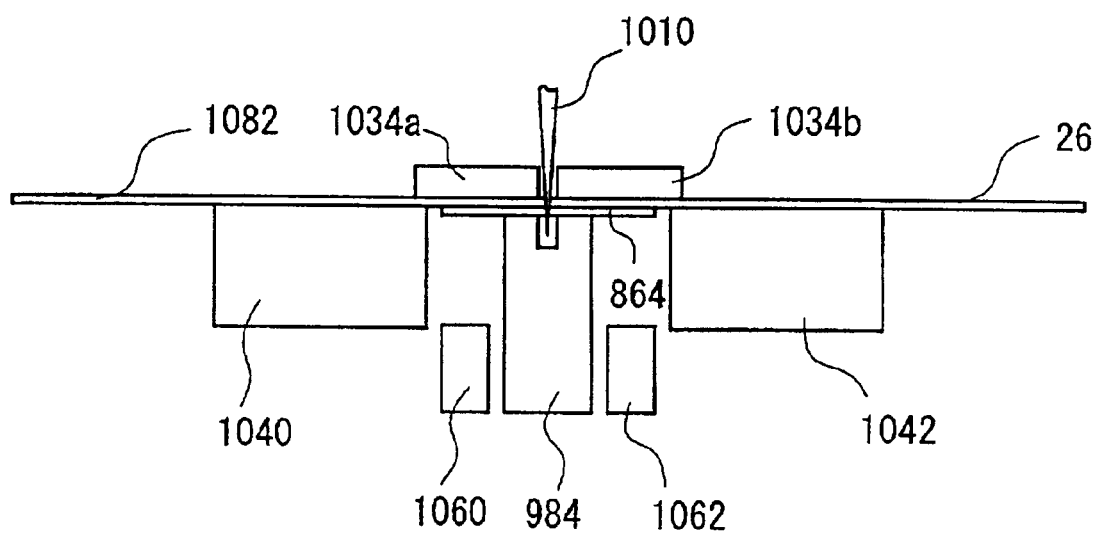
FIG. 76 is a view showing the manner in which the strip-like skirt member and a light-shielding sheet are cut off.

Then, as shown in FIG. 28, the lifting and lowering cylinder 1024 of the sheet member holding mechanism 1020 is actuated to lower the vertically movable base 1028 in unison with the rod 1026. The presser plates 1034a, 1034b mounted on the vertically movable base 1028 by the attachment plates 1032a, 1032b press and hold the strip-like skirt member 864 against the transversely opposite edges of the skirt member suction box 984 (see FIG. 76).

Then, as shown in FIG. 27, the cylinder 1008 of the cutting mechanism 872 is actuated to lower the cutter blade 1010 to a cutting position. The rodless cylinder 1002 is actuated to move the cutter blade 1010 in unison with the movable base 1004 in the direction indicated by the arrow K1. The cutter blade 1010 is guided by the slit 992 defined in the upper surface of the skirt member suction box 984 to move in the direction indicated by the arrow K1, cutting off the strip-like light-shielding sheet 1082 and the strip-like skirt member 864 together.

Figure 77:
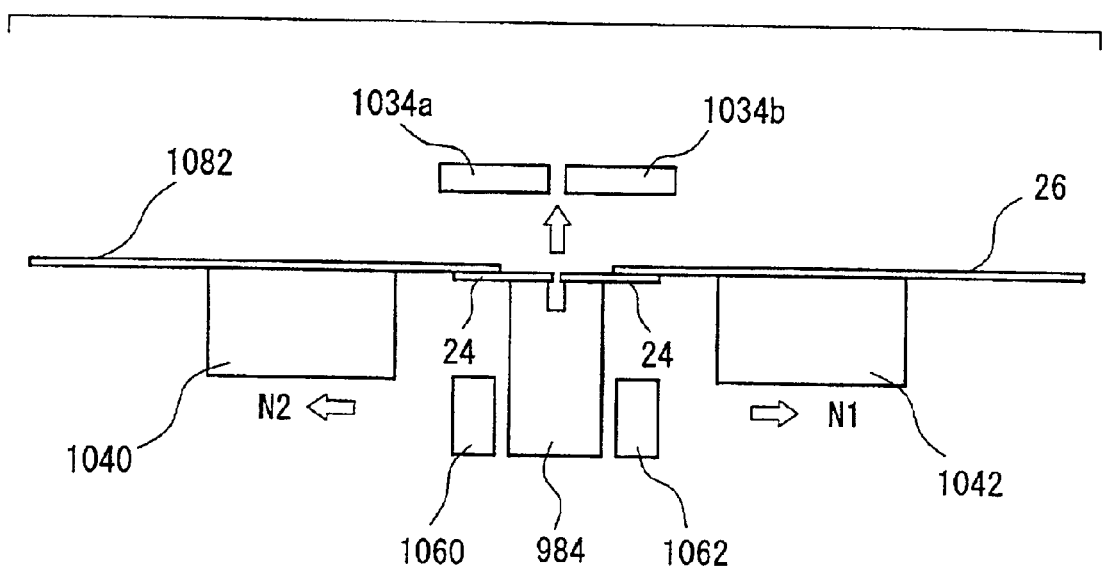
FIG. 77 is a view showing the manner in which cut ends of the light-shielding sheet are spaced from each other.

When the cutting process performed by the cutting mechanism 872 is finished, the lifting and lowering cylinder 1024 of the sheet member holding mechanism 1020 is actuated to lift the presser plates 1034a, 1034b in unison with the vertically movable base 1028. Therefore, after the strip-like light-shielding sheet 1082 is released from the presser plates 1034a, 1034b, the first and second sheet member suction boxes 1040, 1042 are moved away from each other (see FIG. 77). Specifically, as shown in FIG. 29, the first cylinder 1054 of the moving unit 1044 is actuated to move the rod 1054a toward the first cylinder 1054, moving the first sheet member suction box 1040 coupled to the rod 1054a in the direction indicated by the arrow N2 while being guided by the linear guides 1052a, 1052b.

The second cylinder 1056 is actuated to move the second sheet member suction box 1042 coupled to the rod 1056a in the direction indicated by the arrow N1 while being guided by the linear guides 1052a, 1052b. The first and second sheet member suction boxes 1040, 1042 are displaced away from each other, moving the cut ends of the strip-like light-shielding sheet 1082, i.e., the light-shielding sheet 24, attracted thereto away from each other (see FIG. 77).

Then, as shown in FIG. 30, the lifting and lowering unit 1064 of the joining mechanism 876 is actuated. The lifting and lowering cylinders 1066, 1068 of the lifting and lowering unit 1064 are operated to lift the first and second heater blocks 1060, 1062 in unison with the vertically movable bases 1070, 1072. The lifting and lowering cylinder 1024 of the sheet member holding mechanism 1020 is actuated to lower the presser plates 1034a, 1034b in unison with the vertically movable base 1028.

Figure 78:
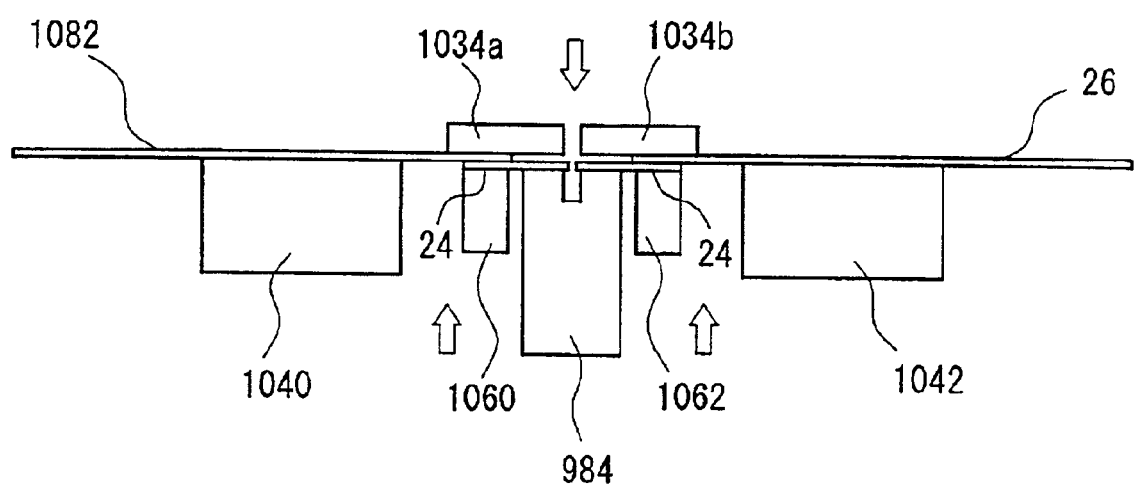
FIG. 78 is a view showing the manner in which a light-shielding shrink film is applied to the light-shielding sheet.

Consequently, as shown in FIG. 78, the cut edges of the light-shielding sheet 26 and the cut strip-like skirt member 864, i.e., the light-shielding shrink films 24, are sandwiched by the first and second heater blocks 1060, 1062 and the presser plates 1034a, 1034b. After elapse of a certain period of time, the light-shielding shrink films 24 are applied to the opposite edges of the light-shielding sheet 26.

In the above joining process, the cutter blade 1010 of the cutting mechanism 872 is placed in an upper position by the cylinder 1008, and thereafter moved in unison with the movable base 1004 in the direction indicated by the arrow K2 into a cutting start position.

The cut strip-like skirt member 864 whose width is set to twice the width of the light-shielding shrink films 24 is delivered. After a lozenge-shaped opening 922 and tear-off perforations 924a, 924b are formed in the strip-like skirt member 864 by the working mechanism 866, the strip-like skirt member 864 is cut off transversely by the skirt member cutting mechanism 868. In the joining region P2a, the strip-like light-shielding sheet 1082 is superposed on the strip-like skirt member 864, and they are cut off together by the cutting mechanism 872. Then, the cut ends of the strip-like light-shielding sheet 1082 are spaced a distance from each other by the sheet member spacing mechanism 874, after which the transversely split strip-like skirt member 864, i.e., the light-shielding shrink films 24, are applied to the cut ends by the joining mechanism 876.

According to the above process, the amount of scrap produced is much smaller than the conventional process in which light-shielding shrink films 24 are blanked from a sheet, resulting in an increased yield and hence an economical procedure.

Since the strip-like skirt member 864 is cut off to a certain length and then transversely split into light-shielding shrink films 24, it is not necessary to stack light-shielding shrink films 24 unlike the conventional process in which light-shielding shrink films 24 are blanked from a sheet. Accordingly, light-shielding shrink films 24 are prevented from sticking together, and can reliably be applied, one by one, to the end of the light-shielding sheet 26, allowing the light-shielding leader 22 to be assembled efficiently and quickly.

In the joining region P2a, the strip-like skirt member 864 cut off to a certain length and the strip-like light-shielding sheet 1082 are superposed one on the other and cut off together by the cutting mechanism 872, after which only the cut ends of the strip-like light-shielding sheet 1082 are spaced a distance from each other. Therefore, the strip-like skirt member 864, i.e., the light-shielding shrink films 24, can be positioned highly accurately and efficiently with respect to the end faces of the cut strip-like light-shielding sheet 1082, i.e., the light-shielding sheet 26, thus producing a high-quality light-shielding leader 22.

The light-shielding shrink films 24 may have a certain orientation (directivity) due to its constituent materials. When the light-shielding leader 22 is pulled to open the light-shielded photosensitive roll 30 as a packaged product, the light-shielding shrink films 24 may be torn apart from the perforations 924a, 924b in different fashions on left and right portions of the light-shielded photosensitive roll 30. For example, one of the light-shielding shrink films 24 may be torn linearly, whereas the other light-shielding shrink film 24 may be torn in a wavy shape.

Different working devices 4400, 4420, 4440 capable of equalizing the orientations of the light-shielding shrink films 24 applied to the opposite sides of the light-shielding sheet 26 will be described below. Those parts of the working devices 4400, 4420, 4440 which are identical to those of the working device 860 are denoted by identical reference characters, and will not be described below.

Figure 79:
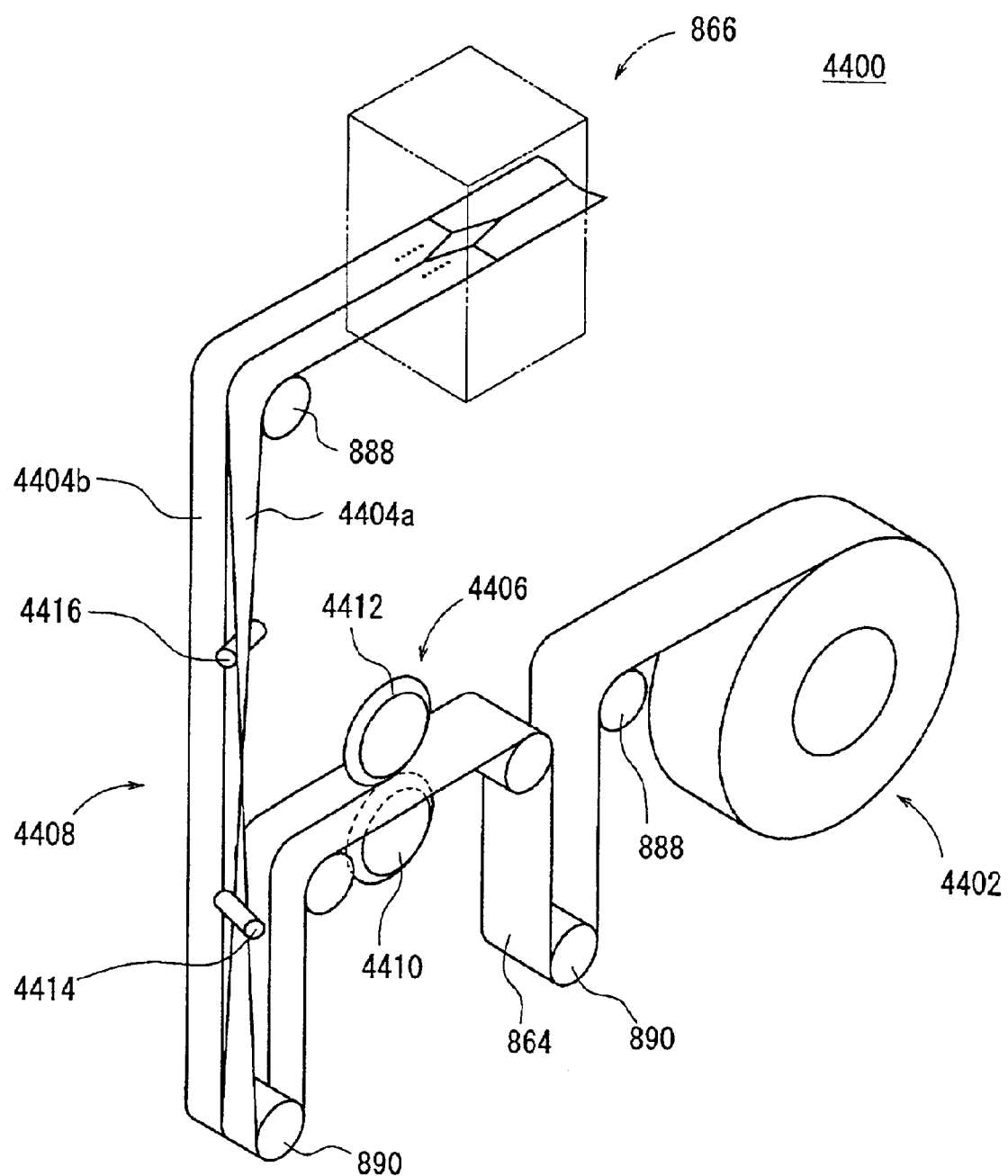
FIG. 79 is a perspective view of another working device.

As shown in FIG. 79, the working device 4400 has a slitter 4406 for longitudinally slitting the strip-like skirt member 864 delivered from a skirt member supply 4402 into two strip-like skirt members 4404a, 4404b, and a reversing mechanism 4408 for reversing, i.e., turning upside down, the strip-like skirt member 4404a.

The slitter 4406 comprises a disk-shaped lower blade 4410 and a disk-shaped upper blade 4412 which are rotatable about their own axes. The reversing mechanism 4408 has at least two guide bars 4414, 4416 for engaging the strip-like skirt member 4404a to forcibly curve or bend the strip-like skirt member 4404a.

The working device 4400 thus constructed operates as follows: The strip-like skirt member 864 delivered from the skirt member supply 4402 is longitudinally slit by the lower and upper blades 4410, 4412 as they rotate, producing two strip-like skirt members 4404a, 4404b. Then, the strip-like skirt member 4404a is guided by the guide bars 4414, 4416 and reversed, i.e., turned upside down, thereby and then guided to travel parallel to the strip-like skirt member 4404b. Then, the two strip-like skirt members 4404a, 4404b are blanked together by the working mechanism strip-like skirt members 4404a, 4404b are.

Since the strip-like skirt member 4404a is reversed, i.e., turned upside down, by the reversing mechanism 4408 and then guided to travel parallel to the strip-like skirt member 4404b, the orientations of the strip-like skirt members 4404a, 4404b are equalized to each other. Consequently, when the packaged product is opened, the strip-like skirt members 4404a, 4404b are torn in the same fashion. Furthermore, because the two strip-like skirt members 4404a, 4404b are brought parallel to each other and then blanked together, the strip-like skirt members 4404a, 4404b are positioned easily and highly accurately with respect to each other.

Figure 80:
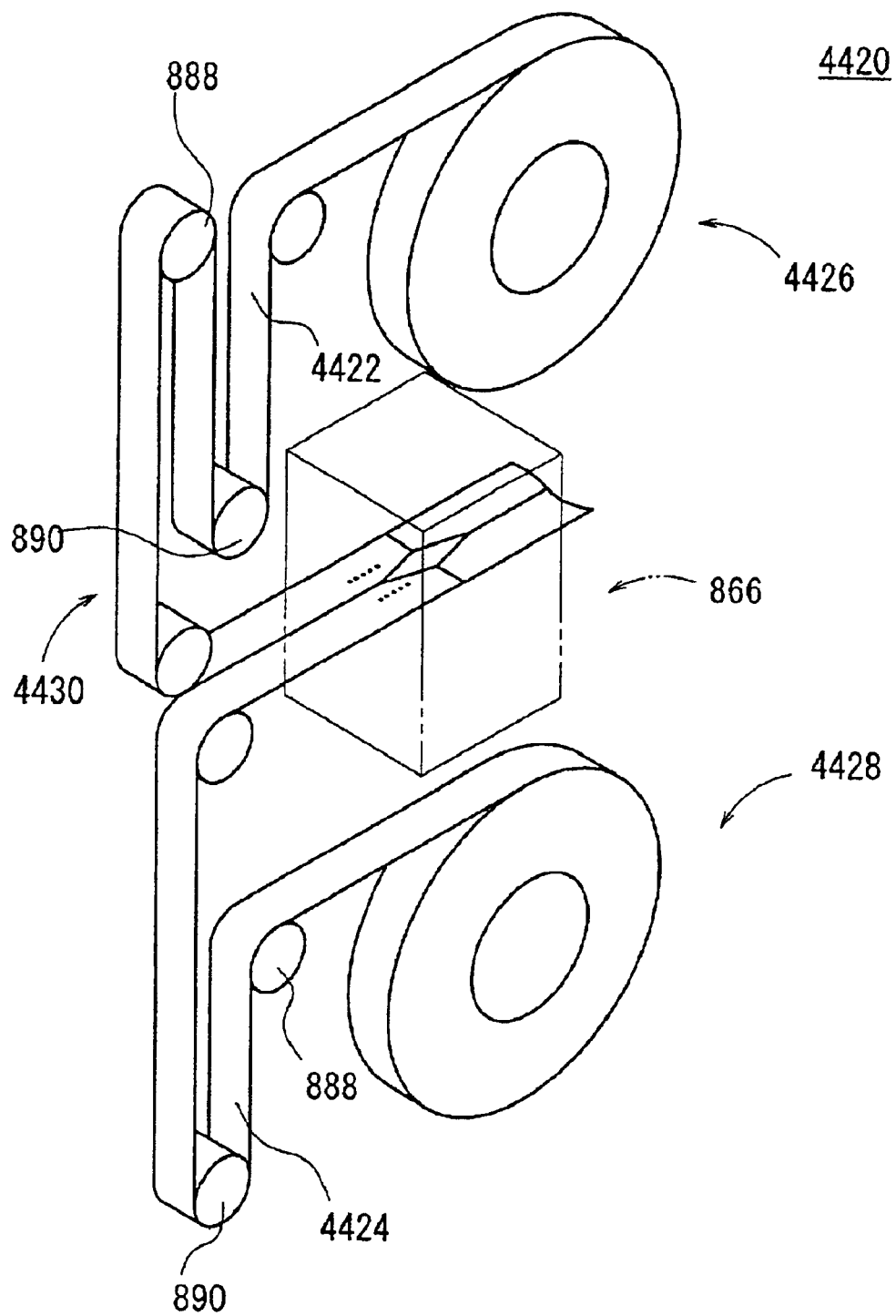
FIG. 80 is a perspective view of still another working device.

As shown in FIG. 80, the working device 4420 comprises first and second skirt member supplies 4426, 4428 for delivering two strip-like skirt members 4422, 4424, and a reversing mechanism 4430 for reversing, i.e., turning upside down, the strip-like skirt member 4422 delivered from the first skirt member supply 4426.

The reversing mechanism 4430 comprises a plurality of guide rollers 888. The strip-like skirt members 4422, 4424 are supplied from respective rolls in the first and second skirt member supplies 4426, 4428. When the strip-like skirt members 4422, 4424 are brought parallel to each other, the strip-like skirt member 4422 has its lower surface contiguous to the outer surface of its roll, and the strip-like skirt member 4424 has its upper surface contiguous to the inner surface of its roll.

The surfaces of the strip-like skirt members 4422, 4424 are thus made opposite to each other by the simple arrangement, and their orientations are easily equalized to each other. Since the strip-like skirt members 4422, 4424 are worked on together by the working mechanism 866, the strip-like skirt members 4422, 4424 are positioned with high accuracy.

Figure 81:
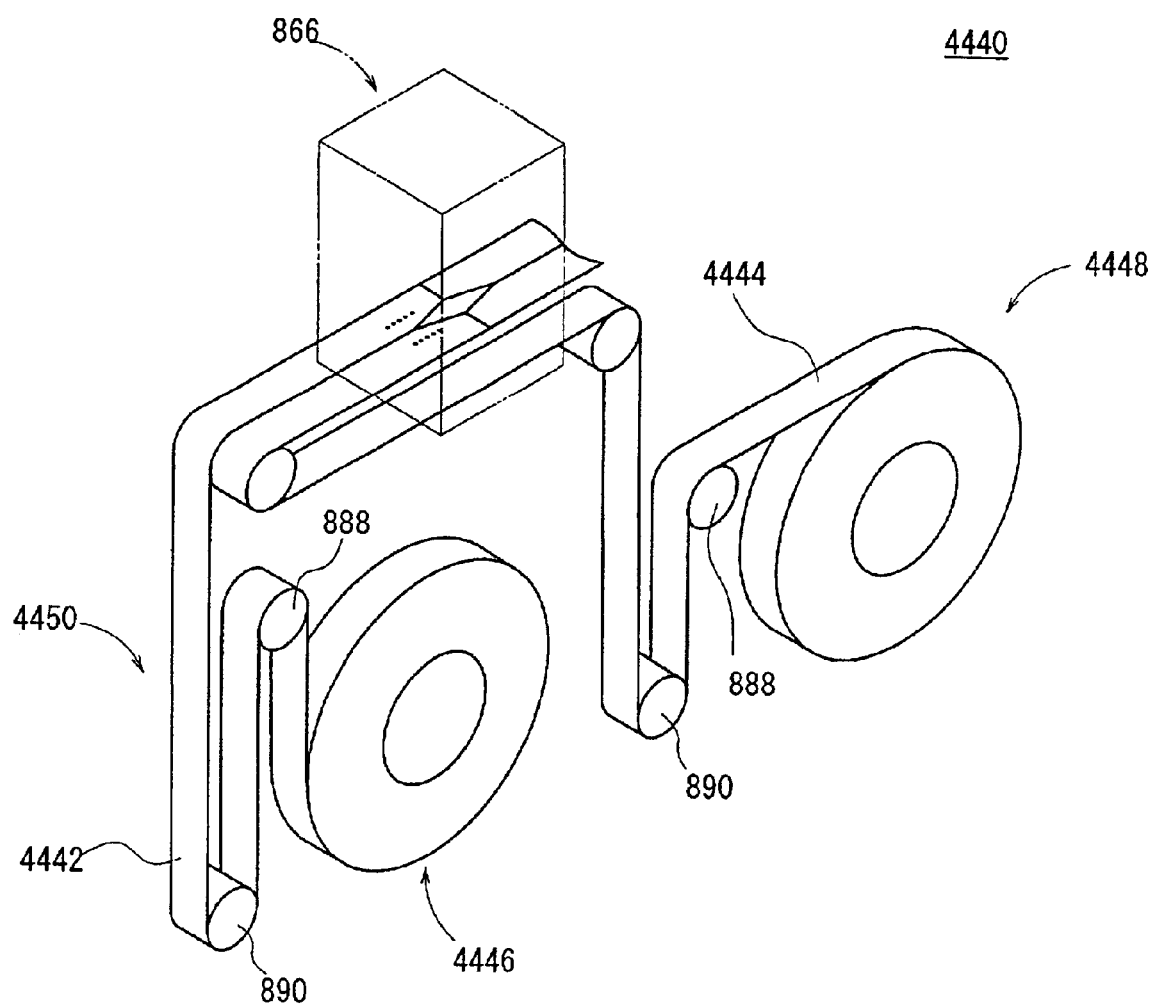
FIG. 81 is a perspective view of yet another working device.

As shown in FIG. 81, the working device 4440 comprises first and second skirt member supplies 4446, 4448 for delivering two strip-like skirt members 4442, 4444, and a reversing mechanism 4450 for reversing, i.e., turning upside down, the strip-like skirt member 4442 delivered from the first skirt member supply 4446.

The reversing mechanism 4450 is characterized by the direction in which the strip-like skirt member 4442 is paid out and the layout of guide rollers 888. The reversing mechanism 4450 delivers the strip-like skirt member 4442, with its upper surface contiguous to the outer surface of its roll, to the working mechanism 866. The strip-like skirt member 4444 is delivered, with its upper surface contiguous to the inner surface of its roll, to the working mechanism 866.

Therefore, the strip-like skirt members 4442, 4444 are delivered to the working mechanism 866 while being parallel to each other with its surfaces being opposite to each other. The strip-like skirt members 4442, 4444 thus have their orientations equalized to each other, and are positioned highly accurately with respect to each other.

As shown in FIG. 5, the light-shielding shrink films 24 are applied to transversely opposite edges of the light-shielding sheet 26, and the end fastening tapes 28 are applied to the leading end of the light-shielding sheet 26, thus producing the light-shielding leader 22.

As shown in FIGS. 33 and 34, in the end tape supplying and applying mechanism 878, the separable sheet 1178 with an array of end fastening tapes 28 disposed thereon is paid out upon rotation of the tape payout shaft 1182, and only the separable sheet 1178 is wound around the separable sheet takeup shaft 1184 by the guide roller 1186 and the separable sheet bending mechanism 1174. Between the guide rollers 1186, the side edge 1178a of the strip-like separable sheet 1178 is bent upwardly by the first and second feed guides 1188, 1190 of the separable sheet bending mechanism 1174.

As shown in FIGS. 35 and 36, therefore, the adhesive-free areas 1180 of the end fastening tapes 28 are exposed out from the side edge 1178a of the strip-like separable sheet 1178. When the adhesive-free areas 1180 of the end fastening tapes 28 are detected by the end tape detecting means 1246 (see FIG. 33), the separable sheet payout mechanism 1172 is inactivated, stopping the feeding of the separable sheet 1178.

Then, as shown in FIG. 37, the first and second lifting and lowering cylinders 1222, 1224 are actuated to move the rods 1222a, 1224a upwardly. The first and second vertically movable bases 1226, 1228 fixed to the rods 1222a, 1224a are lifted, and the first and second suction heads 1192, 1194 are also lifted in unison with the first and second vertically movable bases 1226, 1228. The suction pads 1238, 1240 mounted on the first and second suction heads 1192, 1194 are brought into abutment against the end fastening tapes 28 applied to the separable sheet 1178, and attract the end fastening tapes 28.

Figure 82:
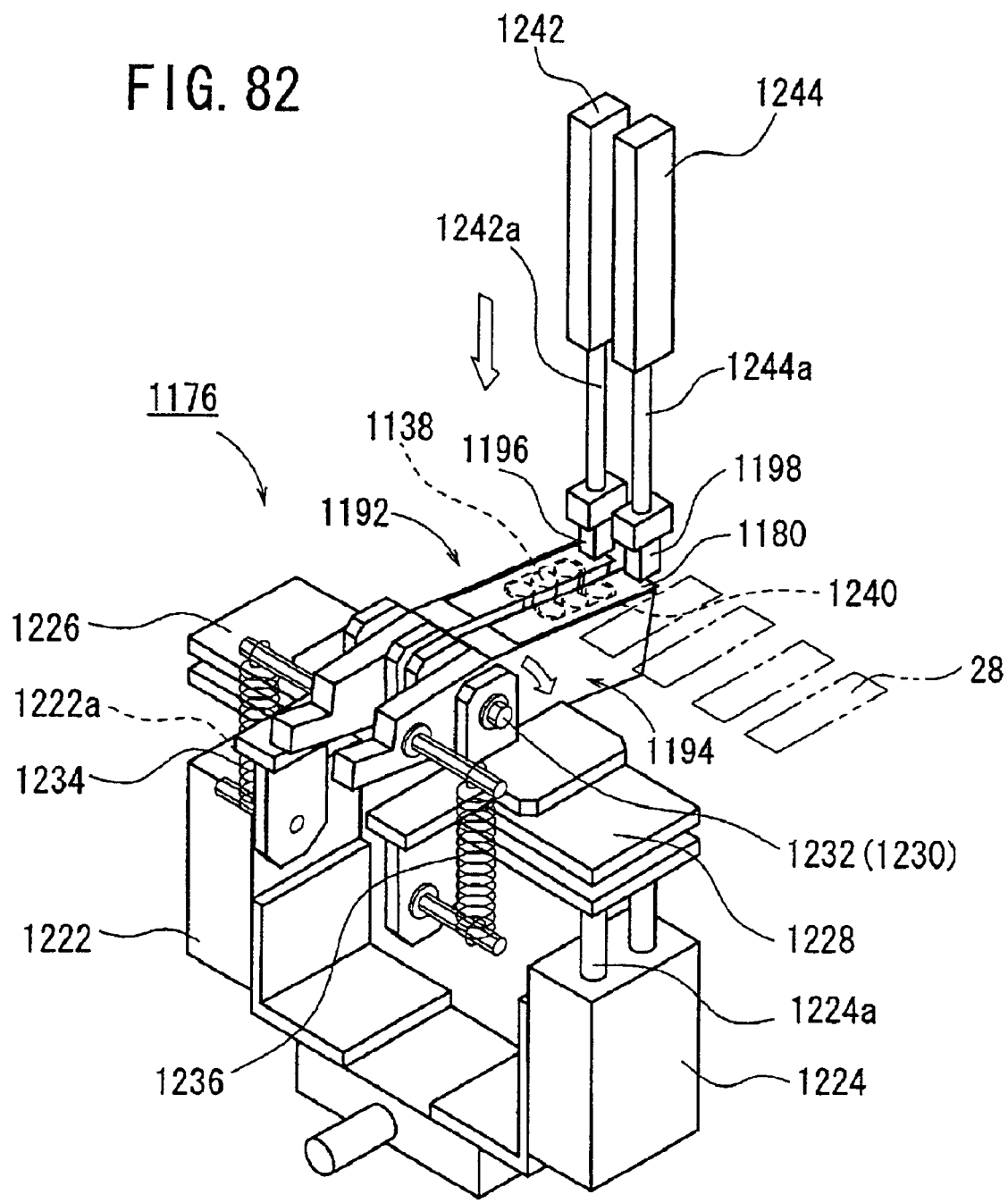
FIG. 82 is a perspective view showing the manner in which first and second pressers are lowered to press adhesive-free areas of end fastening tapes.

As shown in FIG. 82, the first and second cylinders 1242, 1244 are actuated to displace the rods 1242a, 1244a vertically downwardly. The first and second pressing members 1196, 1198 fixed to the rods 1242a, 1244a press the adhesive-free areas 1180 of two end fastening tapes 28 projecting outwardly from the side edge 1178a of the separable sheet 1178 against the first and second suction heads 1192, 1194.

The first and second suction heads 1192, 1194 which are swingably supported on the first and second vertically movable bases 1226, 1228 by the pivot shafts 1230, 1232 have their distal ends pushed vertically downwardly by the first and second pressing members 1196, 1198. The first and second suction heads 1192, 1194 are swung downwardly against the resiliency of the springs 1234, 1236, separating the end fastening tapes 28 whose adhesive-free areas 1180 are sandwiched between the first and second suction heads 1192, 1194 and the first and second pressing members 1196, 1198, from the separable sheet 1178. The separated end fastening tapes 28 are then attracted to the first and second suction heads 1192, 1194.

Figure 83:
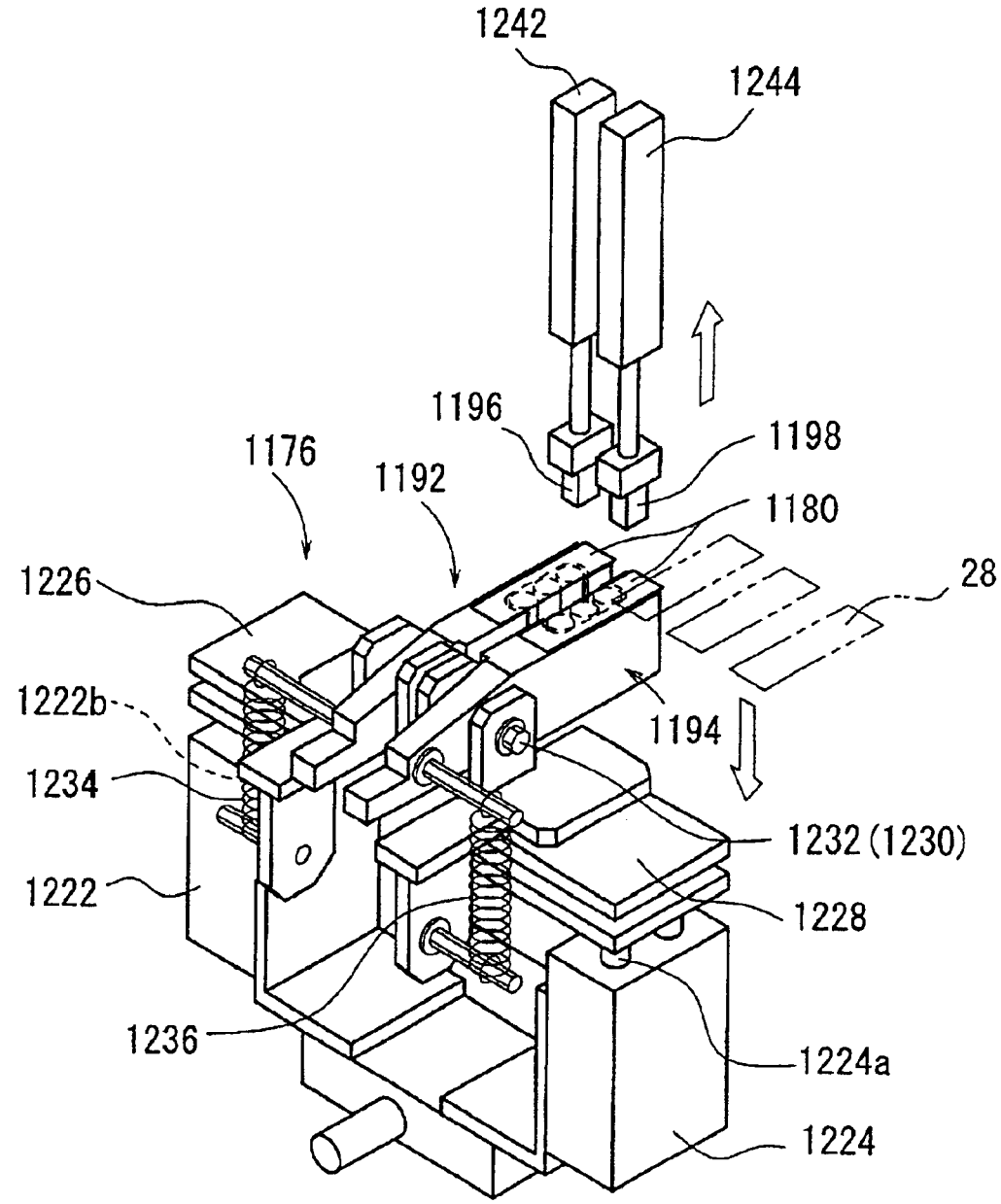
FIG. 83 is a perspective view showing the manner in which the end fastening tapes are held under suction by the first and second suction heads and thereafter retracted.

Then, as shown in FIG. 83, the first and second lifting and lowering cylinders 1222, 1224 are actuated to lower the first and second suction heads 1192, 1194 with the end fastening tapes 28 attracted thereto, and the first and second cylinders 1242, 1244 are actuated to lift the first and second pressing members 1196, 1198. The first and second suction heads 1192, 1194 with the end fastening tapes 28 attracted thereto are delivered to a position to apply end tapes to the light-shielding sheet 26.

Figure 84:
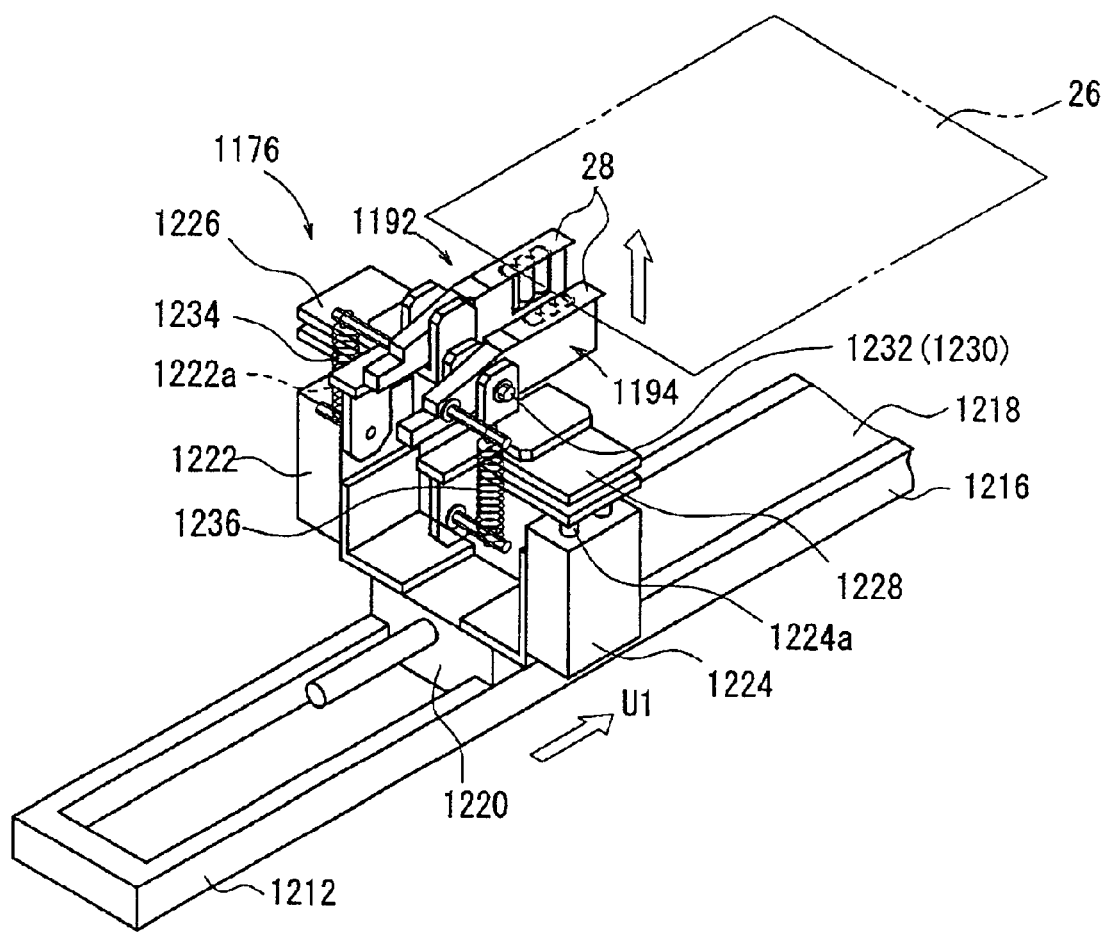
FIG. 84 is a perspective view showing the manner in which the end fastening tapes held by the first and second suction heads are fed to a light-shielding sheet.

Specifically, as shown in FIG. 33, the servomotor 1202 of the moving means 1200 is energized to rotate the ball screw 1206 about its own axis to move the movable base 1212 along the guide rails 1210a, 1210b in the direction indicated by the arrow S. Then, as shown in FIG. 84, the slide member 1220 moves along the guide member 1216 on the movable base 1212 in the direction indicated by the arrow U1, placing the first suction head 1192, for example, in a position below the position to apply end tapes to the light-shielding sheet 26.

Then, the first and second lifting and lowering cylinder 1222 is actuated to lift the first suction head 1192 in unison with the first vertically movable base 1226, pressing the end fastening tapes 28 attracted to the first suction head 1192 against the light-shielding sheet 26. The first suction head 1192 then release the end fastening tapes 28, and is lowered, leaving the fastening tapes 28 applied to the light-shielding sheet 26.

The separable sheet 1178 with the end fastening tapes 28 applied thereto is paid out by the separable sheet payout mechanism 1172, and the separable sheet bending mechanism 1174 is operated to forcibly bend the side edge 1178a of the separable sheet 1178 upwardly, exposing the adhesive-free areas 1180 of the end fastening tapes 28 out of the side edge 1178a.

Then, the first and second lifting and lowering cylinders 1222, 1224 are actuated to lift the first and second suction heads 1192, 1194 to attract the end fastening tapes 28. The first and second cylinders 1242, 1244 are actuated to cause the first and second pressing members 1196, 1198 to press the exposed adhesive-free areas 1180 against the first and second suction heads 1192, 1194, separating the end fastening tapes 28 from the separable sheet 1178.

Since the adhesive-free areas 1180 of the end fastening tapes 28 which are exposed out from the side edge 1178a of the strip-like separable sheet 1178 are directly pressed against the first and second suction heads 1192, 1194 by the first and second pressing members 1196, 1198, the end fastening tapes 28 can reliably be removed from the separable sheet 1178. Therefore, the end fastening tapes 28 can reliably be attracted, one by one, to the first and second suction heads 1192, 1194, and can reliably and efficiently be supplied to the leading end of the light-shielding sheet 26.

The adhesive-free areas 1180 of the end fastening tapes 28 which are exposed out from the side edge 1178a of the strip-like separable sheet 1178 whose side edge 1178a is bent by the separable sheet bending mechanism 1174 are automatically detected by the end tape detecting means 1246. Therefore, the end fastening tapes 28 can reliably be held on the first and second suction heads 1192, 1194, and hence can efficiently be supplied without fail.

The separable sheet bending mechanism 1174 has the first and second feed guides 1188, 1190 disposed one on each side of the separable sheet 1178. Consequently, the separable sheet 1178 can reliably be bent with the simple arrangement. The end fastening tapes 28 can efficiently be removed by exposing the adhesive-free areas 1180 of the end fastening tapes 28.

The end tape removing mechanism 1176 has the first and second suction heads 1192, 1194 and the first and second pressing members 1196, 1198 which can be positioned in confronting relation to each other across the separable sheet 1178. When the first and second suction heads 1192, 1194 and the first and second pressing members 1196, 1198 sandwich the adhesive-free areas 1180 of the end fastening tapes 28 and also when the first and second suction heads 1192, 1194 attract the end fastening tapes 28, the end fastening tapes 28 can reliably and quickly be separated from the separable sheet 1178. The end fastening tapes 28 can thus be easily supplied at a high speed.

The light-shielding leader 22 with the light-shielding shrink films 24 applied to the opposite side edges of the light-shielding sheet 26 is fed to the light-shielding leader winding station ST6 by the light-shielding leader feed mechanism 1302.

Specifically, the first feed unit 1336 will be described below. As shown in FIGS. 39 and 40, the motor 1344 is energized to rotate the first ball screw 1340 about its own axis, causing the nut 1352 threaded over the first ball screw 1340 to move the first feed unit 1336 along the rails 1334*a*, 1334*b* in the direction indicated by the arrow N2. When the clamp means 1360*a*, 1360*b* of the first feed unit 1336 are positioned at the light-shielding leader 22 applied in the joining region P2*a*, the cylinders 1368*a*, 1368*b* are actuated to turn the swing fingers 1364*a*, 1364*b* about the pivot shafts 1366*a*, 1366*b* to lift their distal ends.

Therefore, when the first feed unit 1336 is moved to the light-shielding sheet 26 of the light-shielding leader 22, the opposite edges of the light-shielding sheet 26 are inserted between the fixed fingers 1362*a*, 1362*b* and the swing fingers 1364*a*, 1364*b* (see the two-dot-and-dash lines in FIG. 41). Then, the cylinders 1368*a*, 1368*b* are actuated to close the tip ends of the swing fingers 1364*a*, 1364*b* to cause the swing fingers 1364*a*, 1364*b* and the fixed fingers 1362*a*, 1362*b* to grip the opposite edges of the light-shielding sheet 26.

Figure 85:
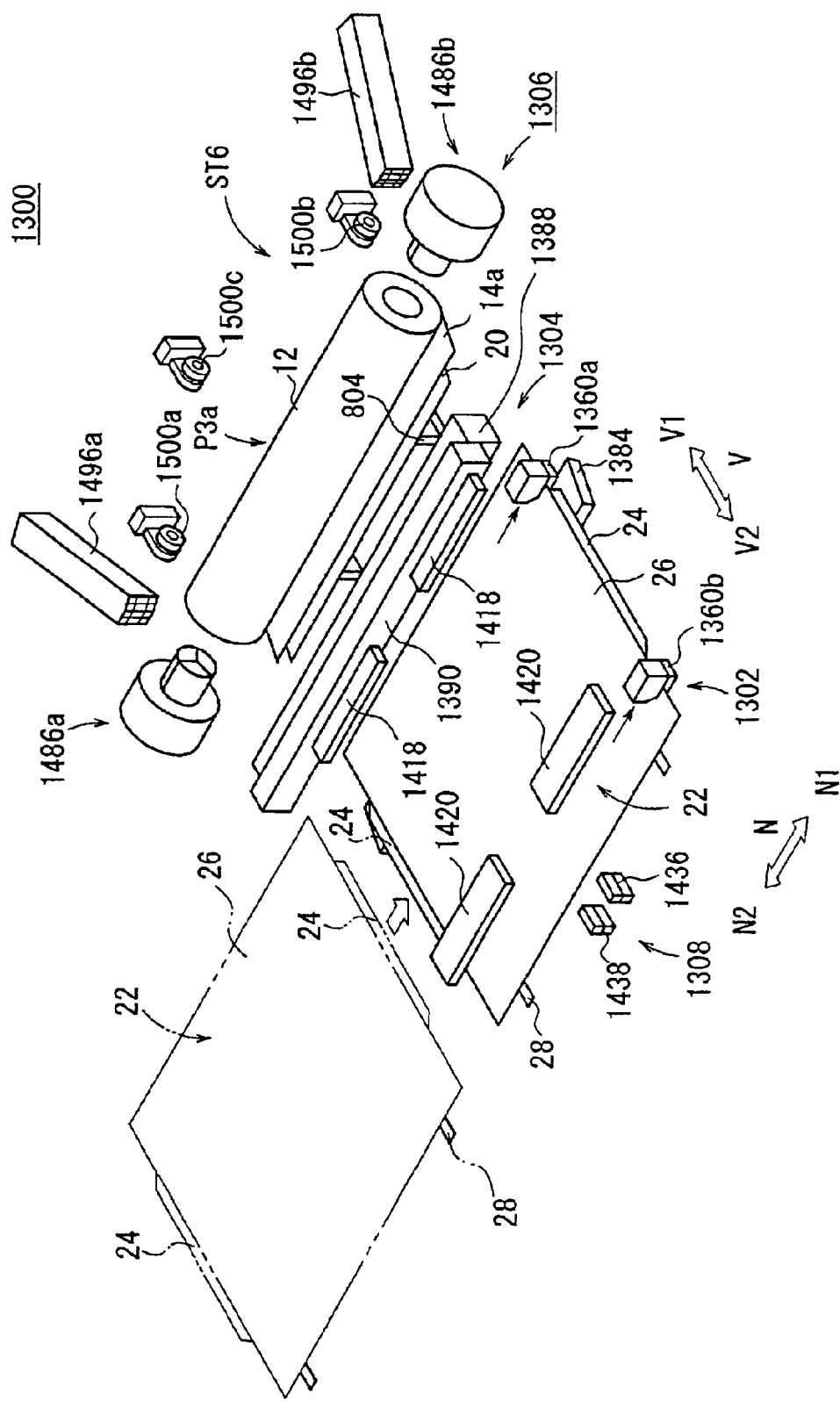
FIG. 85 is a perspective view showing the manner in which a light-shielding leader is placed in a winding position.

The motor 1344 is energized to rotate the first ball screw 1340 in the opposite direction, causing the nut 1352 to move the first feed unit 1336 in the direction indicated by the arrow N1. The light-shielding leader 22 gripped by the first clamp means 1360*a*, 1360*b* is fed in the direction indicated by the arrow N1 to the light-shielding leader winding station ST6 (see FIG. 85).

Figure 86:
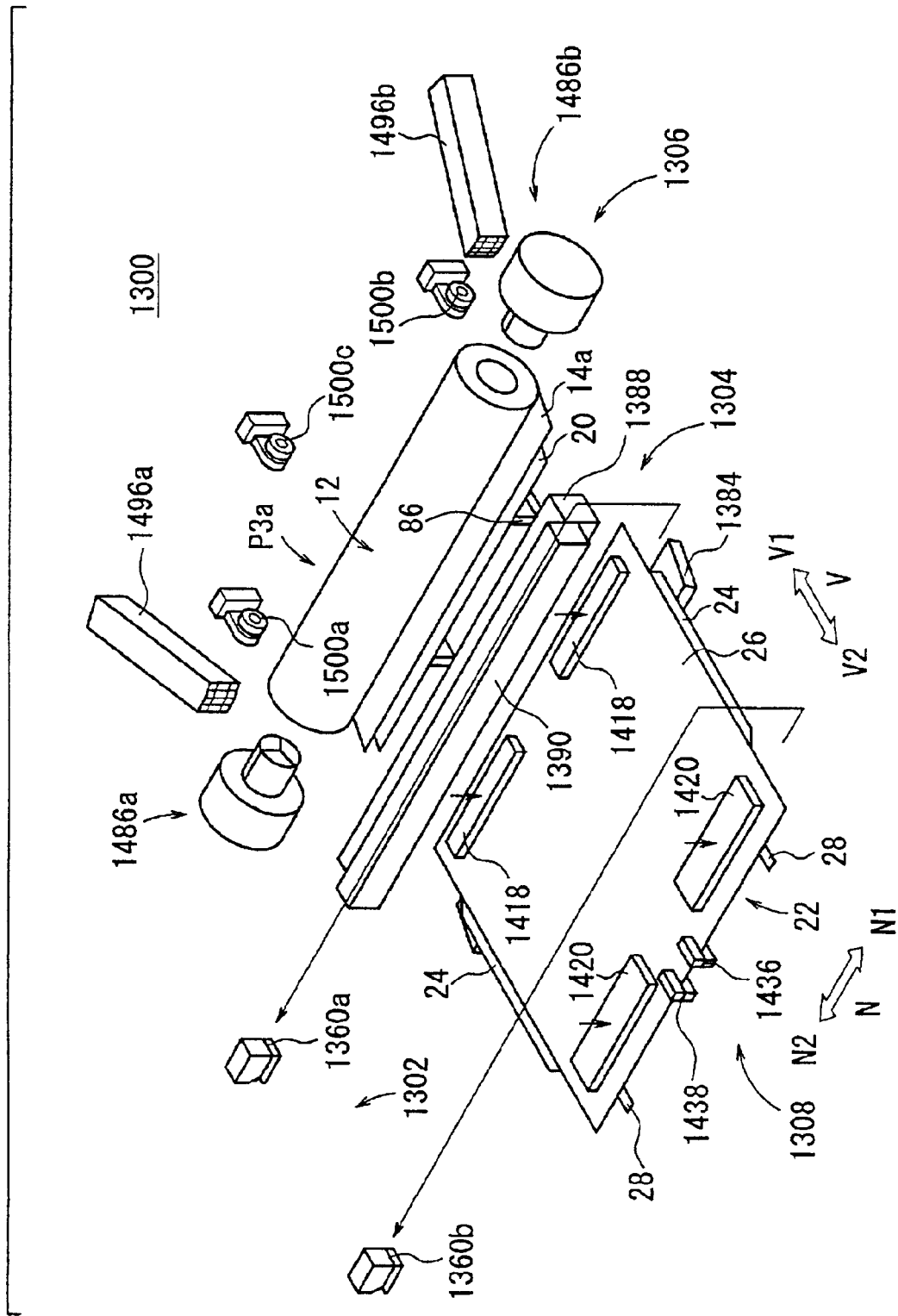
FIG. 86 is a perspective view showing the manner in which the light-shielding leader is held by a light-shielding leader holding mechanism.

In the light-shielding leader winding station ST6, the cylinders 1422, 1424 are actuated to lower the light-shielding leader pressers 1418, 1420 to press the opposite ends of the light-shielding leader 22 in the direction indicated by the arrow V against the support surface of the base 1380 (see FIG. 86). The rodless cylinder 1430 of the light-shielding leader holding mechanism 1308 is actuated to cause the movable base 1432 to move the air chucks 1436, 1438 in the direction indicated by the arrow VI.

The air chucks 1436, 1438 grip the winding terminal end of the light-shielding leader 22, and the clamp means 1360*a*, 1360*b* of the light-shielding leader feed mechanism 1302 release the edge of the light-shielding leader 22 in the direction indicated by the arrow N1. The clamp means 1360*a*, 1360*b* are lifted by the vertically movable tables 1358*a*, 1358*b*, and then moved in the direction indicated by the arrow N2 to the joining region P2*a* by the motor 1344.

In the winding position P3*a*, the light-shielding leader 22 is fed as described above, and the pallet lifting and lowering device 1440 is actuated. The cylinder 1442 is actuated to cause the vertically movable base 1444 to lift the pallet 86. When the photosensitive roll 12 is placed in the winding position by the pallet 86, the applying mechanism 1304 and the rotating mechanism 1306 are actuated.

In the applying mechanism 1304, as shown in FIGS. 42 and 43, the first cylinder 1392 of the actuator 1382 is actuated to move the movable base 1394 in the direction indicated by the arrow V1. The cam rollers 1406 mounted on the opposite ends of the cam plate 1404 engage the cam surfaces 1400 in the lower surfaces of the arms 1398. The arms 1398 are now turned vertically upwardly by the cam surfaces 1400 and the cam rollers 1406.

Figure 87:
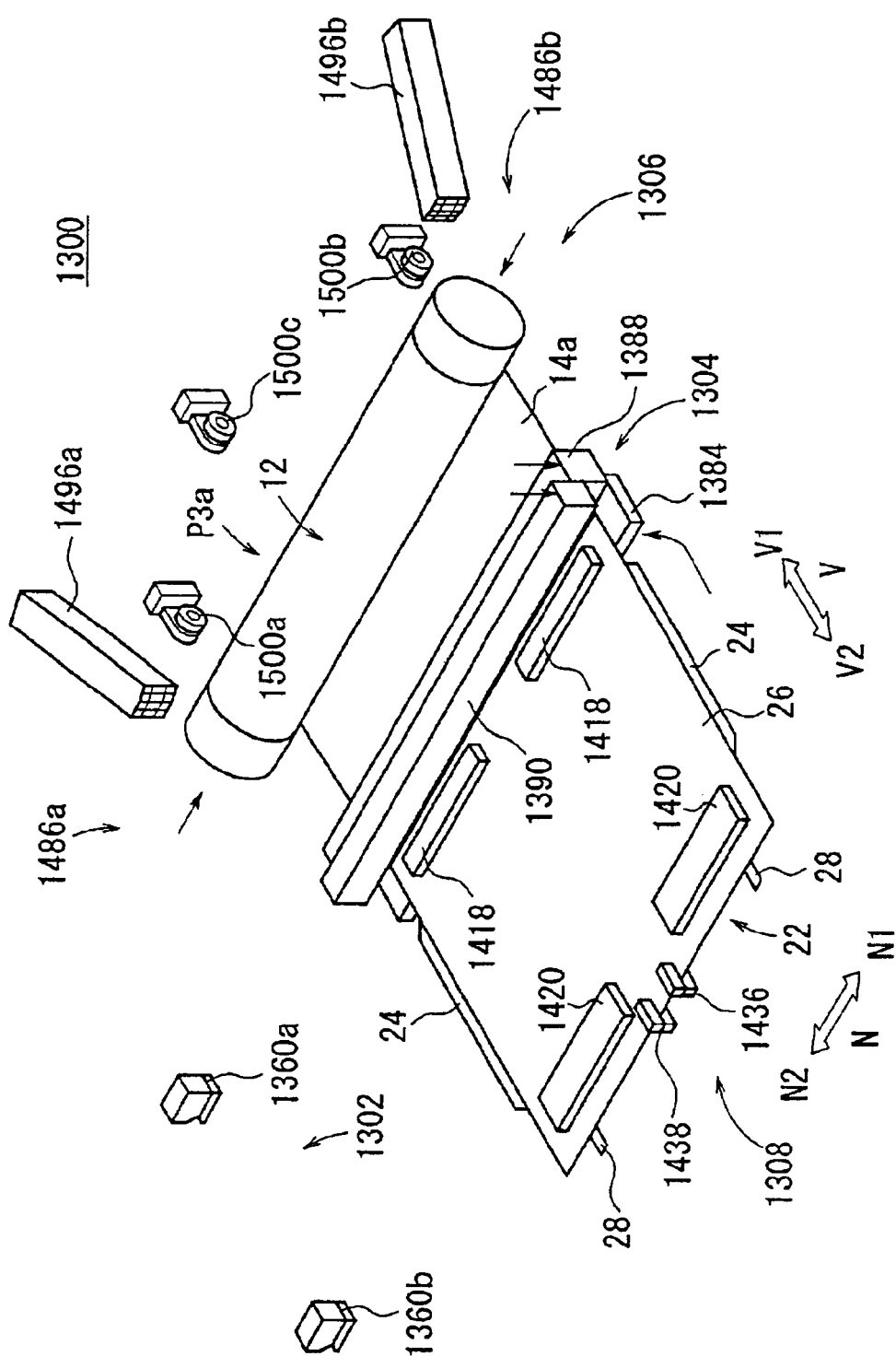
FIG. 87 is a perspective view showing the manner in which the applying mechanism operates.

The movable bearing base 1384 fixed to the arms 1398 projects upwardly from the lower surface of the base 1380 and is positioned between the end of the base 1380 and the photosensitive roll 12 (see FIG. 87). The end 14*a* of the photosensitive sheet 14 and the joint tape 20 are placed on the movable bearing base 1384.

Figure 88:
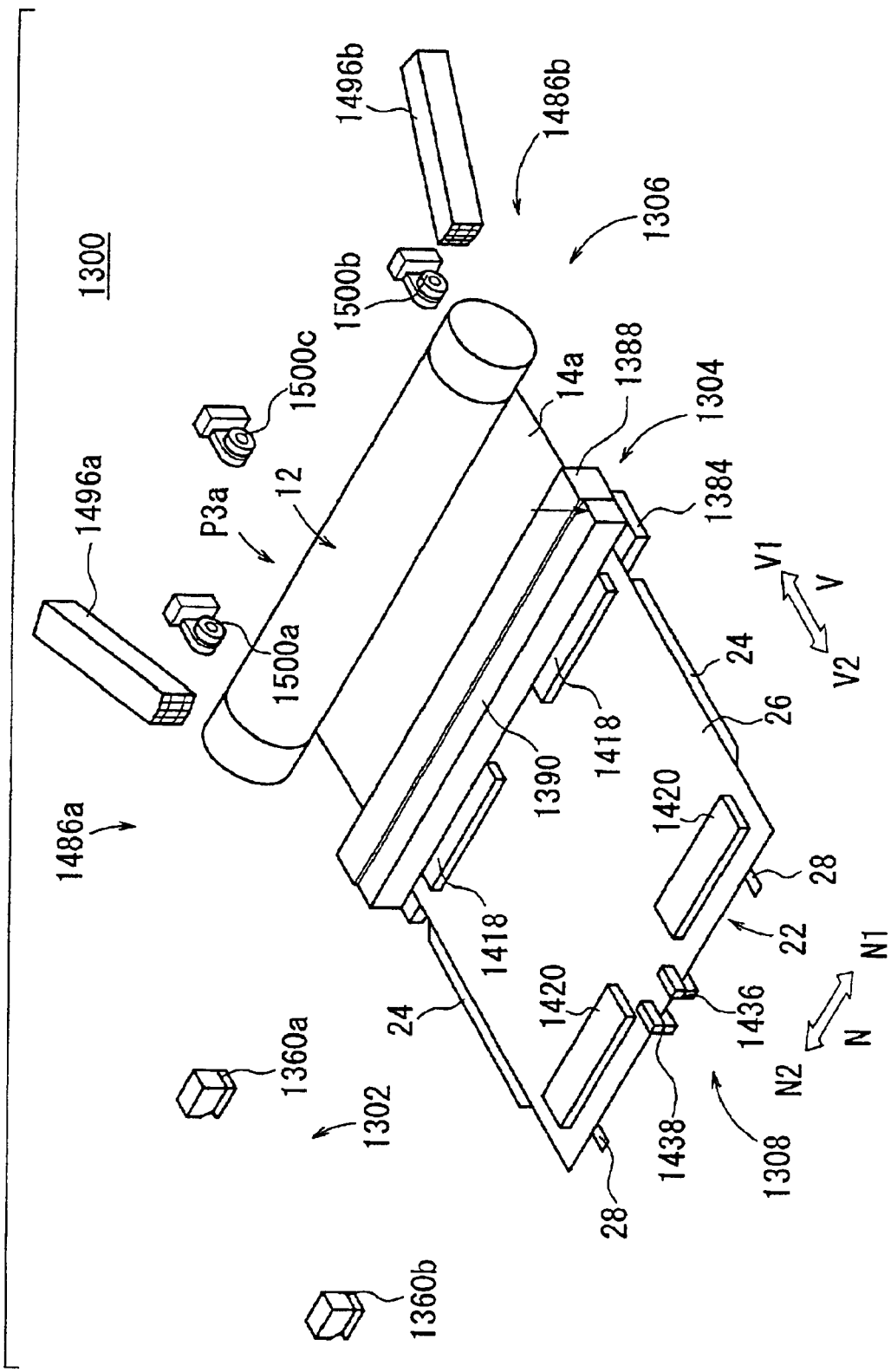
FIG. 88 is a perspective view showing the manner in which the applying mechanism operates.

The lifting and lowering cylinder 1386 is actuated to lower the attachment plate 1408 in unison with the rod 1386*a*. The first presser member 1388 presses the end 14*a* of the photosensitive sheet 14 against the movable bearing base 1384, and then the cylinder 1414 is actuated to enable the second presser member 1390 to apply the joint tape 20 to the end of the light-shielding leader 22 (see FIG. 88).

Figure 89:
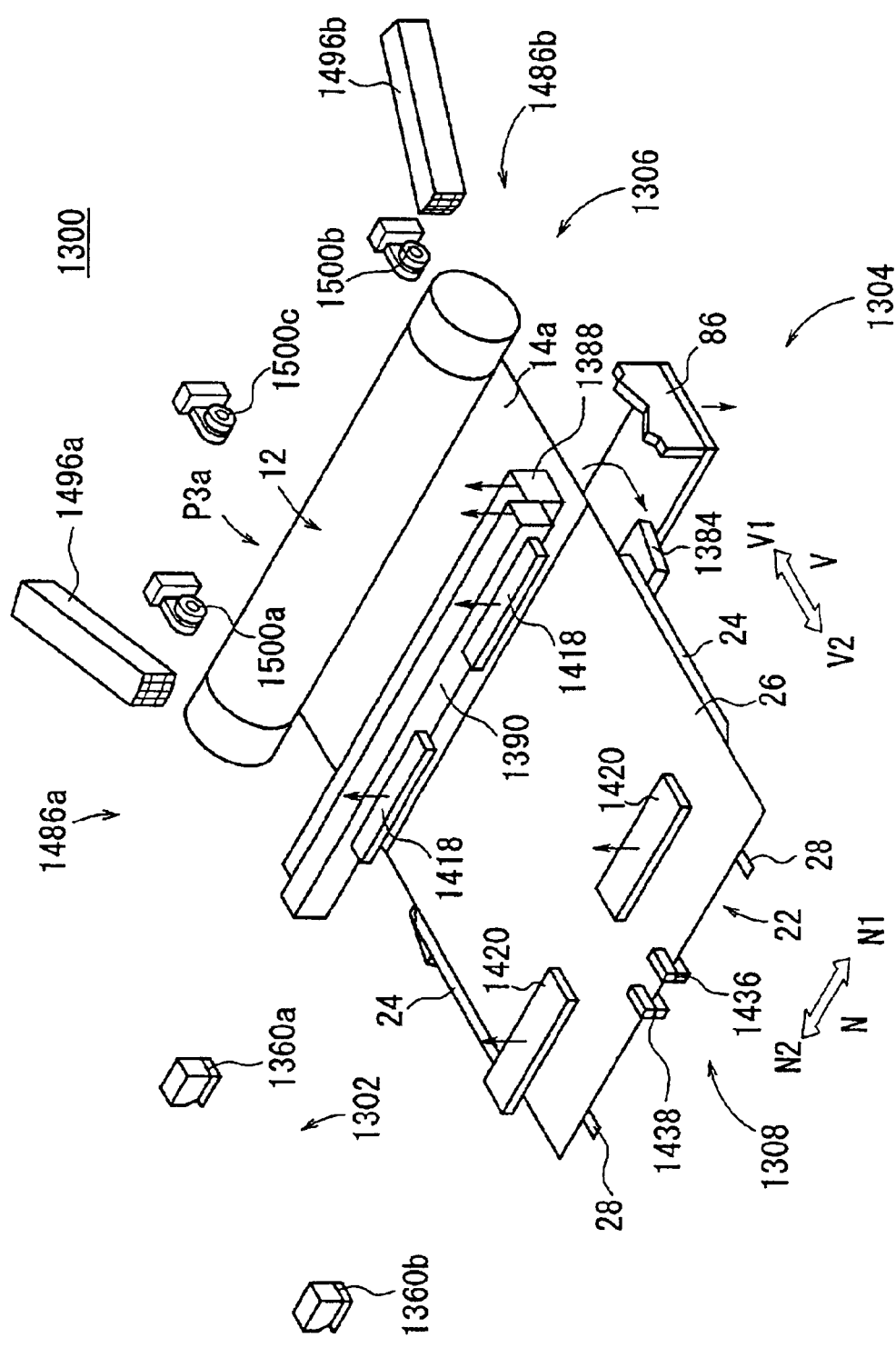
FIG. 89 is a perspective view showing the manner in which the light-shielding leader holding mechanism operates.

The end 14*a* of the photosensitive sheet 14 and the light-shielding leader 22 are now joined to each other by the joint tape 20. The lifting and lowering cylinder 1386 is actuated to move the first and second presser members 1388, 1390 upwardly, and the cylinders 1422, 1424 are actuated to lift the light-shielding leader pressers 1418, 1420, releasing the light-shielding leader 22 (see FIG. 89).

In the rotating mechanism 1306, as shown in FIG. 45, the motor 1464 of the actuator 1463 is energized to rotate the drive gear 1468 and the ball screw 1470 in unison in a given direction. The rotation of the driven gear 1472 meshing with the drive gear 1468 is transmitted through the rotatable shaft 1474 to the first gear 1476, and then from the second gear 1478 meshing with the first gear 1476 through the third gear 1480 to the second ball screw 1482, rotating the second ball screw 1482 about its own axis. Therefore, the first and second ball screws 1470, 1482 rotate in different directions, respectively, causing the nuts 1488*a*, 1488*b* to move the first and second slide units 1486*a*, 1486*b* toward each other.

The first and second chucks 1490*a*, 1490*b* supported on the first and second slide units 1486*a*, 1486*b* are inserted respectively into the opposite ends of the photosensitive roll 12. The opposite ends of the photosensitive roll 12 are held by the first and second chucks 1490*a*, 1490*b*, respectively, and the pallet 86 is lowered a given distance away from the outer circumferential surface of the photosensitive roll 12.

After the photosensitive roll 12 is held by only the first and second chucks 1490*a*, 1490*b*, the motor 1492 is energized to rotate the splined shaft 1493, rotating the first and second chucks 1490*a*, 1490*b* which are operatively coupled to the splined shaft 1493 by the belt and pulley means 1494*a*, 1494*b*.

Figure 90:
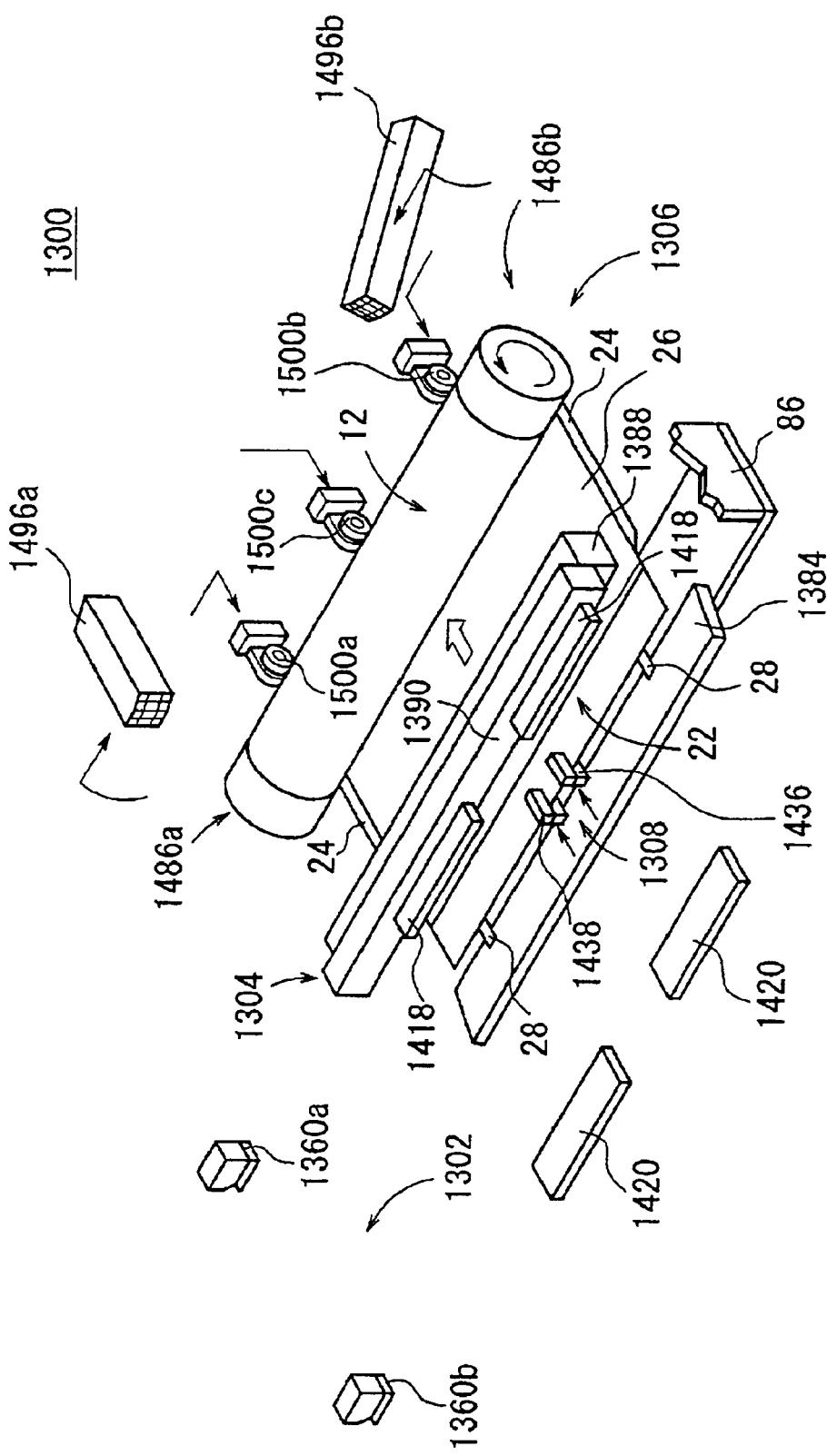
FIG. 90 is a perspective view showing the manner in which the light-shielding leader is wound.

In synchronism with the rotation of the first and second chucks 1490*a*, 1490*b*, the rodless cylinder 1430 of the light-shielding leader holding mechanism 1308 is actuated. Therefore, the rotation of the first and second chucks 1490*a*, 1490*b* rotates the photosensitive roll 12 to wind the light-shielding leader 22 around the photosensitive roll 12. While the winding terminal end of the light-shielding leader 22 is being gripped by the air chucks 1436, 1438 of the light-shielding leader holding mechanism 1308, the air chucks 1436, 1438 move in the direction indicated by the arrow VI (see FIG. 90).

When the air chucks 1436, 1438 move nearly to an end of its stroke in the direction indicated by the arrow V1, the rollers 1500*a* through 1500*c* are pressed against the outer circumferential surface of the photosensitive roll 12 by the actuators 1502*a*, 1502*b*. As shown in FIG. 48, the rollers

1500*a*, 1500*b* are caused to project forward by the cylinders 1502*a*, 1502*b*. The roller 1500*c* is moved vertically downwardly by the first cylinder 1506 of the actuator 1504, and thereafter is caused to project forward by the second cylinder 1510. The rollers 1500*a* through 1500*c* now press the light-shielding leader 22 wound around the photosensitive roll 12.

Before the process of winding the light-shielding leader 22 is finished, the air chucks 1436, 1438 of the light-shielding leader holding mechanism 1308 release the light-shielding leader 22. The air chucks 1436, 1438 are then retracted in the direction indicated by the arrow V2 by the rodless cylinder 1430.

Figure 91:
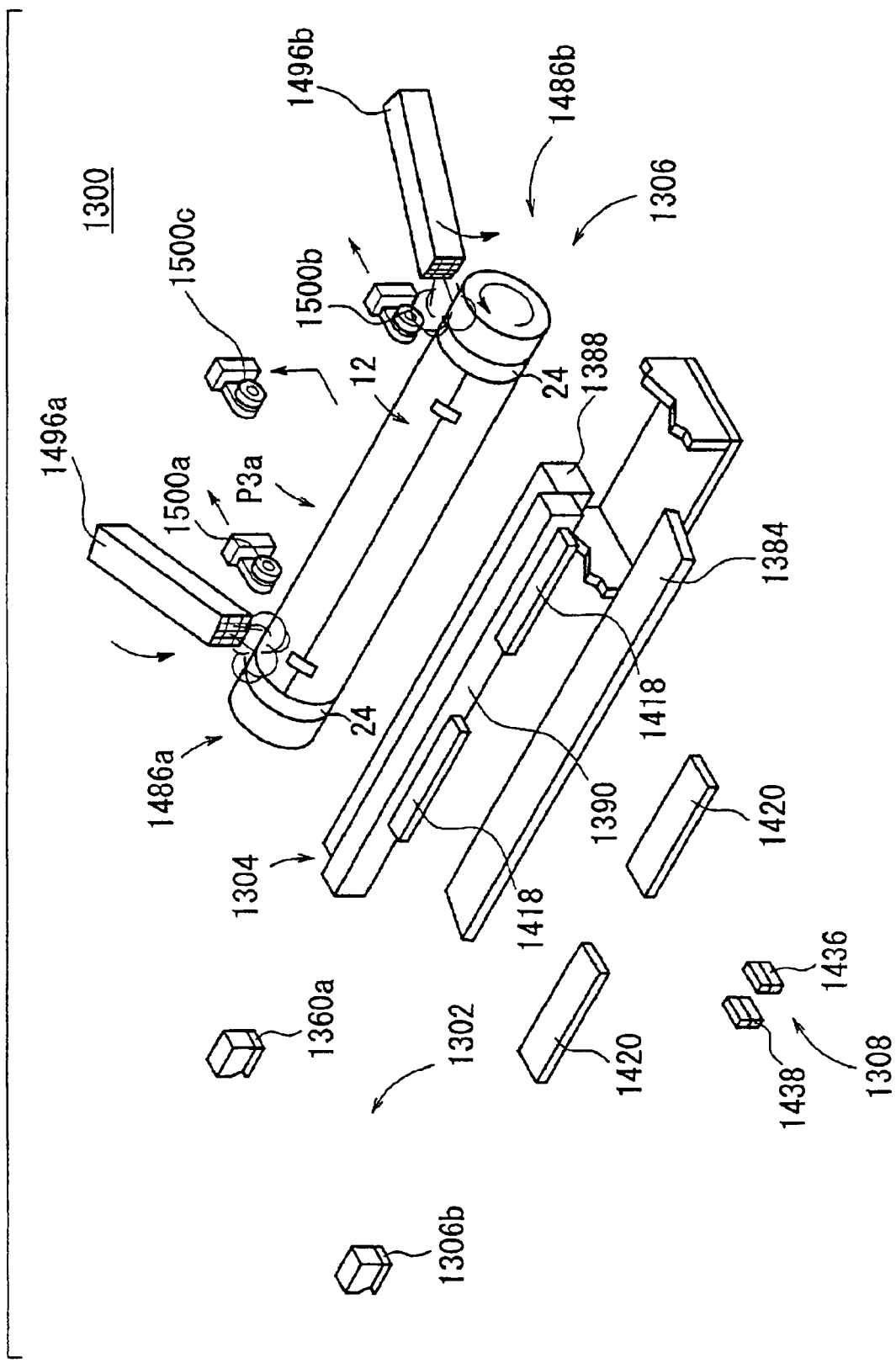
FIG. 91 is a perspective view showing the manner in which hot air blowers operate.

When the light-shielding leader 22 is wound around the photosensitive roll 12 as described above, the hot air blowers 1496*a*, 1496*b* mounted on the first and second slide units 1486*a*, 1486*b* are positioned in confronting relation to the opposite ends of the photosensitive roll 12 by the cylinders 1498*a*, 1498*b*. The hot air blowers 1496*a*, 1496*b* then apply hot air to the photosensitive roll 12, thermally shrinking the light-shielding shrink films 24 of the light-shielding leader 22 over the outer circumferential edges of the first flanged members 18*a* (see FIG. 91).

Figure 92:
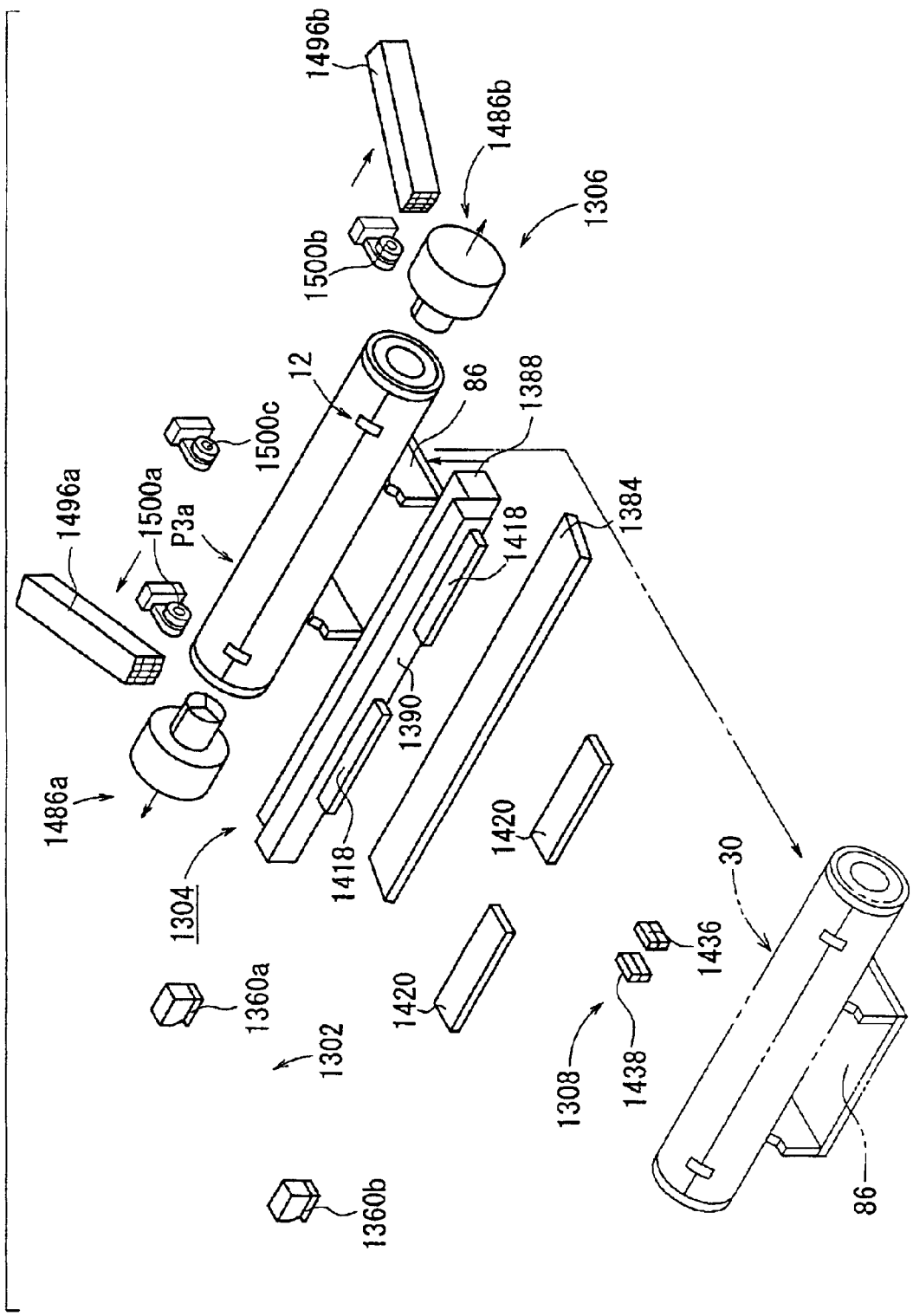
FIG. 92 is a perspective view showing the manner in which a pallet is lifted after the light-shielding leader is applied.

When the light-shielding leader 22 is wound around the photosensitive roll 12 and the terminal end of the light-shielding leader 22 is fixed in position by the end fastening tapes 28, the process of winding the light-shielding leader 22 is finished. Then, the pallet lifting and lowering device 1440 is actuated to lift the vertically movable base 1444 to hold the pallet 86, and the motor 1464 of the rotating mechanism 1306 is energized. The first and second slide units 1486*a*, 1486*b* are moved away from each other, releasing the first and second chucks 1490*a*, 1490*b* from the opposite ends of the photosensitive roll 12 (see FIG. 92). The pallet 86 is lowered onto the upper feed conveyors 82*a*, 82*b*, and thereafter fed to the thermally fusing station ST7.

In the joining region P2*a*, the light-shielding shrink films 24 are applied to the opposite sides of the light-shielding sheet 26, and the end fastening tapes 28 are applied to the leading end of the light-shielding sheet 26, thus producing the light-shielding leader 22. Thereafter, the light-shielding leader 22 is gripped by the clamp means 1360*a*, 1360*b* of the light-shielding leader feed mechanism 1302, and fed to the winding position P3*a* in the direction indicated by the arrow N1.

Since the light-shielding leader 22 is gripped by the clamp means 1360*a*, 1360*b*, the light-shielding leader 22 is prevented from being positioned in error unlike the conventional process in which the light-shielding leader 22 is fed to the winding position P3*a* by suction belts or suction pads. Accordingly, the light-shielding leader 22 can be positioned accurately, and the accuracy with which the light-shielding leader 22 is applied to the end 14*a* of the photosensitive sheet 14 is maintained at a desired level.

The winding terminal end of the light-shielding leader 22 which is positioned in the winding position P3*a* by the light-shielding leader feed mechanism 1302 is gripped by the air chucks 1436, 1438 of the light-shielding leader holding mechanism 1308. The air chucks 1436, 1438 grip a substantially central area of the light-shielding leader 22 in the transverse direction thereof indicated by the arrow N. When the rotating mechanism 1306 rotates the photosensitive roll 12 to wind the light-shielding leader 22 around the photosensitive roll 12, the air chucks 1436, 1348 grips the winding terminal end of the light-shielding leader 22 and is moved in the direction indicated by the arrow V1 by the rodless cylinder 1430.

When the light-shielding leader 22 is wound around the photosensitive roll 12, the light-shielding leader 22 is reliably prevented from being warped and also from being shifted out of position in its turn. Therefore, the light-shielded photosensitive roll 30 of high quality can be produced with a simple process and arrangement.

In the first embodiment, the apparatus has the rollers 1500*a* through 1500*c* which press and hold the light-shielding leader 22 before the air chucks 1436, 1438 of the light-shielding leader holding mechanism 1308 release the light-shielding leader 22. Therefore, even after the air chucks 1436, 1438 are released from the light-shielding leader 22, the outer circumferential surface of the light-shielding leader 22 is reliably held in position, allowing the light-shielding leader 22 to be wound highly reliably and accurately.

The photosensitive roll 12 with the light-shielding leader 22 wound therearound is fed to the thermally fusing station ST7 by the pallet 86. In the thermally fusing station ST7, as shown in FIG. 50, the servomotor 2066 of the lifting and lowering device 2062 is energized to cause the belt and pulley means 2070 to rotate the ball screw 2072 threaded through the nut 2074. The vertically movable base 2076 with the nut 2074 fixed thereto is moved vertically upwardly by the rotation of the ball screw 2072.

The vertically movable plate 2082 is coupled to the vertically movable base 2076 by the guide bars 2078. The vertically movable plate 2082 is lifted in unison with the vertically movable base 2076, and feeds the pallet 86 vertically upwardly to a position above the upper feed conveyors 82*a*, 82*b*. When the photosensitive roll 12 on the pallet 86 reaches a given thermally fusing position, the servomotor 2066 is de-energized.

In the thermally fusing mechanism 2060, as shown in FIG. 54, the cylinder 2130 of the moving mechanism 2129 is operated to place the first heating head 2144, for example, among the first through third heating heads 2144, 2146, 2148, depending on the outside diameter of the photosensitive roll 12, in the thermally fusing position.

Figure 93:
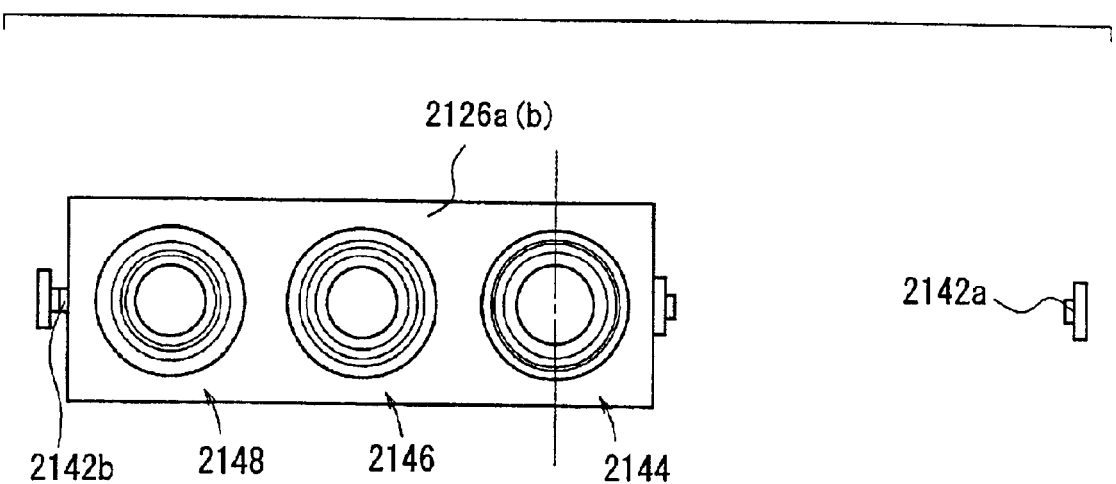
FIG. 93 is a view showing the manner in which the first heating head is placed in a thermally fusing position.

Specifically, the cylinder 2130 is actuated to pull in the rod 2132, moving the slide plate 2126 engaging the rod 2132 toward the engaging screw 2142*b* while being guided by the guide rails 2128*a*, 2128*b*. When the end of the slide plate 2126 abuts against and is supported by the engaging screw 2142*b*, the first heating head 2144 is positioned in the thermally fusing position (see FIG. 93).

As shown in FIG. 52, the servomotor 2092 is energized to rotate the drive gear 2096 and the first ball screw 2098 in unison with each other in a given direction. The driven gear 2100 meshing with the drive gear 2096 is rotated, causing the rotatable shaft 2102 to rotate the first gear 2104 and the second gear 2106 meshing therewith, thus rotating the third gear 2108. The second ball screw 2110 coupled to the third gear 2108 is rotated. The first and second ball screws 2098, 2110 are now rotated in different directions.

The first and second bases 2114*a*, 2114*b* are moved toward each other by the first and second nuts 2116*a*, 2116*b*. The first heating heads 2144 mounted on the first and second movable support bases 2122*a*, 2122*b* supported on the first and second bases 2114*a*, 2114*b* are moved to given positions near the opposite ends of the photosensitive roll 12, after which the servomotor 2092 is de-energized.

When the cylinders 2118*a*, 2118*b* of the pressing mechanism 2117 are actuated, the first and second movable support bases 2122*a*, 2122*b* coupled to the rods 2120*a*, 2120*b* are moved toward the opposite ends of the photosensitive roll 12 while being guided by the linear guides 2124a, 2124b. The second annular protrusions 2150b, for example, of the first heating heads 2144 mounted on the slide plates 2126a, 2126b press given areas of the outer circumferential edges of the opposite ends of the photosensitive roll 12, i.e., the light-shielding shrink films 24.

After the light-shielding shrink films 24 have been heated by the second annular protrusions 2150b, the cylinders 2118a, 2118b are actuated to move the slide plates 2126a, 2126b away from each other. The second annular protrusions 2150b of the first heating heads 2144 are released from the opposite ends of the photosensitive roll 12, whereupon the process of thermally fusing the light-shielding shrink films 24 and the first flanged members 18a is finished.

Then, the servomotor 2066 of the lifting and lowering device 2026 is reversed to rotate the ball screw 2072, lowering the vertically movable plate 2082 with the pallet 86 placed thereon. The pallet 86 is now transferred onto the upper feed conveyors 82a, 82b, and then fed to the inspecting station ST9 by the upper feed conveyors 82a, 82b.

The first and second annular protrusions 2150a, 2150b are coaxially disposed on the first heating head 2144, and the outer second annular protrusion 2150b projects outwardly beyond the inner first annular protrusion 2150a (see FIG. 55). Therefore, when the light-shielding shrink films 24 are thermally fused to the outer circumferential edges of the opposite ends of the photosensitive roll 12 by the second annular protrusions 2150b, the first annular protrusions 2150a do not contact the opposite ends of the photosensitive roll 12.

Since only the second annular protrusions 2150b contact the outer circumferential edges of the opposite ends of the photosensitive roll 12, the light-shielding shrink films 24 are effectively thermally fused to the first flanged members 18a. The second annular protrusions 2150b are of such a dimension corresponding to the outside diameter of the photosensitive roll 12 and can be pressed against the light-shielding shrink films 24 under a constant pressure. Thus, only the light-shielding shrink films 24 can effectively thermally fused to the first flanged members 18a, reliably shielding the photosensitive roll 12 against light.

It is only necessary to press the second annular protrusions 2150b contact the outer circumferential edges of the opposite ends of the photosensitive roll 12, and it is not necessary to rotate the photosensitive roll 12. As the conventional rotating mechanism for rotating the photosensitive roll 12 is not needed, the packaging sheet bonding device 2060 is relatively simple in overall structure, small in size, and economical to manufacture.

The first heating head 2144 has the first and second annular protrusions 2150a, 2150b for handling two types of photosensitive rolls 12 having different outside diameters. Therefore, the first heating head 2144 alone is capable of thermally fusing two types of photosensitive rolls 12 having different outside diameters, so that the packaging sheet bonding device 2060 is further made relatively simple in overall structure.

The first through third heating heads 2144, 2146, 2148 are mounted on each of the slide plates 2126a, 2126b, and have the first annular protrusions 2150a, 2152a, 2154a and the second annular protrusions 2150b, 2152b, 2154b which have different diameters. Therefore, the first through third heating heads 2144, 2146, 2148 can handle six types of photosensitive rolls 12 having different outside diameters, making the packaging sheet bonding device 2060 versatile and economical.

Figure 94:
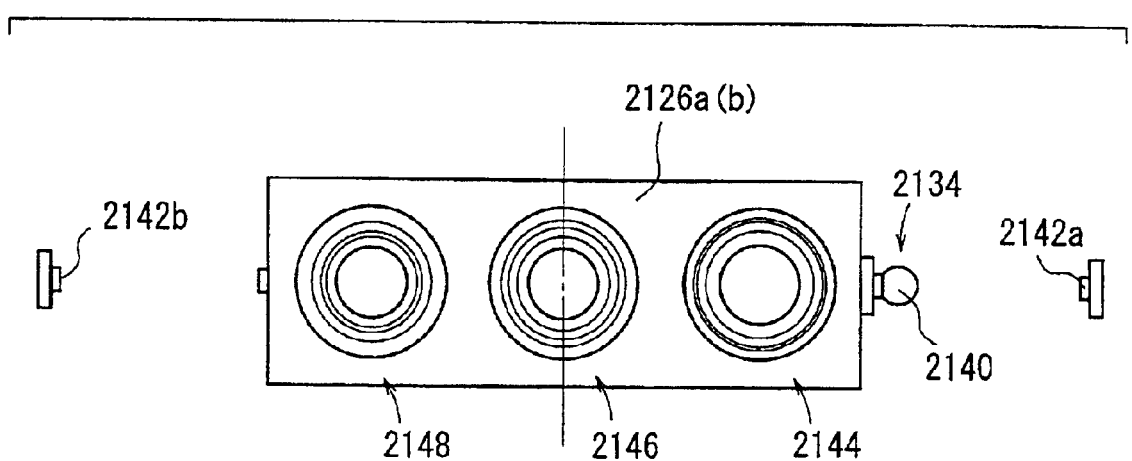
FIG. 94 is a view showing the manner in which the second heating head is placed in the thermally fusing position.

For positioning the second heating head 2146 in the thermally fusing position, the cylinder 2136 of the stopper means 2134 is actuated to project the engaging member 2140 forward, and the cylinder 2130 of the moving mechanism 2129 is actuated. Since the slide plates 2126a, 2126b are coupled to the rod 2132 extending from the cylinder 2130, the end faces of the slide plates 2126a, 2126b near the first heating heads 2144 abut against and are supported by the engaging member 2140, thus positioning the second heating head 2146 in the thermally fusing position (see FIG. 94).

Figure 95:
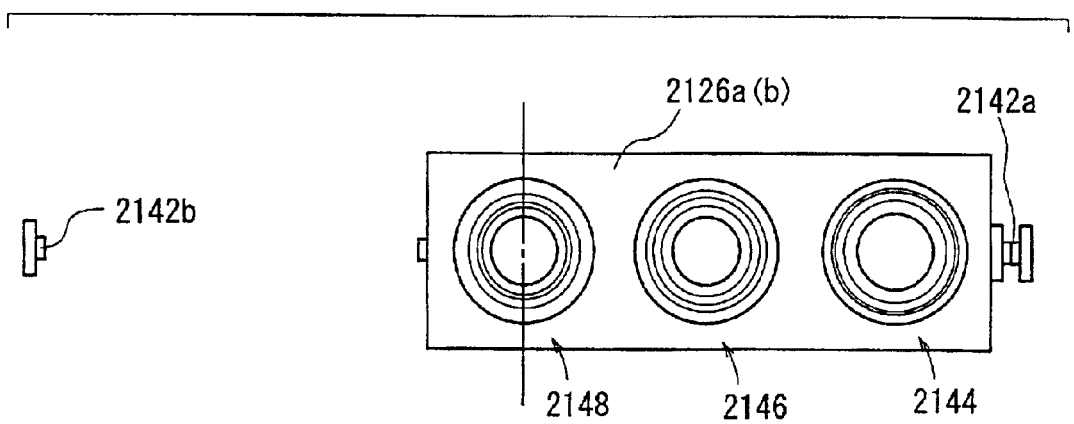
FIG. 95 is a view showing the manner in which the third heating head is placed in the thermally fusing position.

For positioning the third heating head 2148 in the thermally fusing position, the stopper means 2134 is actuated to retract the engaging member 2140, and the cylinder 2130 is actuated. The end faces of the slide plates 2126a, 2126b near the first heating heads 2144 abut against and are supported by the engaging screw 2142a, thus positioning the third heating head 2148 in the thermally fusing position (see FIG. 95).

In the present embodiment, the first through third heating heads 2144, 2146, 2148 are employed. However, only the first heating head 2144 may be used to thermally fuse two types of photosensitive rolls 12, or the first heating head 2144 may have three or more annular protrusions coaxial with each other, so that only the first heating head 2144 may be used to thermally fuse three or more types of photosensitive rolls 12.

Figure 96:
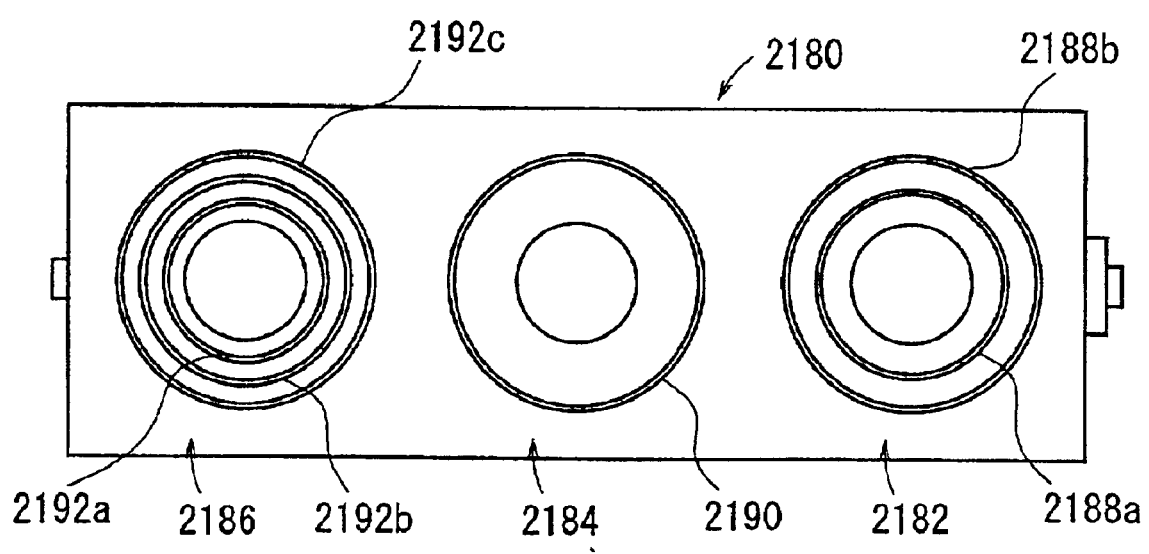
FIG. 96 is a front elevational view of a slide plate having another structure.

FIG. 96 shows in front elevation a slide plate 2180 which is different in structure from the slide plate 2126.

The slide plate 2180 has a first heating head 2182, a second heating head 2184, and a third heating head 2186 mounted thereon. The first heating head 2182 has a first annular protrusion 2188a and a second annular protrusion 2188b which are coaxial with each other. The second heading head 2184 has a single annular protrusion 2190. The third heating head 2186 has a first annular protrusion 2192a, a second annular protrusion 2192b, and a third annular protrusion 2192c which are coaxial with each other.

The single annular protrusion 2190 on the second heating head 2184, and the first annular protrusion 2192a, the second annular protrusion 2192b, and the third annular protrusion 2192c on the third heating head 2186 have dimensions corresponding to the outside diameters of different photosensitive rolls 12. Therefore, the first heating head 2182, the second heating head 2184, and the third heating head 2186 may selectively be used to handle six types of photosensitive rolls 12 of different outside diameters. The slide plate 2180 is thus effective to make the packaging sheet bonding device simple in structure.

In the inspecting station ST9, after the light-shielded photosensitive roll 30 is fed by the pallet 86 to a given position and stopped therein, the light-shielded state of the light-shielded photosensitive roll 30 is inspected. In the hard flanged member supplying station ST15, second flanged members 32 are supplied by a supply mechanism, not shown, and fed to the flanged member feeding device 4066.

In the flanged member feeding device 4066, the cylinders 4078a, 4078b of the first and second horizontally feeding means 4070a, 4070b are actuated to lower the chucks 4082a, 4082b to hold the inner circumferential surfaces of the second flanged members 32 (see FIG. 58). The chucks 4082a, 4082b with the second flanged members 32 held thereby are moved along the guide rails 4072a, 4072b in the direction indicated by the arrow F (see FIG. 58) by the belts 4076a, 4076b operated in circulation by the motors 4074a, 4074b. The chucks 4082a, 4082b are temporarily placed between the swing arms 4108 of the first and second transfer means 4090a, 4090b. The swing arms 4108 have been angularly moved upwardly from the vertically downward position.

Figure 97:
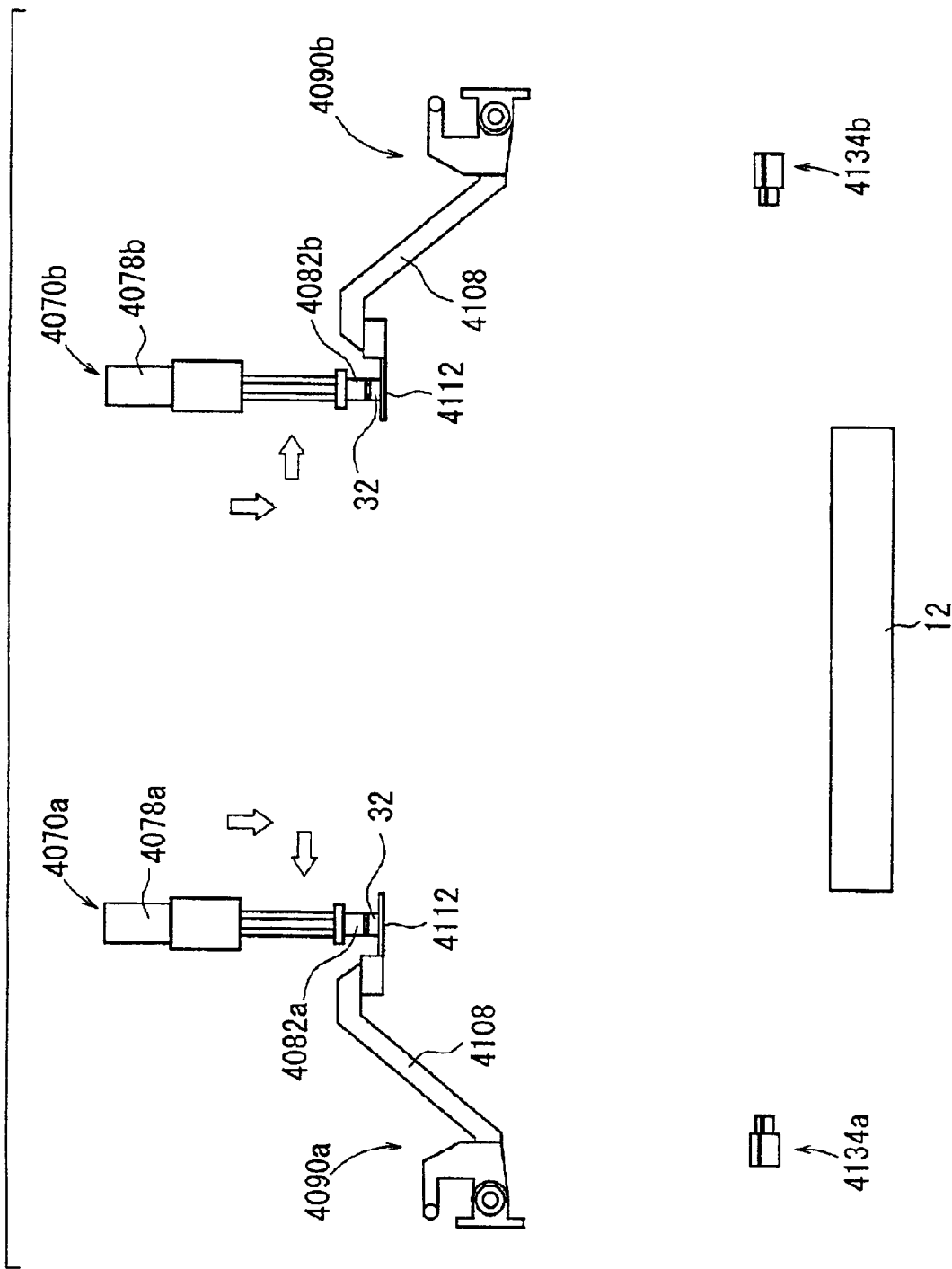
FIG. 97 is a view showing the manner in which a second flanged member is transferred from the flanged member feeding device to first and second transferring means.

After the chucks 4082a, 4082b are lowered by the cylinders 4078a, 4078b, the chuck 4082a is moved to the first transfer means 4090a, and the second chuck 4082b is moved to the second transfer means 4090b (see FIG. 97). The second flanged members 32 held by the chucks 4082a, 4082b are transferred to the chucks 4112 of the respective swing arms 4108. On the chucks 4112, the fingers 4116a, 4116b have been spaced from each other, as shown in FIG. 61. After the second flanged members 32 are transferred to the chucks 4112, the fingers 4116a, 4116b are displaced toward each other, gripping the second flanged members 32.

Figure 98:
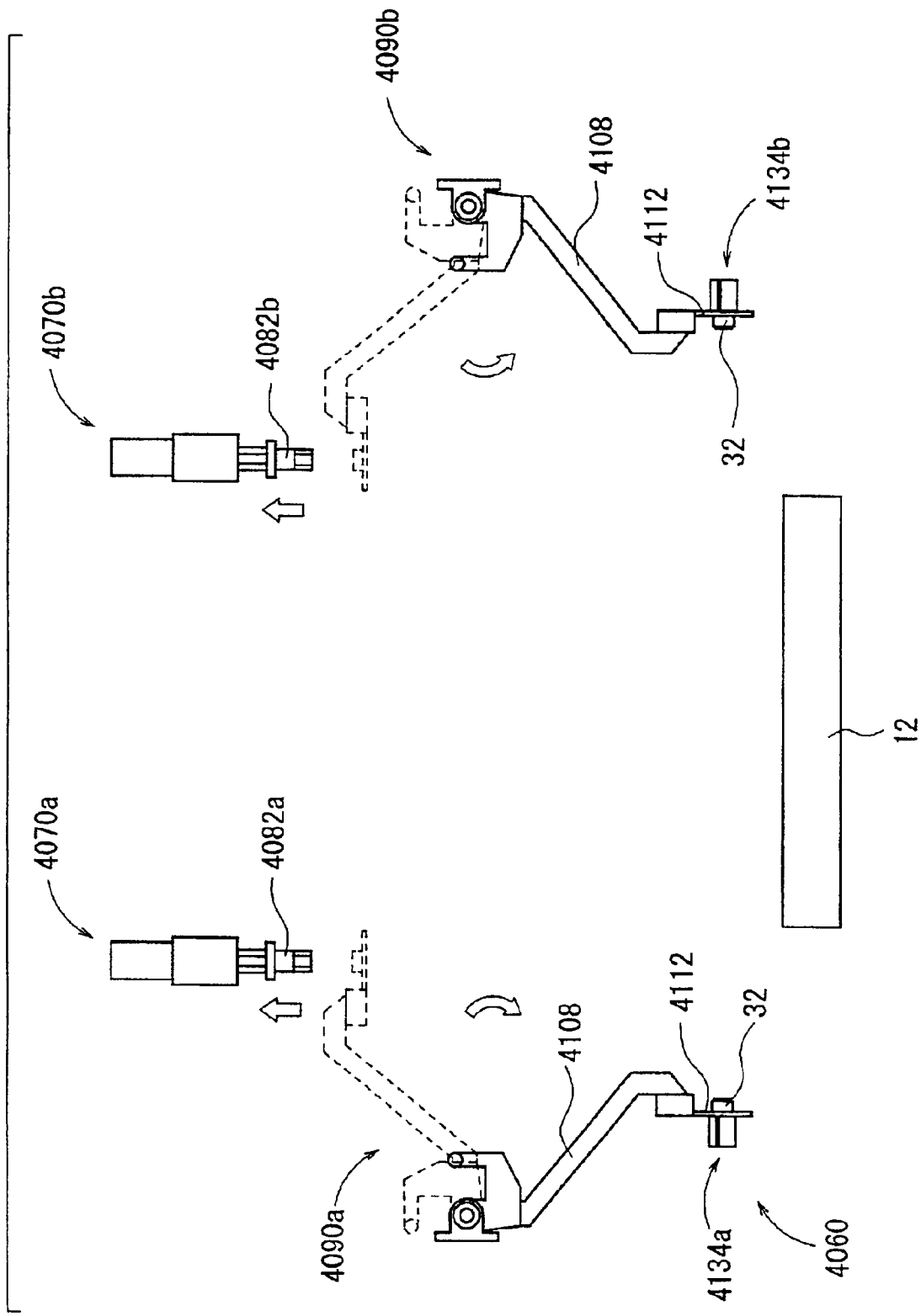
FIG. 98 is a view showing the manner in which the first and second transferring means are swung downwardly.
Figure 99:
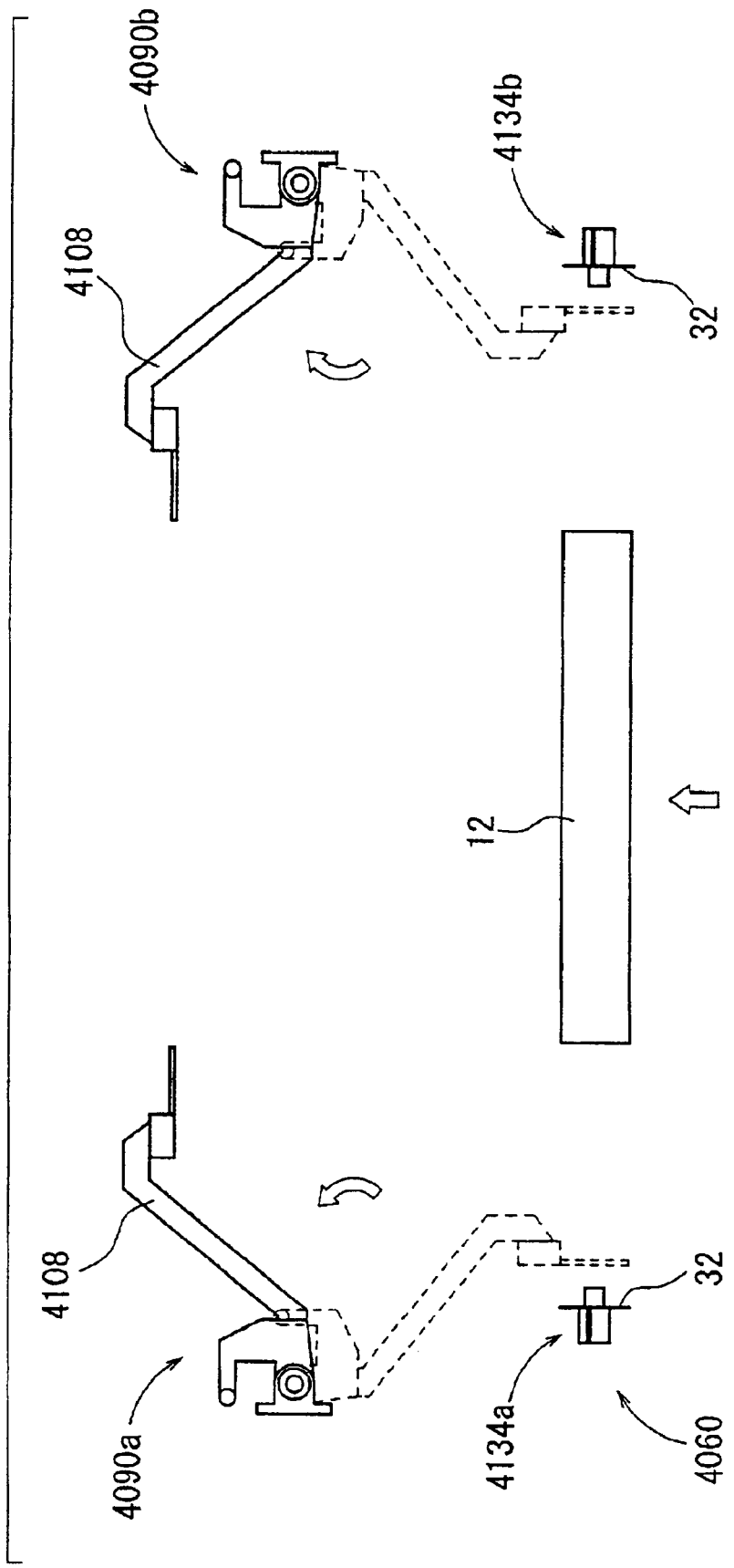
FIG. 99 is a view showing the manner in which the second flanged member is held by an insertion head.

One of the swing arms 4108 is displaced out of alignment with the other swing arm 4108 with respect to the axis of the photosensitive roller 12 because of the chucks 4082a, 4082b. One of the swing arms 4108 is positionally adjusted with respect to the other swing arm 4108 by the cylinder 4090a or 4090b. The swing arms 4108 are then turned 90° downwardly by the cylinders 4104 to orient the axes of the second flanged members 32 horizontally (see FIG. 98). The first and second inserting units 4130a, 4130b of the hard flanged member inserting device 4060 are positioned outwardly of and coaxially with the second flanged members 32. The inserting heads 4134a, 4134b of the first and second inserting units 4130a, 4130b hold the inner circumferential surfaces of the second flanged members 32, and the swing arms 4108 are turned upwardly by the cylinders 4104 (see FIG. 99).

The photosensitive roll 12 is positioned by the centering device 4062 in axial alignment with the axes of the second flanged members 32 held by the inserting heads 4134a, 4134b.

When the pallet 86 is stopped in a given position, the lifting and lowering device 4064 is actuated to lift the pallet 86.

As shown in FIG. 60, the cylinders 4194a, 4194b of the centering device 4062 are actuated to cause the first centering rollers 4190a, 4190b and the second centering rollers 4192a, 4192b to hold the outer circumferential surface of the photosensitive roll 12 in a central position.

The hard flanged member inserting device 4060 is actuated to enable the inserting heads 4134a, 4134b of the first and second inserting units 4130a, 4130b to grip the second flanged members 32. As shown in FIG. 58, the motor 4122 is energized to cause the gear train 4124 to rotate the ball screw 4120. The nuts 4148a, 4148b threaded over the opposite threads of the ball screw 4120 move the first and second inserting units 4130a, 4130b toward each other upon rotation of the ball screw 4120.

Figure 100:
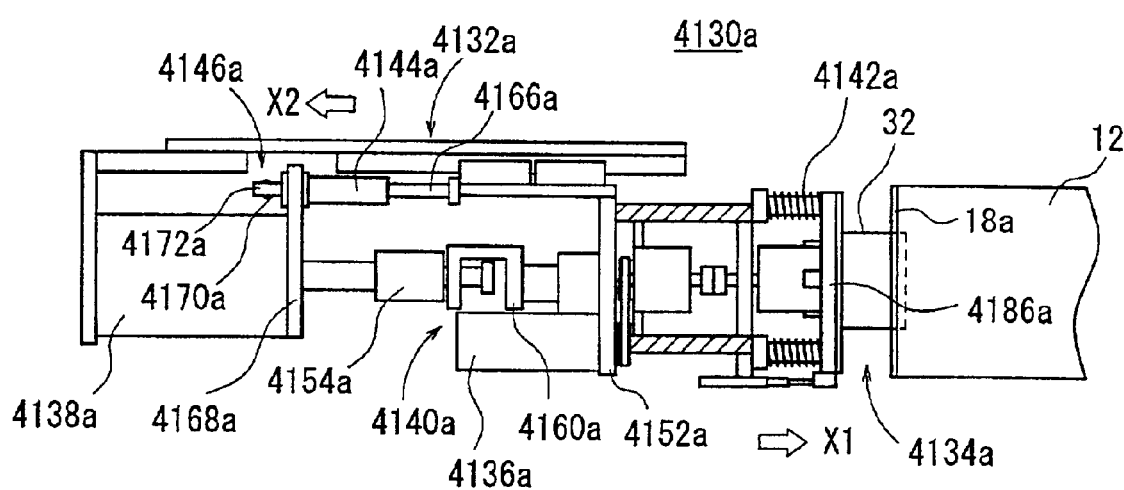
FIG. 100 is a view showing the manner in which the second flanged member held by the insertion head is brought into abutment against a first flanged member.

The first and second inserting units 4130a, 4130b move toward the opposite ends of the photosensitive roll 12 held by the centering device 4062 in the direction indicated by the arrow X1, inserting the ends of the second flanged members 32 held by the inserting heads 4134a, 4134b into the first flanged members 18a on the opposite ends of the photosensitive roll 12 (see FIG. 100). At this time, the tapered tips 64 of the second flanged members 32 are inserted along the inner circumferential surfaces 54 of the first flanged members 18a. The tapered tips 64 guide the ridges 68 of the second flanged members 32 to abut against the steps 60 of the first flanged members 18a. The motor 4122 is energized to move the first and second inserting units 4130a, 4130b toward the photosensitive roll 12.

Since the first and second inserting units 4130a, 4130b operate in the same manner as each other, operation of only the first inserting unit 4130a will be described below.

When the first inserting unit 4130a moves in the direction indicated by the arrow X1 with the ridges 68 engaging the step 60, the movable base 4152a moves toward the presser plate 4186a in the direction indicated by the arrow X1 and then stops, as shown in FIG. 100. Therefore, the presser plate 4186a is subject to the resilient forces of the spring 4142a, and the end of the presser rod 4166a of the cylinder 4144a abuts against the movable base 4152a, and projects toward the presser plate 4168a in the direction indicated by the arrow X2. Therefore, the dog 4170a on the presser rod 4166a turns on the sensor 4172a, de-energizing the motor 4122.

Then, the motor 4136a is energized to rotate the drive shaft 4174a, causing the belt and pulley means 4176a to rotate the rotatable shaft 4178a. The inserting head 4134a coupled to the rotatable shaft 4178a by the coupling 4180a rotates in unison with the second flanged member 32.

Figure 101:
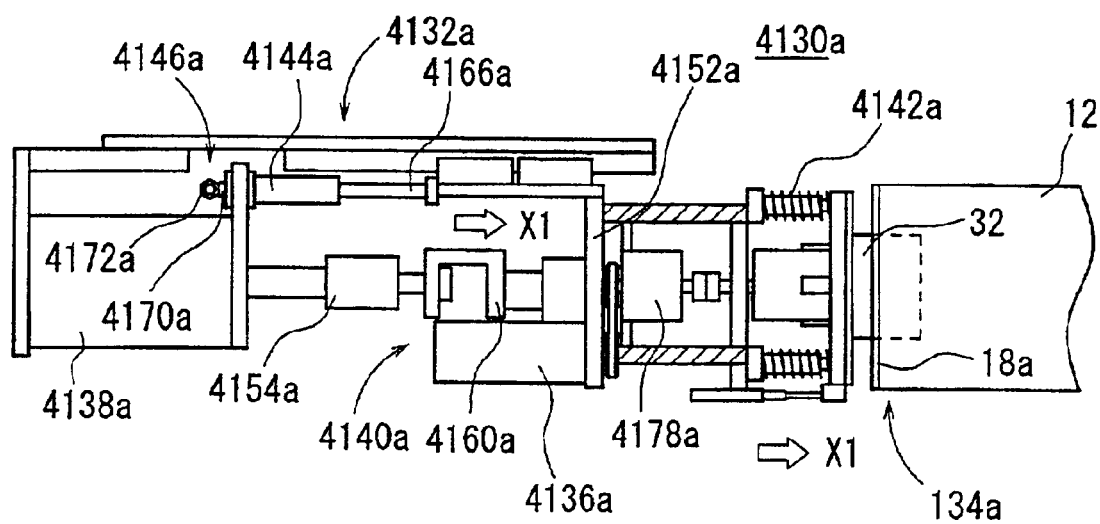
FIG. 101 is a view showing the manner in which the insertion head is turned to bring ridges and grooves into alignment with each other.

As shown in FIG. 3, when the second flanged member 32 rotated in the direction indicated by the arrow A, the ridges 68 abutting against the step 60 of the first flanged member 18a are rotated in the direction indicated by the arrow A, and inserted into the grooves 56 while being guided by the recesses 62. Upon alignment between the ridges 68 and the grooves 56, the second flanged member 32 is moved toward the first flanged member 18a. As shown in FIG. 101, the presser rod 4166a is moved in the direction indicated by the arrow X1 by the cylinder 4144a, and the dog 4170a is released from the sensor 4172a, turning off the sensor 4172a.

Figure 102:
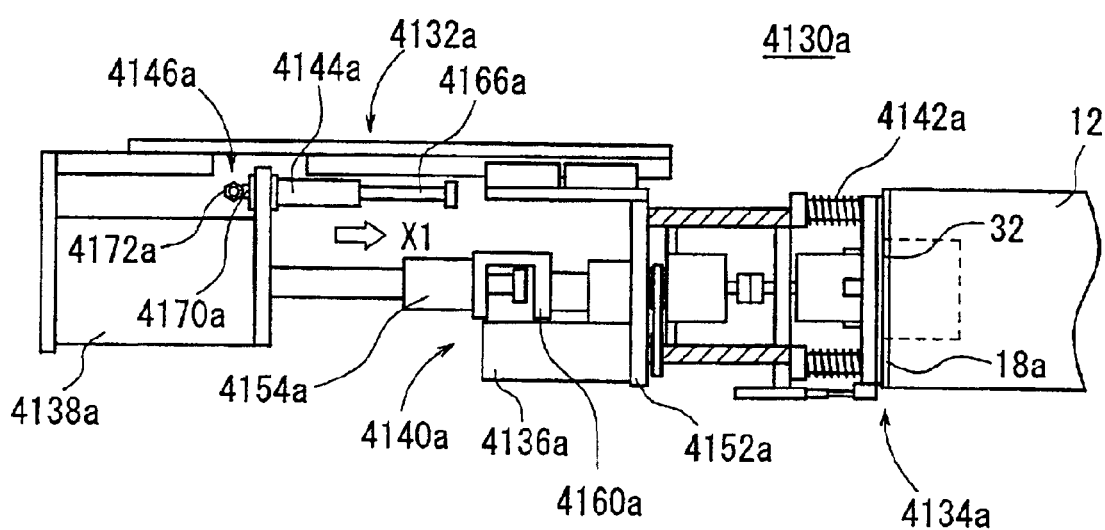
FIG. 102 is a view showing the manner in which the second flanged member is inserted into the first flanged member.

Therefore, the alignment between the ridges 68 and the grooves 56 is detected, and the inserting cylinder 4138a is actuated to move the tubular presser 4154a in unison with the rod 4150a in the direction indicated by the arrow X1. Therefore, as shown in FIG. 102, the tubular presser 4154a presses the distal end of the angle 4160a, moving the movable base 4152a to which the angle 4160a is fixed along the guide rail 4164a in the direction indicated by the arrow X1.

The second flanged member 32 whose inner circumferential surface is held by the inserting head 4134a supported on the movable base 4152a is now inserted into the first flanged member 18a. The inserting head 4134a then releases the second flanged member 32, and is released from the second flanged member 32 by the inserting cylinder 4138a.

In the flanged structure 52, as shown in FIGS. 2 and 3, the first flanged member 18a has the plural grooves 56 defined in the inner circumferential surface 54 thereof, and the step 60 of increased diameter disposed on the inner circumferential surface 54 at the inlet ends of the grooves 56, and the second flanged member 32 has the plural ridges 68 extending to a position where they project toward the tapered tip 64. When the second flanged member 32 is guided by the tapered tip 64 and inserted into the first flanged member 18a, the straight end faces 68a of the ridges 68 abut against and are supported by the step 60 of the first flanged member 18a.

When the second flanged member 32 is turned in the direction indicated by the arrow A, the ridges 68 are brought into alignment with the grooves 56, allowing the second flanged member 32 to be inserted into the first flanged member 18a. The ridges 68 and the grooves 56 can thus be aligned with each other accurately and reliably, allowing the second flanged member 32 to be inserted highly accurately into the first flanged member 18a.

The inner circumferential surface 54 of the first flanged member 18a has the recesses 62 defined therein which extend obliquely from the step 60 toward the respective ends of the grooves 56 in the direction indicated by the arrow A in which the second flanged member 32 is rotated upon insertion into the first flanged member 18a. When the second flanged member 32 is rotated in the direction indicated by the arrow A, the ridges 68 thereof are guided by the recesses 62 and inserted smoothly and reliably from the step 60 into the grooves 56, and are effectively prevented from moving out of the grooves 56. Therefore, the second flanged member 32 can efficiently be inserted into the first flanged member 18a.

On the second flanged member 32, the ridges 68 extend from the straight barrel 66 onto the tapered tip 64. The ridges 68 are thus elongate in the axial direction of the second flanged member 32. When the ridges 68 are inserted into the grooves 56, therefore, the second flanged member 32 can firmly and reliably be retained in the first flanged member 18a.

In the hard flanged member inserting device 4060, the inserting cylinders 4138a, 4138b and the inserting heads 4134a, 4134b are relatively movably coupled to each other by the floating couplers 4140a, 4140b. When the second flanged member 32 is pressed toward the first flanged member 18a only by the cylinders 4144a, 4144b, the second flanged member 32 is rotated. When the ridges 68 are aligned with the grooves 56 and the second flanged member 32 is moved into the first flanged member 18a, the detectors 4146a, 4146b are actuated.

The torque applied to rotate the second flanged member 32 is kept at a constant level under the pressure from the cylinders 4144a, 4144b. Therefore, the ridges 68 can reliably be inserted into the grooves 56 and are prevented from moving out of the grooves 56.

At the time the detectors 4146a, 4146b detect when the ridges 68 are aligned with the grooves 56 and the second flanged member 32 is moved into the first flanged member 18a, the inserting cylinders 4138a, 4138b are actuated. The tubular pressers 4154a, 4154b press the distal ends of the angles 4160a, 4160b in the direction indicated by the arrow X1, inserting the second flanged members 32 gripped by the inserting heads 4134a, 4134b reliably into the first flanged members 18a.

It is thus possible with a simple process and arrangement to bring the ridges 68 into alignment with the grooves 56 reliably and easily and to insert the second flanged members 32 highly accurately and efficiently into the first flanged members 18a.

Figure 103:
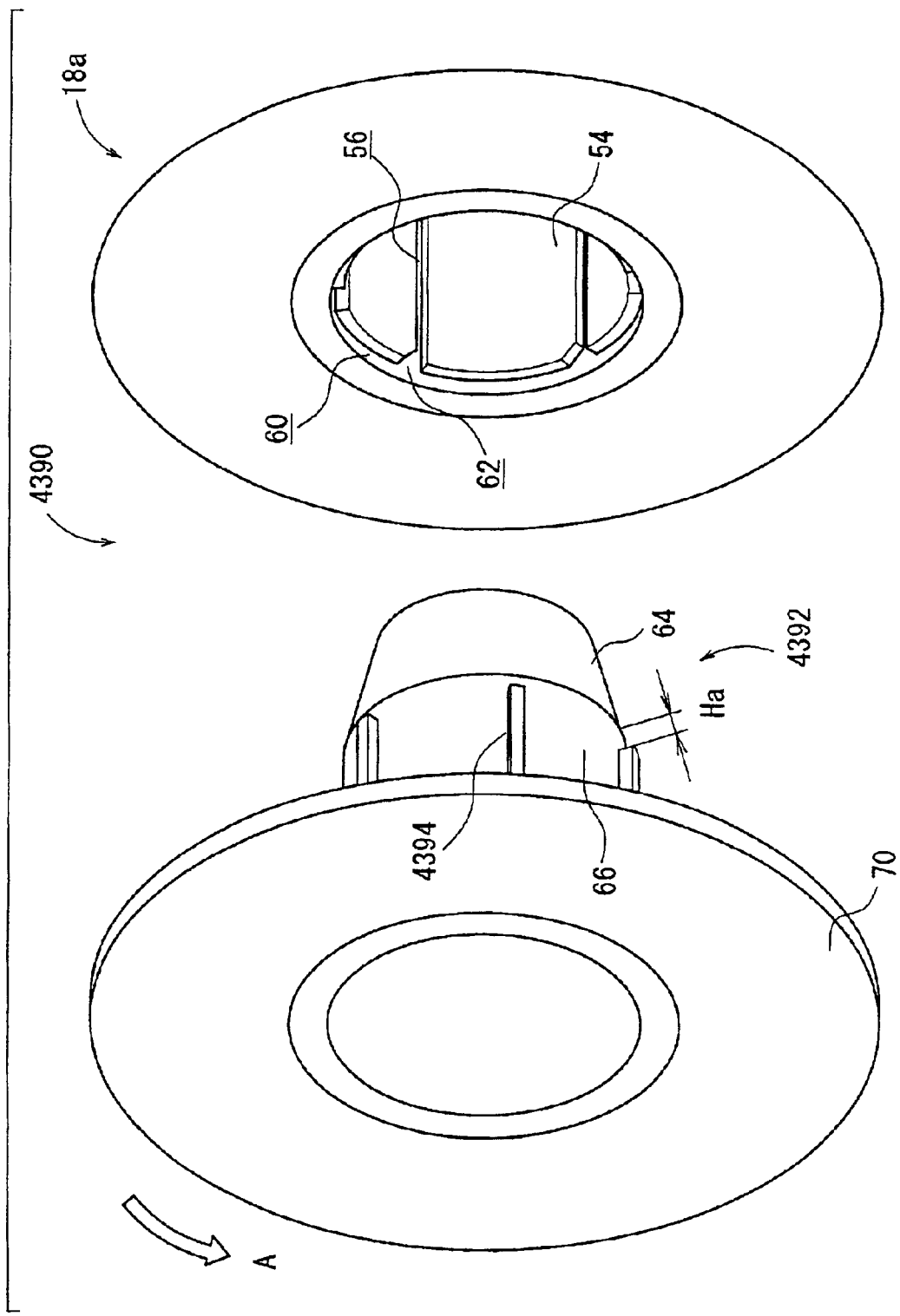
FIG. 103 is an exploded perspective view of another flanged structure.

FIG. 103 shows in exploded perspective another flanged structure 4390. Those parts of the flanged structure 4390 which are identical to the flanged structure 52 are denoted by identical reference characters, and will not be described in detail below.

The flanged structure 4390 has a second flanged member 4392 having a plurality of angularly spaced, axially extending ridges 4394 disposed on the straight barrel 66 and projecting radially outwardly, the ridges 4394 having distal ends spaced from the end of the tapered tip 64 toward the flange 70 by a distance Ha.

The second flanged member 4392 is inserted into the first flanged member 18a. Specifically, the second flanged member 4392 is guided by the tapered tip 64 until the end of the straight barrel 66 thereof reaches the inner circumferential surface 54 of the first flanged member 18a, after which the ridges 4394 abut against and are supported by the step 60.

Then, the second flanged member 4392 is rotated in the direction indicated by the arrow A until the ridges 4394 are aligned with the grooves 56, whereupon the second flanged member 4392 is inserted into the first flanged member 18a.

With the flanged structure 4390, since the tapered tip 64 guides the second flanged member 4392 until the end of the straight barrel 66 is inserted into the first flanged member 18a, the second flanged member 4392 and the first flanged member 18a are positioned accurately concentrically with each other. When the second flanged member 4392 is rotated after the ridges 4394 abut against the step 60, the ridges 4394 are aligned with the grooves 56, allowing the second flanged member 4392 to be inserted into highly accurately and reliably the first flanged member 18a.

Figure 104:
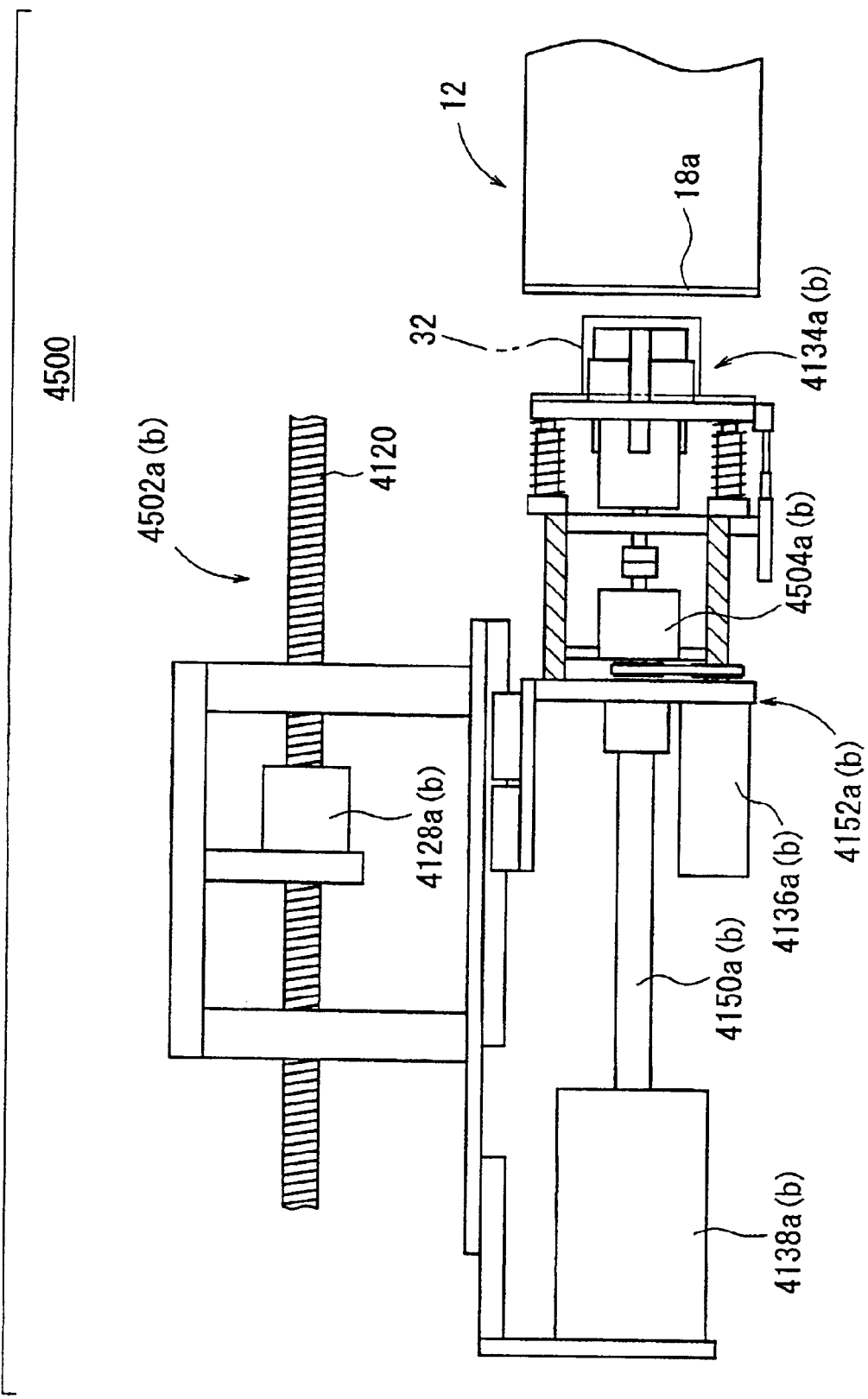
FIG. 104 is a side-elevational view of another flanged member inserting device.
Figure 105:
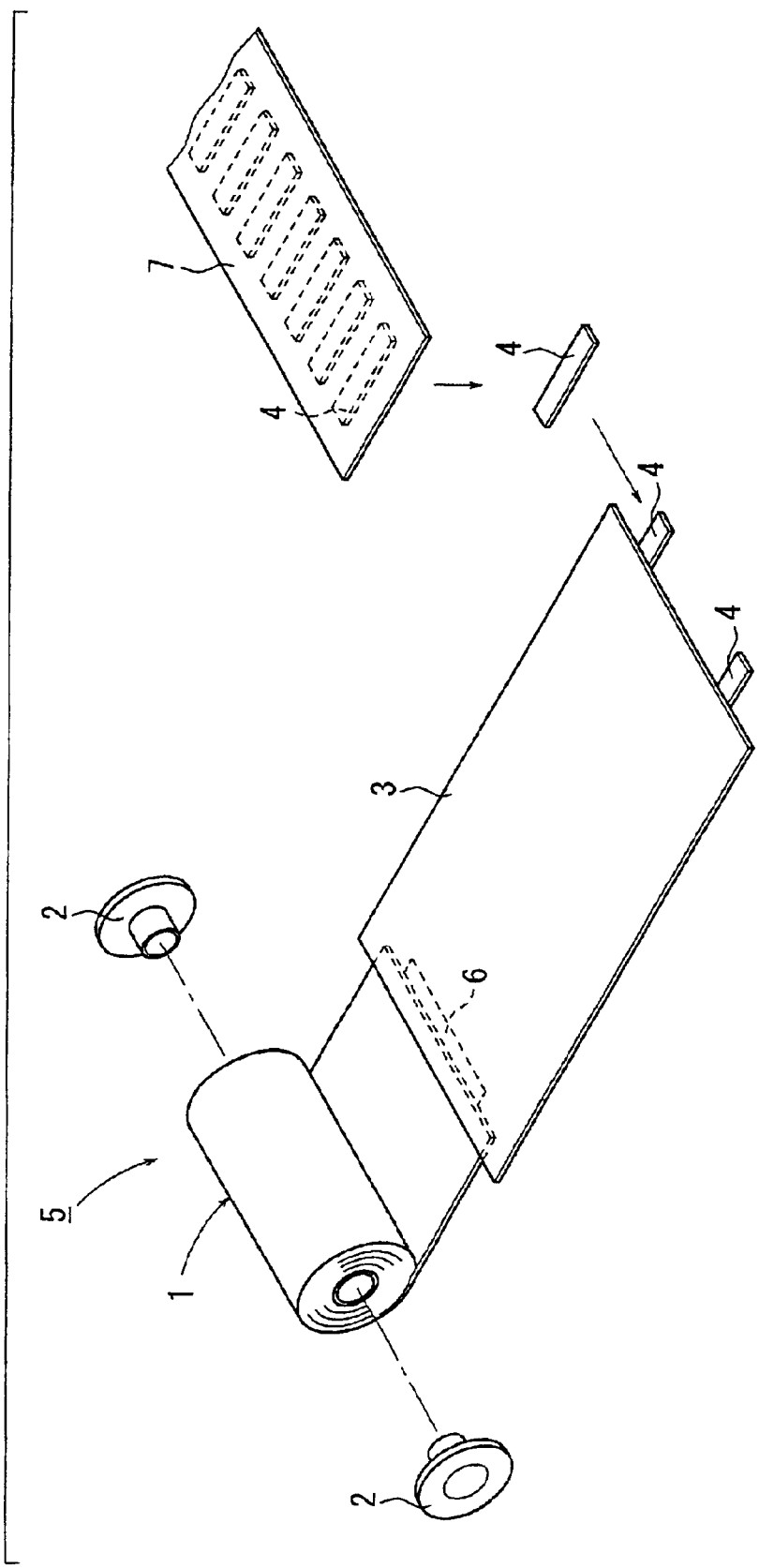
FIG. 105 is an exploded perspective view of a conventional photosensitive roll.
Figure 106:
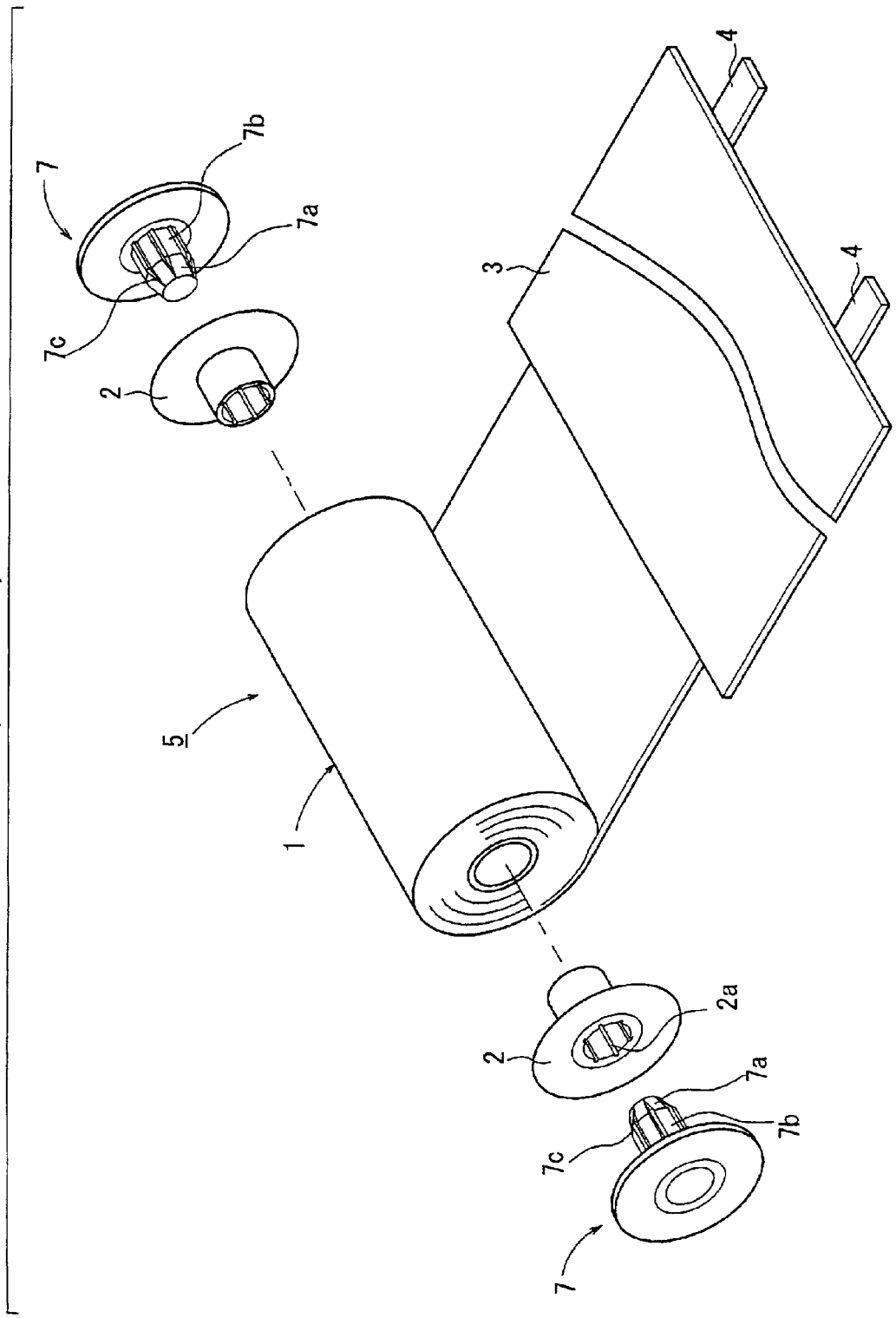
FIG. 106 is an exploded perspective view of another conventional photosensitive roll.

FIG. 104 shows first and second inserting units 4502a, 4502b of another hard flanged member inserting device 4500. Those parts of the hard flanged member inserting device 4500 which are identical to the hard flanged member inserting device 4060 are denoted by identical reference characters, and will not be described in detail below.

The first and second inserting units 4502a, 4502b have inserting cylinders 4138a, 4138b from which rods 4150a, 4150b extend, and powder clutches 4504a, 4504b coupled to the respective rods 4150a, 4150b by movable bases 4152a, 4152b. Inserting heads 4134a, 4134b are directly coupled to the powder clutches 4504a, 4504b by couplings 4180a, 4180b.

The hard flanged member inserting device 4500 operates as follows: The first and second inserting units 4502a, 4502b are moved to the respective opposite ends of the photosensitive roll 12, and the second flanged members 32 held by the inserting heads 4134a, 4134b are placed in positions abutting against the first flanged members 18a. Thereafter, the motors 4136a, 4136b are energized to rotate the inserting heads 4134a, 4134b. When the ridges 68 of the second flanged members 32 are aligned with the grooves 56 of the first flanged members 18a, the powder clutches 4504a, 4504b slip, keeping the ridges 68 engaging in the grooves 56. The inserting cylinders 4138a, 4138b are actuated to insert the second flanged members 32 into the first flanged members 18a.

With the hard flanged member inserting device 4500 thus arranged, the second flanged members 32, 4392 of the flanged structures 52, 4390 are used to insert the ridges 68, 4394 reliably into the grooves 56. The process of inserting the second flanged members into the first flanged members is made highly efficient.

Operation of a data transfer system in the automatic packaging system 10 will be described below.

When a pallet 86 is fed to the transfer station ST1, the programmable controller PLC1 reads identification data stored in the memory medium 138 on the pallet 86 through the data reader 142, and specifies one of the data areas M1 through M30 which corresponds to the identification data. In FIG. 8, because the identification data is "3", the programmable controller PLC1 specifies the data area M3.

Then, as shown in FIG. 7, when a photosensitive roll 12 is fed into the dark chamber 11 and placed on the pallet 86 in the transfer station ST1, the programmable controller PLC1 reads the specification data of the transferred photosensitive roll 12 from the programmable controller, not shown, which controls an upstream working station, in response to a detected signal indicative of the photosensitive roll 12 from the workpiece detector 144, and stores the read specification data in one of the data areas M1 through M30 (the data area M3 in FIG. 8) in the tracking data memory 178.

Similarly, when a photosensitive roll 12 is transferred onto a next pallet 86 in the transfer station ST1, the programmable controller PLC1 stores the specification data of the photosensitive roll 12 in one of the data areas M1 through M30 which is specified by the identification data of the pallet 86. In this manner, the tracking data memory 178 of the programmable controller PLC1 stores the specification data of photosensitive rolls 12 in association with the identification data (pallet number data) of pallets 86. Unless the photosensitive rolls 12 are removed from the pallets 86, the specification data of the photosensitive rolls 12 or the light-shielded photosensitive rolls 30 correspond to and are recognized based on the identification data of the pallets 86.

When the pallet 86 is fed to the next first flanged member inserting station ST2, the programmable controller PLC2 which controls the first flanged member inserting station ST2 reads identification data from the memory medium 138 on the fed pallet 86 through the data reader 142 in response to a detected signal indicative of the photosensitive roll 12 from the workpiece detector 144. The programmable controller PLC2 then reads the specification data of the photosensitive roll 12 corresponding to the read identification data from the tracking data memory 178 of the programmable controller PLC1, and stores the read specification data in the tracking data memory 178 of the programmable controller PLC2. For example, in FIG. 8, the programmable controller PLC2 reads the specification data of the photosensitive roll 12 stored in the data area M1, and stores the read specification data in the tracking data memory 178 of its own. The programmable controller PLC2 controls the control devices of the first flanged member inserting station ST2 according to the stored specification data to insert the first flanges 18a, 18b, 18c into the photosensitive roll 12.

Likewise, the programmable controllers PLC1 through PLC6 read the identification data of fed pallets 86, reads only the specification data of the photosensitive rolls 12 or the light-shielded photosensitive rolls 30 corresponding to the read identification data from the tracking data memory 178 of the programmable controller PLC1, and controls desired operations according to the read specification data.

Unless the pallet 86 and the photosensitive roll 12 or the light-shielded photosensitive roll 30 are separated from each other, when each of the programmable controllers PLC1 through PLC6 reads the identification data of the pallet 86, it reads, with high accuracy, the specification data of the photosensitive roll 12 or the light-shielded photosensitive roll 30 which is identified by the read identification data from the tracking data memory 178 of the programmable controller PLC1, and can control a desired operation according to the read specification data.

The identification data stored in the memory medium 138 are only read by the data reader 142, and are not repeatedly written. Therefore, the identification data are stably stored in the memory medium 138 over a long period of time. Since the data stored in the memory medium 138 are identification data only, the memory medium 138 may store a plurality of identification data for backup against accidental data destruction.

The specification data stored in the tracking data memory 178 include work attribute data managing processed states of photosensitive rolls 12 or light-shielded photosensitive rolls 30 on the pallets 86. The management control by the programmable controllers PLC1 through PLC6 can be performed more reliably using the work attribute data.

Specifically, each of the programmable controllers PLC1 through PLC6 sets a working start flag as work attribute data when the workpiece in the working station starts being processed or worked on, sets a workpiece-present flag when the workpiece detector 144 detects a workpiece in the working station, sets a work completion flag when the operation in the working station is completed, and sets a failure flag when the operation in the working station is a failure.

With the work attribute data thus established, if a desired operation on a workpiece in the working station fails due to some trouble, then since a work completion flag is not set, when the workpiece is fed to the next working station, the programmable controller in the next working station recognizes that the desired operation has not been performed on the workpiece in the preceding working station by confirming the work attribute data. The programmable controller issues a warning indicative to the workpiece trouble to the operator, and suspends the operation on the workpiece.

If the operator forgets to remove the workpiece though a failure occurs due to some trouble in the preceding working station, then the programmable controller in the next station can detect that the problematic workpiece is fed because the failure flag has been set and the workpiece detector 44 detects the workpiece and the workpiece-present flag has been set.

Therefore, since each of the programmable controllers PLC1 through PLC6 reads the specification data and performs the operation only when it confirms that there is a photosensitive roll 12 or a light-shielded photosensitive roll 30 present in the working station, the workpiece is not processed based on different specification data, and any operation is prevented from being performed in the working station when there is no workpiece in the working station. If predetermined code data is set as trouble code data in the tracking data memory 178 when there is not workpiece, then each of the programmable controllers PLC1 through PLC6 can confirm why a photosensitive roll 12 or a light-shielded photosensitive roll 30 is not carried on the pallet 86.

In the present embodiment, the photosensitive roll 12 has been described as the rolled article. However, the principles of the present invention are also applicable to various rolled articles in the form of a roll of a sheet or a roll of an elongate film-like material.

With the method of and apparatus for processing a rolled article according to the present invention, since the end of the rolled article is drawn to a prescribed length and then tape members are applied to the drawn end, the end can be adjusted to the prescribed length at all times, and the tape members can be applied to the end efficiently.

When the tape members are applied, both surfaces of the end of the rolled article are supported by a set of presser members. Even if the end of the rolled article is curled in different states, therefore, the tape members can be applied accurately to the end of the rolled article at desired positions thereon. It is thus possible to apply the tape members highly accurately and efficiently to the end of the rolled article with a simple process and arrangement.

According to the present invention, since the end of a packaging sheet is gripped and the packaging sheet is fed, the packaging sheet can be positioned more accurately than with the conventional structure in which the packaging sheet is fed by suction belts or the like. Therefore, the packaging sheet can be applied accurately to the end of the rolled article.

When the rolled article is rotated, the winding terminal end of the packaging sheet is held in position. Thus, when the packaging sheet is wound around the rolled article, the packaging sheet is prevented from being warped, and can be wound highly accurately around the rolled article. Therefore, the packaging sheet can be wound efficiently and highly accurately around the rolled article with a simple process and arrangement.

According to the present invention, furthermore, a side edge of the separable sheet is bent to expose adhesive-free areas of end tapes out of the side edge of the separable sheet, and the exposed adhesive-free areas are held. Therefore, the end tapes can reliably be removed from the separable sheet. Accordingly, each end tape can efficiently and quickly be supplied to the end of the rolled article with a simple process and arrangement.

According to the present invention, furthermore, a strip-like skirt member is blanked and then cut off transversely, producing skirt members, and at least a sheet member is also cut off, with the cut ends are spaced from each other by a given distance. The skit members are joined to the cut ends with transverse portions thereof being exposed out. The amount of scrap produced when the skirt members are formed is much smaller than if skirt members were blanked from a sheet, thus resulting in an increased yield, and the produced skirt members are prevented from sticking together. Thus, the skirt members can reliably and efficiently be applied to the sheet member with a simple process and arrangement.

According to the present invention, furthermore, a plurality of heating heads with one or more annular protrusions are selectively used depending on the diameter of the rolled article. No rotating mechanism for rotating the rolled article is required, and the packaged product can be pressed under a constant pressure by the annular protrusions. Therefore, the packaging apparatus is effectively simplified in structure, and only the packaging region can reliably be thermally fused, so that the light-shielding capability of the rolled article is increased.

According to the present invention, furthermore, a single heating head with two or more annular protrusions having different diameters corresponding to the diameters of rolled articles is used to handle different rolled articles. The packaging apparatus is thus simplified in structure and economical.

According to the present invention, furthermore, the first flanged member has grooves and a step on its inner circumferential surface, and the second flanged member has ridges on its inner circumferential surface. While the ridges of the second flanged member abut against and are supported by the step of the first flanged member, the second flanged member is rotated to bring the ridges into accurate and reliable alignment with the groove, allowing the second flanged member to be inserted highly accurately and efficiently into the first flanged member.

With the method of and apparatus for mounting a flanged structure for a rolled article according to the present invention, since the second flanged member is rotated while being pressed against the first flanged member only under the bias of a resilient member, the torque to rotate the second flanged member is maintained at a constant level, allowing the ridges to be aligned reliably with the grooves. After it is automatically detected that the grooves and the ridges are aligned with each other and the second flanged member is moved to the first flanged member, the inserting actuator is operated to insert the second flanged member into the first flanged member.

Thus, it is possible to align the ridges and the grooves with each other and insert the second flanged member highly accurately and efficiently into the first flanged member with a simple process and arrangement.

According to the present invention, furthermore, when the rolled article is transferred onto the pallet and fed between a plurality of working stations for working on the rolled article, the identification data of the pallet is read from the pallet, and the specification data of the rolled article corresponding to the identification data is read to work on the rolled workpiece. Therefore, the rolled article fed with the pallet can be worked on highly accurately based on the specification data which is clearly associated with the identification data of the pallet.

Since the identification data memory means on the pallet only stores and reads the identification data, the identification data memory means does not suffer a reduction in its memory capacity, and can read the stored identification data stably over a long period of time for stably obtaining appropriate specification data of the rolled article.

Although certain preferred embodiments of the present invention have been shown and described in detail, it should be understood that various changes and modifications may be made therein without departing from the scope of the appended claims.

What is claimed is:

1. A rolled article comprising:

a first flanged member mounted on a end of a roll; and a second flanged member inserted in said first flanged member;

said first flanged member having a plurality of angularly spaced, axially extending grooves defined in an inner circumferential surface thereof, and a step of increased diameter disposed on said inner circumferential surface at an end into which said second flanged member is inserted;

said second flanged member having, on an outer circumferential surface thereof, a tapered tip which is progressively smaller in diameter toward a tip end thereof in a direction in which said second flanged member is inserted into said first flanged member, and a straight barrel contiguous from a larger-diameter end of said tapered tip;

said second flanged member having, a plurality of angularly spaced, axially extending ridges extending axially along said straight barrel in alignment with said grooves, said ridges being spaced axially from the smaller-diameter tip end of said tapered tip toward the straight barrel by a predetermined distance, and extending radially outwardly to respective radial positions corresponding to the diameter of said step of said first flanged member.

* * * * *